US008726374B2

(12) United States Patent
Unagami et al.

(10) Patent No.: US 8,726,374 B2

(45) Date of Patent: May 13, 2014

(54) TAMPERING MONITORING SYSTEM, CONTROL DEVICE, AND TAMPERING CONTROL METHOD

(75) Inventors: Yuji Unagami, Osaka (JP); Manabu Maeda, Osaka (JP); Yuichi Futa, Osaka (JP); Natsume Matsuzaki, Osaka (JP); Masao Nonaka, Osaka (JP); Hiroki Shizuya, Miyagi (JP); Masao Sakai, Miyagi (JP); Shuji Isobe, Miyagi (JP); Eisuke Koizumi, Miyagi (JP); Shingo Hasegawa, Miyagi (JP); Makoto Carlos Miyauchi, Miyagi (JP)

(73) Assignee: Panasonic Corporation, Osaka (JP)

( * ) Notice: Subject to any disclaimer, the term of this patent is extended or adjusted under 35 U.S.C. 154(b) by 445 days.

(21) Appl. No.: 13/133,029

(22) PCT Filed: Feb. 15, 2010

(86) PCT No.: PCT/JP2010/000903
§ 371 (c)(1),
(2), (4) Date: Jun. 6, 2011

(87) PCT Pub. No.: WO2010/092830
PCT Pub. Date: Aug. 19, 2010

(65) Prior Publication Data

US 2011/0239297 A1 Sep. 29, 2011

(30) Foreign Application Priority Data

Feb. 16, 2009 (JP) ................................ 2009-032373
Apr. 21, 2009 (JP) ................................ 2009-102526

(51) Int. Cl.
*H04N 21/442* (2011.01)
*H04N 1/00* (2006.01)
*G06F 21/55* (2013.01)
*H04L 27/00* (2006.01)

(52) U.S. Cl.
CPC ....... *H04N 21/44236* (2013.01); *H04N 1/0088* (2013.01); *G06F 21/55* (2013.01); *H04L 2027/0034* (2013.01)
USPC .................. 726/22; 726/23; 726/24; 713/194

(58) Field of Classification Search
CPC ............ G06F 21/55; H04L 2027/0034; H04N 1/0088; H04N 21/44236
USPC ...................................... 713/194; 726/22–24
See application file for complete search history.

(56) References Cited

U.S. PATENT DOCUMENTS 6,539,266 B1 * 3/2003 Ishikawa ......................... 700/23
7,831,838 B2 * 11/2010 Marr et al. .................... 713/187

(Continued)

FOREIGN PATENT DOCUMENTS

CN 1591671 3/2005
CN 1741475 3/2006

(Continued)

OTHER PUBLICATIONS

Becker, Th. et al, Oct. 26-29, 2008, IEEE, EADS Innovation Works, EADS Deutschland GmbH, Munich, pp. 1623-1625.*

(Continued)

*Primary Examiner* — Carl Colin
*Assistant Examiner* — Ali Shayanfar
(74) *Attorney, Agent, or Firm* — Wenderoth, Lind & Ponack, L.L.P.

(57) ABSTRACT

A management device detects whether any normal monitoring module that has not been tampered with exists by referring to monitoring results received from an information security device and selects, when existence is detected, one of the monitoring modules and assumes that the selected monitoring module has been tampered with. The monitoring device then successively applies a procedure to monitoring modules other than the selected monitoring module by referring to the monitoring results, starting from the selected monitoring module, the procedure being to assume that any monitoring module determining that a monitoring module assumed to have been tampered with is normal has also been tampered with. As a result of the procedure, when all of the monitoring modules are assumed to have been tampered with the management device determines the selected monitoring module to be a normal monitoring module that has not been tampered with.

23 Claims, 80 Drawing Sheets

(56) References Cited

U.S. PATENT DOCUMENTS

| | | | |
|---|---|---|---|
| 2005/0050421 | A1 | 3/2005 | Enkaku |
| 2006/0048227 | A1 | 3/2006 | Ohta et al. |
| 2006/0265746 | A1 | 11/2006 | Farley et al. |
| 2008/0155509 | A1 | 6/2008 | Ohta et al. |
| 2009/0249085 | A1 | 10/2009 | Stransky |
| 2010/0235588 | A1 | 9/2010 | Maeda et al. |

FOREIGN PATENT DOCUMENTS

| | | |
|---|---|---|
| CN | 101187867 | 5/2008 |
| JP | 3056732 | 4/2000 |
| JP | 2000-293370 | 6/2000 |
| JP | 2009-3853 | 1/2009 |
| WO | 2008/099682 | 8/2008 |

OTHER PUBLICATIONS

Office Action mailed Mar. 20, 2013 in corresponding U.S. Appl. No. 13/143,594.

Yoshiteru Ishida et al., “Autonomus Decentralized Diagnostic Algorithms for Distributed Diagnosis Models: Immune Network Model”, The Transactions of the Institute of Electronics, Information and Communication Engineers D-II; vol. J75-D-II; No. 3, pp. 646-647, Mar. 1992, together with partial English translation.

International Search Report mailed Apr. 27, 2010 in corresponding International (PCT) Application No. PCT/JP2010/000906.

Chinese Office Action (OA) issued Jul. 23, 2013 in Chinese Patent Application No. 201080006212.0.

English translation of Chinese Search Report (SR) issued in Chinese Patent Application No. 201080006212.0.

International Search Report issued May 11, 2010 in International (PCT) Application No. PCT/JP2010/000903.

“Gendai Ango” (Modern Cryptography) by Tatsuaki Okamoto and Hirosuke Yamamoto, Sangyotosho, pp. 171-173, 1997, together with verified partial English translation.

ITU-T-Rec-X.509-199708-S, Information Technology—Open Systems Interconnection—The Directory: Authentication Framework, 1997.

Franco P. Preparata et al., “On the Connection Assignment Problem of Diagnosable Systems”, IEEE Transactions on Electronic Computers, vol. EC-16, No. 6, pp. 848-854, 1968.

USPTO Notice of Allowance and Fees(s) Due issued Jul. 19, 2013 in corresponding U.S. Appl. No. 13/143,594.

Patrick Traynor et al., “On Cellular Botnets: Measuring the Impact of Malicious Devices on a Cellular Network Core”, CCS ’09 Proceedings of the 16th ACM conference on Computer and communications security, pp. 223-234, 2009.

* cited by examiner

131
Update module
Main part of update module
301
Reception unit
302
Sending unit
303
Control unit
304
Update unit
305
Verification unit
306
MAC value generation unit
307
MAC value table updating unit
308
Share storage unit
MAC value table
Verification certificate Start
S100
Initialization
S200
Detection
S300
Analysis/determination
S400
Mutual authentication
S500
Recovery
S600
Next round preparation

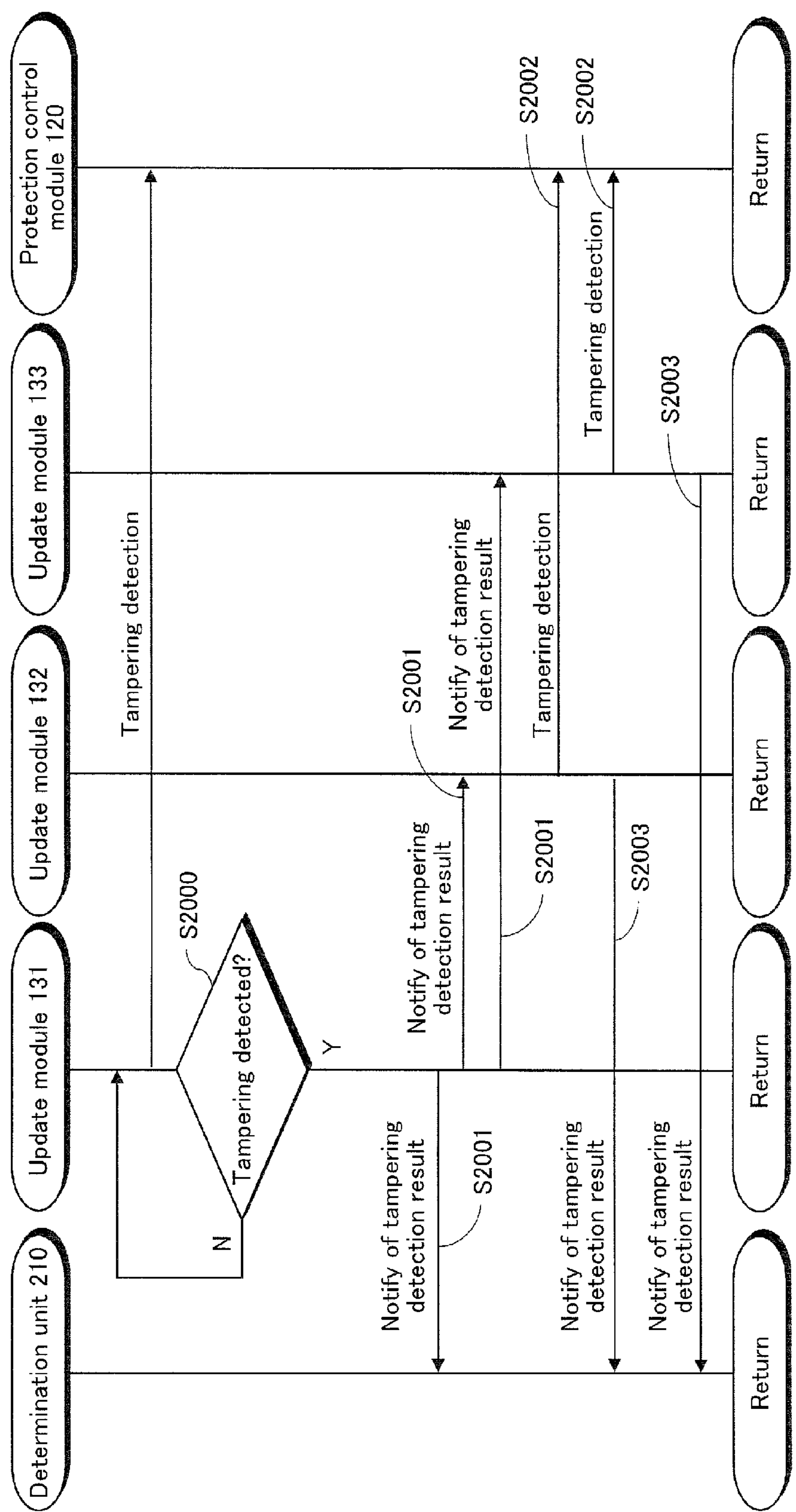
FIG.14
Determination unit 210
Update module 131
Update module 132
Update module 133
Protection control module 120
Tampering detection
Tampering detected?
S2000
Y
N
Notify of tampering detection result
S2001
Notify of tampering detection result
S2001
Notify of tampering detection result
S2001
Tampering detection
S2002
Tampering detection
S2002
Notify of tampering detection result
S2003
S2003
Notify of tampering detection result
Notify of tampering detection result
Return
Return
Return
Return
Return

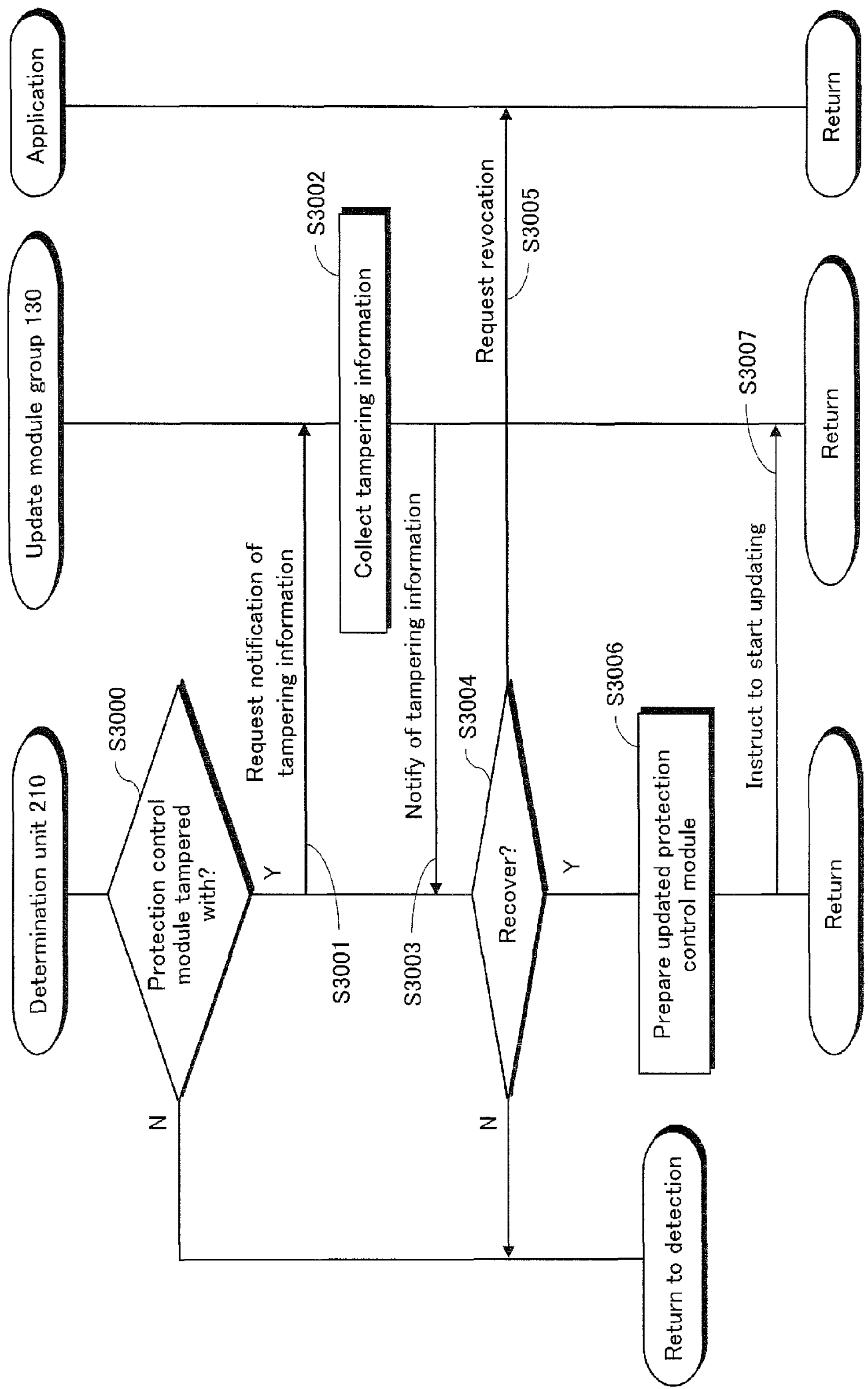
FIG.15
Determination unit 210
Update module group 130
Application
S3000
Protection control module tampered with?
Y
N
Request notification of tampering information
S3001
S3002
Collect tampering information
Notify of tampering information
S3003
S3004
Recover?
Y
N
Request revocation
S3005
S3006
Prepare updated protection control module
Instruct to start updating
S3007
Return
Return
Return
Return to detection Updated software delivery unit 220
Update module 131
S4000
Generate challenge data
Transmit challenge data
S4001
S4002
Generate signature
Transmit signature as response data
S4003
S4004
Verify response data
S4005
Response data correct?
N
Y
S4006
Stop device
Return
Return Determination unit 210
Update module 131
Update module 132
Update module 133
S5001a
Detect tampering in update module 132
S5001b
Detect tampering in update module 133
S5001c
Detect tampering in update module 131
S5002
Transmit detection results
S5003
Receive detection results
S5004
Update module that has been tampered with exists?
N
Y
S5005
Stop processing
Return
Return
Return
Return
End

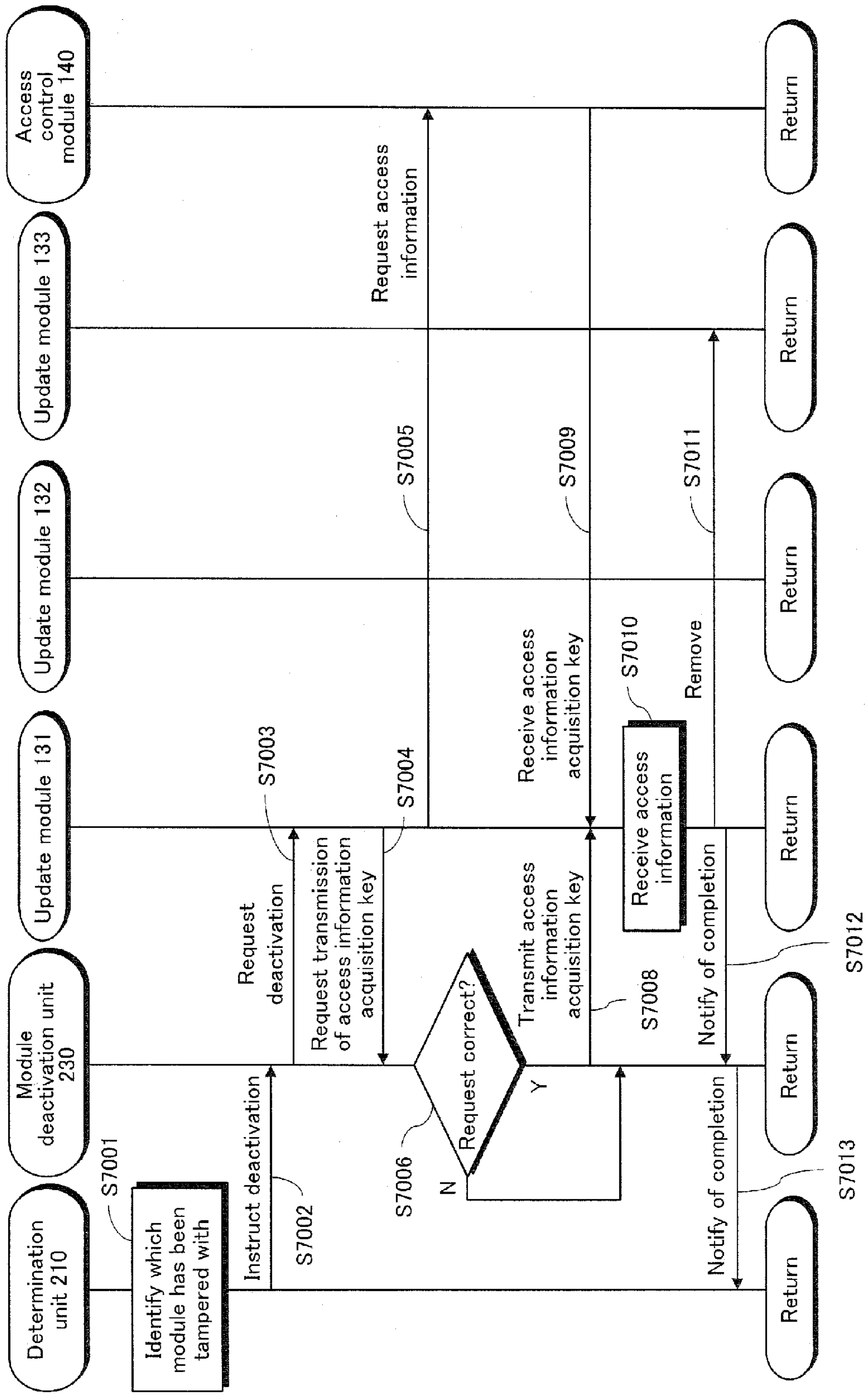
FIG.25
Determination unit 210
Module deactivation unit 230
Update module 131
Update module 132
Update module 133
Access control module 140
S7001
Identify which module has been tampered with
S7002
Instruct deactivation
Request deactivation
S7003
Request transmission of access information acquisition key
S7004
S7005
Request access information
S7006
Request correct?
Y
N
Transmit access information acquisition key
S7008
Receive access information acquisition key
S7009
S7010
Receive access information
Remove
S7011
Notify of completion
S7012
Notify of completion
S7013
Return
Return
Return
Return
Return
Return 131
Update module
132
Update module
133
Update module
134
Update module
135
Update module
136
Update module
137
Update module
2000
2001
2002

131
Update module
132
Update module
133
Update module
134
Update module
135
Update module
136
Update module
137
Update module
2010
2011
2012
2013
2014

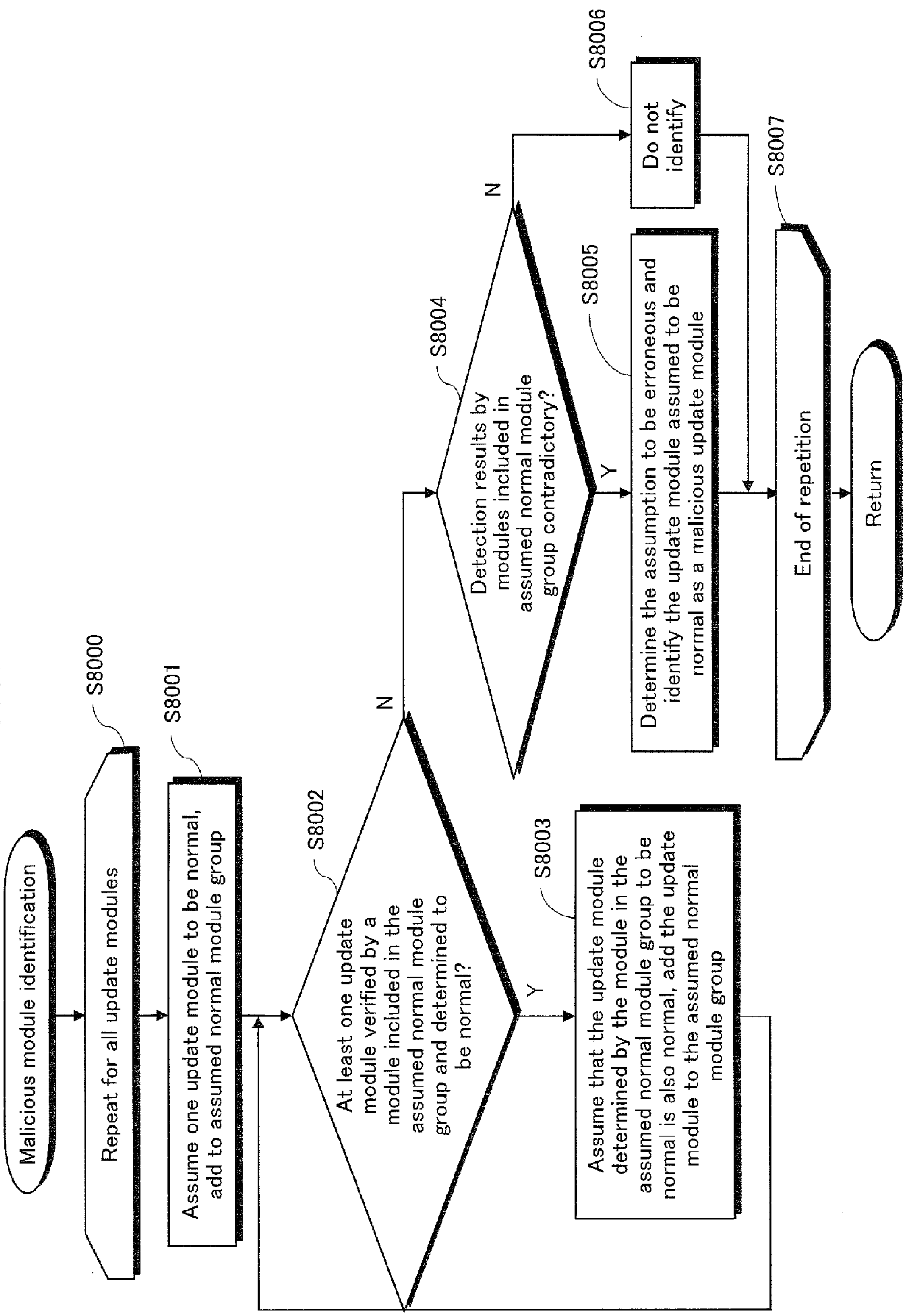
FIG.33
Malicious module identification
S8000
Repeat for all update modules
S8001
Assume one update module to be normal, add to assumed normal module group
S8002
At least one update module verified by a module included in the assumed normal module group and determined to be normal?
Y
N
S8003
Assume that the update module determined by the module in the assumed normal module group to be normal is also normal, add the update module to the assumed normal module group
S8004
Detection results by modules included in assumed normal module group contradictory?
Y
N
S8005
Determine the assumption to be erroneous and identify the update module assumed to be normal as a malicious update module
S8006
Do not identify
S8007
End of repetition
Return Update module
131
Update module
132
Update module
133
Update module
134
Update module
135
Update module
136
Update module
137
2041
2042
2043
2045
2046
2047

131
Update module
132
Update module
133
Update module
134
Update module
135
Update module
136
Update module
137
Update module
2061
2062
Detection results are contradictory

| No | Cycle size | Update modules | Input into cycle |
|---|---|---|---|
| 1 | 3 | 131, 132, 133 | 1 |
| 2 | 5 | 131, 132, 135, 137, 133 | 1 |
| 3 | 5 | 131, 134, 136, 137, 133 | 2 |
| 4 | 3 | 133, 135, 137 | 1 |
| 5 | 3 | 133, 136, 137 | 2 |

| No | Cycle size | Update modules | Input into cycle |
|---|---|---|---|
| 1 | 3 | 133, 136, 137 | 2 |
| 2 | 3 | 131, 132, 133 | 1 |
| 3 | 3 | 133, 135, 137 | 1 |
| 4 | 5 | 131, 134, 136, 137, 133 | 2 |
| 5 | 5 | 131, 132, 135, 137, 133 | 1 |

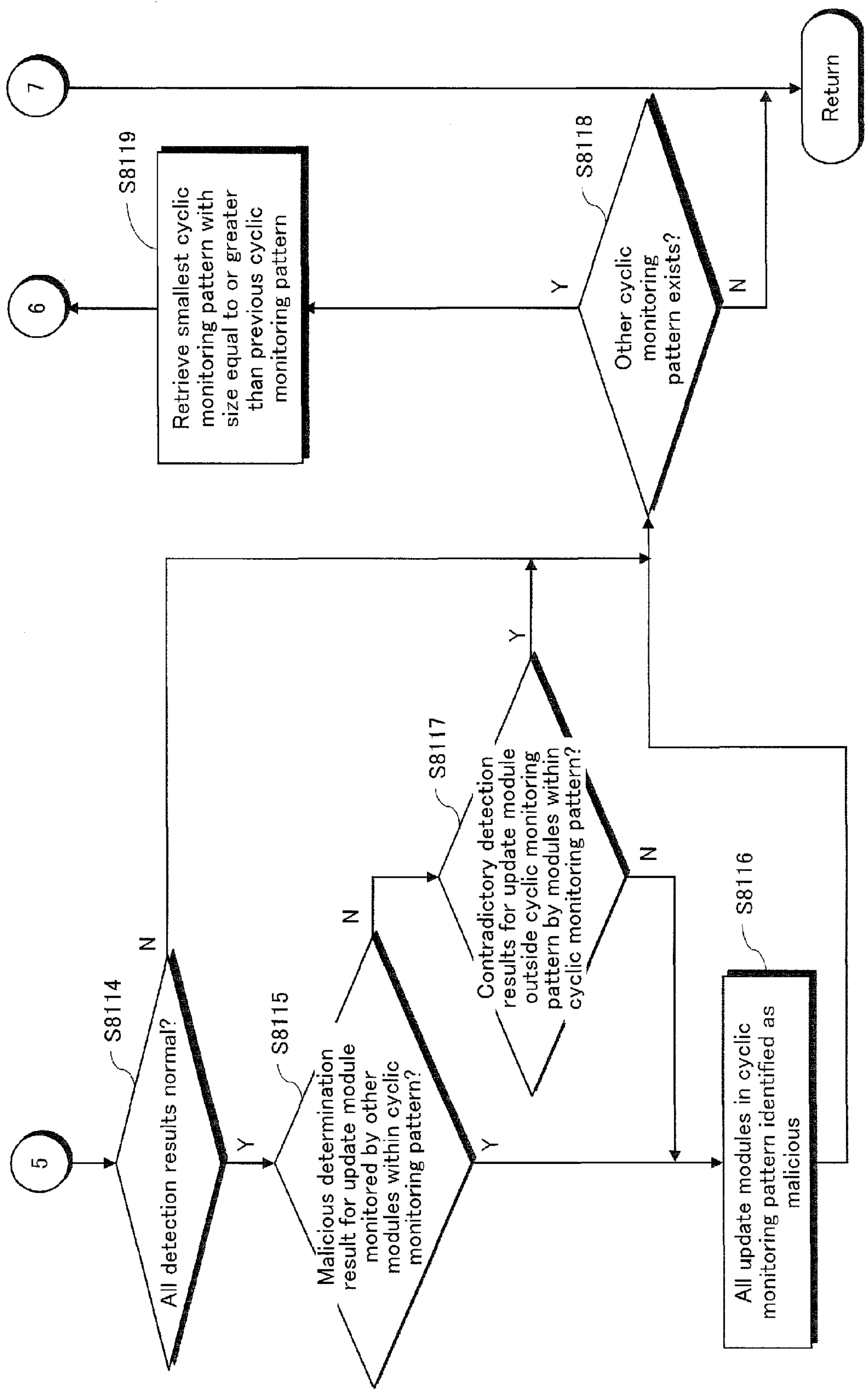
FIG.42
5
S8114
All detection results normal?
Y
N
S8115
Malicious determination result for update module monitored by other modules within cyclic monitoring pattern?
Y
N
S8117
Contradictory detection results for update module outside cyclic monitoring pattern by modules within cyclic monitoring pattern?
Y
N
S8116
All update modules in cyclic monitoring pattern identified as malicious
S8118
Other cyclic monitoring pattern exists?
Y
N
S8119
Retrieve smallest cyclic monitoring pattern with size equal to or greater than previous cyclic monitoring pattern
6
7
Return 131
Update module
132
Update module
133
Update module
134
Update module
135
Update module
136
Update module
137
Update module 130
131
Update module
share 1
share 4
share 7
132
Update module
share 2
share 7
share 6
133
Update module
share 3
share 5
share 4
134
Update module
share 4
share 3
share 1
135
Update module
share 5
share 6
share 3
136
Update module
share 6
share 2
share 5
137
Update module
share 7
share 1
share 6

Update module
Update module
Update module
Update module
Update module
Update module
Update module
Inconsistent
Assume to be a malicious update module
131
132
133
134
135
136
137
3011
3012
3013
3014
3015
3021
3022
3023
3024
3025
3026
3027
3028
3029
3030

Update module
Update module
Update module
Update module
Update module
Update module
Update module
Consistent
Assume to be a malicious update module
131
132
133
134
135
136
137
3041
3042
3043
3044
3045
3051
3052
3053
3054
3055
3056
3057
3058
3059
3060
3061
3062
3063

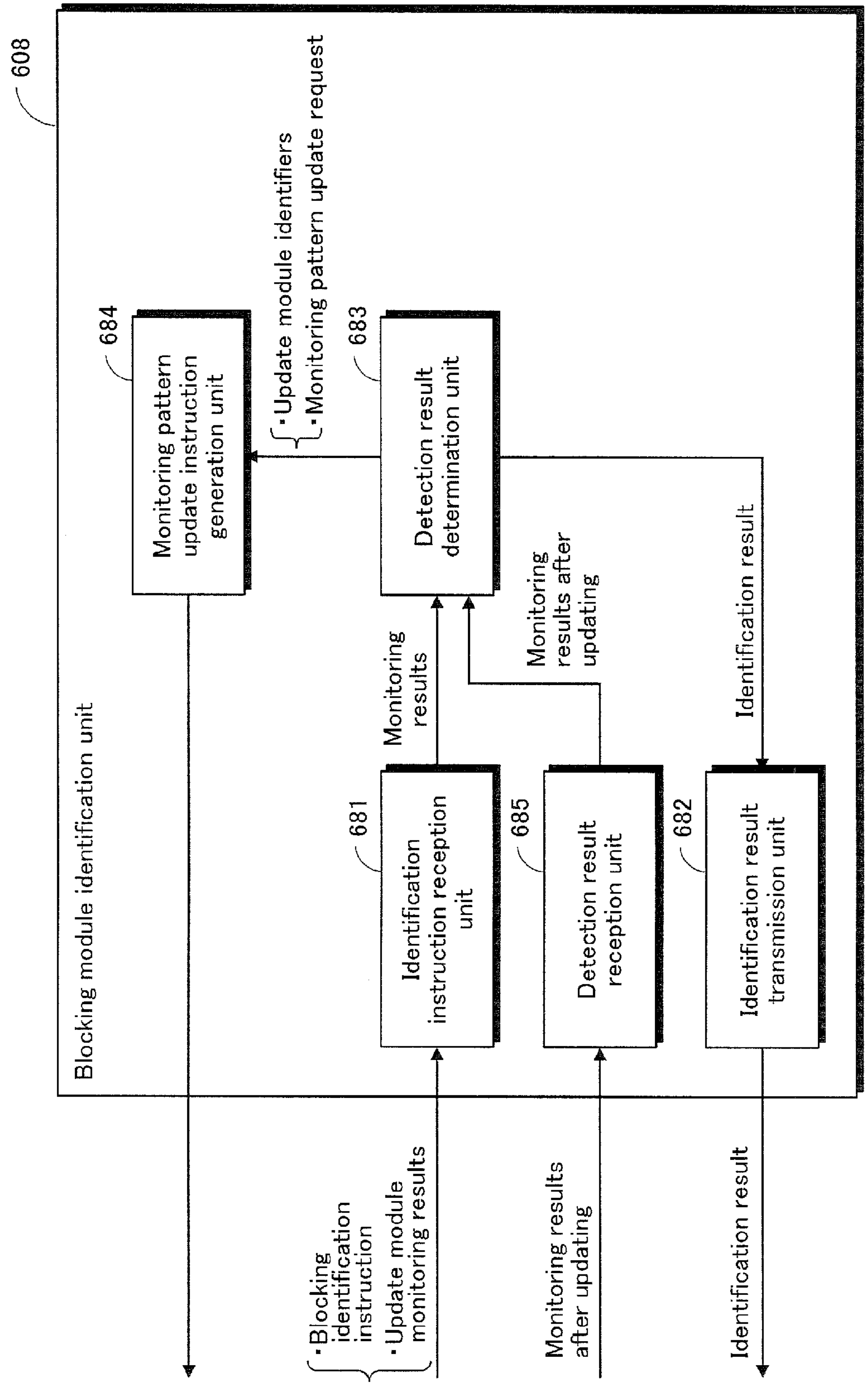
FIG.56
608
Blocking module identification unit
684
Monitoring pattern update instruction generation unit
683
Detection result determination unit
・Update module identifiers
・Monitoring pattern update request
Monitoring results
Monitoring results after updating
Identification result
681
Identification instruction reception unit
685
Detection result reception unit
682
Identification result transmission unit
・Blocking identification instruction
・Update module monitoring results
Monitoring results after updating
Identification result

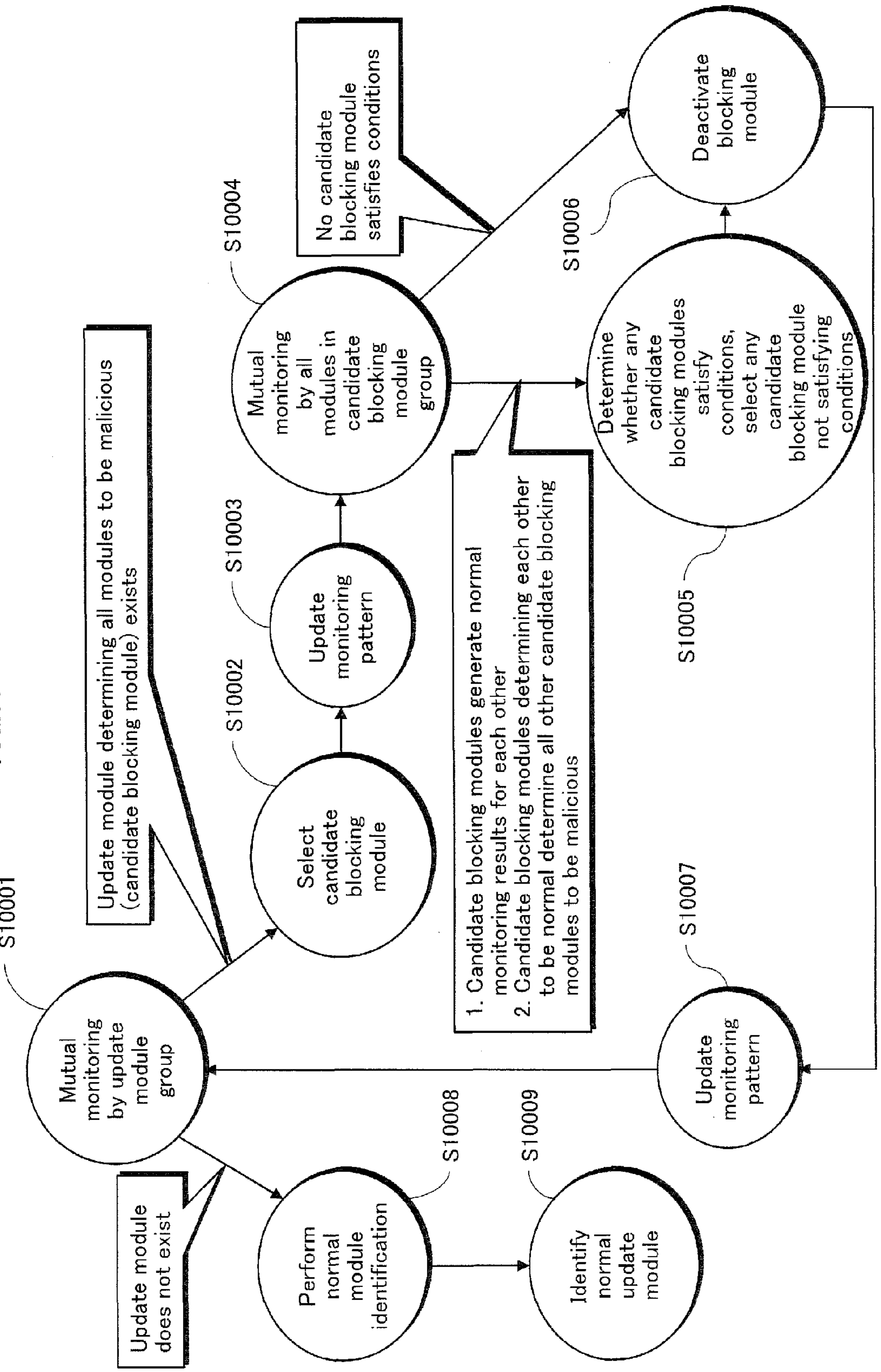
FIG.58
S10001
Mutual monitoring by update module group
Update module determining all modules to be malicious (candidate blocking module) exists
S10002
Select candidate blocking module
S10003
Update monitoring pattern
S10004
Mutual monitoring by all modules in candidate blocking module group
No candidate blocking module satisfies conditions
1. Candidate blocking modules generate normal monitoring results for each other
2. Candidate blocking modules determining each other to be normal determine all other candidate blocking modules to be malicious
S10005
Determine whether any candidate blocking modules satisfy conditions, select any candidate blocking module not satisfying conditions
S10006
Deactivate blocking module
S10007
Update monitoring pattern
Update module does not exist
S10008
Perform normal module identification
S10009
Identify normal update module 15
Return
S11014
S11015
14
Update monitoring patterns
Mutual monitoring
Return
S11016
13
Monitoring results
Return
12
Return
S11017
11
Identify normal module
Return Blocking module identification
S12001
Any update module generates only malicious monitoring results?
N
Return
Y
S12002
Generate monitoring patterns so that each candidate blocking module monitors every other candidate blocking module
S12003
Transmit new monitoring patterns, cause modules to monitor each other
S12004
Receive mutual monitoring results
16

Update module
131
Update module
132
Update module
133
Update module
134
Update module
135
Update module
136
Update module
137
4031
4032
4033
4034
4035
4036
4037
All monitoring results are malicious
All monitoring results are malicious
All monitoring results are malicious
All monitoring results are malicious
Update modules that might block identification of normal module Mutual monitoring pattern
132
Update module
137
Update module
Update module
131
Update module
136

Example 1 of mutual monitoring results
Update module
132
Update module
137
Update module
131
Update module
136

Example 3 of mutual monitoring results

Example 4 of mutual monitoring results
Update module
132
Update module
137
Update module
131
Update module
136
4071
4072

10b
100b
Device
111
Application
110
Application
Protection control module
120
Access control module
140
130b
Update module group
Network
200b
Update server
240
Transmission unit
210b
Determination unit
220
Updated software delivery unit
230
Module deactivation unit

TAMPERING MONITORING SYSTEM, CONTROL DEVICE, AND TAMPERING CONTROL METHOD

BACKGROUND OF INVENTION

1. Technical Field

The present invention relates to management technology for monitoring tampering in modules or the like that operate inside devices.

2. Background Art

A conventionally known method of ensuring that an application program that stores confidential data, such as an authentication key, is not analyzed by a malicious third party (hereinafter, "attacker"), is to protect the application program with an anti-tamper module. The anti-tamper module is normally provided on the device as hardware and protects application programs. However, in light of how new attack methods are continually being proposed these days, it is preferable to protect application programs with software, i.e. with a computer program that can easily be updated to respond flexibly to new attack methods.

Technology to protect application programs via software includes verification of tampering using hash values. Another example is a decryption loading function, whereby application programs are encrypted and stored when not in use. Application programs are decrypted and loaded into memory only when used.

Even when using such technology, however, the very software that is used to protect application programs (hereinafter, a "protection control module") may be subject to attack. If the protection control module is tampered with, application programs are also exposed to attack.

Patent Literature 1 discloses technology for preventing changes to a program that reliably precludes execution of a program that has been tampered with even when changes occur in a check program that checks whether another program has changed. With this technology, a plurality of check programs that monitor changes in other programs are provided, with each check program monitoring one or more of the other check programs. The following is a brief description of this technology.

Suppose two monitoring modules A and B monitor each other. The monitoring modules A and B respectively include programs that are to be protected from tampering by an attacker (main programs A and B), programs for detecting tampering in other modules (check programs A and B), and information necessary for the check programs to detect tampering (check information A and B). Check program A uses check information A to detect whether the main program B and the check program B in the monitoring module B have been tampered with. Furthermore, check program B uses check information B to detect whether the main program A and the check program A in the monitoring module A have been tampered with. The monitoring modules thereby detect whether each other's main program and check program have been tampered with.

CITATION LIST

Patent Literature

Patent Literature 1: Japanese Patent No. 3056732

Patent Literature 2: WO2008/099682

Non-Patent Literature

Non-Patent Literature 1: Tatsuaki OKAMOTO and Hirosuke YAMAMOTO, "Gendai Ango" (Modern Encryption), Sangyo Tosho, 1997.

Non-Patent Literature 2: ITU-T Recommendation X.509 (1997E): Information Technology—Open Systems Interconnection—The Directory: Authentication Framework, 1997.

Non-Patent Literature 3: F. Preparata, G. Metze and R. T. Chien, "On The Connection Assignment Problem of Diagnosable Systems," IEEE Trans. Electronic Computers, vol. 16, pp. 848-854, 1968.

SUMMARY OF INVENTION

When tampering is detected during such tampering detection, then a normal protection control module should be acquired from an external server via a network, and the protection control module that has been tampered with should be replaced by a normal protection control module. However, the module that has the function of updating the protection control module (hereinafter, "update module") may also be attacked.

If the update module is attacked, then the protection control module will not be properly updated, and confidential data held by the application programs may be divulged. It is possible to detect tampering in the update module by further providing a module that detects such tampering. However, such an approach does not solve the fundamental problem, since this detection module may also be tampered with.

The above problem has been described using the example of updating the protection control module, but the same problem of modules not being properly updated occurs with other modules as well, such as when updating application programs or when updating update modules themselves.

In order to solve the above problem, it is an object of the present invention to provide a tampering monitoring system, management device, management method, integrated circuit, program, and recording medium that can identify, to a high degree of accuracy, a normal monitoring module that has not been tampered with among a plurality of monitoring modules, even when a portion of the monitoring modules have been tampered with.

In order to achieve the above object, the present invention is a management device for managing an information security device that includes a plurality of monitoring modules that monitor for tampering, the management device comprising: a reception unit configured to receive, from the information security device, a plurality of monitoring results generated by the monitoring modules each monitoring another monitoring module; a detection unit configured to detect whether any normal monitoring module that has not been tampered with exists by referring to the monitoring results; a first assumption unit configured to select, when the detection unit detects existence, a monitoring module among the plurality of monitoring modules and to assume that the selected monitoring module has been tampered with; a second assumption unit configured to successively apply a procedure to monitoring modules other than the selected monitoring module by referring to the monitoring results, starting from the selected monitoring module, the procedure being to assume that any monitoring module determining that a monitoring module assumed to have been tampered with is normal has also been tampered with; and a determination unit configured to determine whether, as a result of the procedure by the second assumption unit, all of the monitoring modules are assumed to have been tampered with, and when determining positively, to determine the selected monitoring module to be a normal monitoring module that has not been tampered with.

With this structure, the detection unit detects the existence of a normal monitoring module that has not been tampered with, indicating that at least one monitoring module is normal. On the other hand, when the determination unit determines that all of the monitoring modules are assumed to be tampered with, such a determination result contradicts the detection result by the detection unit. This is because the assumption by the first assumption unit is incorrect. Accordingly, the assumption by the first assumption unit is reversed, and the monitoring module assumed by the first assumption unit to have been tampered with is determined to be a normal monitoring module.

Since a normal monitoring module can be identified in this way, monitoring results by normal monitoring modules are reliable and thus used effectively.

BRIEF DESCRIPTION OF DRAWINGS

FIG. 14 is a sequence diagram of detection according to Embodiment 1.

FIG. 15 is a sequence diagram of analysis and determination according to Embodiment 1.

FIG. 25 is a sequence diagram of deactivation according to Embodiment 1.

FIG. 33 is a flowchart of malicious module identification according to Embodiment 2.

FIG. 40 shows a data structure of a cyclic monitoring pattern list 2200 according to Embodiment 2.

FIG. 42 is a flowchart of malicious module identification that takes into account the cyclic monitoring pattern according to Embodiment 2.

FIG. 56 is a configuration diagram showing a structure of a blocking module identification unit 608 in the software updating system 10*db*.

FIG. 58 is an operational diagram showing operations in the software updating system 10*db*; in particular, FIG. 58 shows the relationship between blocking module identification and normal module identification.

DESCRIPTION OF INVENTION

Figure 1:
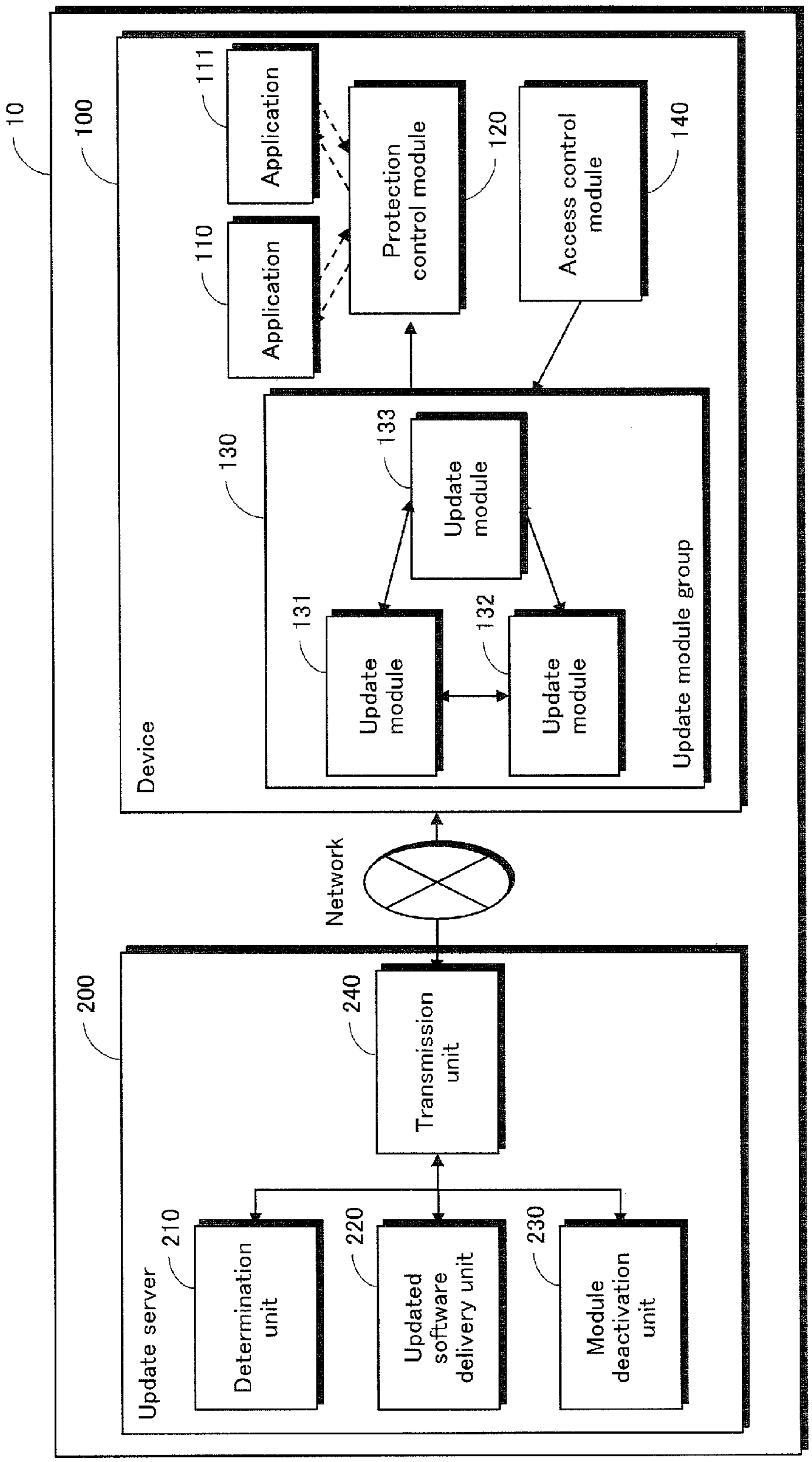
FIG. 1 is an overall structure diagram of a software updating system 10 according to Embodiment 1.

An aspect of the present invention recited in claim 1 is a management device for managing an information security device that includes a plurality of monitoring modules that monitor for tampering, the management device comprising: a reception unit configured to receive, from the information security device, a plurality of monitoring results generated by the monitoring modules each monitoring another monitoring module; a detection unit configured to detect whether any normal monitoring module that has not been tampered with exists by referring to the monitoring results; a first assumption unit configured to select, when the detection unit detects existence, a monitoring module among the plurality of monitoring modules and to assume that the selected monitoring module has been tampered with; a second assumption unit configured to successively apply a procedure to monitoring modules other than the selected monitoring module by referring to the monitoring results, starting from the selected monitoring module, the procedure being to assume that any monitoring module determining that a monitoring module assumed to have been tampered with is normal has also been tampered with; and a determination unit configured to determine whether, as a result of the procedure by the second assumption unit, all of the monitoring modules are assumed to have been tampered with, and when determining positively, to determine the selected monitoring module to be a normal monitoring module that has not been tampered with.

The detection unit may detect, by referring to previously received monitoring results and currently received monitoring results, existence of the normal monitoring module when all monitoring modules are determined to be normal in the previously received monitoring results and not all modules are determined to be normal in the currently received monitoring results, and a time between generation of the previously received monitoring results and generation of the currently received monitoring results may be less than a predetermined threshold.

With this structure, the time between the previous and the current monitoring results is less than the predetermined threshold, making it difficult for all of the update modules to be tampered with between the previous and the current monitoring. Therefore, after the current monitoring, there is a high probability of existence of a normal monitoring module.

The first assumption unit may further be configured to generate an assumed malicious group including an identifier of the selected monitoring module, the second assumption unit may apply the procedure to the monitoring modules other than the selected monitoring module by repeatedly (i) determining, by referring to the monitoring results, whether another monitoring module determines that a monitoring module whose identifier is included in the assumed malicious group is normal and (ii) adding, when determining positively, an identifier of the other monitoring module to the assumed malicious group, and the determination unit may determine whether identifiers corresponding to all monitoring modules are included in the assumed malicious group and, when determining positively, determine the selected monitoring module to be the normal monitoring module.

With this structure, a monitoring module is identified by referring to the identifier.

The management device may further comprise a malicious module identification unit configured to identify at least one malicious module that has been tampered with among the monitoring modules, the first assumption unit may exclude the malicious monitoring module when selecting the monitoring module, the second assumption unit may apply the procedure to the monitoring modules other than the selected monitoring module after excluding the malicious monitoring module, and the determination unit may determine whether all of the monitoring modules, excluding the malicious monitoring module, are assumed to have been tampered with, and when determining positively, determine the selected monitoring module to be the normal monitoring module.

With this structure, a malicious monitoring module is identified and then excluded when identifying a normal monitoring module, thus making it even easier to identify a normal monitoring module.

The malicious module identification unit may identify the malicious monitoring module by assuming that one monitoring module is normal, determining whether two of the monitoring results are inconsistent by referring to the received monitoring results, and when determining positively, identifying the one monitoring module as the malicious monitoring module.

The other monitoring module monitored by each monitoring module may be specified by a cyclic monitoring pattern, the cyclic monitoring pattern indicating that a first monitoring module monitors a second monitoring module and that the second monitoring module monitors the first monitoring module directly or via one or more other monitoring modules, and the malicious module identification unit may identify, as the at least one malicious monitoring module, each of a plurality of monitoring modules in the cyclic monitoring pattern when a plurality of monitoring results by a plurality of monitoring modules in the cyclic monitoring pattern for another monitoring module do not match.

With these structures, a malicious monitoring module is reliably identified.

At least one monitoring module in the information security device may be an update module provided with a function to update another module, and the management device may further comprise a control unit configured to control the monitoring module selected as the normal monitoring module to update another module when the monitoring module is the update module.

With this structure, another module is reliably updated by an update module identified as being normal.

The information security device may further include an application program and a protection control module configured to protect the application program, and the other module may be one of the monitoring module, the application program, and the protection control module.

An aspect of the present invention recited in claim 9 is a management device for managing an information security device that includes a plurality of monitoring modules that monitor for tampering, the management device comprising: a reception unit configured to receive, from the information security device, a plurality of monitoring results generated by the monitoring modules each monitoring one or more other monitoring modules; a determination unit configured to determine, by referring to the monitoring results, that one or more of the monitoring modules are candidate blocking modules that determine all other monitoring modules monitored thereby to be malicious; and an update unit configured to generate, when a plurality of monitoring modules are determined to be candidate blocking modules, a new monitoring pattern in which the candidate blocking modules monitor each other, to transmit the new monitoring pattern to the information security device, and to cause the information security device to adopt the new monitoring pattern, wherein the reception unit further receives, from the information security device, new monitoring results generated in accordance with the new monitoring pattern, and the determination unit determines, by referring to the new monitoring results, that each candidate blocking module is a blocking module after excluding, from the candidate blocking modules, two candidate blocking modules that determine each other to be normal and determine all other candidate blocking modules to be malicious.

Since a blocking module is identified with this structure, the identified blocking module may be deactivated.

The determination unit may identify, by referring to the new monitoring results, a first candidate blocking module as a malicious monitoring module that has been tampered with when the first candidate blocking module determines that a second candidate blocking module is normal and the second candidate blocking module determines that the first candidate blocking module is malicious.

With this structure, a malicious monitoring module is reliably identified.

The update unit may generate the new monitoring pattern so that each monitoring module monitors all other monitoring modules.

The management device may further comprise a deactivation unit configured to cause the information security device to deactivate each blocking module.

The update unit may generate the new monitoring pattern so that monitoring modules excluding each deactivated blocking module monitor each other, transmit the new monitoring pattern to the information security device, and cause the information security device to adopt the new monitoring pattern. The reception unit may further receive, from the information security device, a plurality of monitoring results generated by the monitoring modules monitoring each other, excluding each deactivated blocking module. The monitoring device may further comprise a normal module identification unit configured to identify a normal monitoring module.

With this structure, blocking modules are excluded when identifying a normal monitoring module, thus making it easy to identify a normal monitoring module.

A management device for managing an information security device that includes a plurality of monitoring modules that monitor for tampering comprises: a reception unit configured to receive, from the information security device, a plurality of monitoring results generated by the monitoring modules each monitoring one or more other monitoring modules; a determination unit configured to determine, by referring to the monitoring results, that one or more of the monitoring modules are candidate blocking modules that determine all other monitoring modules monitored thereby to be malicious; a deactivation unit configured to control the information security device, when only one candidate blocking module is determined, to deactivate the candidate blocking module; and an update unit configured to generate, when only one candidate blocking module is determined, a new monitoring pattern excluding the candidate blocking module, to transmit the new monitoring pattern to the information security device, and to cause the information security device to adopt the new monitoring pattern, wherein the reception unit further receives, from the information security device, new monitoring results generated in accordance with the new monitoring pattern, and the determination unit determines that a monitoring module is a normal monitoring module by referring to the new monitoring results.

With this structure, the one candidate blocking module is excluded, thus making it easy to identify a normal monitoring module.

An aspect of the present invention recited in claim 15 is a tampering management system comprising an information security device and a management device, the information security device including a plurality of monitoring modules that monitor for tampering, and the management device managing the information security device, wherein the management device comprises: a reception unit configured to receive, from the information security device, a plurality of monitoring results generated by the monitoring modules each monitoring another monitoring module; a detection unit configured to detect whether any normal monitoring module that has not been tampered with exists by referring to the monitoring results; a first assumption unit configured to select, when the detection unit detects existence, a monitoring module among the plurality of monitoring modules and to assume that the selected monitoring module has been tampered with; a second assumption unit configured to successively apply a procedure to monitoring modules other than the selected monitoring module by referring to the monitoring results, starting from the selected monitoring module, the procedure being to assume that any monitoring module determining that a monitoring module assumed to have been tampered with is normal has also been tampered with; and a determination unit configured to determine whether, as a result of the procedure by the second assumption unit, all of the monitoring modules are assumed to have been tampered with, and when determining positively, to determine the selected monitoring module to be a normal monitoring module that has not been tampered with.

At least one monitoring module in the information security device may be an update module provided with a function to update another module, and the management device may further comprise a control unit configured to control the monitoring module selected as the normal monitoring module to update another module when the monitoring module is the update module.

The tampering management system may comprise an information security device including a plurality of monitoring modules that monitor for tampering and the information security device, wherein the management device comprises: a reception unit configured to receive, from the information security device, a plurality of monitoring results generated by the monitoring modules each monitoring one or more other monitoring modules; a determination unit configured to determine, by referring to the monitoring results, that one or more of the monitoring modules are candidate blocking modules that determine all other monitoring modules monitored thereby to be malicious; and an update unit configured to generate, when a plurality of monitoring modules are determined to be candidate blocking modules, a new monitoring pattern in which the candidate blocking modules monitor each other, to transmit the new monitoring pattern to the information security device, and to cause the information security device to adopt the new monitoring pattern, wherein the reception unit further receives, from the information security device, new monitoring results generated in accordance with the new monitoring pattern, and the determination unit determines, by referring to the new monitoring results, that each candidate blocking module is a blocking module after excluding, from the candidate blocking modules, two candidate blocking modules that determine each other to be normal and determine all other candidate blocking modules to be malicious.

At least one monitoring module in the information security device may be an update module provided with a function to update another module, and the management device may further comprise a control unit configured to control the monitoring module selected as the normal monitoring module to update another module when the monitoring module is the update module.

1. Embodiment 1

With reference to the drawings, the following describes a software updating system 10 as an embodiment of a malicious module deactivation system according to the present invention.

1.1 Structure of Software Updating System 10

(1) Overall Structure

FIG. 1 is an overall structure diagram of the software updating system 10.

As shown in FIG. 1, the software updating system 10 includes a device 100, which is an information processing device according to the present invention, and an update server 200, which is a malicious module identification device according to the present invention. The device 100 and the update server 200 are connected via a network.

(2) Structure of Device 100

Next, the device 100 is described.

The device 100 provides a variety of services to a user via the network. For example, the device 100 accesses a content delivery server for purchasing of music, video, or other content and plays back the content, or accesses the system of a financial institution to perform Internet banking (balance inquiries, transfers, etc.), etc.

(a) Software Structure of Device 100

As shown in FIG. 1, the device 100 includes application software (hereinafter, "applications") 110 and 111, a protection control module 120, an update module group 130, and an access control module 140.

The applications 110 and 111 are software for providing a variety of functions to the user of the device 100 via the network. For example, the applications 110 and 111 are software for purchasing music, video, or other content from a content delivery server (not shown in the figures) on the network and playing back the purchased content, or software for accessing the system of a financial institution (not shown in the figures) on the network to perform Internet banking such as balance inquiries, transfers, etc.

The applications 110 and 111 store confidential data such as an authentication key for performing authentication with the content delivery server or the system of the financial institution. It is necessary to protect this confidential data from being extracted from the application by a malicious third party (hereinafter, "attacker") and used fraudulently.

The protection control module 120 controls functions for protecting the applications 110 and 111 so that an attacker cannot analyze the applications 110 and 111 to extract the confidential data, such as the authentication key. An example of the function to protect the applications is a decryption loading function, whereby application programs are encrypted and stored when not in use. Application programs are decrypted and loaded into memory only when used. Other examples include a tampering detection function to check whether an application has been tampered with, and an analysis tool detection function to check whether an analysis tool, such as a debugger, is operating.

The protection control module 120 controls the operations of these functions in order to check whether an attacker has analyzed the applications 110 and 111. Upon detecting an attack, the protection control module 120 prevents the confidential data from being divulged by performing processes such as stopping operations of the applications 110 and 111 and clearing the memory areas used by the applications 110 and 111, in particular the memory areas in which the confidential data was stored.

The update module group 130 is formed by a plurality of update modules. In Embodiment 1, the update module group 130 includes three update modules, i.e. an update module 131, an update module 132, and an update module 133, as shown in FIG. 1.

The update modules 131, 132, and 133 each detect whether the protection control module 120 has been tampered with. Each update module has functions to download a protection control module from the update server 200 and to update the protection control module 120 when the protection control module 120 has been tampered with.

The update modules 131, 132, and 133 may also have the function of updating the applications 110 and 111.

Furthermore, the update modules in the update module group 130 perform tampering detection on each other in order to prevent the detection modules from being tampered with by an attacker and used fraudulently. Tampering determination results are transmitted to the update server 200. When the update server 200 determines that an update module has been tampered with, another, normal update module receives a deactivation instruction from the update server 200 and deactivates the update module that has been tampered with.

When one or more of the detection modules included in the update module group 130 is attacked and tampered with, the above structure allows for detection of the tampering and response to the attack.

An access control module 140 stores access information necessary for the update modules to remove other modules. The access information is, for example, an address assigned to the module that is to be removed, or a manual listing steps necessary for removal. Note that the access information is encrypted with an access information acquisition key that differs each time a module is to be removed.

(b) Structure of Update Modules

The following describes the update modules 131, 132, and 133 in detail.

Figure 2:
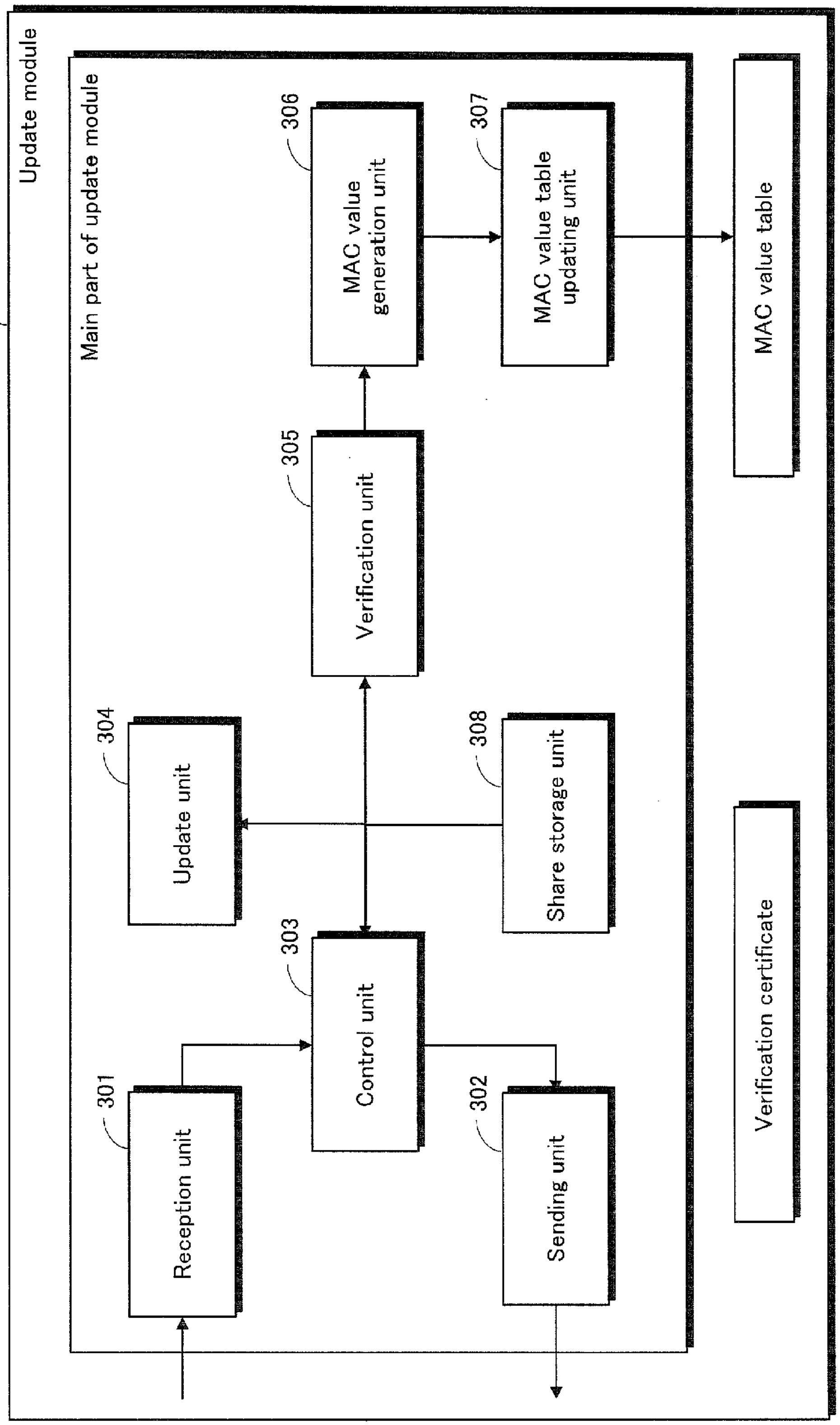
FIG. 2 is a block diagram of an update module 131 according to Embodiment 1.

FIG. 2 is a functional block diagram showing the functional structure of the update module 131. The update modules 132 and 133 have a similar structure. The update module 131 includes a main part, a verification certificate, and a MAC value table.

The main part of the update module includes a reception unit 301, a sending unit 302, a control unit 303, an update unit 304, a verification unit 305, a MAC value generation unit 306, a MAC value table updating unit 307, and a share storage unit 308.

The reception unit 301 receives instructions, software for updating, etc. from the update server 200. The reception unit 301 also receives, from other update modules, the main part of each update module, the update module verification certificate, etc. which are necessary for mutual monitoring. Furthermore, the reception unit 301 receives, from other update modules, the result of requested processing, the result of monitoring of the protection control module 120 by the other update modules, etc.

The sending unit 302 sends data, such as a variety of processing results, certificates, etc., to the update server 200, the protection control module 120, the other update modules, and the access control module 140.

The control unit 303 executes a variety of processes to control the update unit 304 and the verification unit 305 based on the instructions and notifications received by the reception unit 301.

Specifically, the control unit 303 performs processes such as the following: verification of tampering with the protection control module 120, the update module 132, and the update module 133; updating of the protection control module 120, the update module 132, and the update module 133; and updating of the monitoring pattern.

The update unit 304 coordinates with the update server 200 to update the software in the device 100, specifically the applications 110 and 111, the protection control module 120, and the update modules 131, 132, and 133 in response to control by the control unit 303.

In response to control by the control unit 303, the verification unit 305 detects whether the protection control module 120, the update module 132, and the update module 133 have been tampered with.

The verification unit 305 may detect tampering using the verification certificate attached to each module. The verification unit 305 may also use a Message Authentication Code (hereinafter, MAC value) calculated in advance.

The update server 200 provides the verification unit 305 in advance with an indication of when to perform tampering detection on which modules. When the update server 200 indicates a change in the modules on which tampering detection is to be performed, or a change in the timing of tampering detection, the verification unit 305 operates in accordance with the indicated changes.

The MAC value generation unit 306 stores a verification key. When the verification unit 305 uses MAC values for tampering detection, the MAC value generation unit 306 generates a MAC value using the verification key.

The MAC value table updating unit 307 updates a MAC table that stores the MAC value for each module. The MAC value table stores a module identifier for identifying one of the modules in correspondence with the MAC value corresponding to that module.

The MAC value generation unit 306 acquires a module that is the target of tampering detection and calculates the MAC value thereof. The verification unit 305 performs tampering detection by comparing the calculated MAC value with the MAC value stored in the MAC value table for the target module.

The share storage unit 308 stores shares and distribution information. Based on a secret sharing scheme, the shares are generated from an encryption/decryption key that the protection control module 120 uses for encryption and decryption of the applications 110 and 111. The distribution information indicates which share is distributed to which update module.

Note that Non-Patent Literature 1 provides a detailed explanation of a signature method. Non-Patent Literature 2 provides a detailed explanation of certificates. Non-Patent Literature 2 also provides a detailed explanation of shares.

(c) Structure of Protection Control Module 120

The following describes the protection control module 120 in detail.

Figure 3:
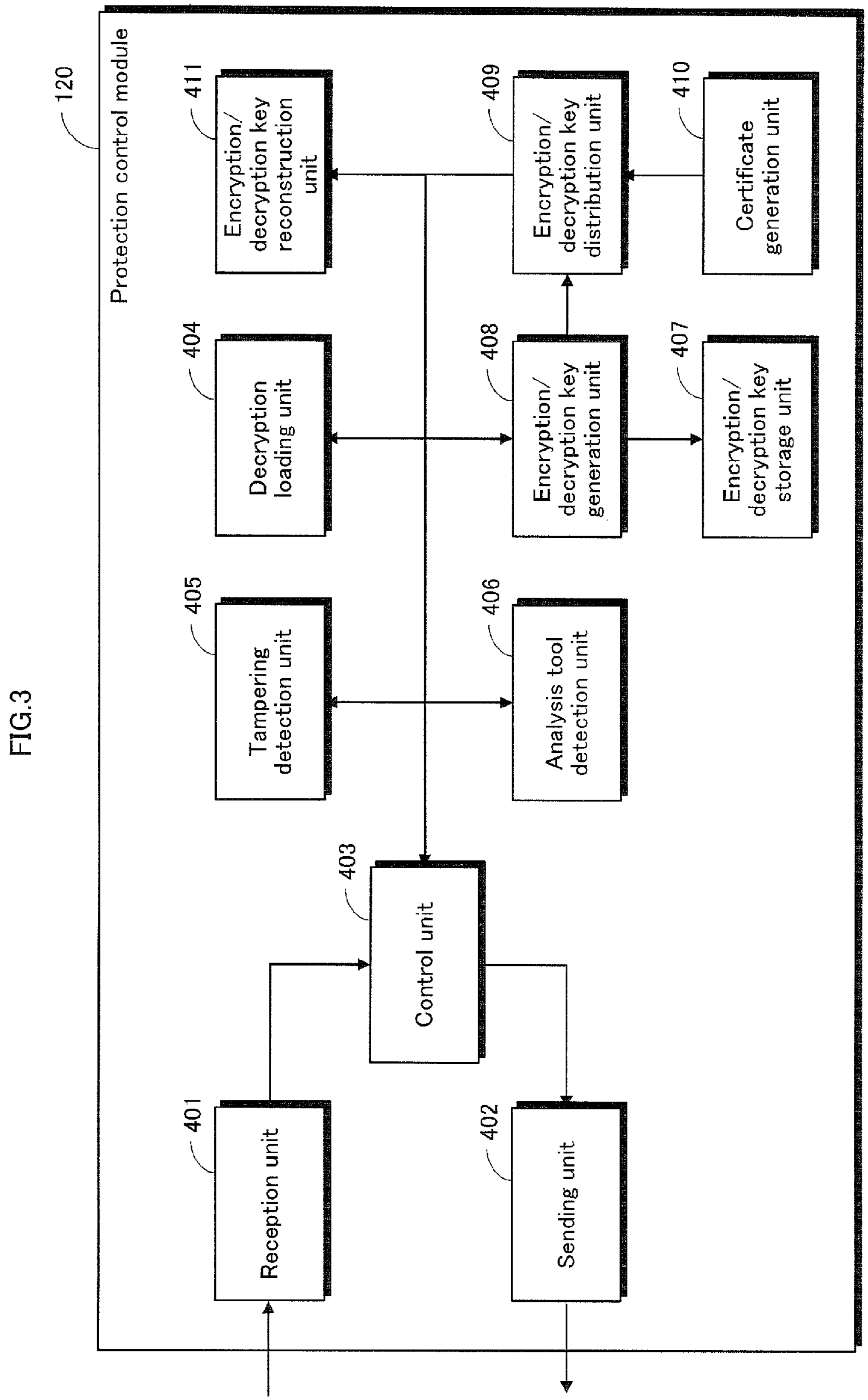
FIG. 3 is a block diagram of a protection control module 120 according to Embodiment 1.

FIG. 3 is a functional block diagram showing the functional structure of the protection control module 120.

As shown in FIG. 3, the protection control module 120 includes a reception unit 401, a sending unit 402, a control unit 403, a decryption loading unit 404, a tampering detection unit 405, an analysis tool detection unit 406, an encryption/decryption key storage unit 407, an encryption/decryption key generation unit 408, an encryption/decryption key distribution unit 409, a certificate generation unit 410, and an encryption/decryption key reconstruction unit 411.

The reception unit 401 receives shares, a variety of requests, etc. from the update modules 131, 132, and 133.

The sending unit 402 sends a variety of requests to the update modules 131, 132, and 133.

By controlling the decryption loading unit 404, the tampering detection unit 405, and the analysis tool detection unit 406, the control unit 403 detects when the applications 110 and 111 have been attacked.

When the encrypted applications 110 and 111 are to be executed, the decryption loading unit 404 decrypts the applications 110 and 111 using the encryption/decryption key and loads them into memory. While the applications 110 and 111 are running and a context switch to another application occurs, the decryption loading unit 404 encrypts the data in memory with the encryption/decryption key. When a context switch occurs again to return to the applications 110 and 111, the decryption loading unit 404 decrypts the encrypted data.

Furthermore, during re-encryption, the decryption loading unit 404 decrypts the applications 110 and 111 using a reconstructed old encryption/decryption key transmitted by the encryption/decryption key reconstruction unit 411 and then re-encrypts the applications 110 and 111 using a new encryption/decryption key stored by the encryption/decryption key storage unit 407.

The tampering detection unit 405 detects whether tampering has occurred in the applications 110 and 111. Methods for detecting tampering include using a verification certificate attached to the applications 110 and 111 and comparing MAC values.

The analysis tool detection unit 406 detects whether an analysis tool, such as a debugger or the like, has been installed and is operating. This is because it is assumed that, in order to attack the applications 110 and 111, a malicious attacker will install an analysis tool and cause the analysis tool to operate. The detection method may, for example, be to search for a file name, to check whether a special register used by a debugger is in use, or to detect an interrupt set by a debugger.

The encryption/decryption key storage unit 407 stores an encryption/decryption key for encrypting and decrypting the applications 110 and 111.

The encryption/decryption key generation unit 408 generates the encryption/decryption key for encrypting and decrypting the applications 110 and 111.

The encryption/decryption key distribution unit 409 generates shares from the encryption/decryption key using the secret sharing scheme.

The certificate generation unit 410 generates a certificate used for verification of whether reconstruction is correct when the shares generated from the encryption/decryption key are reconstructed.

Based on the distribution information, the encryption/decryption key reconstruction unit 411 acquires, from the update modules, the shares distributed thereto. The encryption/decryption key reconstruction unit 411 reconstructs the encryption/decryption key from the acquired shares and transmits the reconstructed encryption/decryption key to the decryption loading unit 404.

(d) Structure of the Access Control Module 140

Figure 4:
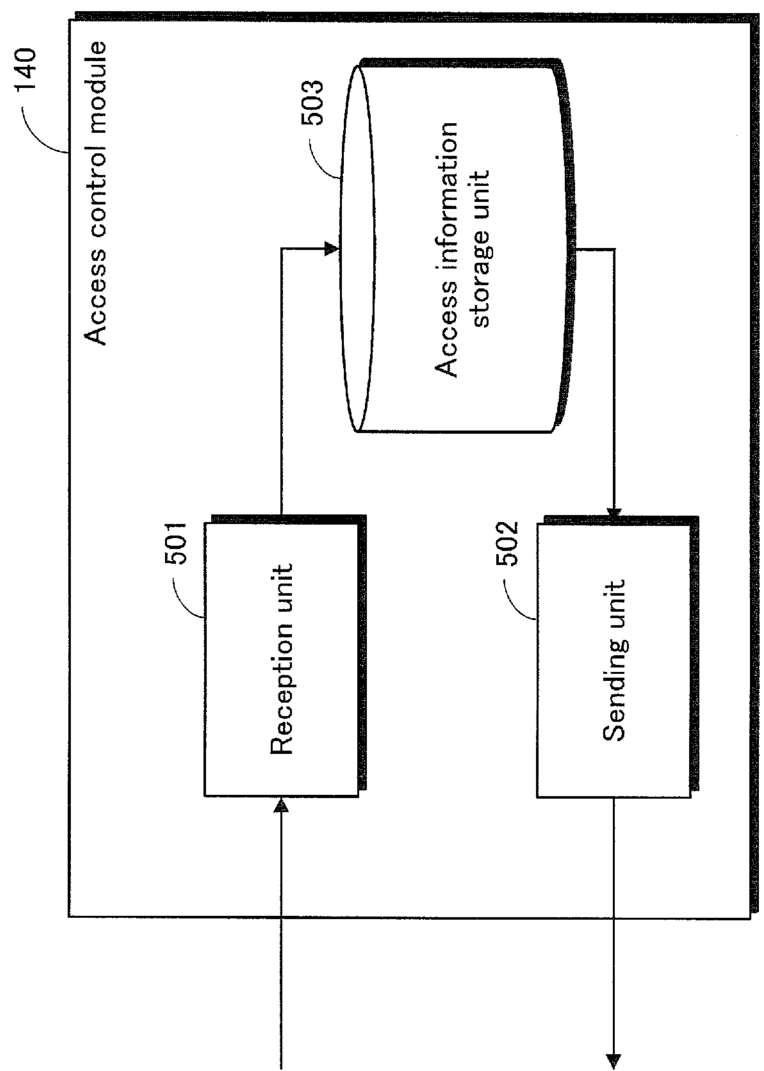
FIG. 4 is a block diagram of an access control module 140 according to Embodiment 1.

FIG. 4 is a functional block diagram showing the functional structure of the access control module 140. As shown in FIG. 4, the access control module 140 includes a reception unit 501, a sending unit 502, and an access information storage unit 503.

The reception unit 501 receives, from the update modules 131, 132, and 133, a request for acquisition of a piece of access information, which is information necessary to remove a detection module in which tampering has been detected.

In response to the access information acquisition request, the sending unit 502 sends a piece of access information to the update module that issued the request.

The access information storage unit 503 stores pieces of access information respectively necessary to remove the update modules 131, 132, and 133.

An update module identifier for identifying the update module to be removed is attached to each piece of access information. Each piece of access information is encrypted with an access information acquisition key.

In response to the access information acquisition request from one of the update modules 131, 132, and 133, the access information storage unit 503 transmits, to the requesting update module, the piece of access information to which is attached the identifier for the detection module that is to be removed.

(e) Hardware Structure of Device 100

Next, the hardware structure of the device 100 is described with reference to FIG. 5.

Figure 5:
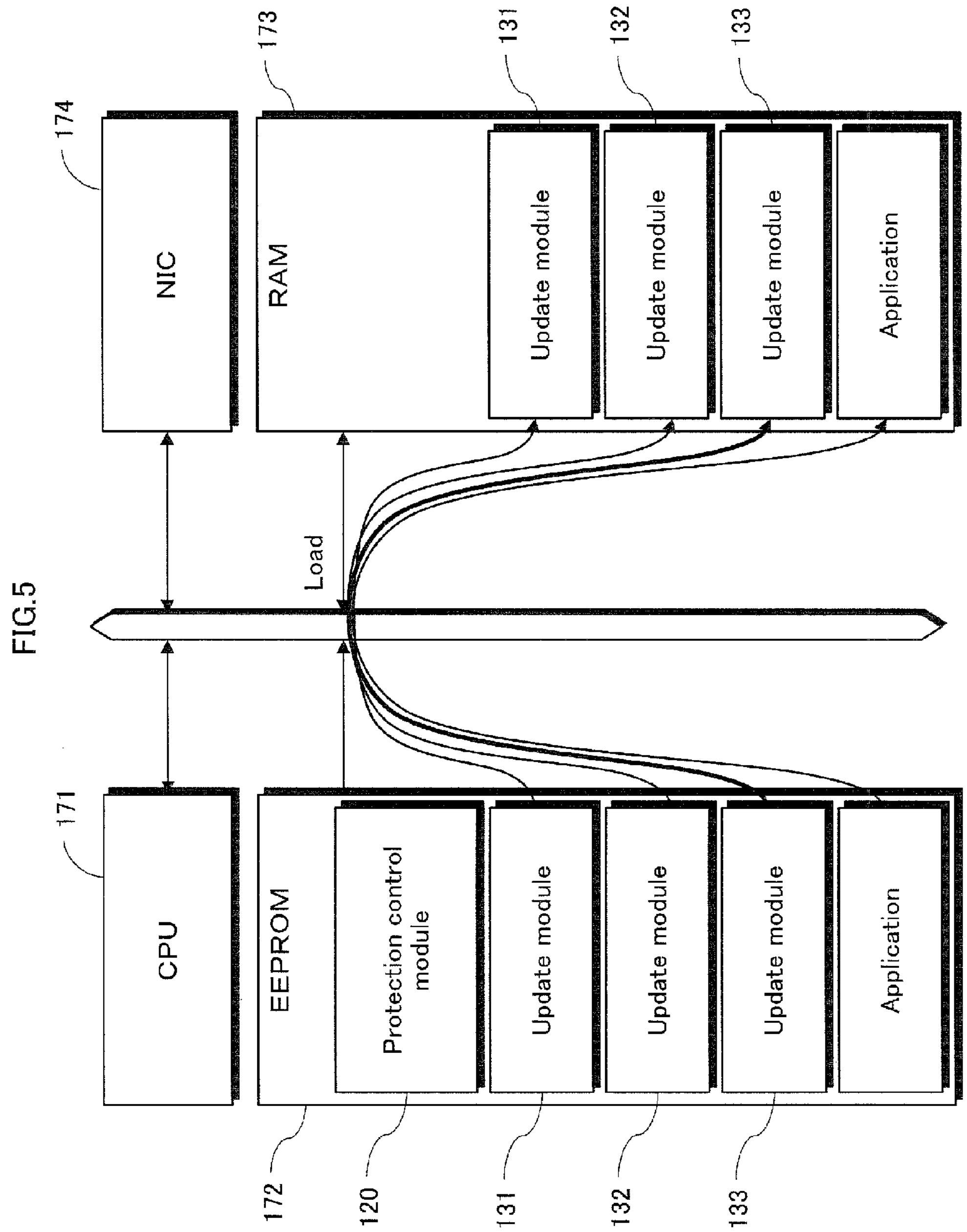
FIG. 5 is a hardware configuration diagram of a device 100 according to Embodiment 1.

As shown in FIG. 5, the device 100 includes a Central Processing Unit (CPU) 171, an Electrically Erasable and Programmable Read Only Memory (EEPROM) 172, which is a non-volatile memory, a Random Access Memory (RAM) 173, a Network Interface Card (NIC) 174, etc. These components are connected via a bus for inter-component transmission.

The EEPROM 172 stores the protection control module 120, the update modules 131, 132, and 133, the applications 110 and 111, etc.

The functional units of the modules stored in the EEPROM 172 are achieved by the CPU 171 executing the modules. Specifically, each functional unit is described as a computer program.

The RAM 173 is used by the CPU 171 as a work area. The update modules 131, 132, and 133 and the applications 110 and 111 are loaded into the RAM 173. The update module that is the target of tampering detection or deactivation is one of the update modules operating in the RAM 173.

The NIC 174 is an extension card for connecting to the network.

(f) Software Hierarchy

Next, the software hierarchy of the device 100 is described with reference to FIG. 6.

Figure 6:
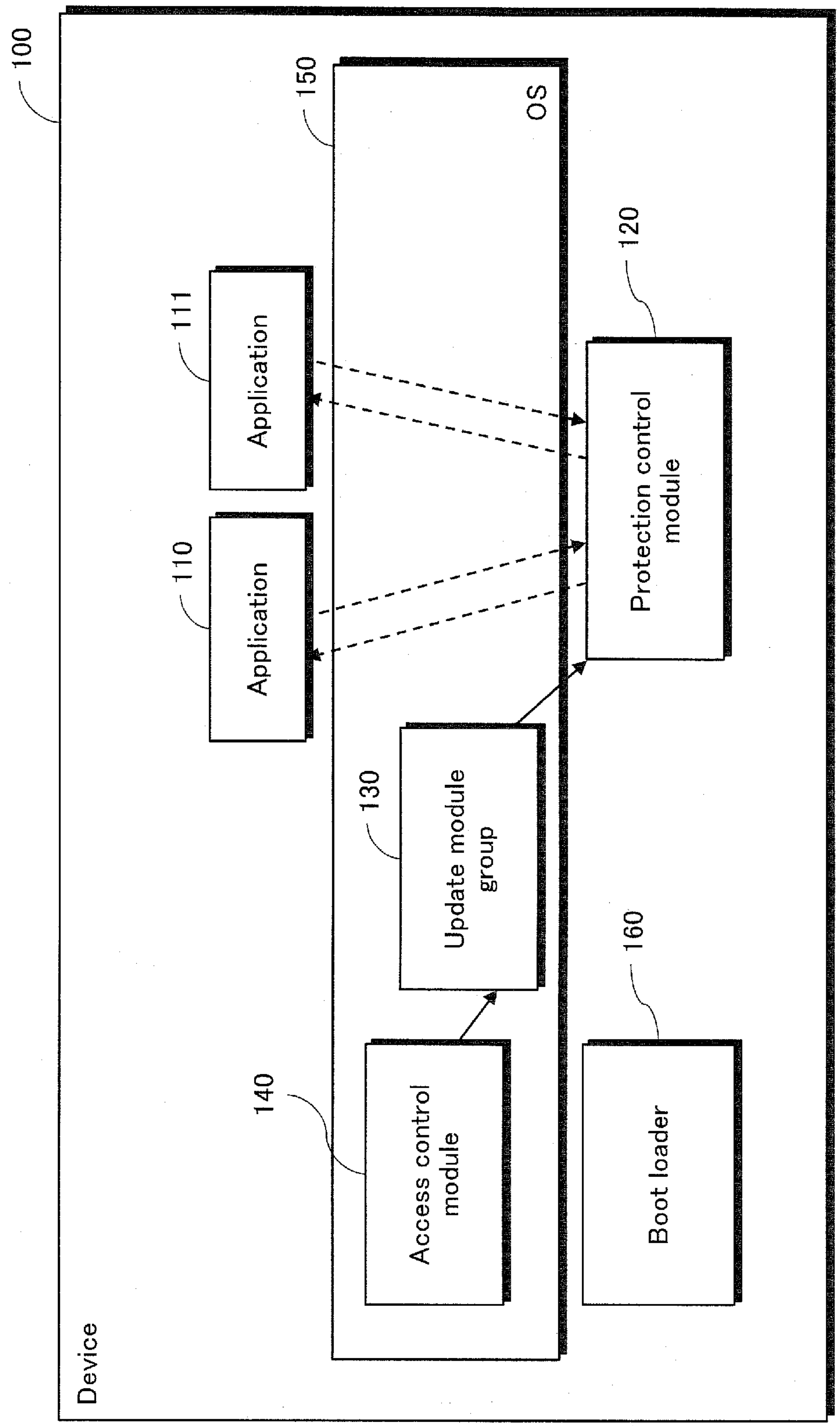
FIG. 6 is a software configuration diagram of the device 100 according to Embodiment 1.

As shown in FIG. 6, the access control module 140 and the update module group 130 are included in the OS 150. The applications 110 and 111 operate in the OS 150, whereas the protection control module 120 and a boot loader 160 are external to management by the OS 150.

When the device 100 boots, applications are executed after the protection control module 120 and the update module group 130 boot.

(3) Structure of Update Server 200

Next, the structure of the update server 200 is described.

The update server 200 functions as a malicious module identification device, receiving tampering detection results from the update module group 130 in the device 100 and, based on the received tampering detection results, identifying a malicious update module that is to be deactivated. Furthermore, the update server 200 functions as a software delivery device for delivering, to the device 100, updated software necessary for updating software operating on the device 100 (such as the protection control module 120).

(a) Overall Structure

As shown in FIG. 1, the update server 200 includes a determination unit 210, an updated software delivery unit 220, a module deactivation unit 230, and a transmission unit 240. The update server 200 is, specifically, a computer system provided with a CPU, a ROM, a RAM, a hard disk unit, etc. The update server 200 achieves the above functions by the CPU operating in accordance with computer programs stored in the ROM or on the hard disk unit.

The determination unit 210 receives tampering detection results from the update module group 130 in the device 100 and, based on the received tampering detection results, identifies a malicious update module that is to be deactivated.

When updating the protection control module 120, the updated software delivery unit 220 operates in coordination with the update modules 131, 132, and 133 to securely transmit updated software to the device 100.

Upon receiving an acquisition request from one of the update modules 131, 132, and 133 for an access information acquisition key, the module deactivation unit 230 transmits the access information acquisition key to the requesting update module.

The transmission unit 240 transmits information to and receives information from the device 100 and the units in the update server 200. For example, the transmission unit 240 transmits, to the determination unit 210, the tampering detection results received from the device 100. Note that for transmission between the device 100 and the update server 200, a secure transmission channel may be used, for example by encrypting data.

Next, each structural component of the update server 200 is described.

(b) Structure of Determination Unit 210

Figure 7:
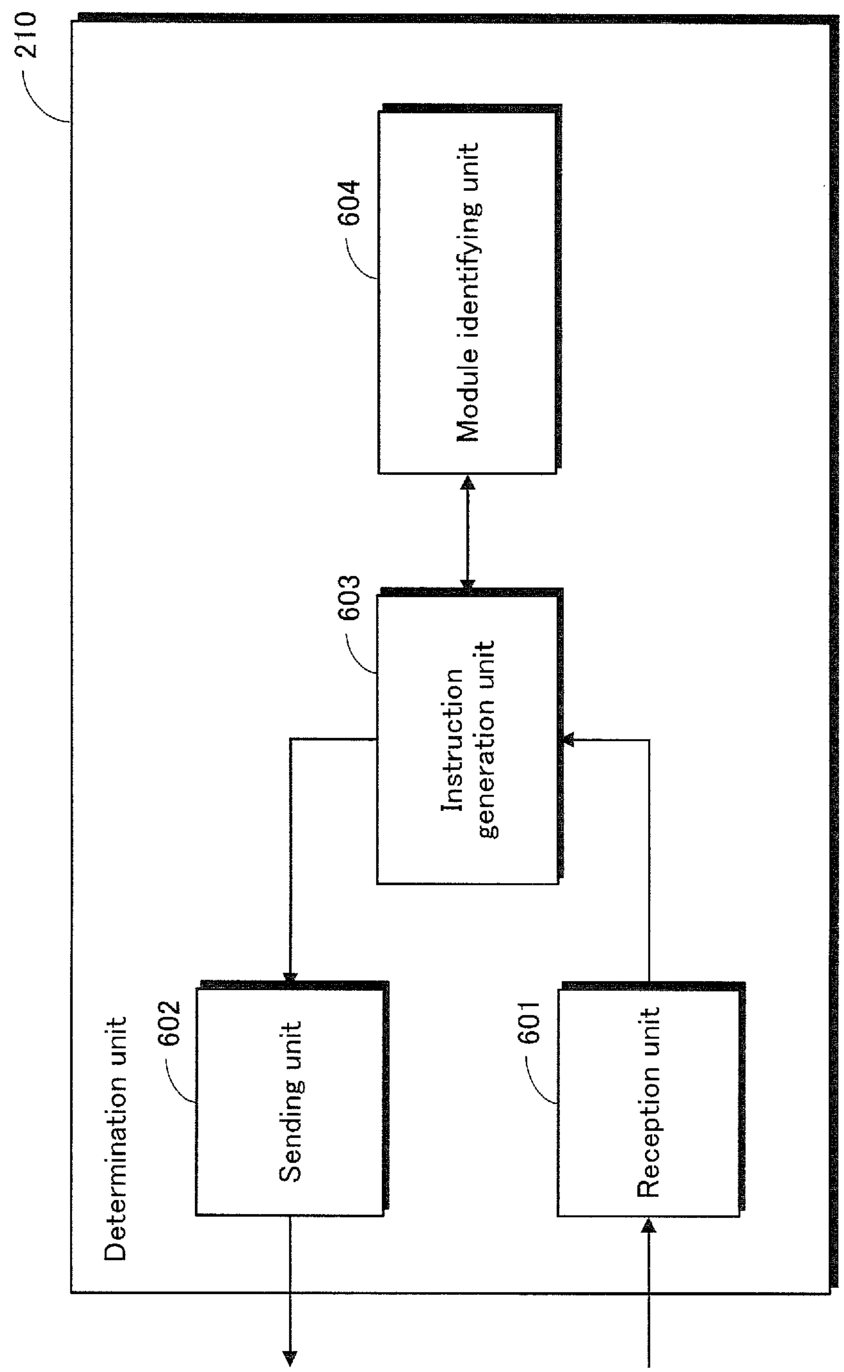
FIG. 7 is a block diagram of a determination unit 210 according to Embodiment 1.

FIG. 7 is a functional block diagram showing the functional structure of the determination unit 210.

As shown in FIG. 7, the determination unit 210 includes a reception unit 601, a sending unit 602, an instruction generation unit 603, and a module identifying unit 604.

The reception unit 601 receives, from the update modules 131, 132, and 133, the tampering detection results, the shares, a variety of requests, etc. and transmits these results, shares, requests, etc. to the instruction generation unit 603. The reception unit 601 also receives notification that processing is complete from each of the units in the update server 200 and transmits the notification to the instruction generation unit 603.

The sending unit 602 sends the instructions generated by the instruction generation unit 603 to the units in the update server 200.

The instruction generation unit 603 transmits, to the module identifying unit 604, the tampering detection results received from the update modules 131, 132, and 133 (hereinafter, also referred to as "inter-monitoring results"). The instruction generation unit 603 acquires, from the module identifying unit 604, information identifying a malicious update module that has been tampered with and, based on the acquired information, generates instructions for the units in the update server 200.

In order to identify malicious detection modules that have been tampered with, the module identifying unit 604 determines whether each of the update modules has been tampered with by using the inter-monitoring results received from the update modules 131, 132, and 133. The module identifying unit 604 transmits the information identifying the malicious detection modules to the instruction generation unit 603.

The module identifying unit 604 in Embodiment 1 identifies a particular update module as a malicious update module when, for example, among a plurality of tampering determination results received from update modules, a majority of the update modules indicate "Tampering detected" for the particular update module. Specifically, since there are three update modules 131, 132, and 133 included in the update module group 130, when two of the update modules indicate "Tampering detected" for the remaining update module, the remaining update module is identified as malicious.

(c) Updated Software Delivery Unit 220

Figure 8:
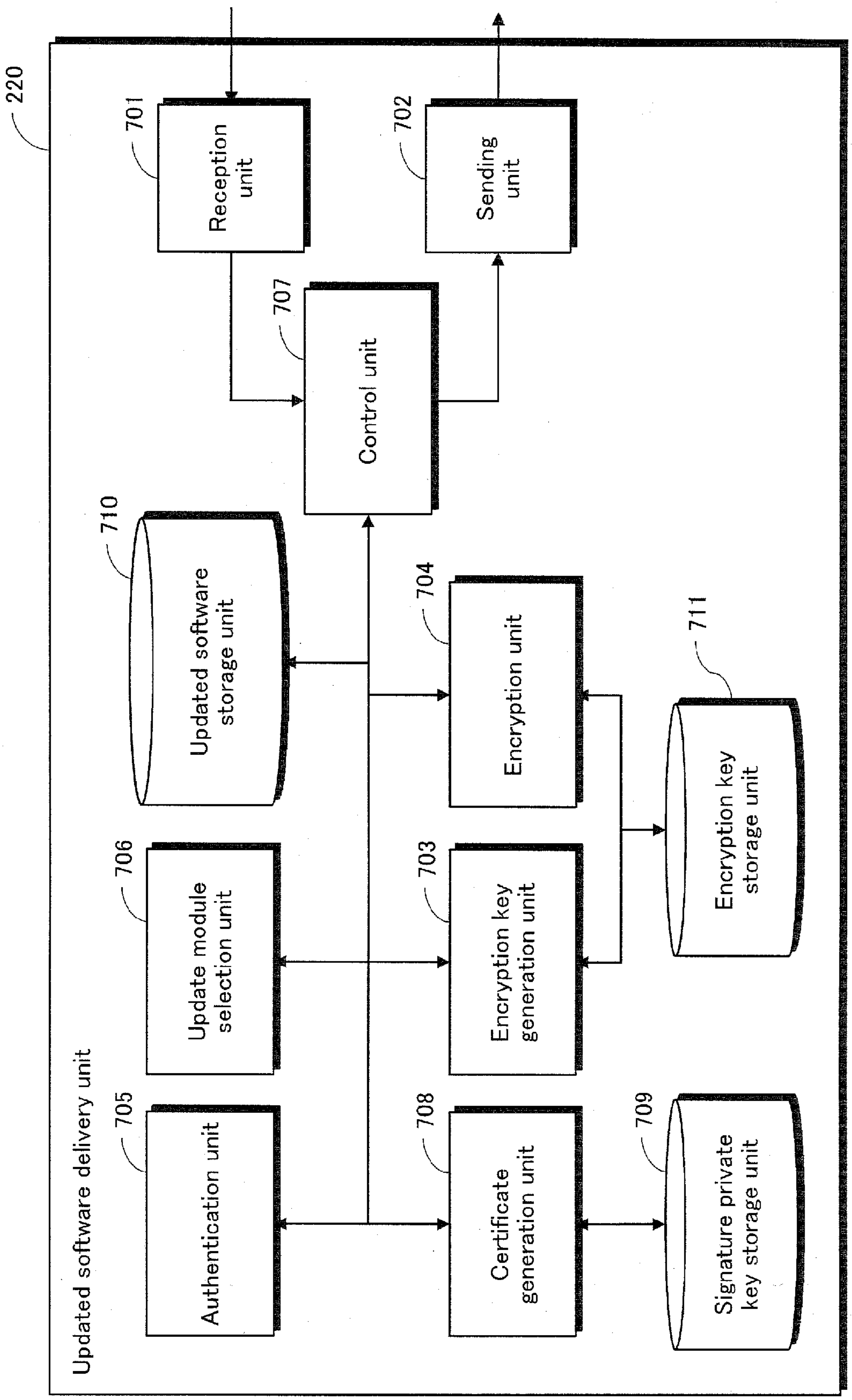
FIG. 8 is a block diagram of an updated software delivery unit 220 according to Embodiment 1.

FIG. 8 is a functional block diagram showing the functional structure of the updated software delivery unit 220.

As shown in FIG. 8, the updated software delivery unit 220 includes a reception unit 701, a sending unit 702, an encryption key generation unit 703, an encryption unit 704, an authentication unit 705, an update module selection unit 706, a control unit 707, a certificate generation unit 708, a signature private key storage unit 709, an updated software storage unit 710, and an encryption key storage unit 711.

The reception unit 701 receives tampering detection results for the protection control module 120 from the update modules 131, 132, and 133 and receives inter-monitoring results for monitoring between update modules.

When it is necessary to update the applications 110 and 111 or the protection control module 120 in the device 100, the sending unit 702 sends an update request and data such as updated software, a key necessary for decryption, etc. to the update modules 131, 132, and 133.

The encryption key generation unit 703 generates an encryption key used when transmitting the updated software to the update modules 131, 132, and 133.

The encryption unit 704 encrypts the updated software using the encryption key generated by the encryption key generation unit 703. The encryption unit 704 also encrypts the encryption key using a key unique to each update module.

The encryption keys and updated software are not transmitted to the update modules 131, 132, and 133 all at once. Rather, data is transferred to each update module when the data becomes necessary during the updating process.

The authentication unit 705 performs mutual authentication with the update modules 131, 132, and 133 and the protection control module 120.

When the protection control module 120 is to be updated, the update module selection unit 706 selects the update module used for updating. The encryption unit 704 encrypts the encryption key used to encrypt the updated protection control module with the key unique to the update module selected by the update module selection unit 706. The sending unit 702 sends the encryption key and the updated protection control module to the update module selected by the update module selection unit 706.

The control unit 707 controls each of the constituent elements in the updated software delivery unit 220.

The certificate generation unit 708 generates an authentication certificate for the authentication public key stored by each of the update modules 131, 132, and 133 using a signature private key. The certificate generation unit 708 also generates, using the signature private key for the updated protection control module, an update verification certificate for verifying that the protection control module in the device 100 has been correctly updated.

The signature private key storage unit 709 stores the signature private key used when the certificate generation unit 708 generates certificates.

The updated software storage unit 710 stores an updated protection control module for updating the protection control module 120 when the protection control module 120 is attacked.

The encryption key storage unit 711 stores the encryption key generated by the encryption key generation unit 703 and the encryption key encrypted by the encryption unit 704.

(d) Module Deactivation Unit 230

Figure 9:
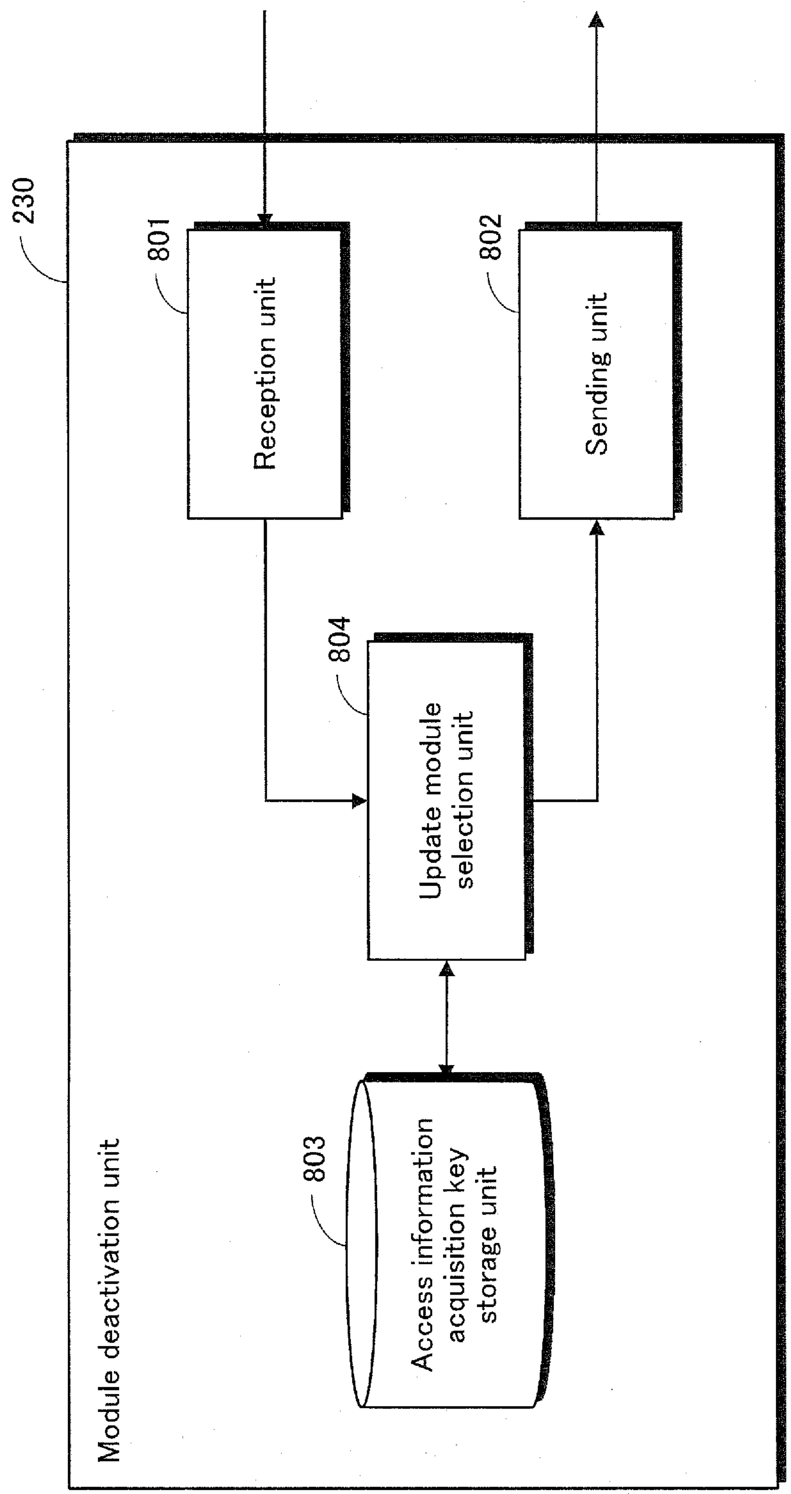
FIG. 9 is a block diagram of a module deactivation unit 230 according to Embodiment 1.

FIG. 9 is a functional block diagram showing the functional structure of the module deactivation unit 230.

As shown in FIG. 9, the module deactivation unit 230 includes a reception unit 801, a sending unit 802, an access information acquisition key storage unit 803, and an update module selection unit 804.

The reception unit 801 receives an instruction from the determination unit 210 to deactivate a malicious update module that has been tampered with. The reception unit 801 also receives, from the update modules 131, 132, and 133, a request for acquisition of the access information acquisition key.

In response to the request for acquisition of the access information acquisition key, the sending unit 802 sends the access information acquisition key to the update module that issued the request.

The access information acquisition key storage unit 803 stores the access information acquisition key for decrypting the access information stored by the access control module 140.

The update module selection unit 804 selects an update module to deactivate the malicious update module that has been tampered with and issues, to the selected update module, an instruction to deactivate the malicious update module.

Note that when a request for acquisition of the access information acquisition key is received from the update module selected by the update module selection unit 804, the sending unit 802 attaches, to the access information acquisition key, the identifier for the update module to be removed and transmits the access information acquisition key to the selected update module.

1.2 Operations of Software Updating System 10

Next, the operations of the software updating system 10 are described.

(1) Overall Operations

Figure 10:
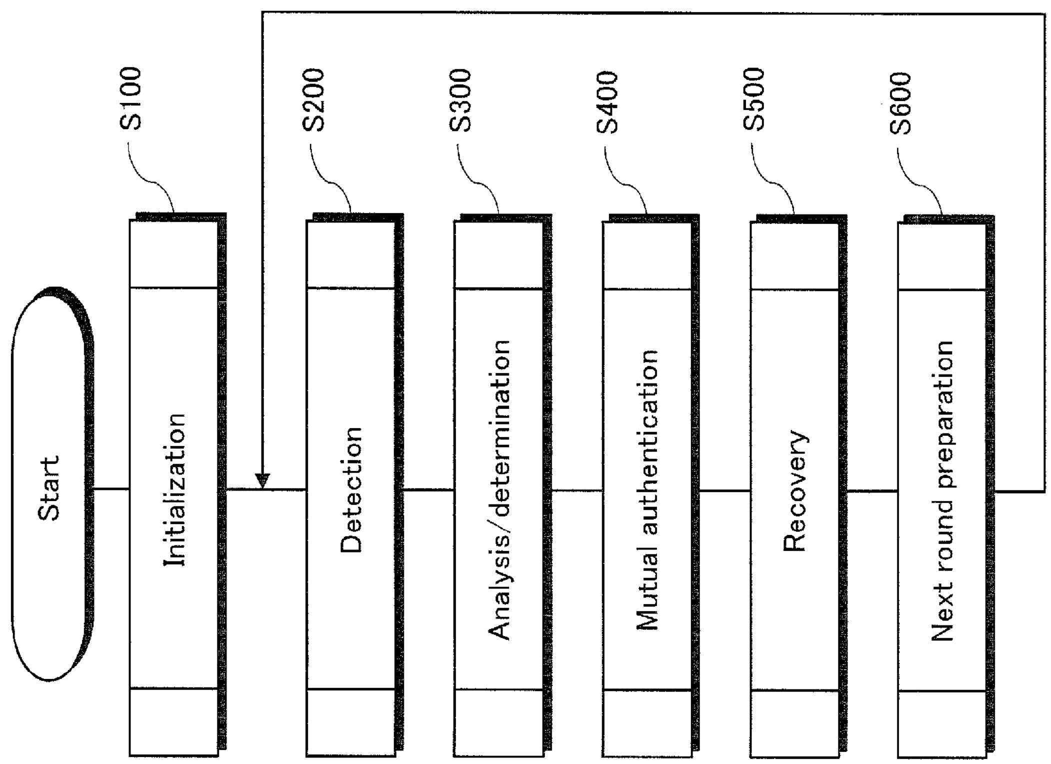
FIG. 10 is a flowchart showing overall operations in the software updating system 10 according to Embodiment 1.

FIG. 10 is a flowchart showing the overall flow of processing in the software updating system 10.

The software updating system 10 first performs initialization (S100).

Initialization refers to embedding a variety of key data necessary for updating of the protection control module 120, data necessary after software updating (shares distributed using the secret sharing scheme), etc. in the update modules 131, 132, and 133. Note that this initialization is performed when the device 100 is manufactured in a factory. Subsequently, the device 100 is shipped from the factory and provided to a user.

When the user uses the device 100, the protection control module 120 in the device 100 protects the applications 110 and 111 from attack.

At the same time, the update modules 131, 132, and 133 detect whether the protection control module 120 has been tampered with in order to check whether the protection control module 120 has been attacked (S200).

Next, when tampering is detected in the protection control module 120 during step S200, the software updating system 10 performs analysis and determination to analyze the protection control module 120 and determine whether updating is necessary (S300).

In the software updating system 10, the update modules 131, 132, and 133 and the updated software delivery unit 220 then perform mutual authentication to confirm each other as correct software (S400).

The software updating system 10 then performs recovery (S500).

Recovery refers to installing an updated protection control module in the device 100 after detection between update modules included in the update module group 130. Recovery also refers to updating the protection control module in the device 100 using shares embedded in the update modules 131, 132, and 133.

Subsequently, the software updating system 10 performs next round preparation in preparation for the next time the protection control module will need to be updated, generating key data and shares necessary for updating and embedding the generated information in the update modules (S600). The software updating system 10 then returns to the detection in step S200 and continues processing.

If tampering is detected in any of the update modules 131, 132, and 133 during the mutual authentication in step S400 or during recovery in step S500, the software updating system 10 removes the malicious update module that has been tampered with by deactivating the module.

Note that not all of the above processes are essential to the software updating system of the present invention. It suffices for the software updating system to be triggered to update by an external device.

(2) Initialization Operations

Figure 11:
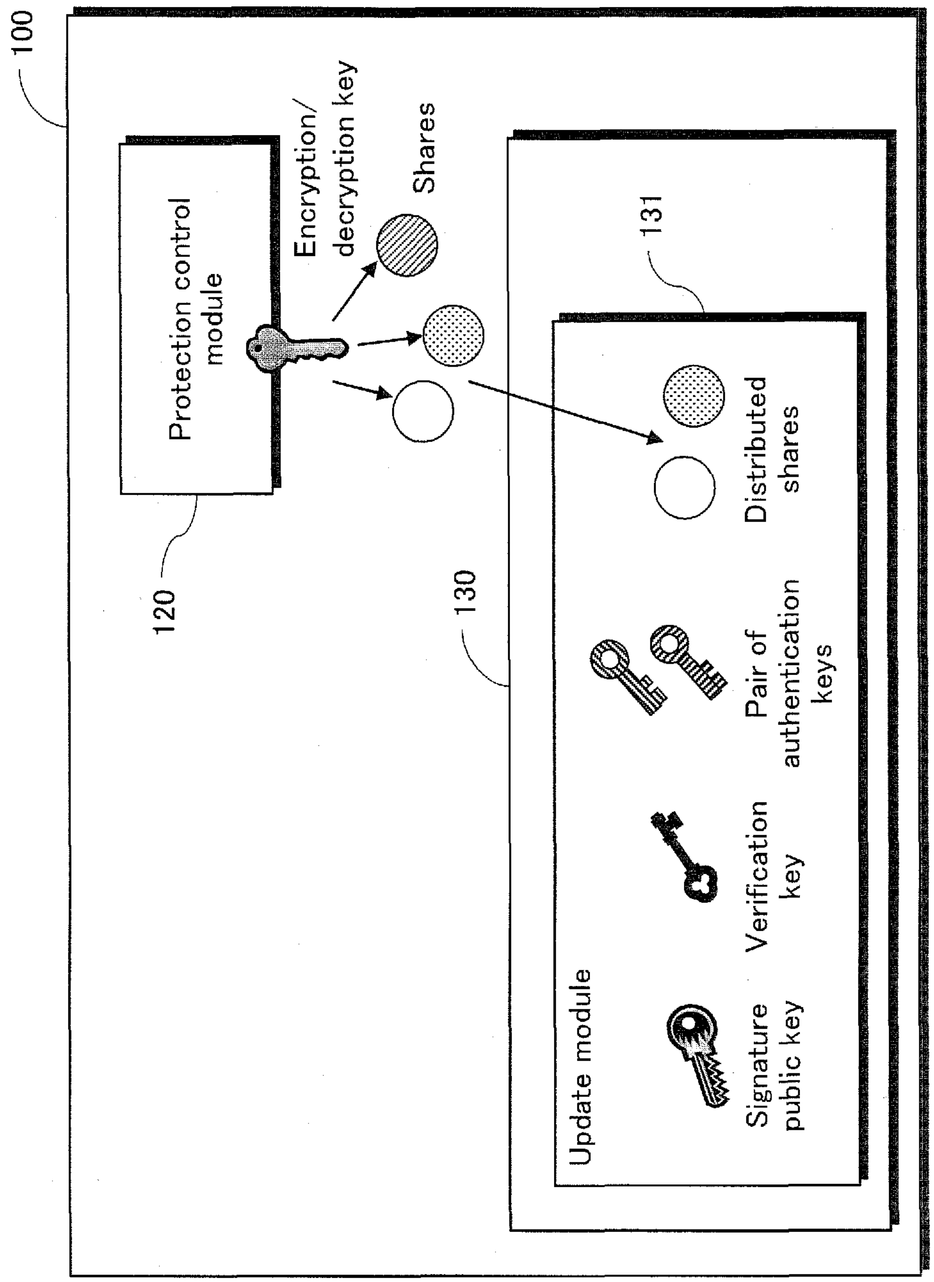
FIG. 11 illustrates operations during initialization according to Embodiment 1.
Figure 12:
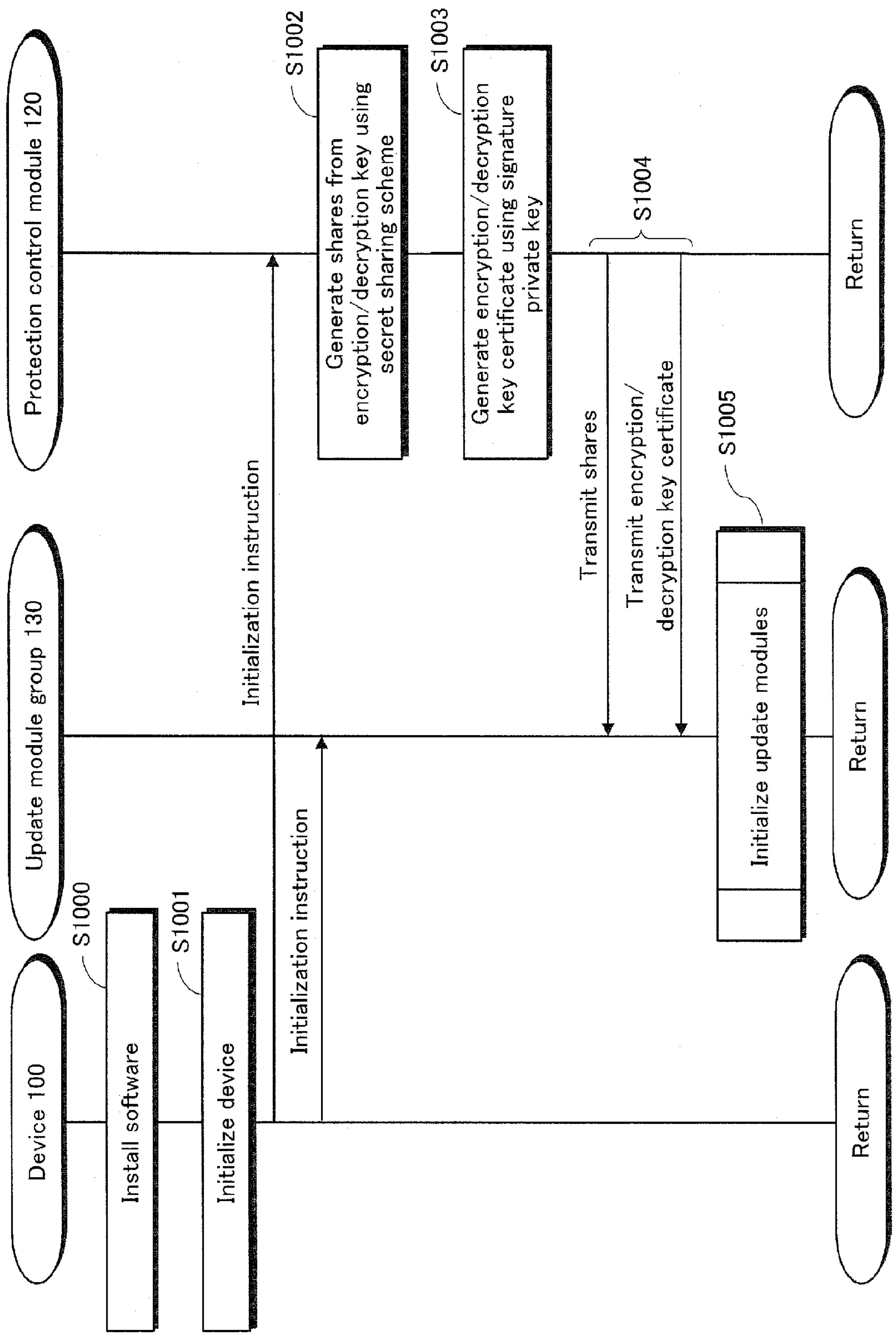
FIG. 12 is a sequence diagram of initialization according to Embodiment 1.
Figure 13:
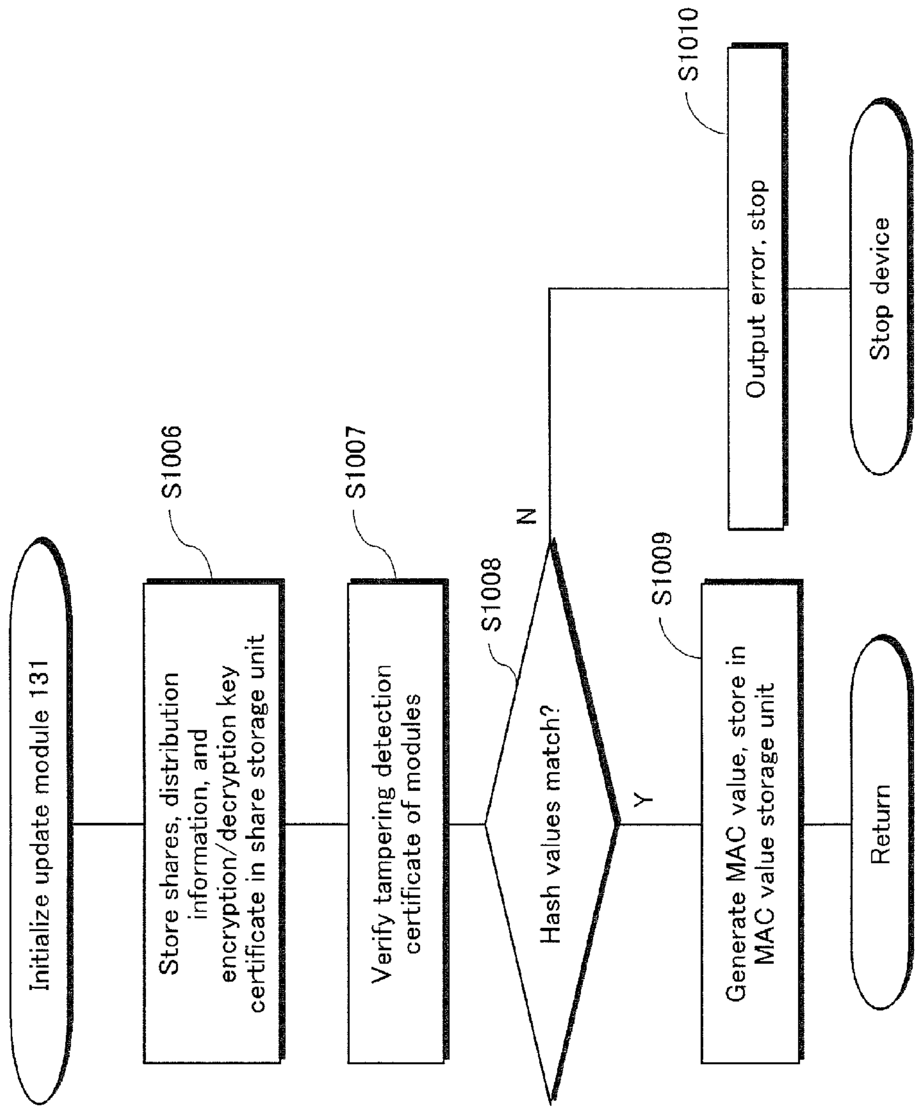
FIG. 13 is a flowchart of update module initialization according to Embodiment 1.

The following describes initialization in the software updating system 10 (S100 in FIG. 10) in detail with reference to FIGS. 11 through 13.

FIG. 12 is a sequence diagram showing initialization.

When the device 100 is manufactured in the factory, the software updating system 10 installs the applications (110 and 111), the protection control module 120, the update modules (131, 132, 133), etc. in non-volatile memory of the device 100 (S1000).

A tampering detection certificate is attached to each of these pieces of software for verification of whether tampering has occurred in the software. This tampering detection certificate is signed with a signature private key stored in the updated software delivery unit 220 of the update server 200. Note that in step S1000, software necessary for operations of the device 100 other than the above software is also installed.

The following describes the keys embedded in the device 100 during initialization with reference to FIG. 11. FIG. 11 schematically shows keys embedded in the device 100. In this figure, the update module group 130 includes only the update module 131. The update modules 132 and 133 are also in fact included but are omitted from this figure.

As shown in FIG. 11, an encryption/decryption key is embedded in the protection control module 120, and a signature public key, a verification key, and a pair of authentication keys are embedded in the update modules 131, 132, and 133 (combinations of shares are not yet embedded in the update modules). Furthermore, the update modules 131, 132, and 133 are installed in the device 100 with update module identifiers for identifying the update modules 131, 132, and 133 respectively embedded therein.

The encryption/decryption key is a key for encrypting and decrypting the applications 110 and 111. The applications 110 and 111 are stored in non-volatile memory after encryption with the encryption/decryption key. The applications 110 and 111 are executed after decryption by the protection control module 120 with the encryption/decryption key.

When the device 100 executes a plurality of applications via context switching, data used by the applications 110 and 111 is encrypted and decrypted using the encryption/decryption key each time a context switch occurs in order to prevent data from being extracted by an analysis tool, such as a debugger, when the applications 110 and 111 are being executed.

Among the keys embedded in the update modules 131, 132, and 133, the signature public key is shared by all of the update modules. On the other hand, the verification key and the pair of authentication keys are unique to each update module. This description now returns to FIG. 12. After installation of software in step S1000, the device 100 initializes itself by executing software for initialization and software for testing whether the device 100 operates normally (S1001).

The device 100 also transmits an initialization instruction to the protection control module 120 and the update modules 131, 132, and 133.

The protection control module 120 generates shares from the encryption/decryption key using the secret sharing scheme (S1002). Note that the protection control module 120 generates the same number of shares as the number of update modules provided with the share storage unit 308. When all of the update modules 131, 132, and 133 are provided with the share storage unit 308, the protection control module 120 generates three shares.

Furthermore, the protection control module 120 generates the encryption/decryption key certificate using the signature private key (S1003). The encryption/decryption key certificate is for confirming, after reconstruction of the encryption/decryption key, that the encryption/decryption key has been correctly reconstructed.

The protection control module 120 transmits the generated shares and encryption/decryption key certificate to the update modules 131, 132, and 133 (S1004).

Note that the protection control module 120 transmits a combination of shares to each of the update modules 131, 132, and 133 so that each update module stores a different combination of shares. Furthermore, the protection control module 120 transmits, to each update module, distribution information indicating which shares were distributed to which update modules. The same distribution information is transmitted to each update module.

Pages 47 to 49 of Patent Literature 2 contain a detailed description of both the method for generating the shares from the encryption/decryption key using the secret sharing scheme, as well as the method for transmitting the shares to the update modules. In order to employ the same method as in Patent Literature 2, the encryption/decryption key in Embodiment 1 can be made to correspond to the private key d, the protection control module 120 to the authentication authority device, and the update modules 131, 132, and 133 to the share storing devices in Patent Literature 2.

After receiving the shares, the distribution information, and the encryption/decryption key certificate from the protection control module 120, update module initialization is performed (S1005).

(3) Update Module Initialization

FIG. 13 is a flowchart showing operations for update module initialization (S1005 in FIG. 12).

Note that in FIG. 13, only the update module 131 is described. Operations for the update modules 132 and 133 are fundamentally the same.

The update module 131 receives the shares, the distribution information, and the encryption/decryption key certificate from the protection control module 120, storing the received information in the share storage unit 308 (S1006).

The update module 131 verifies the tampering detection certificate of the update modules 132 and 133 and of the protection control module 120, which are the target of tampering detection (S1007). This verification is performed by generating a hash value for each module and comparing the generated hash value with the hash value listed in the corresponding tampering detection certificate.

If the generated hash values match the respective hash values listed in the tampering detection certificates (S1008: Y), then the update module 131 generates MAC values for the update modules 132 and 133 and for the protection control module 120. The update module 131 stores the generated MAC values in a MAC value table (S1009).

If at least one hash value does not match the hash value listed in the tampering detection certificate (S1008: N), the update module 131 outputs an error and stops (S1010).

(4) Detection Operations

Next, detection by the software updating system 10 (S200 in FIG. 10) is described in detail with reference to the sequence diagram in FIG. 14.

When initialization is complete, the device 100 is shipped from the factory to the user, who uses the device 100.

When the applications 110 and 111 operate on the device 100, the protection control module 120 in the device 100 controls the decryption loading function, the tampering detection function, the analysis tool detection function, etc. to protect the applications 110 and 111 from an attack.

During detection, the update modules 131, 132, and 133 first detect whether the protection control module 120 has been tampered with. Tampering detection is performed by calculating the MAC value of the protection control module 120 using the verification key and comparing the calculated MAC value with the MAC value stored in the MAC value table.

When the MAC values match, the update module 131 determines that the protection control module 120 has not been tampered with. On the other hand, when the MAC values do not match, the update module 131 determines that the protection control module 120 has been tampered with.

Note that FIG. 14 has been simplified to show only the update module 131 detecting whether the protection control module 120 has been tampered with. The update modules 132 and 133 of course perform similar processing.

The description of subsequent processing also focuses on when the update module 131 detects tampering in the protection control module 120. Processing is fundamentally the same when the update modules 132 and 133 detect tampering in the protection control module 120.

The update module 131 determines whether the protection control module 120 has been tampered with, i.e. whether the MAC values match, and when determining positively (S2000: Y), notifies the determination unit 210 in the update server 200 (S2001).

When determining that the protection control module 120 has not been tampered with (S2000: N), the update module 131 returns to tampering detection processing without issuing notification to the determination unit 210 or to other update modules.

An update module receiving notification from another update module that the protection control module 120 has been tampered with uses the verification key and the MAC value to detect tampering in the protection control module 120 (S2002). The update module notifies the determination unit 210 and the other update modules of the tampering detection result (S2003).

The determination unit 210 receives tampering detection results from the update modules 131, 132, and 133.

Note that during detection in step S2000, the update modules in the update module group 130 may perform mutual monitoring to identify a malicious update module by performing tampering detection on each other. When a malicious update module is identified, the identified update module may then be deactivated.

Details on mutual monitoring and on deactivation are provided below. Note that during mutual monitoring, the method described in Embodiment 2 of the present invention may be used to identify a malicious module.

(5) Analysis and Determination Operations

Next, analysis and determination (S300 in FIG. 10) are described in detail with reference to the sequence diagram in FIG. 15. Note that FIG. 15 represents processing performed individually by the update modules 131, 132, and 133 collectively as being performed by the update module group 130.

Upon receiving tampering detection results for the protection control module 120 from the update modules in step S2001 and step S2003 of FIG. 14, the determination unit 210 determines whether the protection control module 120 is normal or malicious (whether the protection control module 120 has been tampered with) based on the received tampering detection results.

An example of the method of determination is to determine that the protection control module 120 is malicious (has been tampered with) when a predetermined number of update modules have detected tampering, and to determine that the protection control module 120 is normal (has not been tampered with) when less than the predetermined number of update modules have detected tampering. The predetermined number may be a majority of the update modules included in the update module group 130.

When determining the protection control module 120 to have been tampered with (S3000: Y), the determination unit 210 requests notification of tampering information, such as the part of the protection control module 120 that was tampered with, from the update module group 130 in order to determine whether it is necessary to recover the protection control module 120 (S3001).

Upon receiving a request for notification of tampering information, the update module group 130 collects the tampering information (S3002) and notifies the determination unit 210 of the collected tampering information (S3003).

Based on the tampering information, the determination unit 210 determines whether to recover the protection control module 120, to revoke the device 100, or to do nothing (S3004).

When the protection control module 120 is to be recovered (S3004: Y), the determination unit 210 prepares an updated protection control module (S3006) and instructs the update module group 130 to start updating (S3007). When the device 100 is to be revoked, the determination unit 210 issues a request to the server providing service to the applications 110 and 111 to revoke the device 100 (S3005). When the determination unit 210 determines to do nothing (S3004: N), processing returns to detection.

When the determination unit 210 determines that the protection control module 120 is normal (i.e. not tampered with; S3000: N), processing returns to detection.

(6) Mutual Authentication Operations

Next, mutual authentication by the software updating system 10 (S400 in FIG. 10) is described in detail with reference to the sequence diagrams in FIGS. 16 and 17.

When determining, during analysis and determination, that it is necessary to recover the protection control module 120, the determination unit 210 of the update server 200 instructs the updated software delivery unit 220 to recover the protection control module 120.

After being instructed by the updated software delivery unit 220 to start updating, the update modules 131, 132, and 133 perform mutual authentication with each other on a one-to-one basis. This prevents the device 100 from connecting to a malicious server and prevents the update server 200 from connecting to a malicious device. Note that during mutual authentication, the updated software delivery unit 220 uses the signature private key and the signature public key, and the update modules use the pair of authentication keys (authentication private key and authentication public key).

Figure 16:
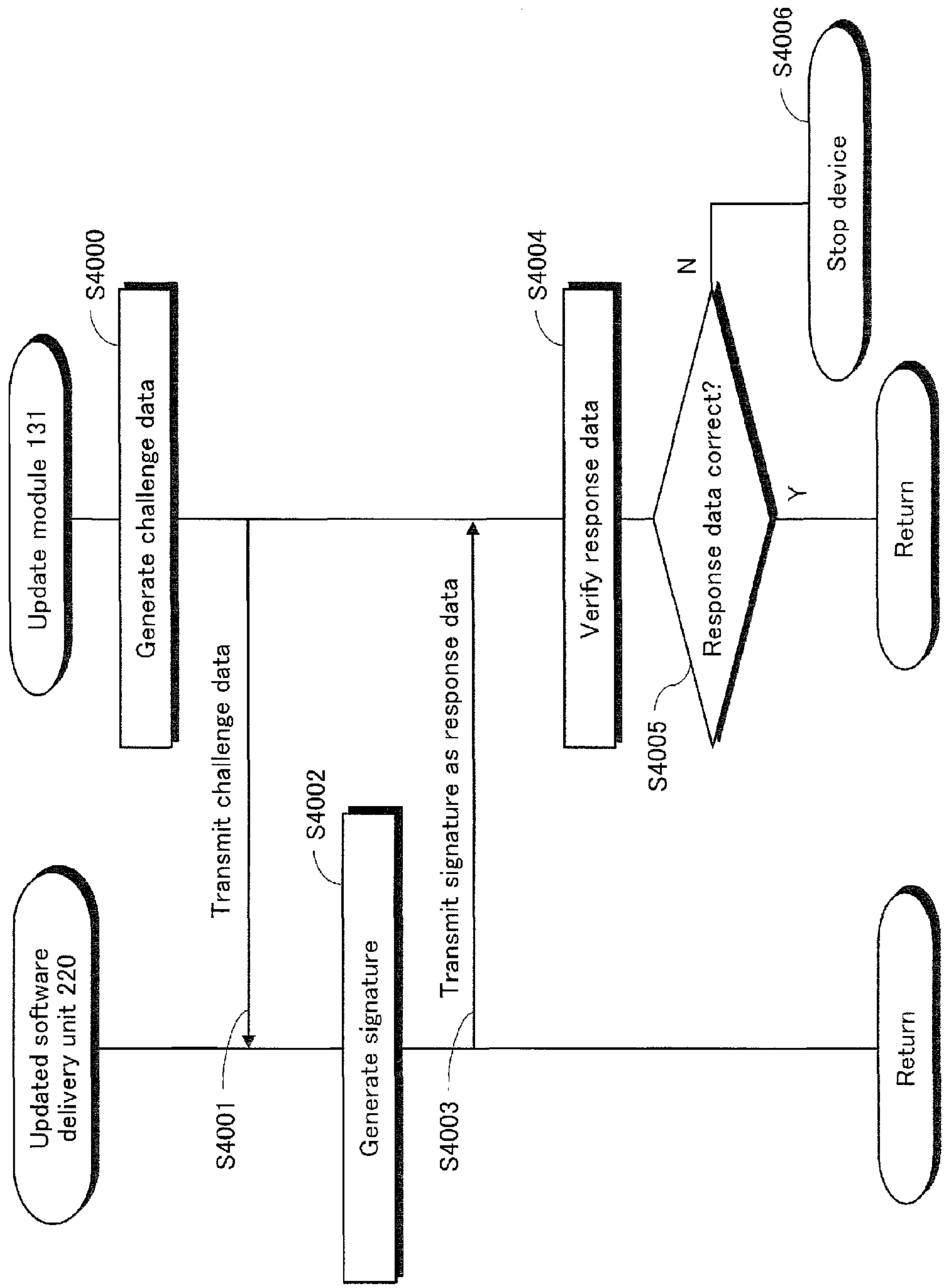
FIG. 16 is a sequence diagram of mutual authentication according to Embodiment 1.

FIG. 16 is a sequence diagram of when the update module 131 performs authentication on the updated software delivery unit 220. Note that the update modules 132 and 133 also operate similarly to the update module 131 in FIG. 16 to perform authentication on the updated software delivery unit 220.

The update module 131 generates a random number (challenge data) using a random number generator (S4000) and transmits the generated challenge data to the updated software delivery unit 220 (S4001). Along with the challenge data, the update module 131 also transmits an update module identifier for identifying the update module 131. The updated software delivery unit 220 generates signature data for the received challenge data using the signature private key (S4002) and returns the generated signature data to the update module 131 as response data (S4003).

Upon receiving the response data from the updated software delivery unit 220, the update module 131 verifies whether the response data matches the signature data for the challenge data using the signature public key (S4004).

If verification indicates that the response data is correct, and therefore that the updated software delivery unit 220 is an authentic module (S4005: Y), the update module 131 continues processing. If verification indicates that the response data is not correct, and therefore that the updated software delivery unit 220 is not an authentic module (S4005: N), the update module 131 outputs an error and terminates processing (S4006).

Next, the updated software delivery unit 220 performs authentication on the update modules 131, 132, and 133.

Figure 17:
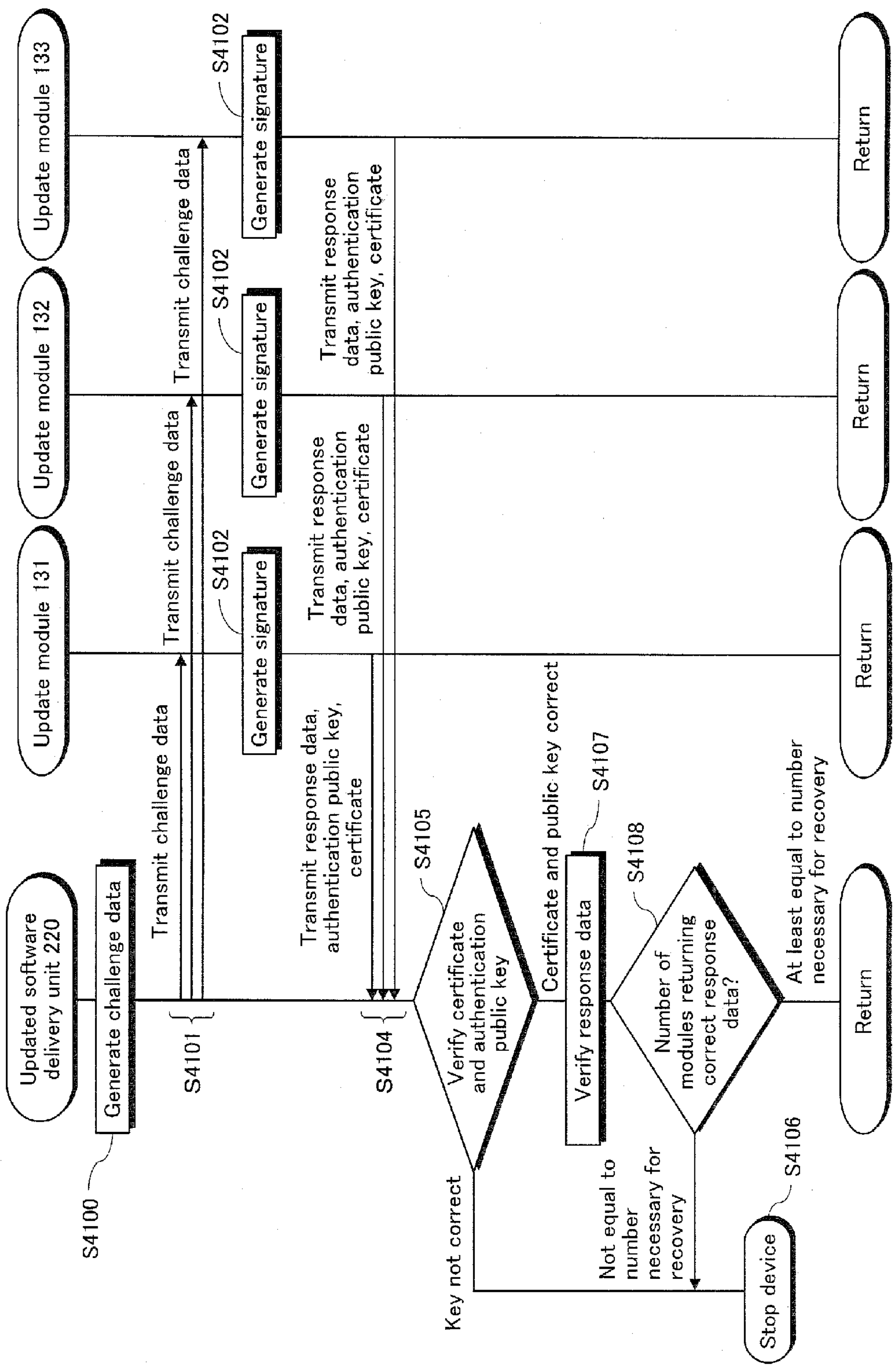
FIG. 17 is a sequence diagram of mutual authentication according to Embodiment 1.

FIG. 17 is a sequence diagram of when the updated software delivery unit 220 performs authentication on the update modules.

Using the random number generator, the updated software delivery unit 220 generates a different random number (challenge data) for each of the update modules that transmitted challenge data (S4100) and transmits each piece of challenge data to the corresponding update module (S4101).

The update modules generate signature data for the received challenge data using the authentication private key (S4102) and return the generated signature data to the updated software delivery unit 220 as response data.

Along with the response data, the update modules also transmit the authentication public key and the authentication key certificate to the updated software delivery unit 220.

The updated software delivery unit 220 receives the response data, the authentication public key, and the authentication key certificate from each update module (S4104). The updated software delivery unit 220 verifies whether each authentication key certificate is the certificate that the updated software delivery unit 220 itself issued and also verifies authenticity of the authentication public key using the authentication key certificate (S4105).

When the authentication key certificate and the authentication public key are not correct, the updated software delivery unit 220 terminates processing (S4106).

If the authentication key certificate and the authentication public key are correct, the updated software delivery unit 220 verifies whether the received response data matches the signature data for the challenge data using the authentication public key (S4107).

Next, the updated software delivery unit 220 determines whether the number of update modules that return correct response data (i.e. authentic update modules) is at least a preset number necessary for recovery (S4108).

When the number of authentic update modules is less than the number necessary for recovery, recovery cannot be performed, and therefore the updated software delivery unit 220 stops processing (S4106). When the number of authentic update modules is at least the number necessary for recovery, mutual authentication is complete, and processing proceeds to recovery.

The updated software delivery unit 220 also creates an authentication list that lists update module identifiers for all of the update modules confirmed to be authentic during mutual authentication. During subsequent recovery, only the update modules whose identifier is listed in the authentication list are used.

(7) Recovery Operations

Next, recovery (S500 in FIG. 10) is described in detail with reference to FIGS. 18 to 23. Recovery is processing to update the protection control module 120 that has been tampered with to a new, updated protection control module when the above described mutual authentication is successful.

Figure 18:
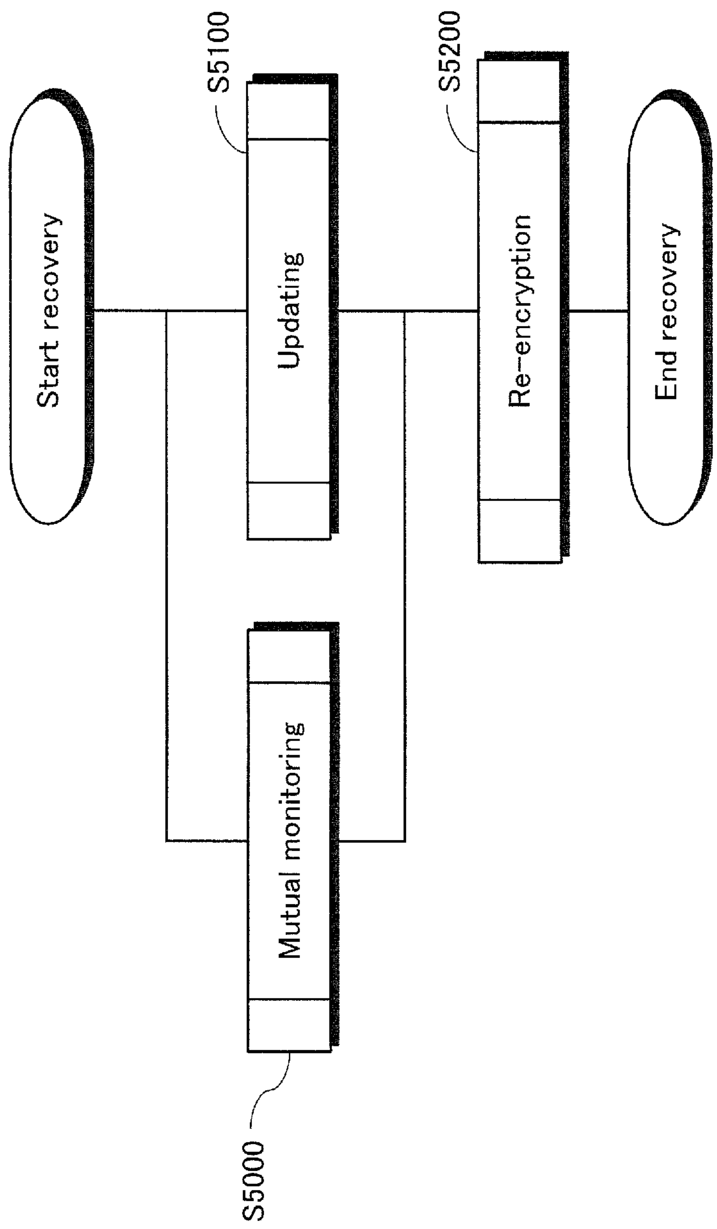
FIG. 18 is a flowchart showing recovery according to Embodiment 1.

FIG. 18 is a flowchart showing recovery operations.

First, the update modules 131, 132, and 133 perform mutual monitoring (S5000). During mutual monitoring, each update module performs tampering detection on another update module.

Furthermore, processing to update the protection control module 120 is performed using the updated protection control module (S5100).

Re-encryption processing to re-encrypt the encrypted applications 110 and 111 is then performed (S5200).

Note that not all of the above processes are essential to the software updating system of the present invention. It suffices for the software updating system to be triggered to update by an external device, to update the protection control module 120 that has been tampered with using a new update control module (S5000), and to perform mutual monitoring at the time of recovery so that update modules perform tampering detection on each other (S5100).

(8) Mutual Monitoring

Figure 19:
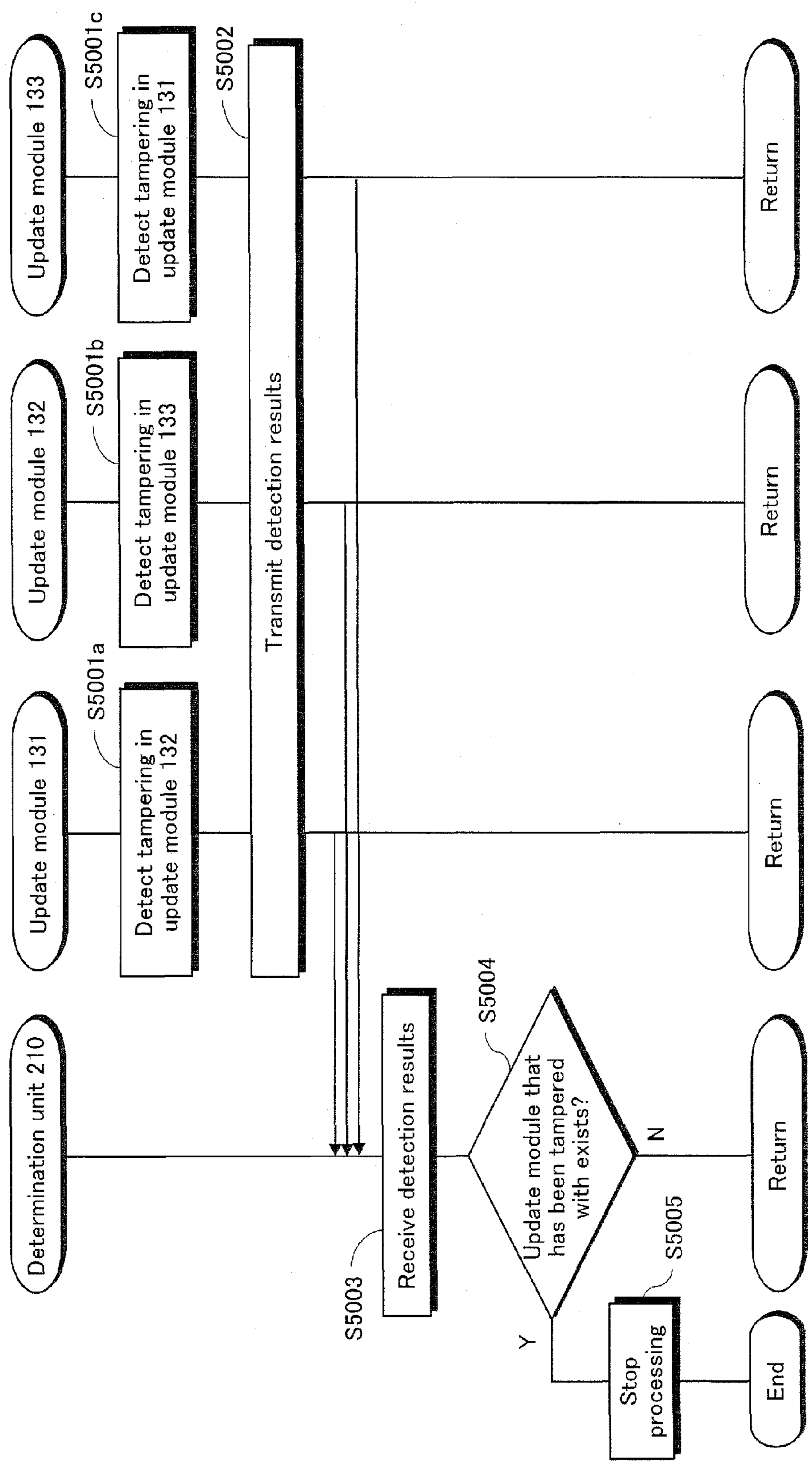
FIG. 19 is a sequence diagram of mutual monitoring according to Embodiment 1.

Next, mutual monitoring (S5000 in FIG. 18) is described in detail with reference to the sequence diagram in FIG. 19.

During mutual monitoring, the update modules 131, 132, and 133 each perform tampering detection on another one of the update modules in the update module group 130. The update module on which to perform tampering detection during mutual monitoring is indicated in the monitoring pattern stored by each update module. The monitoring pattern lists information for the module that is the target of tampering detection (a module identifier, a location in memory, a size, an address, a file name, etc.).

First, the update module 131 performs tampering detection on the update module 132 (S5001*a*). The update module 132 then performs tampering detection on the update module 133 (S5001*b*), and the update module 133 performs tampering detection on the update module 131 (S5001*c*).

Each update module performs tampering detection by calculating the MAC value of one of the update modules 131, 132, and 133 using the verification key and comparing the calculated MAC value with the MAC value that is calculated at the time of initialization and stored in the MAC value table.

Alternatively, each update module may perform tampering detection by calculating a hash value for one of the update modules 131, 132, and 133 and comparing the calculated hash value with a hash value that is listed in a certificate attached in advance to each update module.

Each update module notifies the determination unit 210 of the tampering detection result (S5002).

The determination unit 210 receives the tampering detection result from each update module (S5003) and determines whether an update module has been tampered with (S5004).

When determining that an update module has been tampered with (S5004: Y), the determination unit 210 immediately stops recovery (S5005).

When it is determined that no module has been tampered with (S5004: N), processing continues.

(9) Updating

Figure 20:
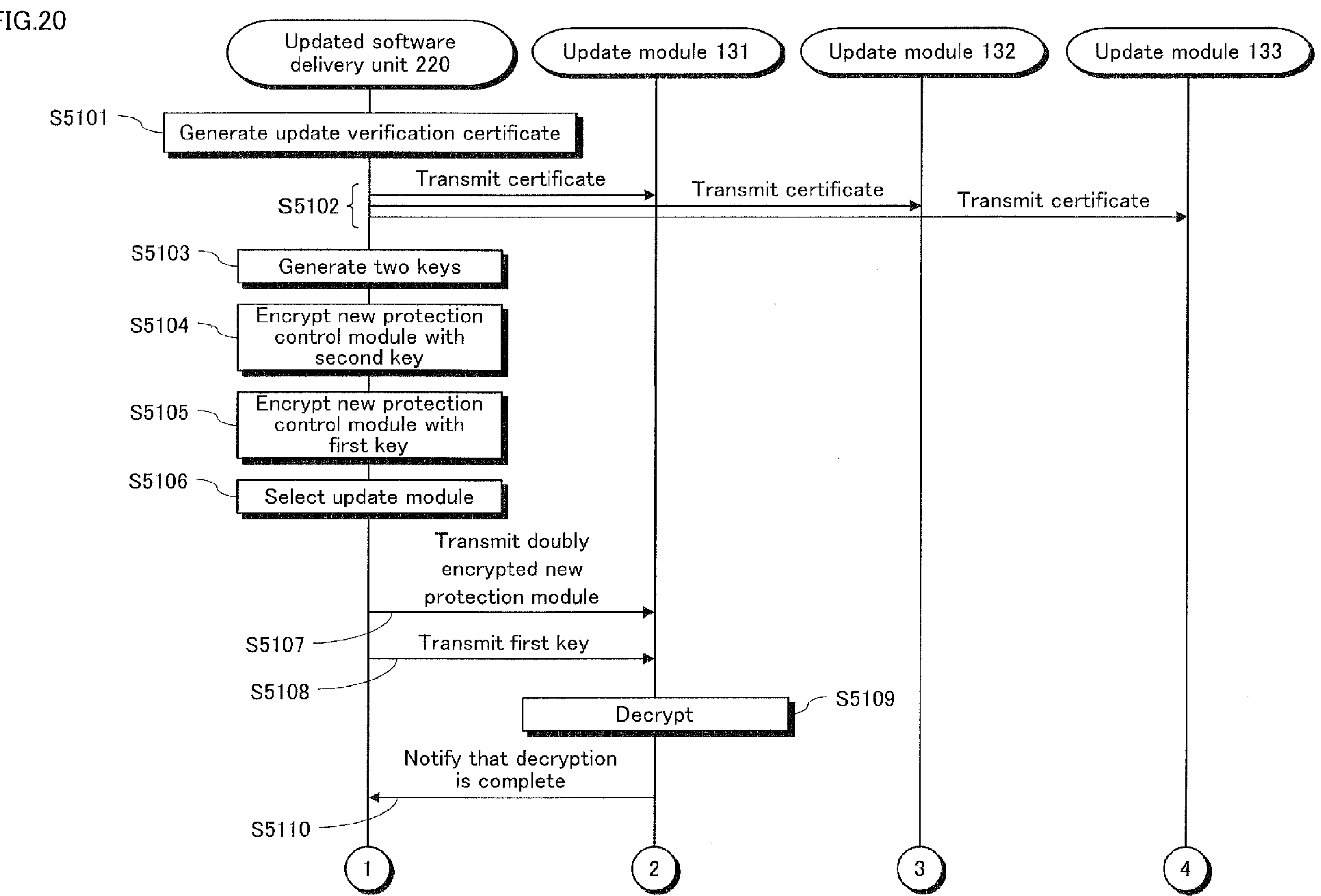
FIG. 20 is a sequence diagram of updating according to Embodiment 1.
Figure 21:
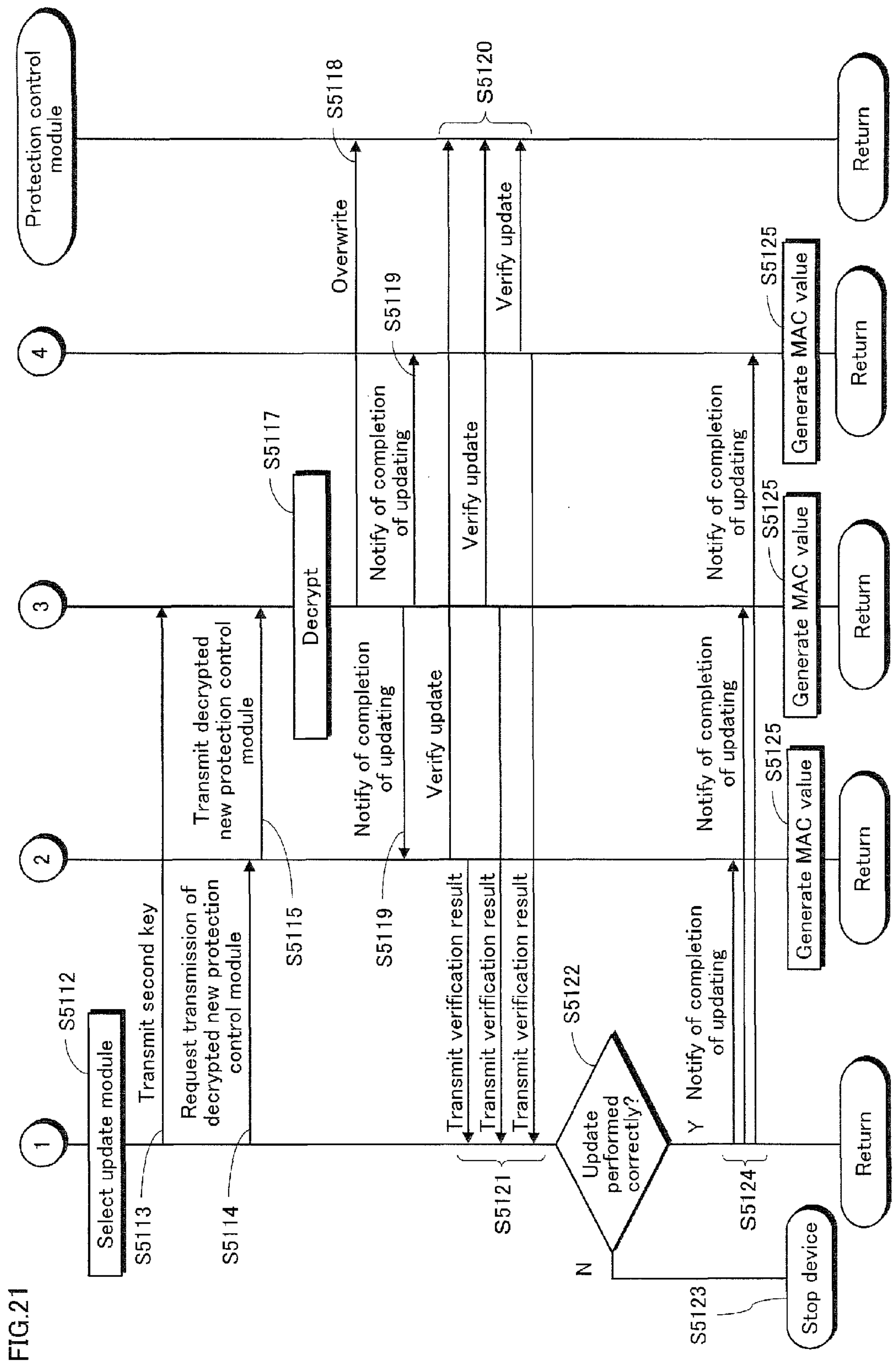
FIG. 21 is a sequence diagram of updating according to Embodiment 1.

Next, updating (S5100 in FIG. 18) is described in detail with reference to the sequence diagrams in FIGS. 20 and 21.

First, the certificate generation unit 708 of the updated software delivery unit 220 generates an update verification certificate using the signature private key (S5101). The update verification certificate is for the update modules 131, 132, and 133 to confirm whether the new protection control module has been installed correctly. The updated software delivery unit 220 transmits the generated certificate to the update modules (S5102).

Next, the encryption key generation unit 703 in the updated software delivery unit 220 generates two encryption keys (a first key and a second key) for doubly encrypting the new protection control module (S5103). The encryption unit 704 encrypts the new protection control module using the second key, thus generating an encrypted new protection control module (S5104). The encryption unit 704 then further encrypts the encrypted new protection control module using the first key, thus generating a doubly encrypted new protection control module (S5105).

The updated software delivery unit 220 selects one of the update modules in the update module group 130 (S5106) and notifies the determination unit 210 of the identifier of the selected update module. In step S5106, an update module other than malicious update modules stored by the malicious module identifying unit 604 in the determination unit 210 is selected. In this example, the update module 131 is selected.

The updated software delivery unit 220 transmits the doubly encrypted new protection control module (S5107) and the first key (S5108) to the selected update module 131.

The update module 131 receives the doubly encrypted new protection control module and the first key. The update module 131 decrypts the doubly encrypted new protection control module using the first key, thus acquiring the encrypted new protection control module (S5109). The update module 131 then notifies the updated software delivery unit 220 that decryption is complete (S5110).

Upon receiving the notification of completion of decryption, the updated software delivery unit 220 selects an update module from the update module group 130 that is an authentic module and that differs from the update module selected in step S5106 (S5112). In this example, the update module 132 is selected.

As above, an update module other than malicious update modules stored by the malicious module identifying unit 604 in the determination unit 210 is selected.

The updated software delivery unit 220 transmits the second key to the selected update module 132 (S5113). The updated software delivery unit 220 also issues a request to the update module 131 to transmit the encrypted new protection control module acquired in step S5109 to the update module 132 (S5114).

The update module 131 receives the request from the updated software delivery unit 220 and transmits the encrypted new protection control module to the update module 132 (S5115).

The update module 132 receives the second key from the updated software delivery unit 220 and receives the encrypted new protection control module from the update module 131. The update module 132 then decrypts the encrypted new protection control module using the second key, thus acquiring the new protection control module (S5117).

The update module 132 overwrites the protection control module 120 with the new protection control module acquired in step S5117, thereby updating the protection control module 120 (S5118). The update module 132 then transmits a notification of completion of updating to the other update modules (S5119). Next, the update modules 131, 132, and 133 verify whether the protection control module has been correctly updated, using the already received update verification certificate (S5120), and then notify the updated software delivery unit 220 of the detection results (S5121).

Upon receiving the detection results transmitted from the update modules, the updated software delivery unit 220 determines whether the protection control module has been correctly updated (S5122). When updating is determined not to have been performed correctly (S5121: N), the updated software delivery unit 220 stops the device 100 (S5123).

When updating is determined to have been performed correctly (S5121: Y), the updated software delivery unit 220 notifies the update modules of completion of the updating process (S5124).

Upon receiving the notification of completion of the updating process, the update modules generate a MAC value for the new protection control module and write the generated MAC value in combination with the identifier of the protection control module in the MAC value table (S5125).

As explained above, during updating, the updated software delivery unit 220 doubly encrypts the new protection control module for updating with a plurality of keys before transmission to the update module group 130. The update module group 130 updates the protection control module 120 with the received new protection control module.

During this process, the updated software delivery unit 220 controls the timing at which the plurality of keys for decrypting the doubly encrypted new protection control module is transmitted to the update module group 130, making it difficult for an attacker to acquire the non-encrypted new protection control module.

(10) Relationship Between Mutual Monitoring and Updating

The above-described mutual monitoring and updating are performed in coordination with each other.

Mutual monitoring is performed periodically when the updated software delivery unit 220 transmits the plurality of keys to update modules included in the update module group 130, and when update modules included in the update module group 130 decrypt the encrypted new protection control module. The time intervals at which mutual monitoring is performed periodically are, for example, shorter intervals than the time for the protection control module used for updating to traverse the transmission channel and be completely transmitted to an external device. For example, if transmission requires one second to complete, monitoring is performed at a shorter interval, such as 500 milliseconds.

Figure 22:
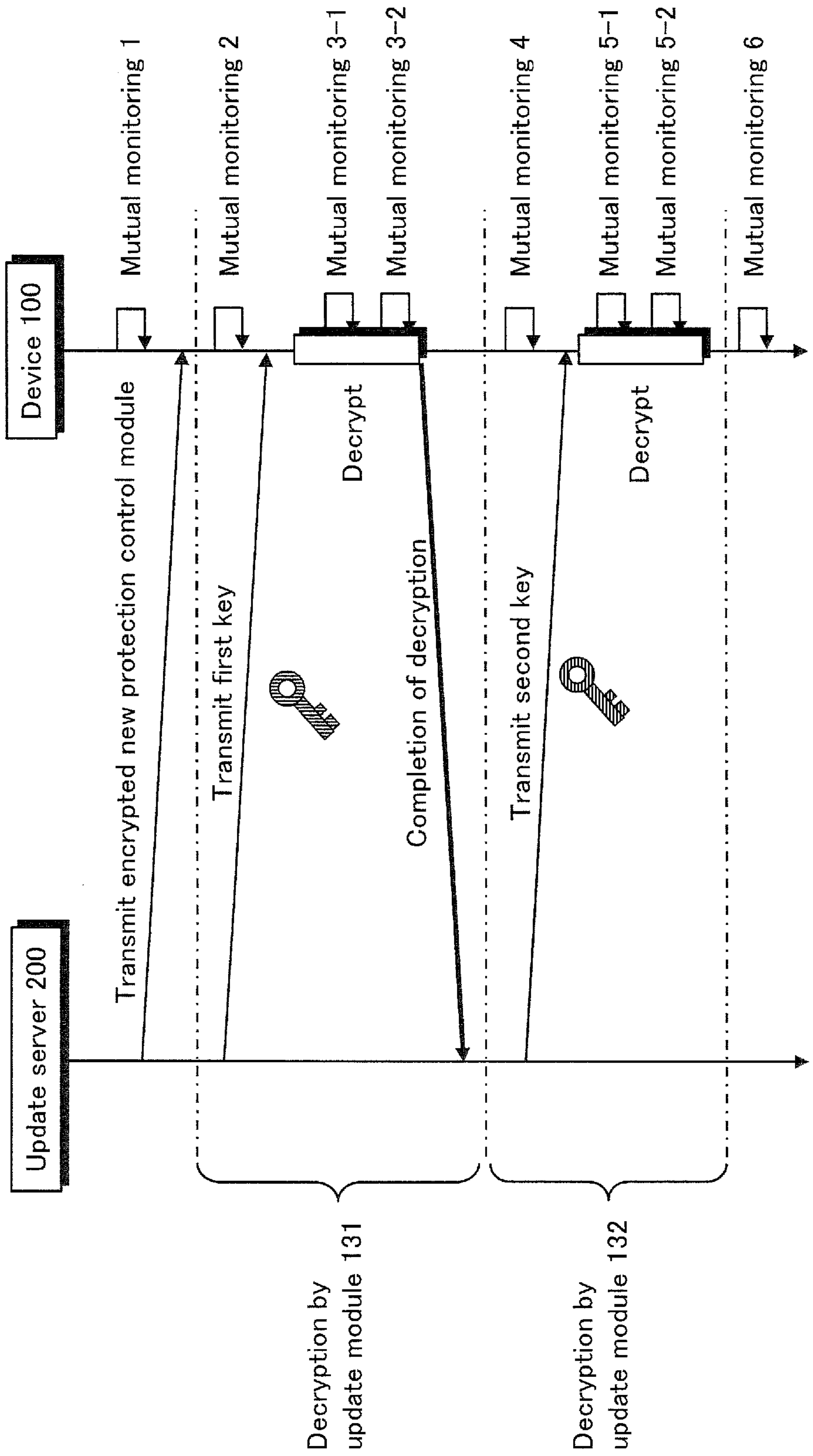
FIG. 22 illustrates coordination between mutual monitoring and updating according to Embodiment 1.

The coordinated operations of mutual monitoring and updating are now described with reference to FIG. 22.

First, the device 100 performs mutual monitoring (mutual monitoring 1) before the doubly encrypted new protection control module is transmitted from the update server 200. This is so as not to select a malicious update module for performing the update.

Subsequently, the device 100 performs mutual monitoring (mutual monitoring 2) before the update module 131 receives the first key transmitted by the update server 200, thus confirming that a malicious update module has not been selected before the device 100 receives the first key.

Furthermore, after the update module 131 receives the first key, while the update module 131 decrypts the doubly encrypted new protection control module using the first key, decryption is periodically suspended for mutual monitoring (mutual monitoring 3-1, 3-2). Therefore, even if the update modules 131, 132, and 133 are attacked during decryption, the attack is detected in time to prevent the entire encrypted new protection control module from being divulged.

Subsequent processing is the same as above. Specifically, the device 100 performs mutual monitoring (mutual monitoring 4) before the update module 132 receives the second key transmitted by the update server 200, thus confirming that a malicious update module has not been selected before the device 100 receives the second key.

Furthermore, after the update module 132 receives the second key, while the update module 132 decrypts the doubly encrypted new protection control module using the second key, decryption is periodically suspended for mutual monitoring (mutual monitoring 5-1, 5-2). Mutual monitoring is then performed one last time (mutual monitoring 6).

Therefore, an attack on the update modules is detected in time to prevent the entire new protection control module from being divulged.

If tampering is detected in one of the update modules during mutual monitoring, recovery processing is terminated. This allows the update server 200 to suspend transmission of the first key or the second key, thereby making it impossible for an attacker to acquire the keys for decrypting the doubly encrypted new protection control module.

(11) Re-Encryption

Figure 23:
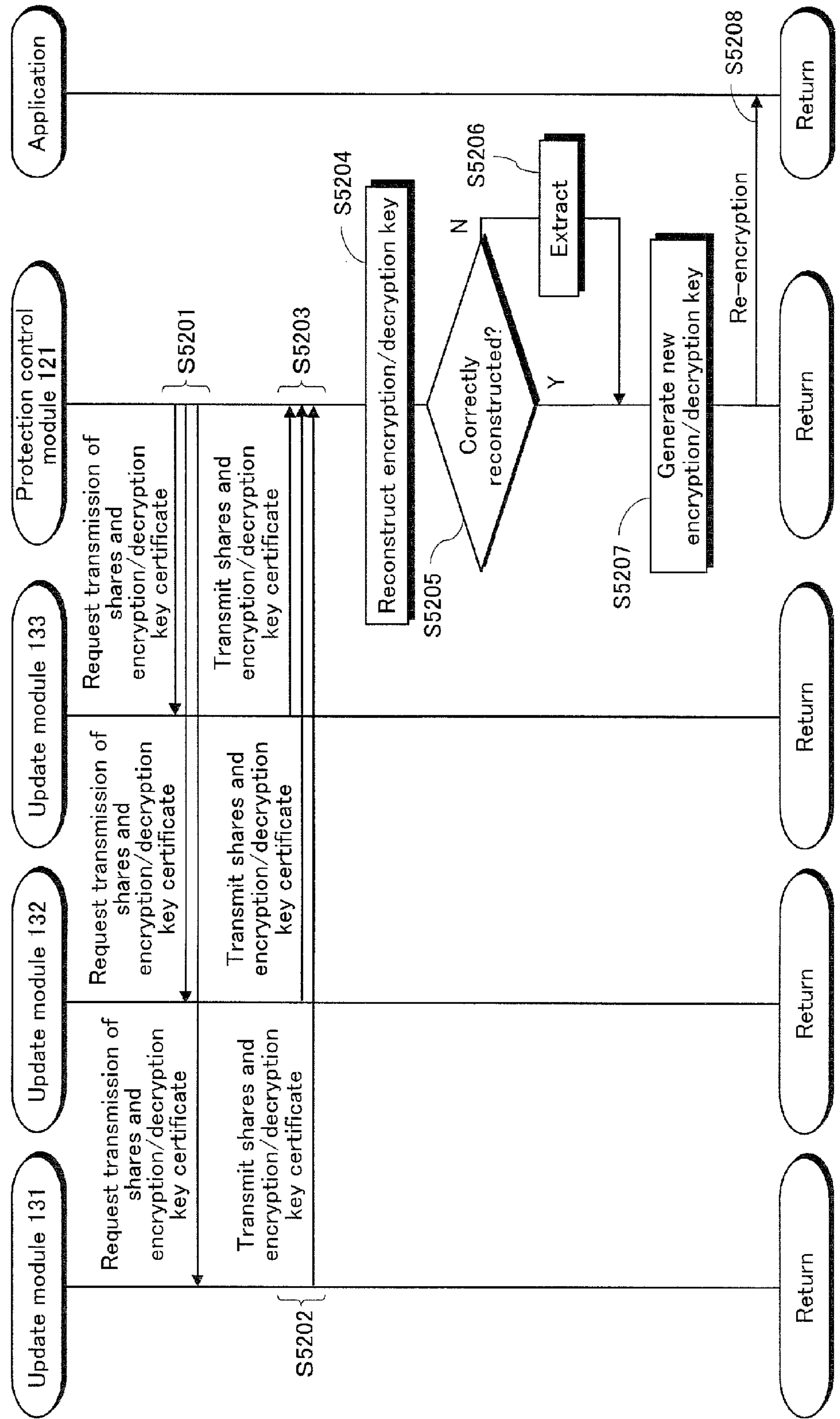
FIG. 23 is a sequence diagram of re-encryption according to Embodiment 1.

Next, re-encryption (S5200 in FIG. 18) is described in detail with reference to the sequence diagram in FIG. 23.

First, the updated protection control module (referred to in the description of FIGS. 23 and 24 as the "protection control module 121" to distinguish from the protection control module 120 before updating) issues a request to the update modules 131, 132, and 133 to transmit the shares and the encryption/decryption key certificate stored by each update module (S5201).

Upon receiving the request from the protection control module 121, the update modules 131, 132, and 133 transmit the shares and the encryption/decryption key certificates (S5202).

The protection control module 121 receives the shares and the encryption/decryption key certificates from the update modules 131, 132, and 133 (S5203) and, from the received shares, reconstructs the encryption/decryption key (referred to here as the "old encryption/decryption key") used by the protection control module 120 before updating (S5204). The protection control module 121 also refers to the encryption/decryption key certificates to verify whether the old encryption/decryption key was properly reconstructed (S5205).

If the old encryption/decryption key was not properly reconstructed (S5205: NO), the protection control module 121 extracts the malicious update module (i.e. identifies the update module that transmitted a malicious share) (S5206). The update server 200 is notified of the identified, malicious update module.

If the old encryption/decryption key was correctly reconstructed (S5205: Y), the encryption/decryption key generation unit 408 in the protection control module 121 generates a new encryption/decryption key (S5207). The decryption loading unit 404 decrypts the encrypted applications (110, 111) with the old encryption/decryption key and then re-encrypts the applications (110, 111) with the new encryption/decryption key (S5208).

The following describes the method for identifying a malicious update module in step S5206. First, the protection control module 121 gathers combinations of the shares from the update modules and attaches, to the gathered information, the identifiers for identifying the update modules.

Subsequently, the protection control module 121 gathers distributed shares that were set to the same value upon initialization into groups. The protection control module 121 compares the value of the shares in each group, further gathering shares with the same value into subgroups. Then, the protection control module 121 generates all possible combinations by selecting subgroups from within the groups one at a time.

For each generated combination, the protection control module 121 generates an old encryption/decryption key and verifies whether the old encryption/decryption key was generated correctly. When verification is OK, a verification pass identifier is attached to the subgroups included in the combination to indicate that verification was OK.

After generating and verifying the old encryption/decryption key for all combinations, the protection control module 121 removes the shares that are included in subgroups to which the verification pass identifier is attached.

The remaining shares are malicious values. The update modules that transmitted the shares having malicious values can be identified by the identifiers attached to the shares. Each update module identified by the identifier is determined to be a malicious update module.

Pages 50 to 52 of Patent Literature 2 contain a detailed description of both the method of reconstructing the old encryption/decryption key from the shares, as well as the method of identifying malicious update modules. In order to employ the same method as in Patent Literature 2, the encryption/decryption key in Embodiment 1 can be made to correspond to the private key d, the protection control module 121 to the authentication authority device, and the update modules 131, 132, and 133 to the share storing devices in Patent Literature 2.

Also, the malicious module identification method described in detail in Embodiment 2 below may be used as the method for identifying a malicious update module in step S5206.

(12) Next Round Preparation Operations

Figure 24:
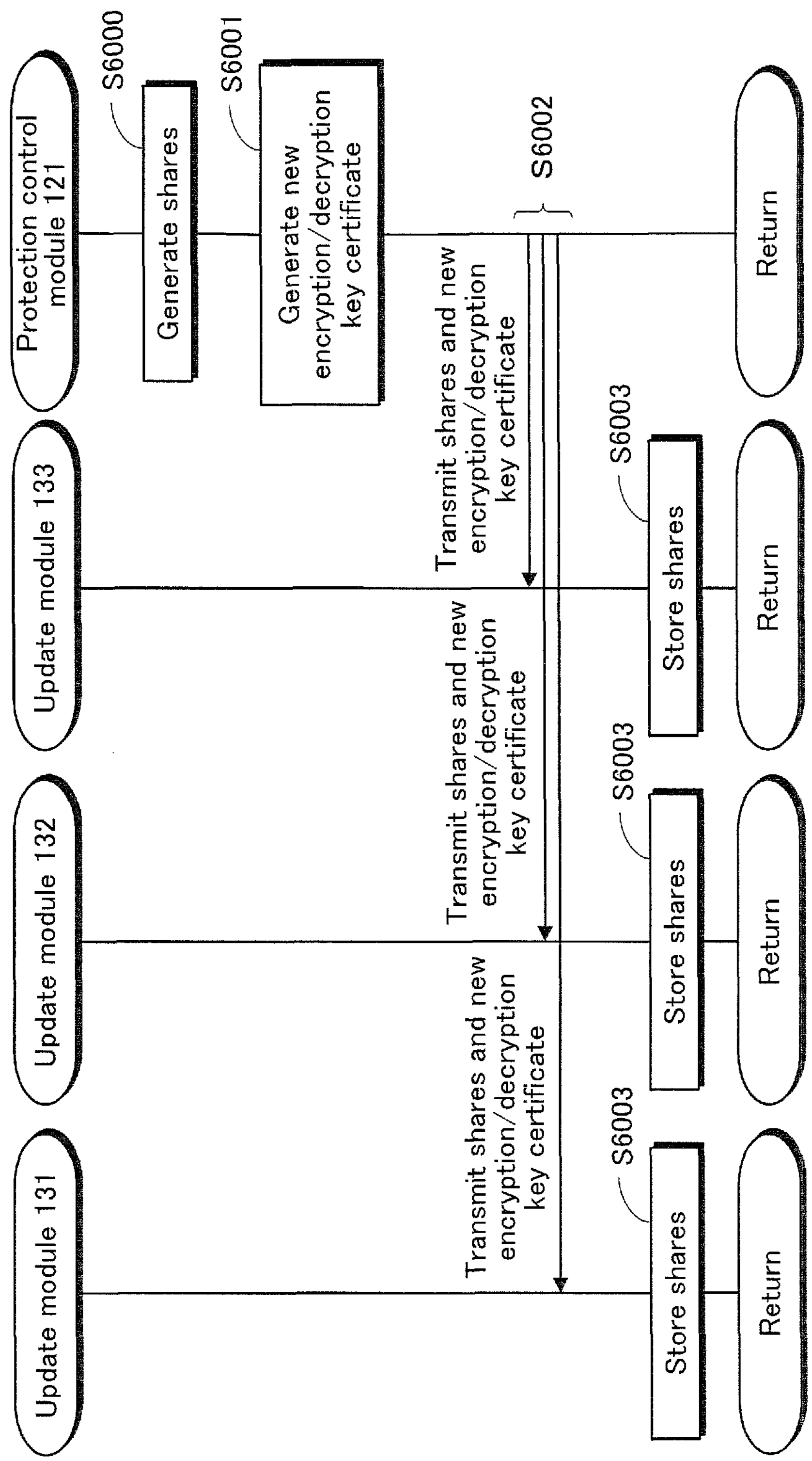
FIG. 24 is a sequence diagram of next round preparation according to Embodiment 1.

Next round preparation (S600 in FIG. 10) is described next in detail with reference to the sequence diagram in FIG. 24. During next round preparation, preparations are made for the next recovery after completion of the present recovery. The following describes an example.

First, the protection control module 121 generates shares from the new encryption/decryption key using the secret sharing scheme (S6000) and generates a new encryption/decryption key certificate using the signature private key (S6001). The protection control module 121 transmits the generated shares and encryption/decryption key certificate to the update modules 131, 132, and 133 (S6002).

As during initialization, the same number of shares as the number of update modules is generated, and shares are transmitted so that each update module stores a different pair of shares. The same new encryption/decryption key certificate is transmitted to the update modules 131, 132, and 133.

Each of the update modules 131, 132, and 133 receives the shares and the new encryption/decryption key certificate from the protection control module 121 and stores the received shares and new encryption/decryption key certificate in the share storage unit 308 (S6003).

(13) Deactivation Operations

Next, deactivation is described in detail with reference to the sequence diagram in FIG. 25.

Deactivation refers to deactivating a malicious module (a module that has been tampered with) located in the device 100. Deactivation is performed when mutual authentication fails for an update module, when an update module that has been tampered with is detected during monitoring within the recovery process, or when a malicious update module is detected during re-encryption within the recovery process.

Deactivation operations are described in detail for an example in which the update module 133 has been tampered with, and the update modules 131 and 132 have detected the tampering.

Based on the inter-monitoring results received from the update modules 131, 132, and 133, the determination unit 210 determines which update module has been tampered with (S7001). The method of determination may, for example, be to determine that an update module determined by a majority of update modules to have been tampered with is a malicious update module.

The determination unit 210 transmits the identifier for the update module that has been tampered with along with a deactivation instruction to the module deactivation unit 230 (S7002).

The module deactivation unit 230 issues a request to deactivate the update module 133, which has been tampered with, to either the update module 131 or 132 (in this example, to the update module 131), which have been determined not to have been tampered with (S7003).

Upon receiving the request to deactivate the update module 133 from the module deactivation unit 230, the update module 131 requests that the module deactivation unit 230 issue an access information acquisition key for deactivating the update module 133 (S7004). Furthermore, the update module 131 issues a request to the access control module 140 to acquire the access information for deactivating the update module 133 (S7005).

Upon receiving the request for issuing the access information acquisition key, the module deactivation unit 230 confirms whether the update module 131 is an authentic update module (a module that has not been tampered with) and whether the requested access information acquisition key is the access information acquisition key for deactivating the update module 133 that is malicious (i.e. tampered with) (S7006). The module deactivation unit 230 performs this confirmation using information on the update module notified to the module deactivation unit 230 by the determination unit 210.

If confirmation indicates that the request is from the update module 133, which has been tampered with, or that the acquisition request is for the access information acquisition key for update module 131 or 132, which have not been tampered with (S7006: N), the module deactivation unit 230 terminates processing for deactivation.

If confirmation indicates no problem (S7006: Y), the module deactivation unit 230 transmits the access information acquisition key for deactivating the update module 133 to the requesting update module 131 (S7008).

The update module 131 receives the access information acquisition key from the module deactivation unit 230 and also receives a piece of encrypted access information from the access control module 140 (S7009). The update module 131 acquires the access information from the access information acquisition key and the encrypted piece of access information (S7010). The acquired access information is a dedicated driver for removing the update module 133. The update module 131 removes the malicious update module 133, which has been tampered with, using the dedicated driver (S7011).

Upon completion of deactivation, the update module 131 deletes the access information acquisition key, the encrypted piece of access information, the access information, etc., and transmits a notification of completion to the module deactivation unit 230 (S7012). Upon receiving the notification of completion from the update module 131, the module deactivation unit 230 transmits the notification of completion of deactivation to the determination unit 210 (S7013).

In step S7003, deactivation of the update module 133, which has been tampered with, is requested of the update module 131. However, an alternative method of selecting one authentic update module is to use the results of malicious module identification according to the present invention to select an authentic module.

Note that when an update module provided with the share storage unit 308 is deactivated, the shares stored by that update module are deleted. Therefore, when deactivating an update module provided with a share storage unit 308, it is necessary for deactivation processing to take deletion of shares into consideration.

Pages 56 to 64 of Patent Literature 2 describe deactivation that takes deletion of shares into consideration in detail as "withdrawal". In order to employ the same method as in Patent Literature 2, the encryption/decryption key in Embodiment 1 can be made to correspond to the private key d, and the update modules 131, 132, and 133 to the share storing devices in Patent Literature 2. Note that to perform deactivation that takes deletion of shares into consideration, at least three authentic update modules are required in addition to the malicious update module that is to be deactivated. When the protection control module 120 is used for deactivation, shares are once again generated with the same method as during initialization and are distributed.

As described above, the plurality of update modules in the update module group 130 perform mutual monitoring to detect an update module that has been tampered with. This increases reliability of the software updating system. Furthermore, deactivating an update module that has been tampered with prevents unauthorized operations by such an update module.

2. Embodiment 2

With reference to the drawings, the following describes Embodiment 2 of a malicious module deactivation system according to the present invention.

In Embodiment 1, the method of identifying a malicious update module that has been tampered with is, for example, to determine that an update module is malicious when a certain number, such as a majority, of update modules determine that the update module has been tampered with.

When an update module has been tampered with, however, it may erroneously detect tampering in a module that has not actually been tampered with, or it may erroneously detect no tampering in a module that has actually been tampered with.

It follows that it may not be possible to deactivate an update module that should be deactivated. Conversely, a module that should not be deactivated may end up being deactivated. Non-Patent Literature 3 discloses technology for assessing malfunction via mutual monitoring by modules. This technology, however, restricts the number of malfunctions in the system, and therefore harbors the same possibility of erroneous determination as Embodiment 1.

To address this problem, Embodiment 2 identifies a malicious update module based on a contradiction in tampering detection results.

2.1 Structure of Software Updating System 10*a*

The structure of a software updating system 10*a* according to Embodiment 2 is described with reference to FIG. 79.

Figure 79:
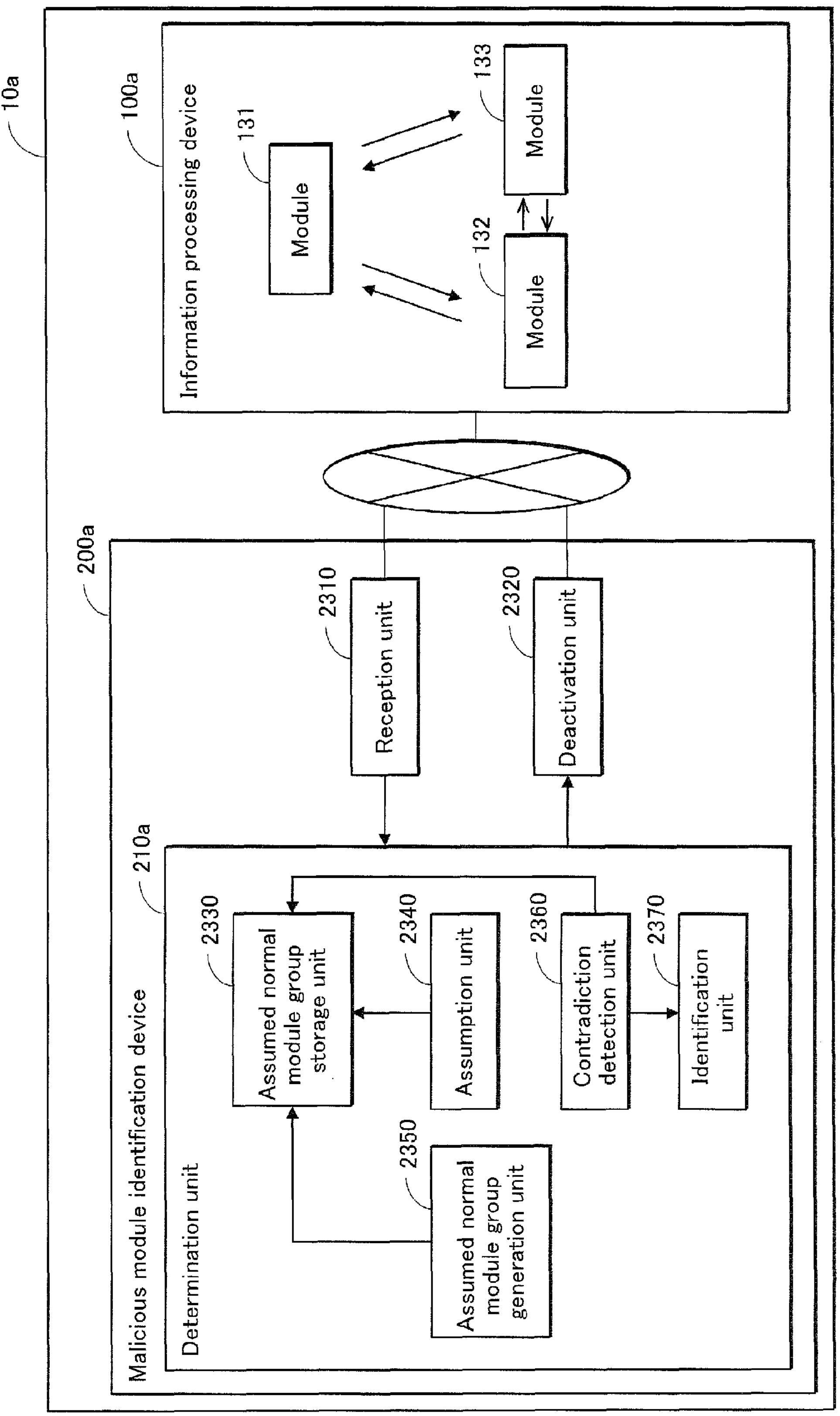
FIG. 79 is an overall structure diagram of the software updating system 10*a* according to Embodiment 2.

As shown in FIG. 79, in the software updating system 10*a*, an information processing device 100*a* and a malicious module identification device 200*a* are connected via a network.

The information processing device 100*a* includes a module 131, a module 132, and a module 133. These modules perform tampering detection on each other and transmit the tampering detection results via the network to the malicious module identification device 200*a*. The information processing device 100*a* may further include additional modules.

The malicious module identification device 200*a* includes a reception unit 2310, a determination unit 210*a*, and a deactivation unit 2320.

The reception unit 2310 receives tampering detection results from the modules 131, 132, and 133 in the information processing device 100*a*.

The determination unit 210*a* assumes that one of the plurality of modules is a normal module and determines, based on this assumption, whether there is a contradiction in the received tampering detection results. When there is a contradiction, the module that was assumed to be a normal module is identified as a malicious module.

As shown in FIG. 79, the determination unit 210*a* includes an assumed normal module group storage unit 2330, an assumption unit 2340, an assumed normal module group generation unit 2350, a contradiction detection unit 2360, and an identification unit 2370.

The assumed normal module group storage unit 2330 stores identifiers for modules assumed to be normal modules.

The assumption unit 2340 selects one of the modules 131, 132, and 133, assumes the module to be a normal module, and stores the identifier for the module in the assumed normal module group storage unit 2330.

Starting from the module assumed to be a normal module by the assumption unit 2340, the assumed normal module group generation unit 2350 repeats the process of assuming that a module in which tampering was not detected according to the tampering detection results is a normal module and storing the identifier for the module in the assumed normal module group storage unit 2330.

The contradiction detection unit 2360 determines whether there is a contradiction in the tampering detection results for the modules corresponding to the identifiers stored in the assumed normal module group storage unit 2330.

When the contradiction detection unit 2360 detects a contradiction, the identification unit 2370 identifies the module assumed by the assumption unit 2340 to be a normal module as a malicious module.

The deactivation unit 2320 outputs a deactivation instruction for the identified malicious module.

2.2 Structure of Software Updating System 10*b*

The following provides a more detailed description of Embodiment 2 of the present invention.

(1) Overall Structure

Figure 80:
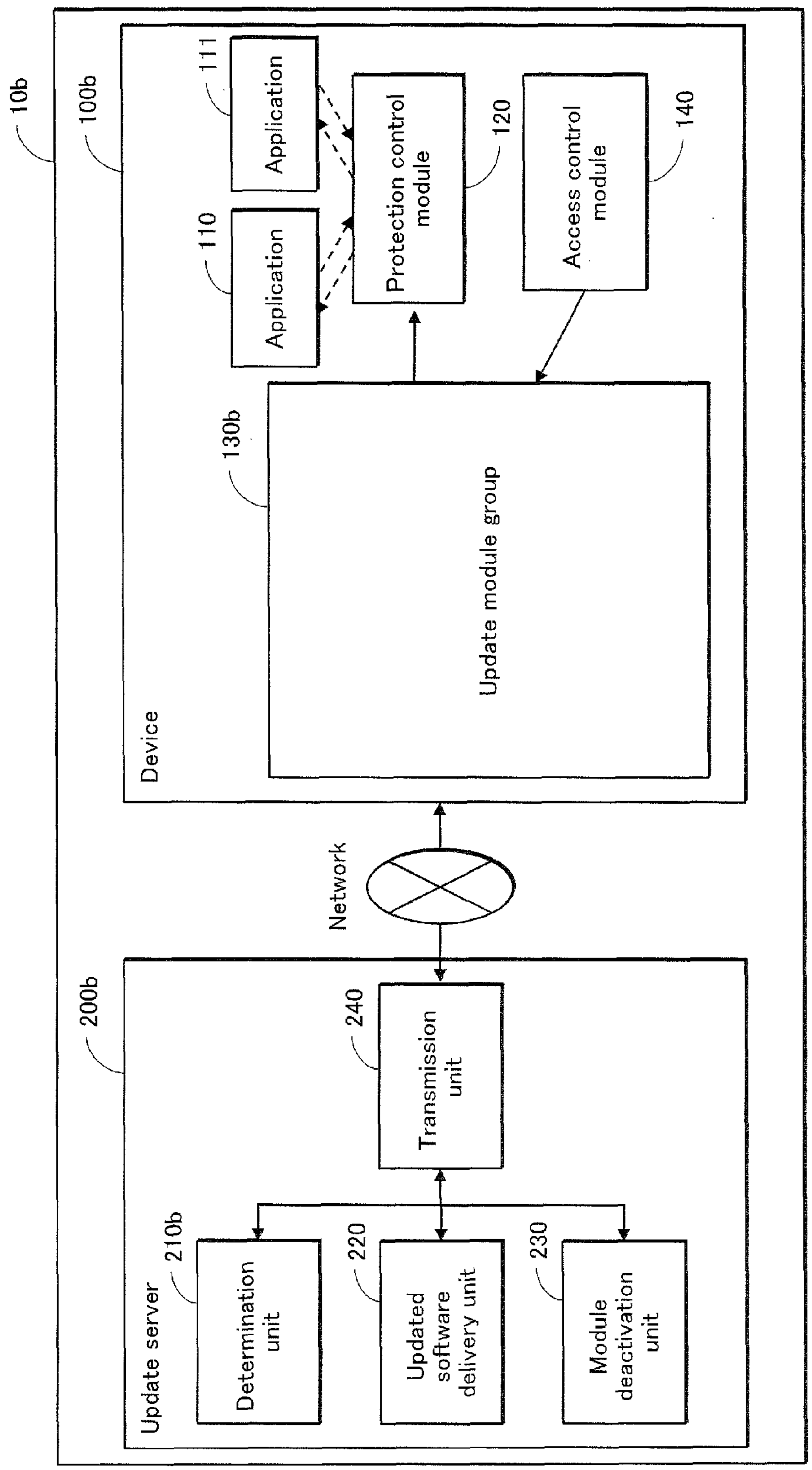
FIG. 80 is an overall structure diagram of a software updating system 10*b* according to Embodiment 2.

FIG. 80 is a block diagram showing the structure of a software updating system 10*b*, an example to further illustrate Embodiment 2.

As shown in FIG. 80, the software updating system 10*b* includes a device 100*b*, which is an information processing device according to the present invention, and an update server 200*b*, which is a malicious module identification device according to the present invention. The device 100*b* and the update server 200*b* are connected via a network.

The device 100*b* includes an application 110, an application 111, a protection control module 120, an update module group 130*b*, and an access control module 140.

The update server 200*b* includes a determination unit 210*b*, an updated software delivery unit 220, a module deactivation unit 230, and a transmission unit 240.

In FIG. 80, constituent elements having the same functions as in Embodiment 1 are provided with the same reference signs as in FIG. 1, and a detailed description thereof is omitted. The following provides a detailed description of the characteristic constituent elements and processing in Embodiment 2.

(2) Structure of Update Module Group 130*b*

Figure 26:
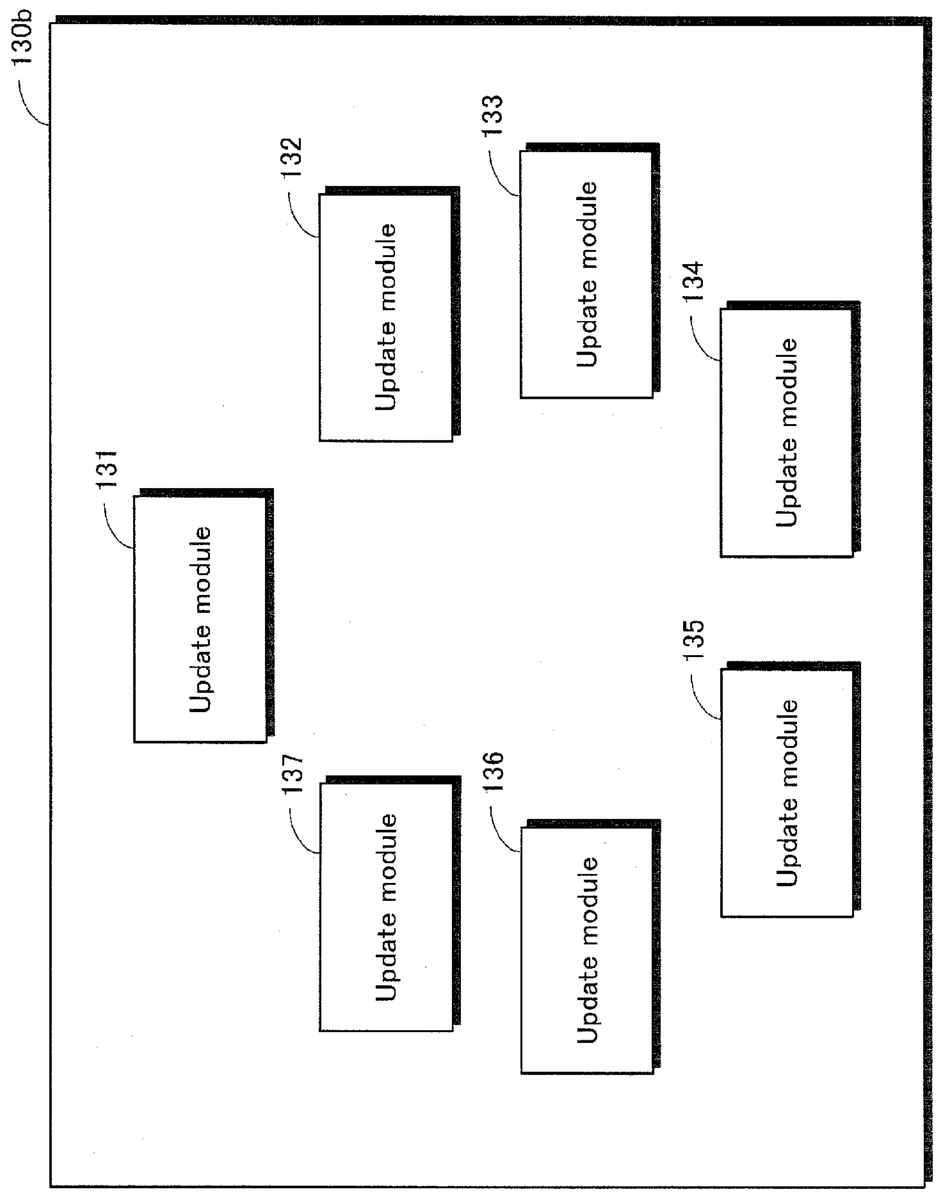
FIG. 26 illustrates a structure of an update module group 130*b* according to Embodiment 2.

FIG. 26 shows the structure of the update module group 130*b* in Embodiment 2.

As shown in FIG. 26, the update module group 130*b* in Embodiment 2 includes seven update modules, update modules 131, 132, 133, 134, 135, 136, and 137. The structure of each update module is the same as in Embodiment 1 (see FIG. 2).

(3) Structure of Determination Unit 210*b*

Figure 27:
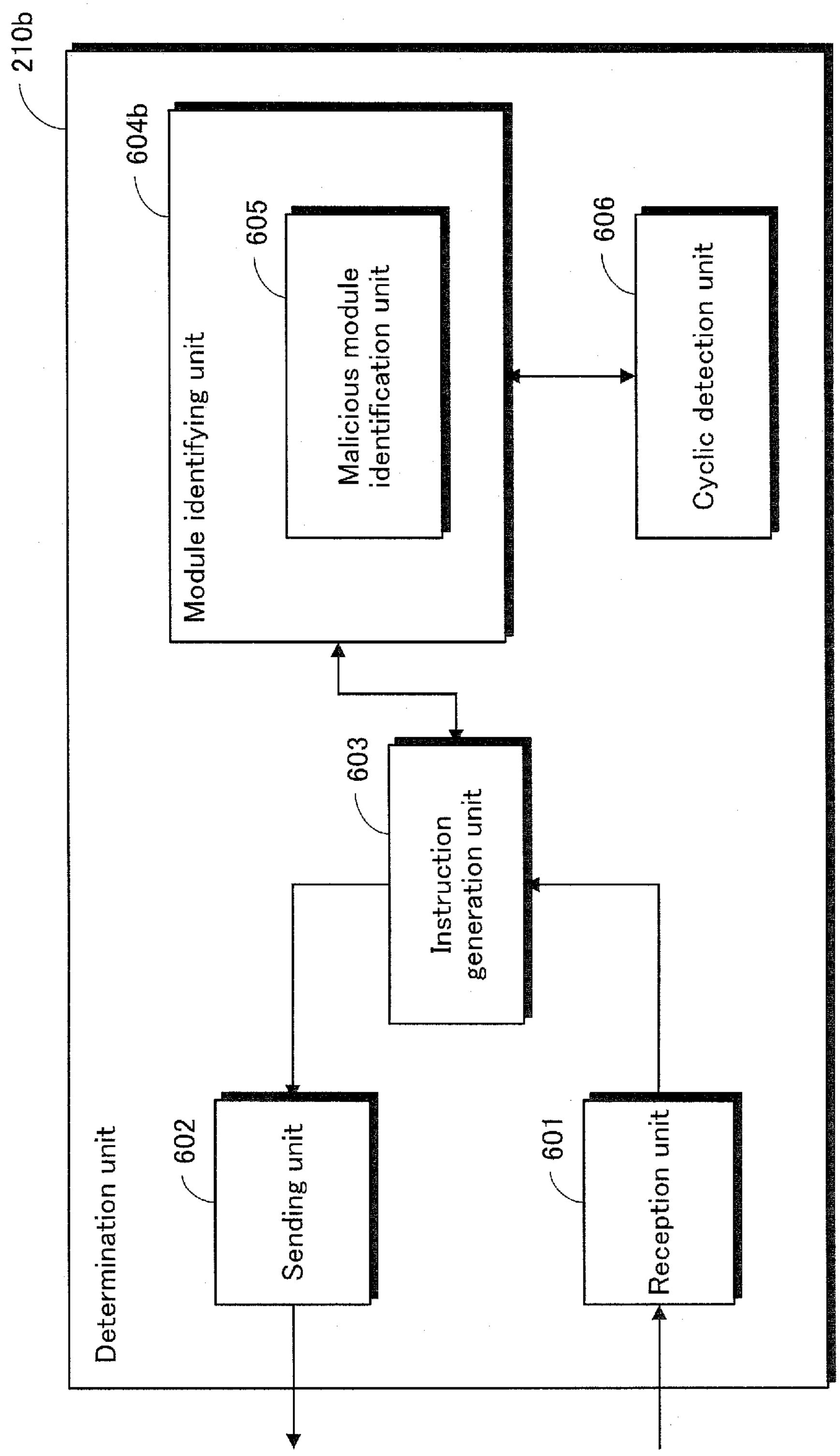
FIG. 27 is a block diagram of a determination unit 210*b* according to Embodiment 2.

FIG. 27 is a functional block diagram showing the functional structure of the determination unit 210*b* according to Embodiment 2.

As shown in FIG. 27, the determination unit 210*b* includes a reception unit 601, a sending unit 602, an instruction generation unit 603, a module identifying unit 604*b*, and a cyclic detection unit 606. A malicious module identification unit 605 is provided in the module identifying unit 604.

The differences with the determination unit 210 in Embodiment 1 are that the malicious module identification unit 605 and the cyclic detection unit 606 are provided in the module identifying unit 604.

(a) Structure of Malicious Module Identification Unit 605

The following describes the malicious module identification unit 605, which is a characteristic constituent element of Embodiment 2, in detail.

Figure 28:
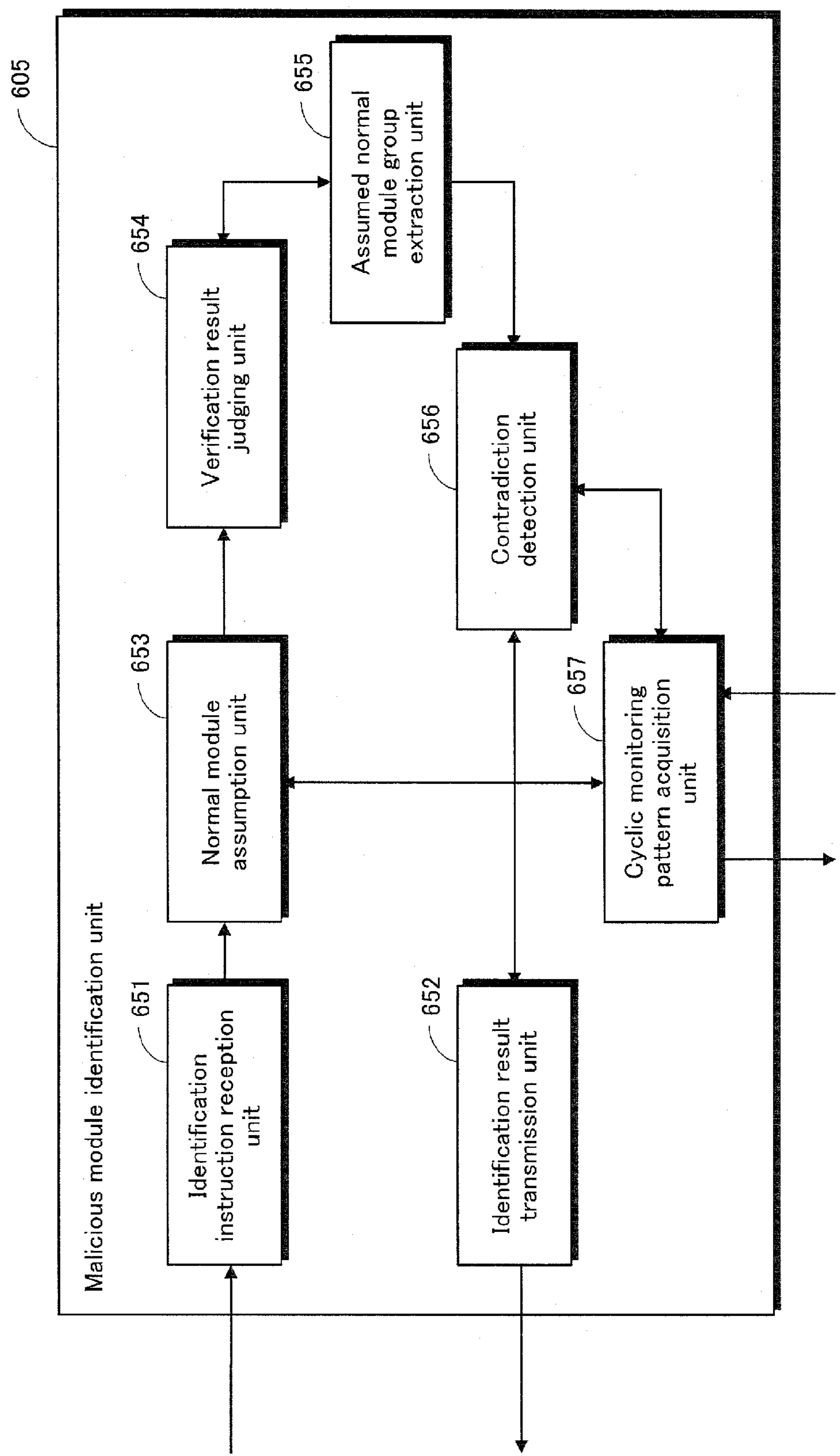
FIG. 28 is a block diagram of a malicious module identification unit 605 according to Embodiment 2.

FIG. 28 is a functional block diagram showing the functional structure of the malicious module identification unit 605. As shown in FIG. 28, the malicious module identification unit 605 includes an identification instruction reception unit 651, an identification result transmission unit 652, a normal module assumption unit 653, a detection result judging unit 654, an assumed normal module group selection unit 655, a contradiction detection unit 656, and a cyclic monitoring pattern acquisition unit 657.

Upon receiving, from the instruction generation unit 603, an instruction to identify a malicious update module and inter-monitoring results (tampering detection results) for the update module group 130*b*, the identification instruction reception unit 651 outputs the instruction to the normal module assumption unit 653.

Upon receiving an identification result for a malicious update module from the contradiction detection unit 656, the identification result transmission unit 652 outputs the identification result to the instruction generation unit 603.

Upon receiving the instruction from the identification instruction reception unit 651, the normal module assumption unit 653 selects an update module in the update module group 130 and assumes that the selected update module is a normal update module. The selected update module is set as the assumed normal module group.

The assumed normal module group is a conceptual group formed by update modules that are assumed by the normal module assumption unit 653 to be normal modules. Specifically, the normal module assumption unit 653 generates structural information on the assumed normal update module group, the structural information including identifiers for all of the update modules assumed to be normal.

The normal module assumption unit 653 transmits an identifier for the selected update module to the contradiction detection unit 656. The normal module assumption unit 653 also transmits the structural information on the assumed normal update module group to the detection result judging unit 654.

The normal module assumption unit 653 transmits an instruction to acquire the cyclic monitoring pattern to the cyclic monitoring pattern acquisition unit 657. Upon receiving the identification result from the cyclic monitoring pattern acquisition unit 657, the normal module assumption unit 653 assumes that an update module other than the update modules in the cyclic monitoring pattern is a normal update module. Note that details on the cyclic monitoring pattern are described below.

Upon receiving notification from the contradiction detection unit 656 that there is no contradiction, the normal module assumption unit 653 assumes that an update module other than the selected update module is a normal update module, adding the update module to the assumed normal module group. The normal module assumption unit 653 also updates the structural information on the assumed normal update module group and transmits the updated structural information on the assumed normal update module group to the detection result judging unit 654.

Upon receiving the structural information on the assumed normal update module group from the normal module assumption unit 653, the detection result judging unit 654 judges the tampering detection results for another update module other than the update modules in the assumed normal update module group.

When the tampering detection result for the other update module other than the update modules in the assumed normal update module group is normal, the detection result judging unit 654 considers the verified update module to be a normal module. In other words, a normal update module that is judged to be "normal" is considered to be a normal update module.

The detection result judging unit 654 transmits the identifier for the update module considered to be normal and the structural information on the assumed normal update module group received from the normal module assumption unit 653 to the assumed normal module group selection unit 655.

When no update module has been considered to be normal, the detection result judging unit 654 notifies the assumed normal module group selection unit 655 accordingly.

The detection result judging unit 654 performs similar processing when receiving the structural information on the assumed normal update module group from the assumed normal module group selection unit 655.

The assumed normal module group selection unit 655 receives the identifier for an update module that can be considered to be normal and the structural information on the assumed normal update module group. The assumed normal module group selection unit 655 adds the received identifier to the received structural information on the assumed normal update module group, thus updating the structural information. The assumed normal module group selection unit 655 also transmits the updated structural information on the assumed normal update module group to the detection result judging unit 654.

Upon receiving notification from the detection result judging unit 654 that no update module has been considered normal, the assumed normal module group selection unit 655 transmits the structural information on the assumed normal update module group to the contradiction detection unit 656.

Upon receiving the structural information on the assumed normal update module group from the assumed normal module group selection unit 655, the contradiction detection unit 656 performs processing for contradiction detection. Details are described below.

When a contradiction is detected, the update module assumed to be normal by the normal module assumption unit 653 is identified as a malicious update module. In this case, the contradiction detection unit 656 notifies the identification result transmission unit 652 of identification of the malicious update module. When no contradiction is detected, the contradiction detection unit 656 notifies the normal module assumption unit 653 accordingly.

Upon receiving the cyclic monitoring pattern from the cyclic monitoring pattern acquisition unit 657, the contradiction detection unit 656 determines whether an update module determined to be malicious exists based on the results of tampering detection by the update modules in the cyclic monitoring pattern for another update module in the cyclic monitoring pattern. When a malicious update module exists, all of the update modules included in the cyclic monitoring pattern are identified as malicious modules.

Furthermore, the contradiction detection unit 656 verifies whether there is a contradiction in the detection results of tampering detection by the update modules in the cyclic monitoring pattern for the same update module outside of the cyclic monitoring pattern. When a contradiction exists, all of the update modules included in the cyclic monitoring pattern are identified as malicious modules.

When all of the update modules included in the cyclic monitoring pattern are identified as malicious modules, the contradiction detection unit 656 notifies the identification result transmission unit 652 and the normal module assumption unit 653 accordingly.

Upon receiving the acquisition instruction from the normal module assumption unit 653, the cyclic monitoring pattern acquisition unit 657 transmits an instruction to acquire the cyclic monitoring pattern to the cyclic detection unit 606. Upon receiving the cyclic monitoring pattern from the cyclic detection unit 606, the cyclic monitoring pattern acquisition unit 657 transmits the cyclic monitoring pattern to the contradiction detection unit 656.

(b) Structure of Cyclic Detection Unit 606

The following describes the cyclic detection unit 606, which is a characteristic constituent element of Embodiment 2, in detail.

Figure 29:
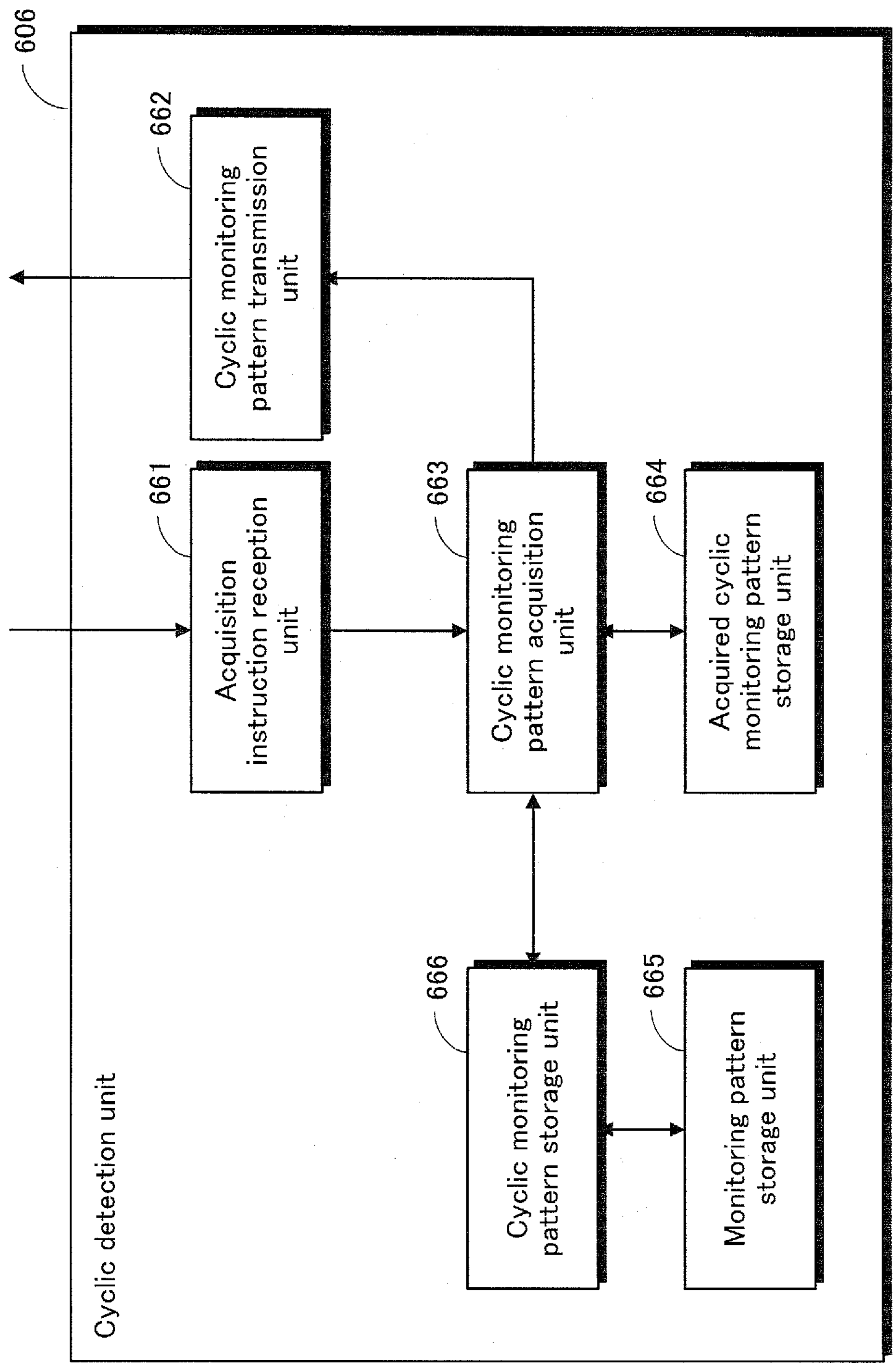
FIG. 29 is a block diagram of a cyclic detection unit 606 according to Embodiment 2.

FIG. 29 is a functional block diagram showing the functional structure of the cyclic detection unit 606. As shown in FIG. 29, the cyclic detection unit 606 includes an acquisition instruction reception unit 661, a cyclic monitoring pattern transmission unit 662, a cyclic monitoring pattern acquisition unit 663, an acquired cyclic monitoring pattern storage unit 664, a monitoring pattern storage unit 665, and a cyclic monitoring pattern storage unit 666.

Upon receiving the instruction to acquire the cyclic monitoring pattern from the malicious module identification unit 605, the acquisition instruction reception unit 661 transmits the instruction to the cyclic monitoring pattern acquisition unit 663.

After acquiring the cyclic monitoring pattern from the cyclic monitoring pattern acquisition unit 663, the cyclic monitoring pattern transmission unit 662 transmits the acquired cyclic monitoring pattern to the malicious module identification unit 605.

The cyclic monitoring pattern acquisition unit 663 reads the cyclic monitoring pattern from the cyclic monitoring pattern storage unit 666 and determines whether the results of tampering detection performed in a unidirectional cycle by the group of update modules included in the read cyclic monitoring pattern are all normal. When all the results are normal, the cyclic monitoring pattern acquisition unit 663 transmits the cyclic monitoring pattern read from the cyclic monitoring pattern storage unit 666 to the cyclic monitoring pattern transmission unit 662. The cyclic monitoring pattern acquisition unit 663 also transmits the cyclic monitoring pattern to the acquired cyclic monitoring pattern storage unit 664.

The acquired cyclic monitoring pattern storage unit 664 stores the cyclic monitoring pattern acquired from the cyclic monitoring pattern acquisition unit 663.

The monitoring pattern storage unit 665 stores a monitoring pattern between update modules included in the update module group 130*b*. The monitoring pattern lists information on the modules that are the target of monitoring (verification) when the update modules 131-137 included in the update module group 130*b* perform tampering detection on each other. Specifically, the monitoring pattern lists a module identifier, a location in memory, a size, an address, a file name, etc. for each module.

Figure 30:
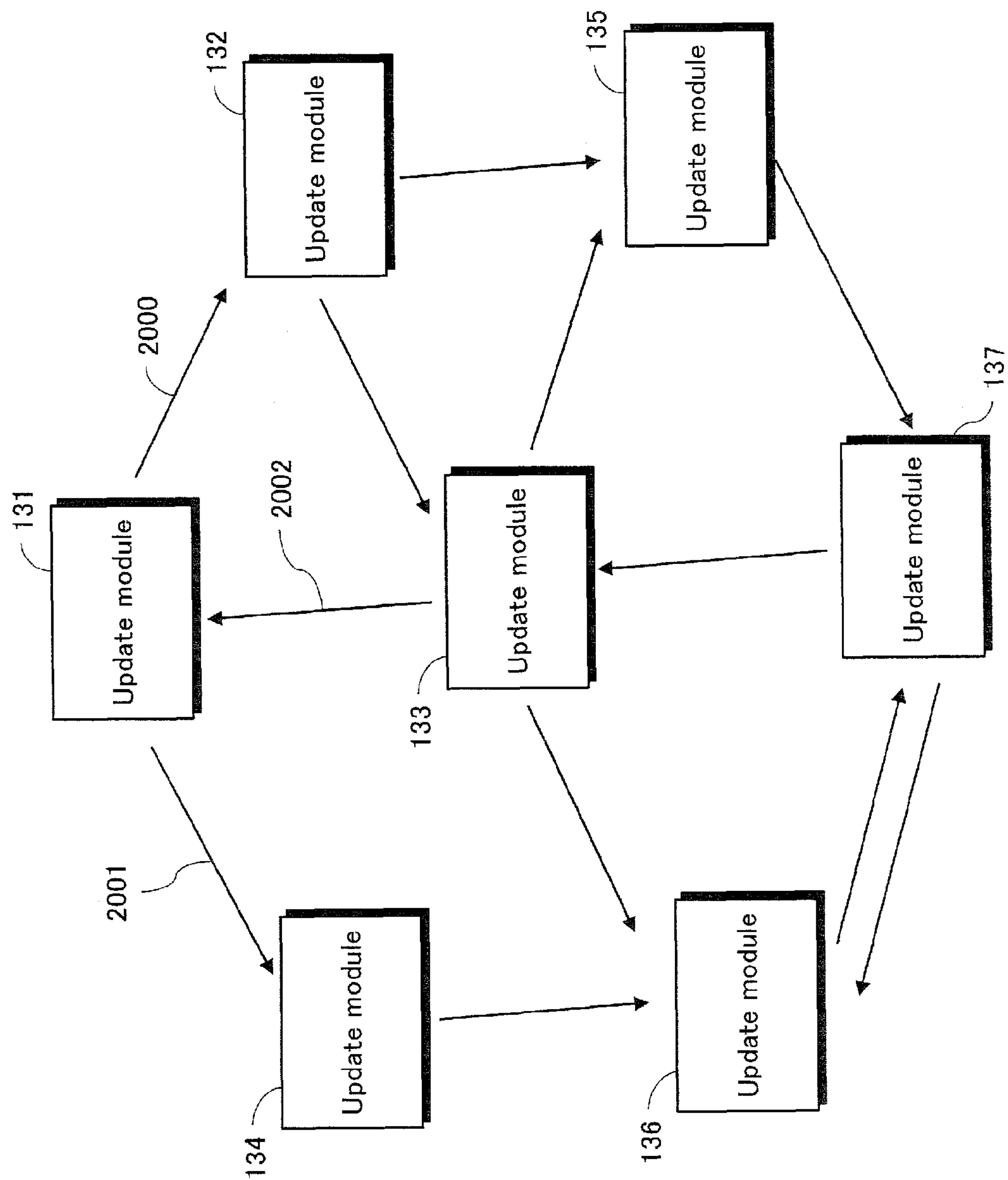
FIG. 30 illustrates a monitoring pattern according to Embodiment 2.

The example shown in FIG. 30 is now described. To simplify description of the monitoring pattern, the monitoring pattern in FIG. 30 is represented as a digraph. The arrows point from the monitoring (verifying) update module to the monitored (verified) update module.

For example, the arrow 2000 points from the update module 131 to the update module 132, indicating that the update module 131 performs tampering detection on the update module 132. The arrow 2001 points from the update module 131 to the update module 134, indicating that the update module 131 also performs tampering detection on the update module 134. The arrow 2003 points from the update module 133 to the update module 131, indicating that the update module 133 performs tampering detection on the update module 131.

The cyclic monitoring pattern storage unit 666 acquires the monitoring pattern stored in the monitoring pattern storage unit 665 and detects, from the entire monitoring pattern, a group of update modules that perform tampering detection in a unidirectional cycle in order to generate a cyclic monitoring pattern. The cyclic monitoring pattern storage unit 666 stores the generated cyclic monitoring pattern.

The cyclic monitoring pattern records, for a plurality of update modules that perform tampering detection in a unidirectional cycle, information regarding the module to be monitored (verified). Specifically, the cyclic monitoring pattern lists a module identifier, a location in memory, a size, an address, a file name, etc. for each module.

The example shown in FIG. 30 is now described.

The group of update modules that perform tampering detection in a unidirectional cycle is, for example, the update module 131, the update module 132, and the update module 133. As shown by the arrows in FIG. 30, the update module 131 verifies the update module 132, the update module 132 verifies the update module 133, and the update module 133 verifies the update module 131.

The cyclic monitoring pattern lists information on these update modules 131, 132, and 133.

Furthermore, in FIG. 30, the update module 131, the update module 132, the update module 135, the update module 137, and the update module 133 perform tampering detection in a unidirectional cycle, as do the update module 133, the update module 136, and the update module 137.

In this way, the cyclic monitoring pattern storage unit 666 generates a plurality of cyclic monitoring patterns from the monitoring pattern in FIG. 30.

(c) Contradiction in Inter-Monitoring Results (Tampering Detection Results)

The following describes contradiction in the tampering detection results.

When the update module group **130*b* performs mutual tampering detection with the monitoring pattern shown in FIG. 30, the update modules 131-137 transmit respective detection results to the determination unit 210*b* of the update server 200*b***.

Figure 31:
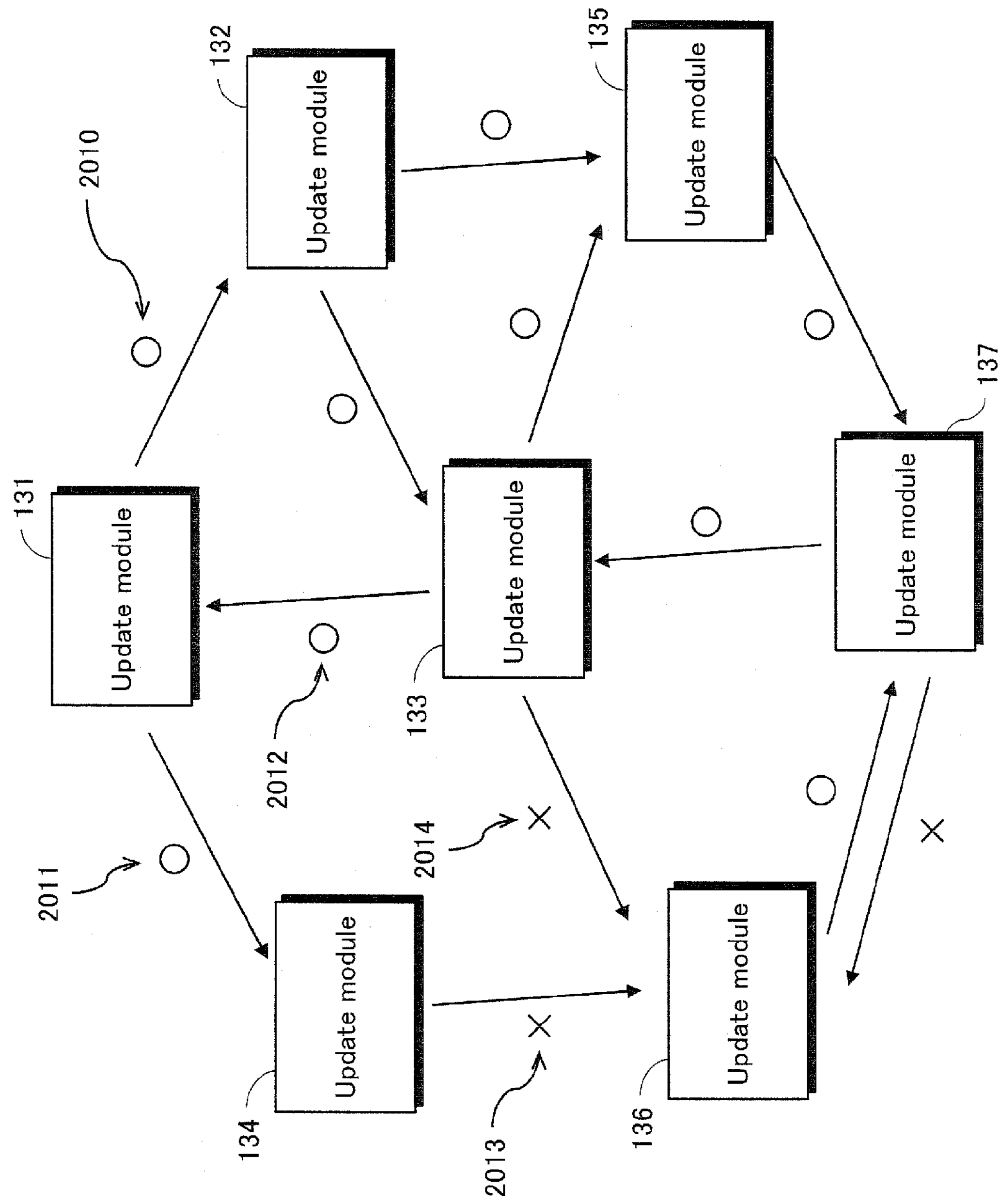
FIG. 31 illustrates inter-monitoring results according to Embodiment 2.

FIG. 31 shows the detection results received by the determination unit **210*b*. In FIG. 31**, the detection result "No tampering" is represented as a circle, "○", next to the corresponding arrow, and the detection result "Tampering" is represented as an "X" next to the corresponding arrow.

For example, the circle ○ 2010 represents a result of "No tampering" for tampering detection performed by the update module 131 on the update module 132.

Similarly, the circle ○ 2011 represents a result of "No tampering" for tampering detection performed by the update module 131 on the update module 134.

The circle ○ 2012 represents a result of "No tampering" for tampering detection performed by the update module 133 on the update module 131.

The X 2013 represents a result of "Tampering" for tampering detection performed by the update module 134 on the update module 136.

Similarly, the X 2014 represents a result of "Tampering" for tampering detection performed by the update module 133 on the update module 136.

Note that in FIG. 31, all of the detection results corresponding to the arrows are listed. This indicates that the determination unit **210*b*** has completely received all of the tampering detection results.

Figure 32:
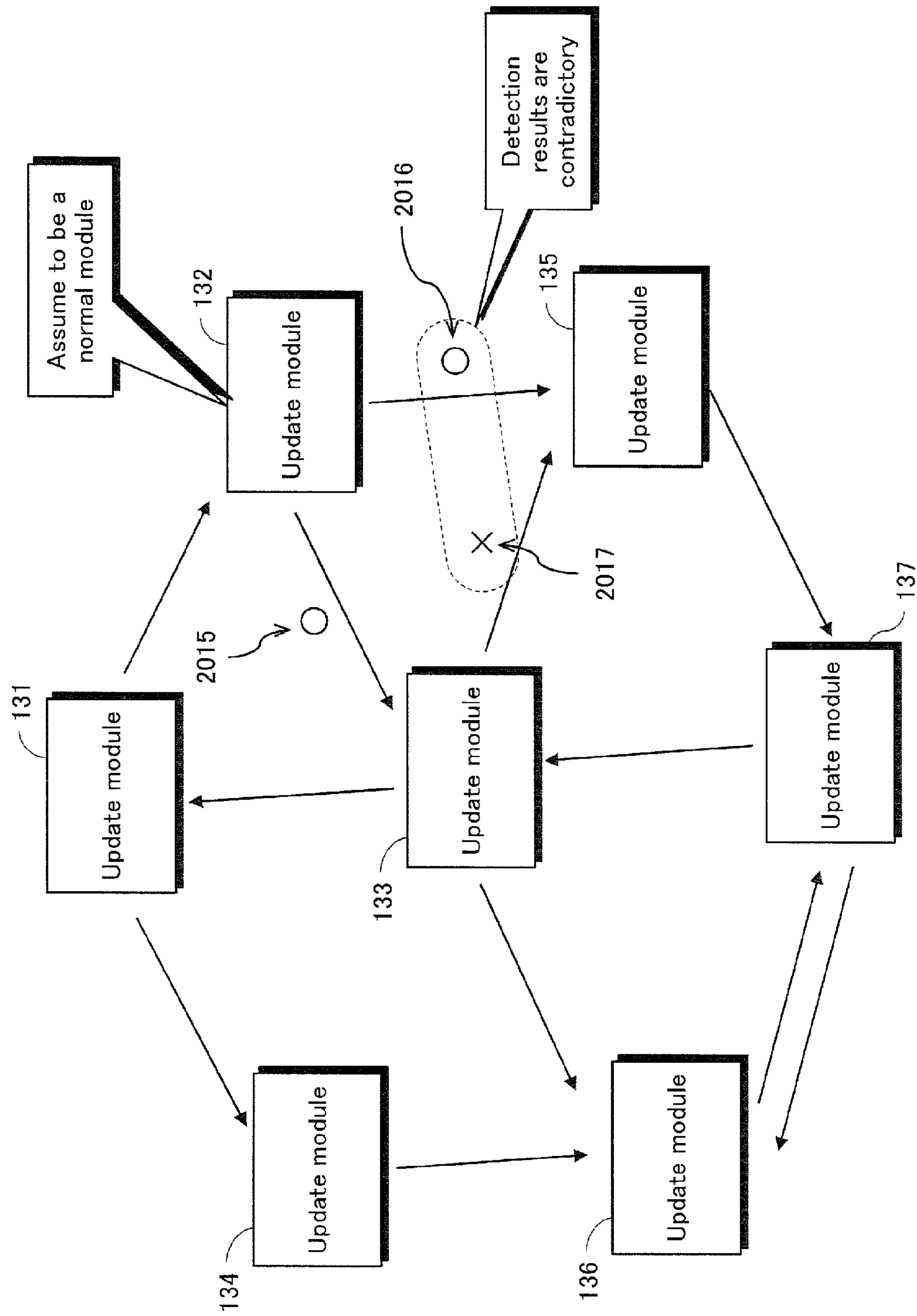
FIG. 32 illustrates contradiction in the inter-monitoring results according to Embodiment 2.

Next, a contradiction is described with reference to FIG. 32. First, the update module 132 is assumed to be a normal update module. The update module 132 determines a result of "No tampering" for the update modules 133 and 135, as indicated by the circles a 2015 and 2016. The update modules 133 and 135 in which "No tampering" is detected by the normal update module 132 are both assumed to be normal modules.

However, as indicated by the X 2017, the update module 133, which has been assumed to be a normal module, detects "Tampering" in the update module 135. Therefore, the tampering detection result by the update module 132 and the detection result by the update module 133, which are both normal modules, do not match. This sort of situation is referred to as a contradiction in the tampering detection results.

(4) Operations for Malicious Module Identification

Operations by the software updating system **10*b* for identification of a malicious update module are described with reference to FIGS. 33 and 34**.

(a) Identification with a Regular Monitoring Pattern

FIG. 33 is a flowchart showing operations for malicious module identification.

The malicious module identification unit 605 repeats the processing from step S8001 through step S8006 for all of the update modules (S8000).

Figure 34:
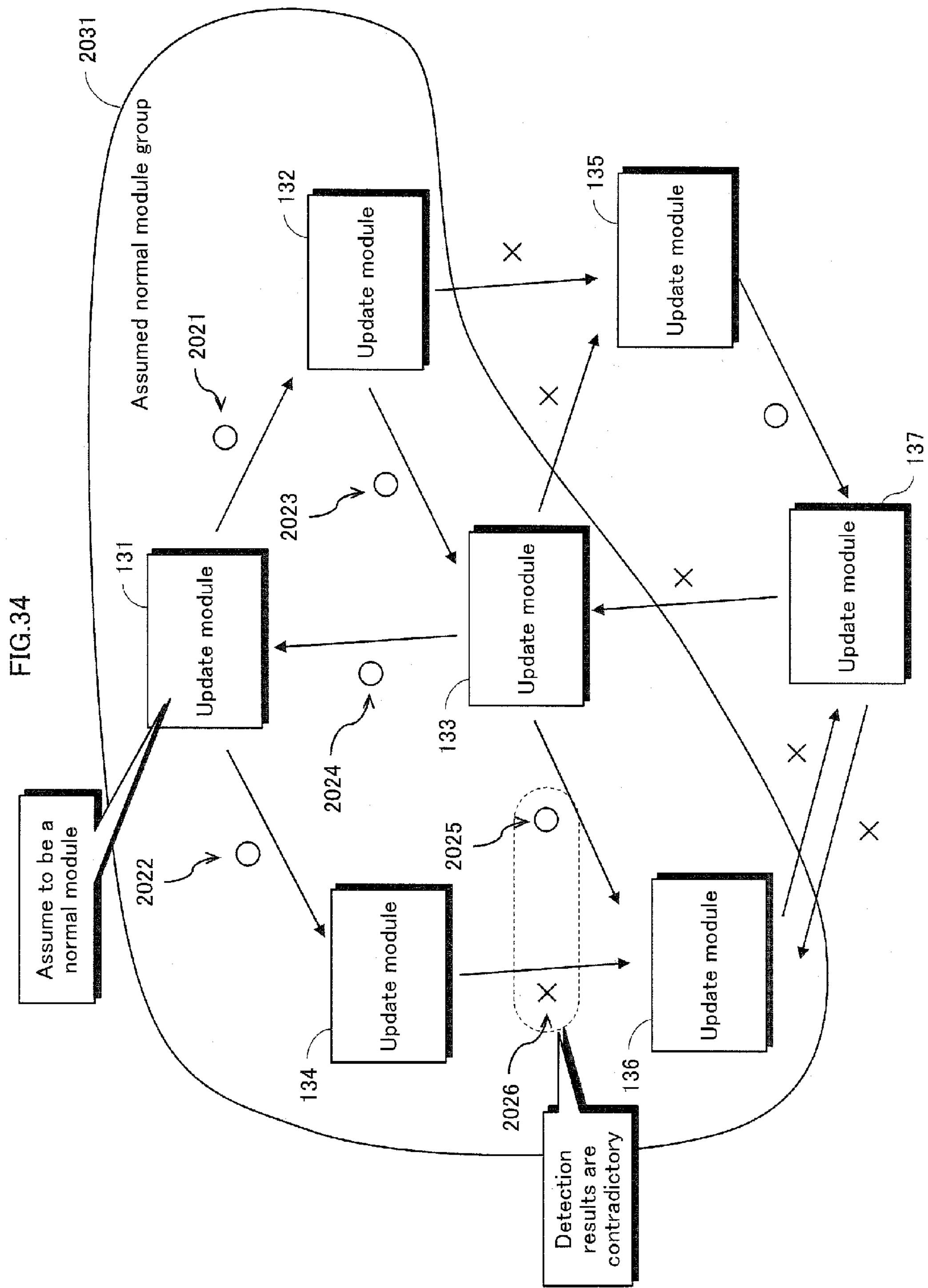
FIG. 34 illustrates malicious module identification according to Embodiment 2.

In the following description, the tampering detection results shown in FIG. 34 are used as an example to describe operations for identifying the update module 131 as a malicious module.

First, the normal module assumption unit 653 assumes that the update module 131 is a normal update module and generates the assumed normal module group to include only the update module 131 (S8001).

Next, the detection result judging unit 654 judges whether an update module in which "No tampering (normal)" is detected exists among the tampering detection results by the update module 131 included in the assumed normal module group (S8002).

As shown by the circles a 2021 and 2022 in FIG. 34, the update module 132 and the update module 134 are determined to be normal.

When an update module determined to be normal exists (S8002: Y), the detection result judging unit 654 transmits the identifiers for the update modules 132 and 134, which have been determined to be normal, to the assumed normal module group selection unit 655.

The assumed normal module group selection unit 655 adds the received identifiers to the assumed normal module group. In this way, the update modules 132 and 134, which have been determined to be normal, are added to the assumed normal module group (S8003).

Similarly, the detection result judging unit 654 judges whether an update module determined to be normal exists among the tampering detection results by the update modules 132 and 134 included in the assumed normal module group (S8002). As indicated by the circle a 2023, the update module 133 has been determined to be normal, and therefore the update module 133 is added to the assumed normal module group (S8003).

Similarly, the detection result judging unit 654 judges whether an update module determined to be normal exists among the tampering detection results by the update module 133 included in the assumed normal module group (S8002). As indicated by the circles a 2024 and 2025, the update modules 131 and 136 have been determined to be normal, and therefore the update module 136 is added to the assumed normal module group (S8003).

When an update module determined to be normal by the update modules included in the assumed normal module group no longer exists (S8002: N), the contradiction detection unit 656 determines whether there is a contradiction in the detection results of the update modules included in the assumed normal module group (S8004).

At this point, the assumed normal module group 2031 shown in FIG. 34 has been formed. Looking at the detection results for the update modules included in the assumed normal module group 2031, the detection result by the update module 133 for the update module 136 is a circle a 2025, whereas the detection result by the update module 134 for the update module 136 is an X 2026. The detection results are therefore contradictory.

When there is a contradiction in the assumed normal module group (S8004: Y), the assumption in step S8001 that the update module 131 is normal is mistaken. In other words, the update module 131 is identified as a malicious update module (S8005).

When there is no contradiction in the assumed normal module group (S8004: N), the update module 131 assumed in step S8001 to be normal is not identified (S8006).

Next, processing returns to step S8000, another update module is assumed to be normal, and processing from step S8001 to step S8006 is repeated.

The processing from step S8001 to step S8006 is repeated for all of the update modules in the update module group 130*b* (S8007).

In this way, the malicious module identification in Embodiment 2 focuses on one update module as the target of determination, assumes that the update module is a normal module, and verifies whether the assumption leads to a contradiction in tampering detection results by the update modules. When a contradiction occurs, the update module that is the target of determination is identified as an abnormal module.

In this way, the determination unit 210*b* effectively uses a logical verification method to identify a malicious update module that provides a false tampering detection result. By transmitting a deactivation instruction for an identified malicious update module, the determination unit 210*b* appropriately removes the malicious update module.

(b) Identification with a Cyclic Monitoring Pattern

A description is now provided for malicious module identification when a cyclic monitoring pattern is included in the monitoring pattern for update modules in the update module group 130*b*.

Figure 35:
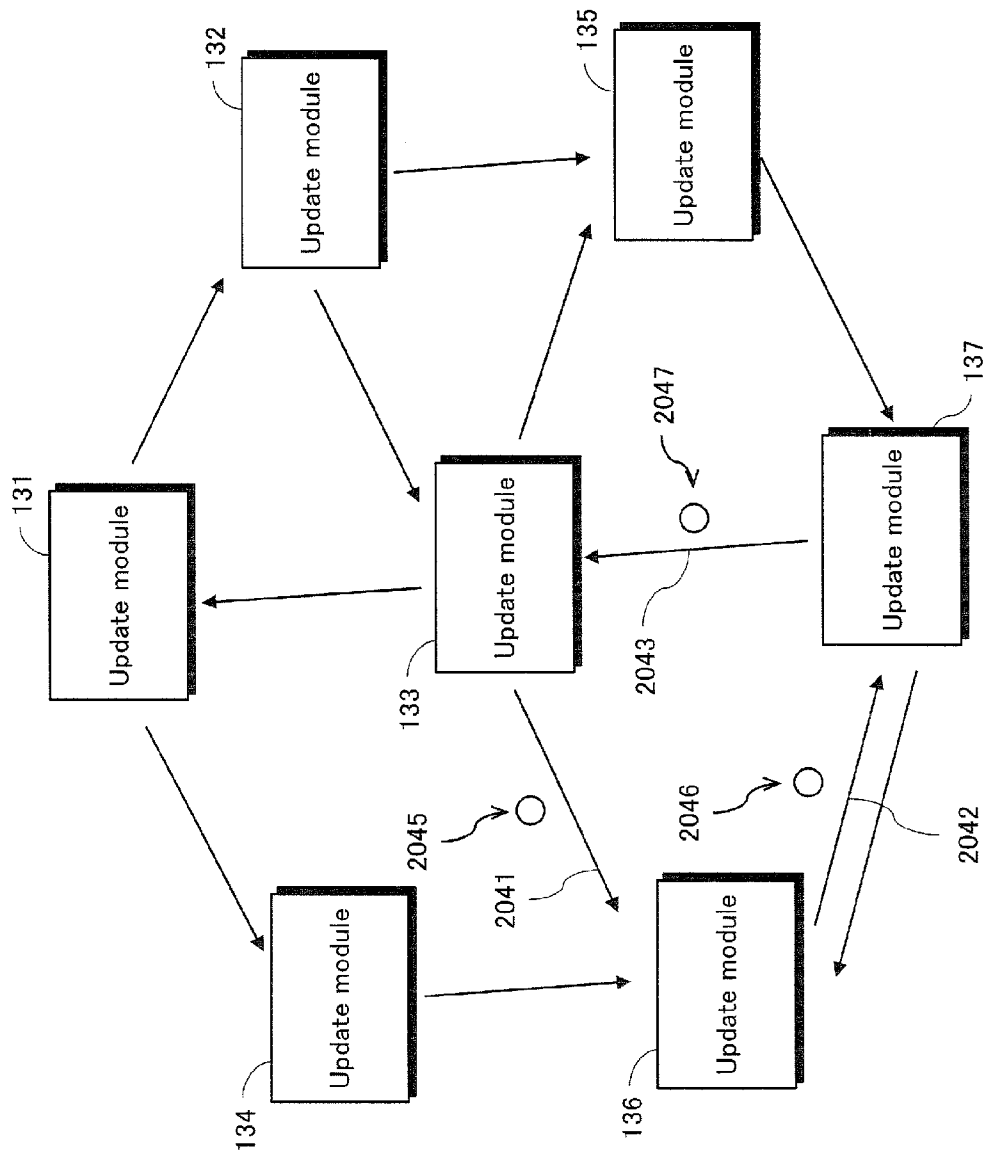
FIG. 35 illustrates a cyclic monitoring pattern according to Embodiment 2.

For example, in FIG. 35, the update module 133, the update module 136, and the update module 137 perform tampering detection in a unidirectional cycle, as indicated by the arrows 2041, 2042, and 2043. As indicated by the circles a 2045, 2046, and 2047, the tampering detection results are all normal.

In this case, the update module 133, the update module 136, and the update module 137 may be treated as a group during malicious module identification.

For example, when the update module 133 is identified as a malicious update module, the tampering detection result by the update module 137 for the update module 133 (the circle a 2047 in FIG. 35) is erroneous. Since the update module 137 cannot properly perform tampering detection, this means that there is a high probability that the update module 137 is malicious. Furthermore, when the update module 137 is identified as a malicious update module, the tampering detection result by the update module 136 for the update module 137 (the circle a 2046 in FIG. 35) is erroneous. Since the update module 136 also cannot properly perform tampering detection, this means that there is a high probability that the update module 136 is malicious.

In other words, in a cyclic monitoring pattern in which all tampering detection results are normal, if one of the update modules is identified as malicious, all of the update modules in the cyclic monitoring pattern can be considered to be malicious.

Figure 36:
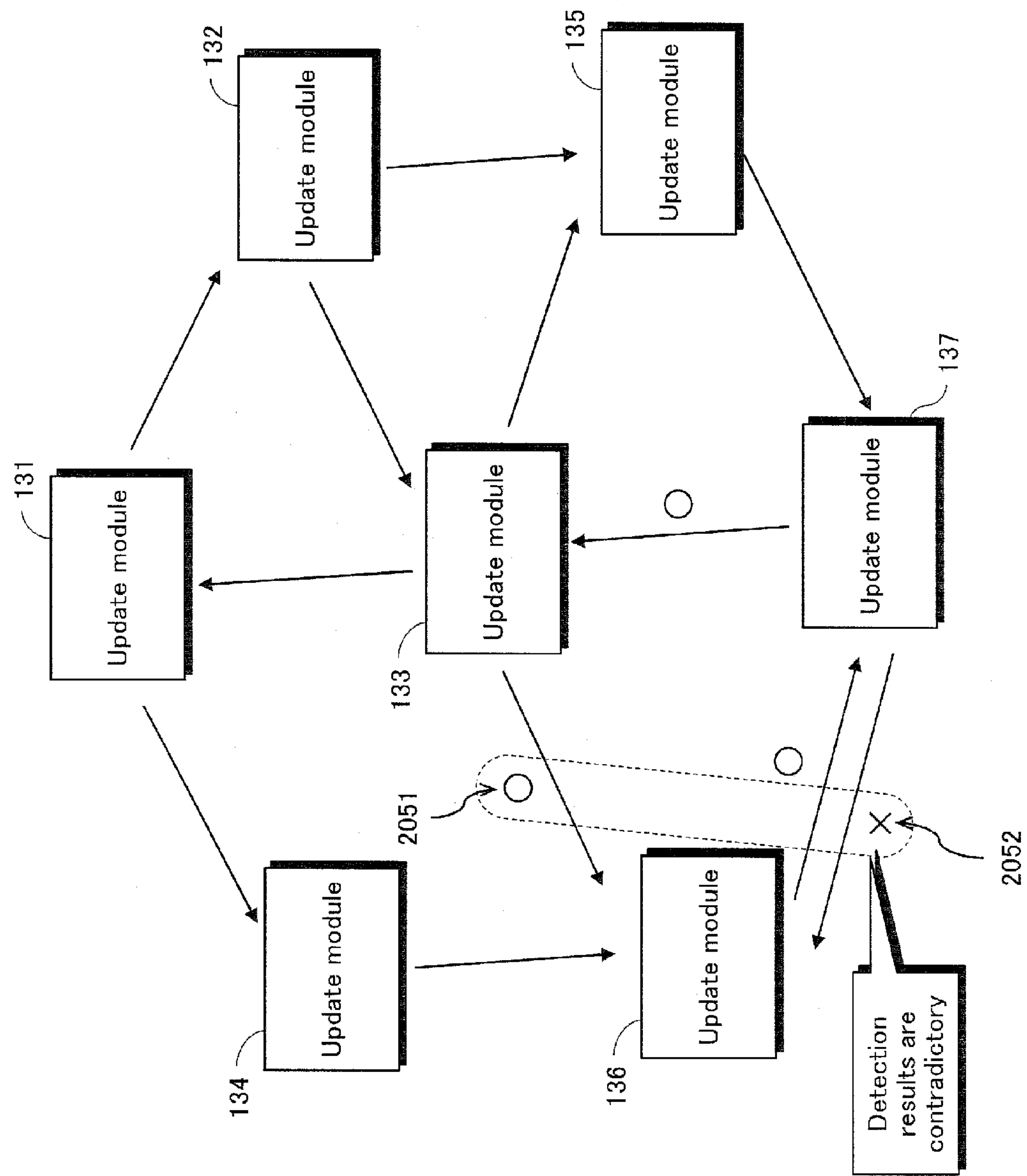
FIG. 36 illustrates contradiction in a cyclic monitoring pattern according to Embodiment 2.
Figure 37:
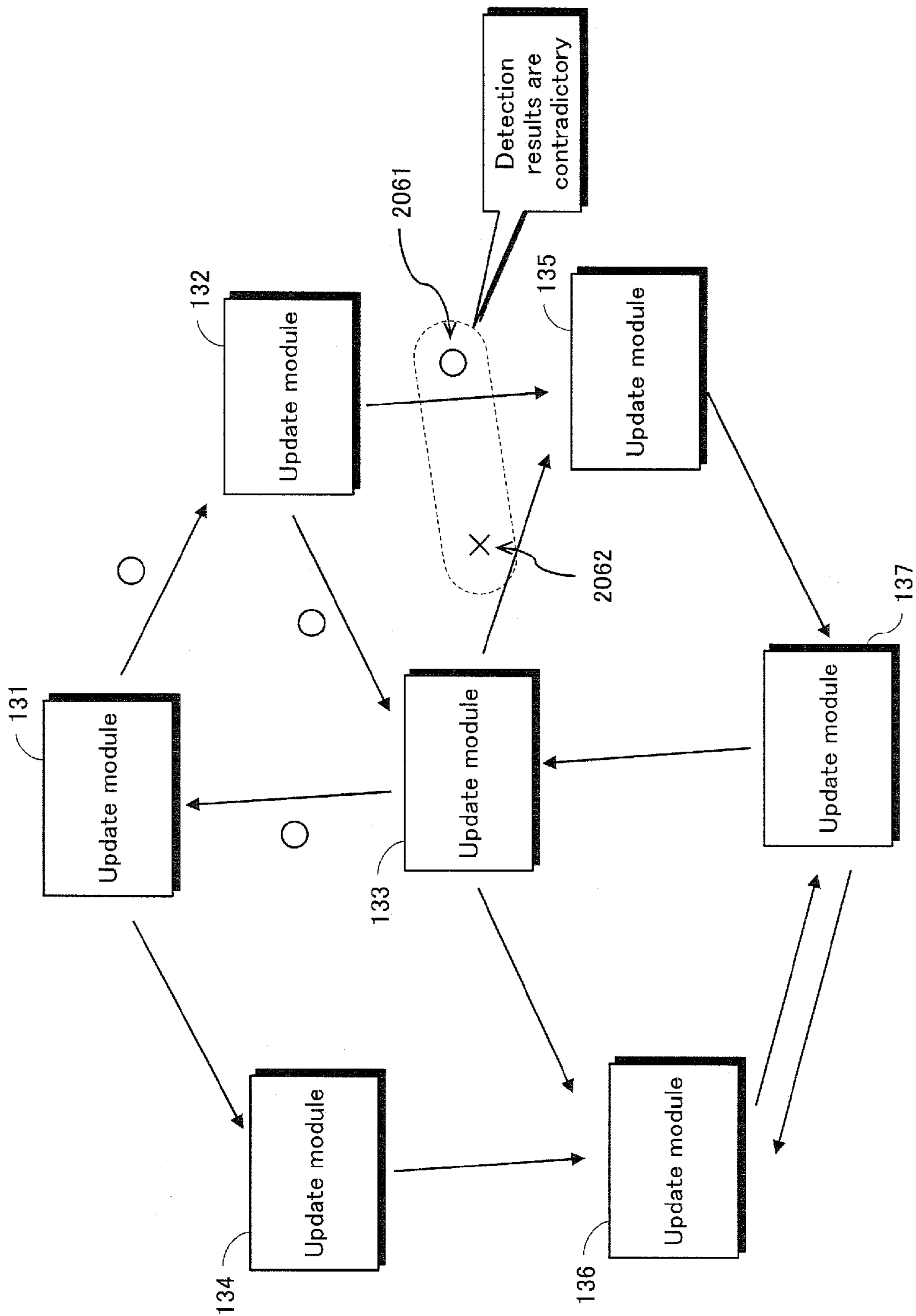
FIG. 37 illustrates contradiction in a cyclic monitoring pattern according to Embodiment 2.

The following is a more specific explanation with reference to FIGS. 36 and 37.

In FIG. 36, all of the tampering detection results in the cyclic monitoring pattern formed by the update modules 133, 136, and 137 are normal. The update modules 133, 136, and 137 can therefore be treated as a group.

In this example, the tampering detection result by the update module 133 for the update module 136 and the tampering detection result by the update module 137 for the update module 136 are contradictory. Accordingly, the entire group of update modules 133, 136, and 137 is identified as malicious update modules.

Furthermore, in the example in FIG. 36, the update module 136 and the update module 137 perform tampering detection on each other. The update module 137 detects “Tampering” in the update module 136, whereas the update module 136 detects “No tampering” in the update module 137. When mutual monitoring results are thus contradictory for a combination of update modules in the cyclic monitoring pattern, the entire group of update modules 133, 136, and 137 is identified as malicious update modules.

In FIG. 37, all of the tampering detection results in the cyclic monitoring pattern formed by the update modules 131, 132, and 133 are normal. The update modules 131, 132, and 133 can therefore be treated as a group.

In this example, the tampering detection result by the update module 132 for the update module 135 (the circle a 2061) and the tampering detection result by the update module 133 for the update module 135 (the X 2062) are contradictory. In the case when tampering detection results are contradictory for an update module outside of the cyclic monitoring pattern as well, the entire group of update modules 131, 132, and 133 is identified as malicious update modules.

By thus treating update modules included in the cyclic monitoring pattern as a group, processing efficiency is dramatically increased as compared to determining whether each update module is malicious.

Figure 38:
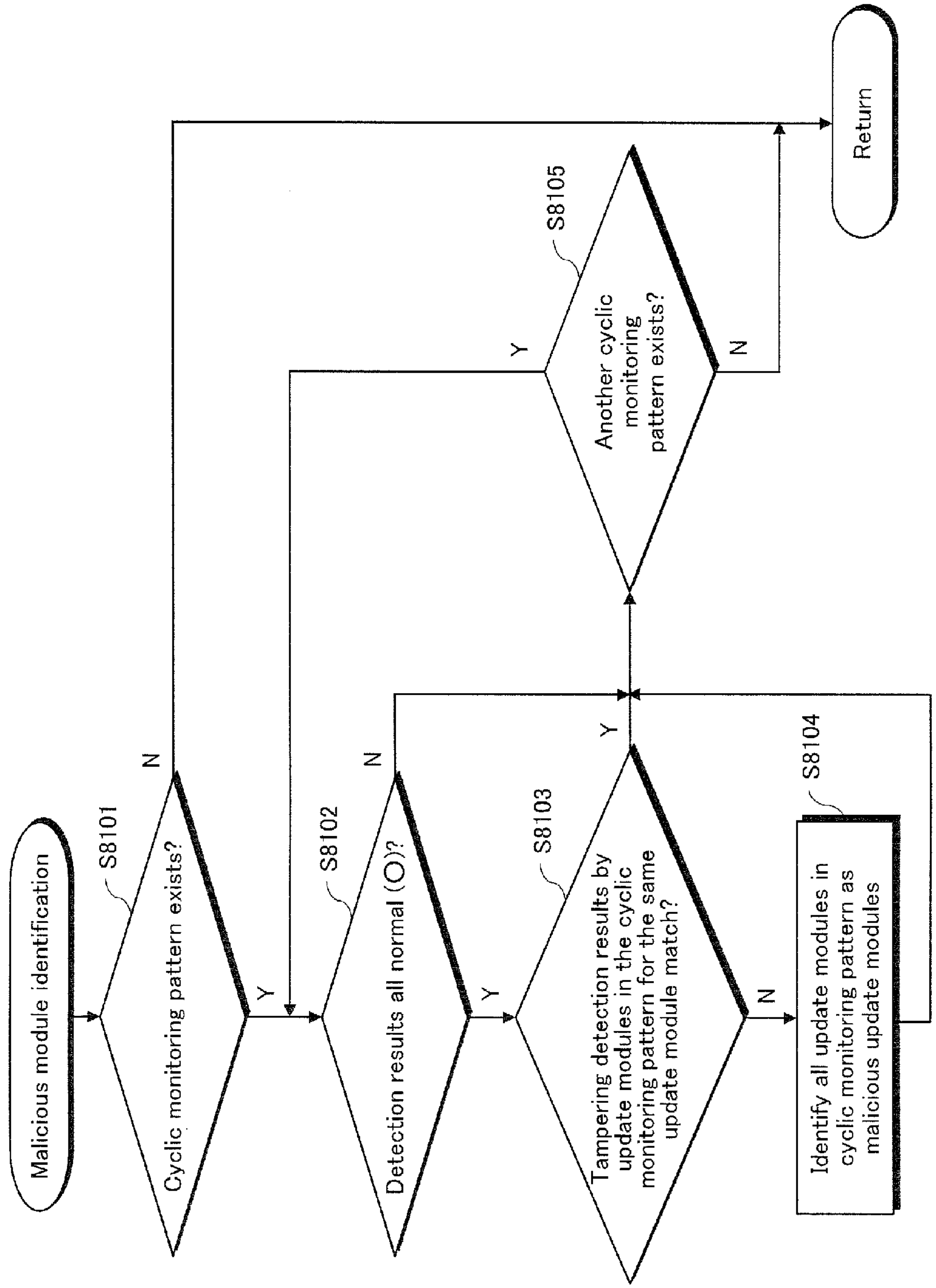
FIG. 38 is a flowchart of malicious module identification that takes into account the cyclic monitoring pattern according to Embodiment 2.

Next, with reference to the flowchart in FIG. 38, operations for malicious module identification that take into account a cyclic monitoring pattern is described.

First, the cyclic monitoring pattern acquisition unit 663 determines whether a cyclic monitoring pattern is included in the monitoring pattern in the update module group 130*b* by referring to the cyclic monitoring pattern storage unit 666 (S8101). When no cyclic monitoring pattern is included (S8101: N), malicious module identification terminates.

When a cyclic monitoring pattern is included (S8101: Y), it is determined whether all of the tampering detection results for the cyclic monitoring pattern are normal (S8102).

When not all of the tampering detection results are normal (S8102: N), the update modules in the cyclic monitoring pattern cannot be treated as a group. Processing proceeds to step S8105.

When all of the tampering detection results for the cyclic monitoring pattern are normal (S8102: Y), it is determined whether the tampering detection results by the update modules in the cyclic monitoring pattern for the same update module match (S8103).

When the detection results do not match (S8103: N), all of the update modules in the cyclic monitoring pattern are identified as malicious update modules (S8104).

When not all of the detection results in the cyclic monitoring pattern are normal (S8102: N), and the tampering detection results by the update modules in the cyclic monitoring pattern for the same update module match (S8103: Y), it is determined whether another cyclic monitoring pattern is included within the monitoring pattern of the update module group 130*b* (S8105).

When another cyclic monitoring pattern is included (S8105: Y), processing returns to step S8102 and continues from there. When no other cyclic monitoring pattern is included (S8105: N), malicious module identification terminates.

(c) Cyclic Monitoring Pattern Selection Method

Next, the cyclic monitoring pattern selection method is described.

As described above, during malicious module identification, when all of the tampering detection results in the cyclic monitoring pattern are normal, all of the update modules included in the cyclic monitoring pattern are treated as a group.

When the number of update modules included in the cyclic monitoring pattern (hereinafter, “cycle size”) is large, it is assumed that the probability of all of the update modules in the cyclic monitoring pattern being tampered with simultaneously is low. Also, as the cycle size increases, the probability of all of the detection results being normal decreases.

Based on these considerations, in Embodiment 2, when there is a plurality of cyclic monitoring patterns, malicious module identification is performed by prioritizing a cyclic monitoring pattern with a small cycle size, thereby effectively discovering and deactivating malicious update modules.

Furthermore, when a plurality of cyclic monitoring patterns with the same cycle size exist, the order of priority for performing malicious module identification is determined based on the number of update modules outside of the cyclic monitoring pattern on which the update modules inside the cyclic monitoring pattern perform tampering detection.

After all of the update modules in the cyclic monitoring pattern are determined to be malicious modules, if an update module outside of the cyclic monitoring pattern determines any of the update modules inside the cyclic monitoring pattern to be normal, this update module outside of the cyclic monitoring pattern is determined to be a malicious update module.

Therefore, when there is a plurality of cyclic monitoring patterns with the same cycle size, malicious module identification is performed prioritizing the cyclic monitoring pattern in which the update modules inside the cyclic monitoring pattern perform tampering detection on a larger number of update modules outside of the cyclic monitoring pattern.

Figure 39:
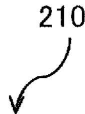
FIG. 39 shows a data structure of a cyclic monitoring pattern list 2100 according to Embodiment 2.

In order to perform such processing, when the cyclic monitoring pattern storage unit 666 detects a plurality of cyclic monitoring patterns in the monitoring pattern storage unit 665, then in addition to the above-described cyclic monitoring pattern, the cyclic monitoring pattern storage unit 666 generates and stores a cyclic monitoring pattern list as shown in FIG. 39 or FIG. 40. The cyclic monitoring pattern list contains information on each of a plurality of cyclic monitoring patterns included in the monitoring pattern.

FIG. 39 shows a data structure of a cyclic monitoring pattern list 2100.

As shown in FIG. 39, the cyclic monitoring pattern list 2100 lists, in association with each cyclic monitoring pattern, the following: the cycle size, the identifiers of the update modules forming the cyclic monitoring pattern, and the number of update modules outside of the cyclic monitoring pattern on which the update modules in the cyclic monitoring pattern perform tampering detection (referred to here as "Input into cycle").

For example, cyclic monitoring pattern No. 1 has a cycle size of three and is formed by the update modules 131, 132, and 133. Furthermore, tampering detection is performed on one update module outside of the cyclic monitoring pattern by the update modules in the cyclic monitoring pattern.

FIG. 40 shows a data structure of a cyclic monitoring pattern list 2200.

Unlike the cyclic monitoring pattern list 2100 in FIG. 39, in the cyclic monitoring pattern list 2200, information on the cyclic monitoring patterns is listed in order from the smallest cycle size. Furthermore, when a plurality of cyclic monitoring patterns have the same cycle size, the cyclic monitoring patterns are listed in order from the largest number of update modules (Input into cycle) outside of the cyclic monitoring pattern verified by update modules in the cyclic monitoring pattern.

The list 2200 in FIG. 40 simplifies the determination of which of a plurality of cyclic monitoring patterns to prioritize and, as compared to the list 2100 in FIG. 39, allows for malicious update modules to be more effectively discovered and deactivated.

Figure 41:
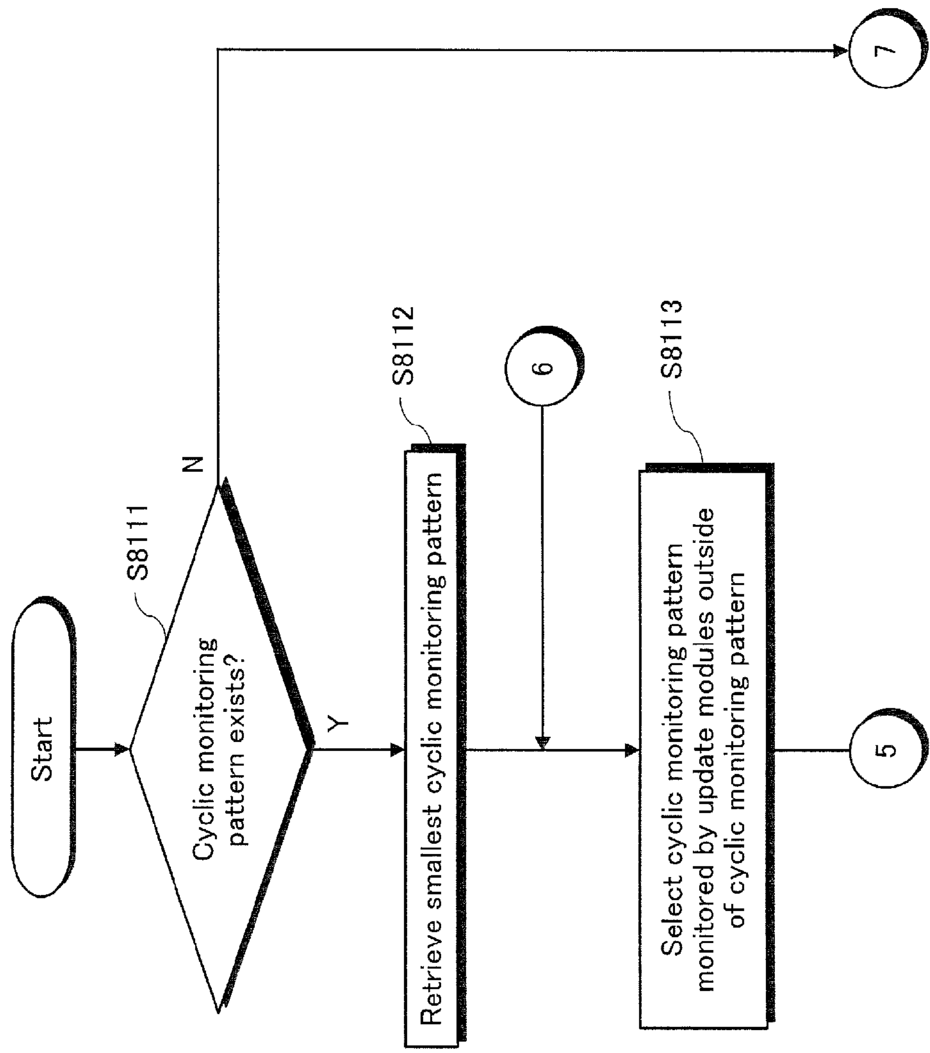
FIG. 41 is a flowchart of malicious module identification that takes into account the cyclic monitoring pattern according to Embodiment 2.

Next, with reference to the flowcharts in FIGS. 41 and 42, operations for malicious module identification that take into account a plurality of cyclic monitoring patterns is described.

First, the cyclic monitoring pattern acquisition unit 663 determines whether a cyclic monitoring pattern is included in the monitoring pattern in the update module group 130*b* by referring to the cyclic monitoring pattern storage unit 666 (S8111). When no cyclic monitoring pattern is included (S8111: N), malicious module identification terminates.

When a cyclic monitoring pattern is included (S8111: Y), the cyclic monitoring pattern acquisition unit 663 retrieves the cyclic monitoring pattern with the smallest cycle size from the cyclic monitoring pattern list stored in the cyclic monitoring pattern storage unit 666 (S8112). Furthermore, when a plurality of cyclic monitoring patterns have the same cycle size, the cyclic monitoring pattern acquisition unit 663 selects the cyclic monitoring pattern with the largest number of update modules outside of the cyclic monitoring pattern verified by update modules in the cyclic monitoring pattern (S8113).

Next, the cyclic monitoring pattern acquisition unit 663 determines whether all of the detection results for the selected cyclic monitoring pattern are normal (S8114).

When not all of the detection results are normal (S8114: N), processing proceeds to step S8118.

When all of the detection results are normal (S8114: Y), the contradiction detection unit 656 checks whether a malicious update module is identified as a result of tampering detection by update modules in the cyclic monitoring pattern on another update module in the cyclic monitoring pattern (S8115).

When an update module has been determined to be malicious (S8115: Y), all of the update modules in the cyclic monitoring pattern are identified as malicious update modules (S8116), and processing proceeds to step S8118.

When no update module is determined to be malicious (S8115: N), the contradiction detection unit 656 determines whether tampering detection results by update modules within the cyclic monitoring pattern for an update module outside of the cyclic monitoring pattern are contradictory (S8117).

When detection results are contradictory (S8117: N), all of the update modules in the cyclic monitoring pattern are identified as malicious update modules (S8116), and processing proceeds to step S8118.

When detection results match (S8117: Y), the cyclic monitoring pattern acquisition unit 663 determines whether there is at least another cyclic monitoring pattern by referring to the cyclic monitoring pattern list stored in the cyclic monitoring pattern storage unit 666 (S8118).

When there is at least another cyclic monitoring pattern (S8118: Y), the cyclic monitoring pattern acquisition unit 663 selects the cyclic monitoring pattern with the smallest cycle size that is equal to or greater than the previously selected cyclic monitoring pattern (S8119). Processing returns to step S8113 and continues from there.

When there is no other cyclic monitoring pattern (S8118: N), malicious module identification terminates.

(5) Shares

The following describes shares stored by update modules and cyclic monitoring patterns.

During the above-described initialization, the protection control module 120 creates shares from the encryption/decryption key using the secret sharing scheme and transmits the generated shares to the update modules.

When using the method described in Patent Literature 2, the same share is transmitted to a plurality of update modules. In this way, even if a certain update module is deactivated, so that the share cannot be acquired from the update module, the share can be acquired from another update module storing the same share, and the encryption/decryption key can be reconstructed.

When an update module in a cyclic monitoring pattern is identified as a malicious module, all of the update modules included in the cyclic monitoring pattern are identified as malicious update modules and are deactivated.

Therefore, in order to prevent a situation in which the encryption/decryption key cannot be reconstructed, the protection control module 120 in Embodiment 2 transmits shares to update modules based on the structure of any existing cyclic monitoring patterns.

Figure 43:
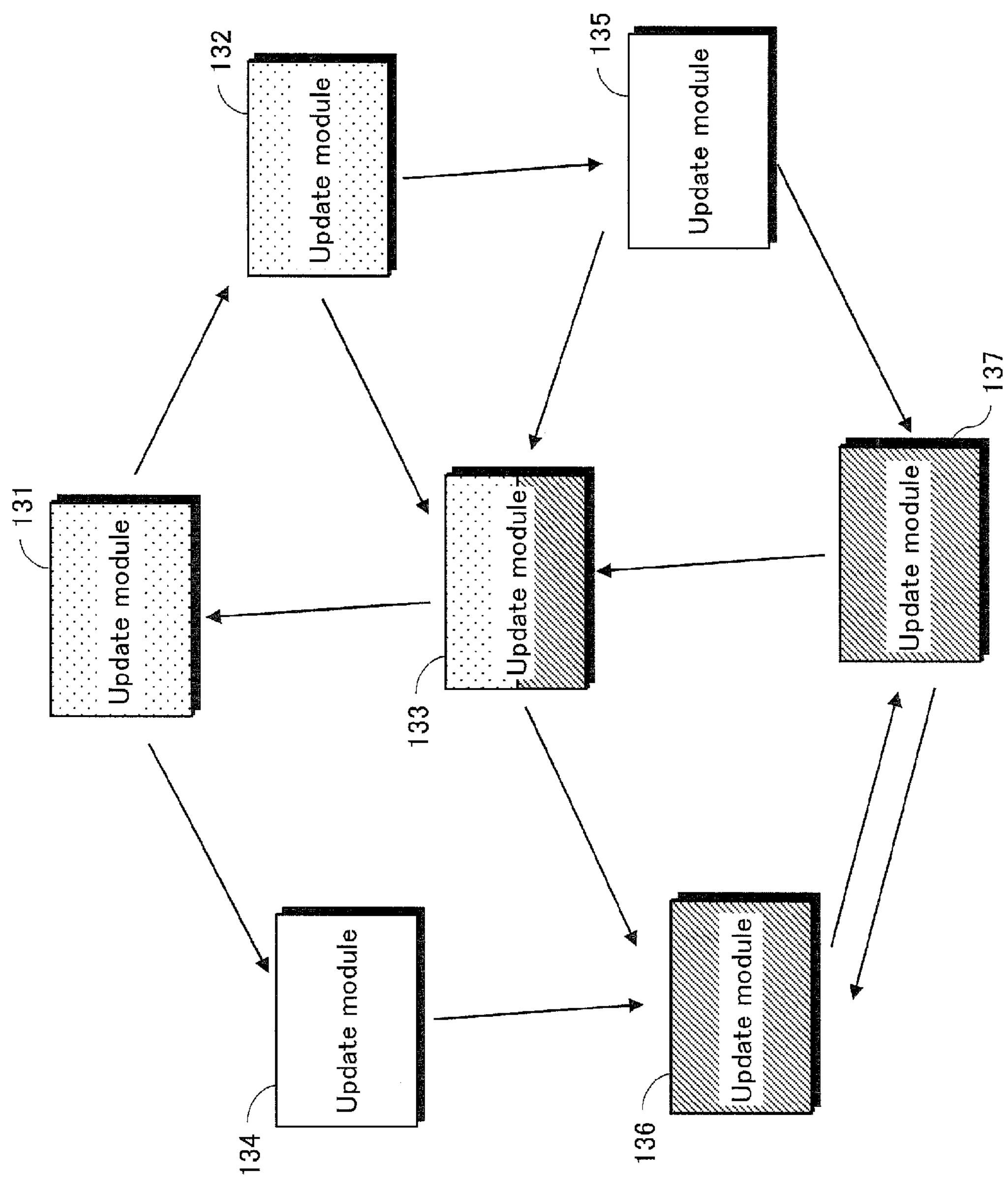
FIG. 43 illustrates a specific example of distributing shares taking into account the cyclic monitoring pattern.
Figure 44:
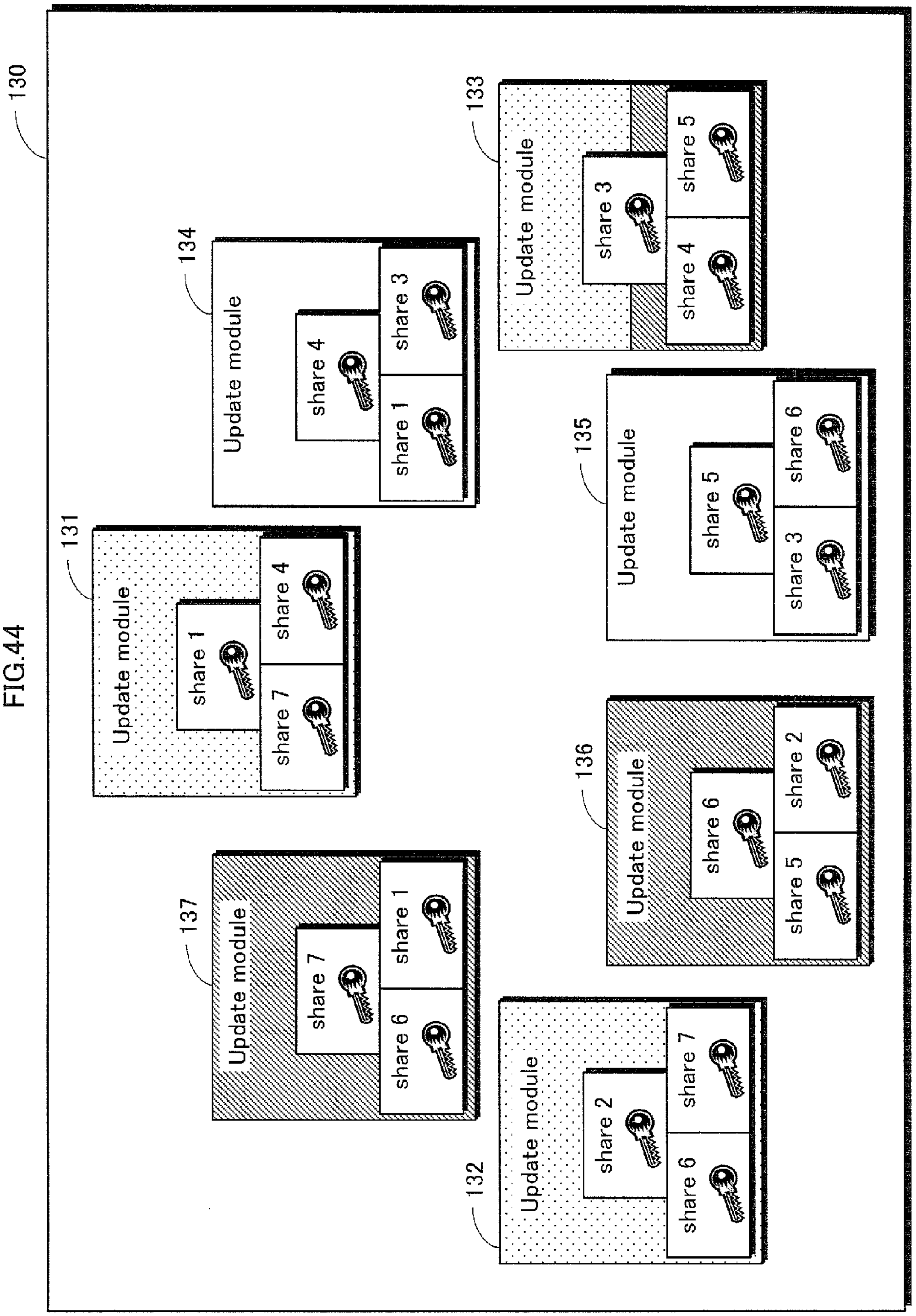
FIG. 44 illustrates a specific example of distributing shares taking into account the cyclic monitoring pattern.

The following is a specific explanation with reference to FIGS. 43 and 44.

FIG. 43 shows an example of a monitoring pattern. In FIG. 43, the update modules 131, 132, and 133 and the update modules 133, 136, and 137 form cyclic monitoring patterns.

At this point, if there is a share stored only by the update modules 131, 132, and 133 in the cyclic monitoring pattern and not stored by other update modules, the protection control module 120 cannot reconstruct the encryption/decryption key if all of the update modules 131, 132, and 133 are deactivated.

Similarly, if there is a share stored only by the update modules 133, 136, and 137 in the cyclic monitoring pattern and not stored by other update modules, the protection control module 120 cannot reconstruct the encryption/decryption key if all of the update modules 133, 136, and 137 are deactivated.

To address this problem, as shown in FIG. 44, shares 1, 2, 3, 4, 5, 6, and 7 are transmitted to the update modules so that no share is stored only by the update modules 131, 132, and 133, and so that no share is stored only the update modules 133, 136, and 137.

In this way, even if the update modules 131, 132, and 133, or the update modules 133, 136, and 137 are all deactivated, the protection control module 120 can reconstruct the encryption/decryption key.

3. Embodiment 3

The following describes another Embodiment.

3.1 Tampering Monitoring System 10*c*

Figure 77:
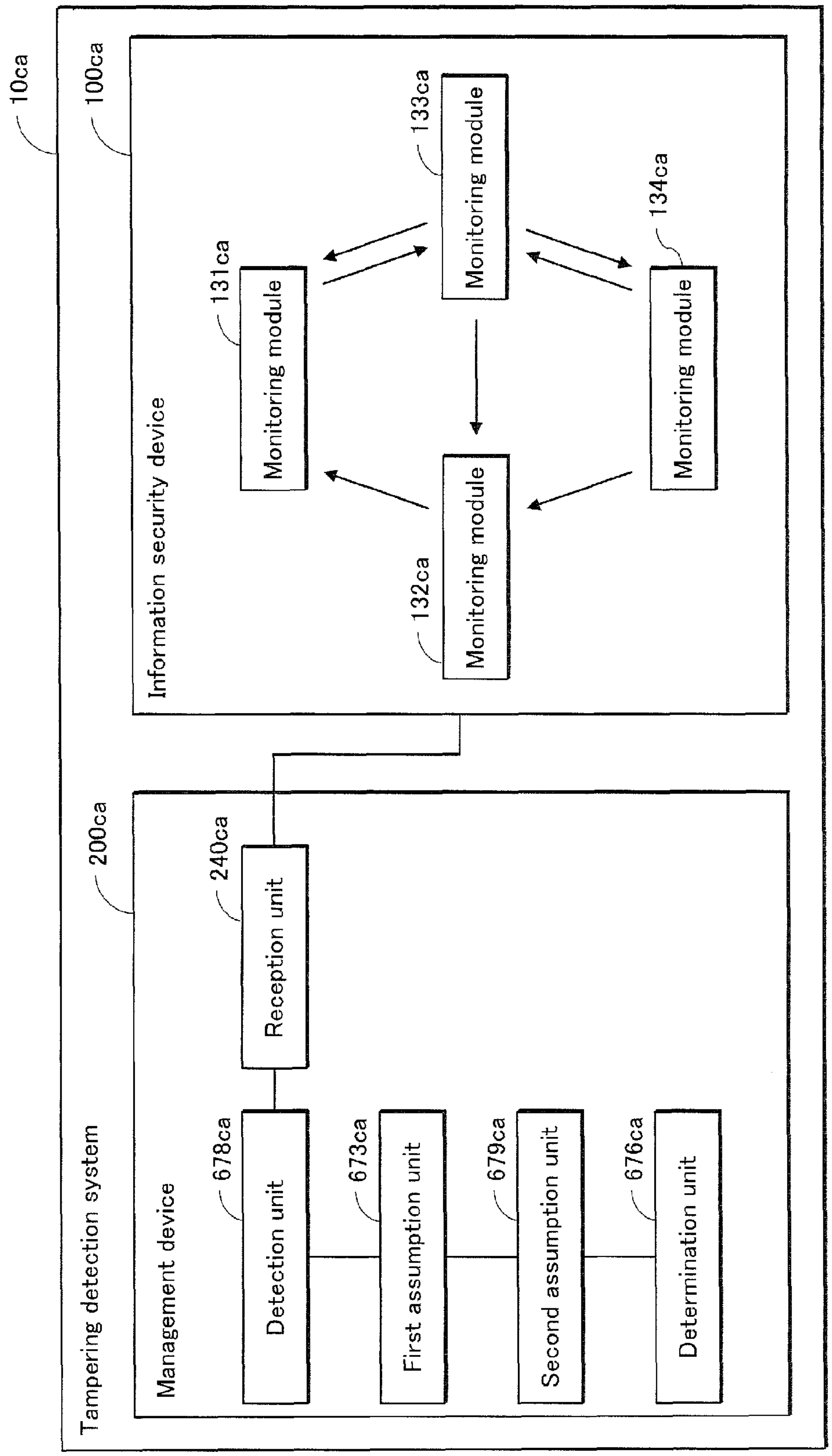
FIG. 77 is a block diagram showing a structure of a tampering monitoring system 10*ca* according to Embodiment 3 of the present invention.

With reference to the configuration diagram in FIG. 77, the following describes a tampering monitoring system 10*ca* as another Embodiment.

As shown in FIG. 77, the tampering monitoring system 10*ca* includes an information security device 100*ca* and a management device 200*ca*.

The information security device 100*ca* includes a plurality of monitoring modules 131*ca*, 132*ca*, 133*ca*, and 134*ca* that monitor for tampering.

The management device 200*ca* comprises: a reception unit 240*ca* that receives, from the information security device 100*ca*, a plurality of monitoring results generated by the monitoring modules each monitoring another monitoring module; a detection unit 678*ca* that detects whether any normal monitoring module that has not been tampered with exists by referring to the monitoring results; a first assumption unit 673*ca* that selects, when the detection unit 678*ca* detects existence, a monitoring module among the plurality of monitoring modules and to assume that the selected monitoring module has been tampered with; a second assumption unit 679*ca* that successively applys a procedure to monitoring modules other than the selected monitoring module by referring to the monitoring results, starting from the selected monitoring module, the procedure being to assume that any monitoring module determining that a monitoring module assumed to have been tampered with is normal has also been tampered with; and a determination unit 676*ca* that determines whether, as a result of the procedure by the second assumption unit 679*ca*, all of the monitoring modules are assumed to have been tampered with, and when determining positively, to determine the selected monitoring module to be a normal monitoring module that has not been tampered with.

The detection unit 678*ca* in the management device 200*ca* detects the existence of a normal monitoring module that has not been tampered with, indicating that at least one monitoring module is normal.

On the other hand, when the determination unit 676*ca* determines that all of the monitoring modules are assumed to be tampered with, such a determination result contradicts the detection result by the detection unit 678*ca*. This is because the assumption by the first assumption unit 673*ca* is incorrect.

Accordingly, the assumption by the first assumption unit 673*ca* is reversed, and the monitoring module assumed by the first assumption unit 673*ca* to have been tampered with is identified as a normal monitoring module.

Since a normal monitoring module can be identified in this way, monitoring results by normal monitoring modules are reliable and thus used effectively.

Note that when a normal monitoring module is identified as above, all of the above assumptions that modules are malicious are revoked.

3.2 Software Updating System 10*cb*

The following describes the software updating system 10*cb* (not illustrated in the figures) as another Embodiment.

In the software updating system 10*cb*, selection of an update module for updating (S5106 in FIG. 20 and S5112 in FIG. 21) uses a method of identifying an update module that has not been tampered with, i.e. a normal update module. By using this method, a normal update module is logically identified from among a plurality of update modules, and the protection control module is securely updated using the identified normal module.

Note that the software updating system 10*cb* is described as having seven update modules, as in Embodiment 2. However, the number of update modules may be eight or greater, or six or fewer.

(1) Structure of Software Updating System 10*cb*

The software updating system 10*cb* includes an update server 200*cb* (not illustrated in the figures) and a device 100. The device 100 has the same structure as the device 100 in Embodiment 1. The update server 200*cb* has a similar structure to the update server 200 in Embodiment 1, yet has a determination unit 210*cb*, shown in FIG. 45, in the update server 200 instead of the determination unit 210. Other structures are the same as the update server 200. The following description focuses on the differences with the update server 200.

(2) Structure of Determination Unit 210*cb*

Figure 45:
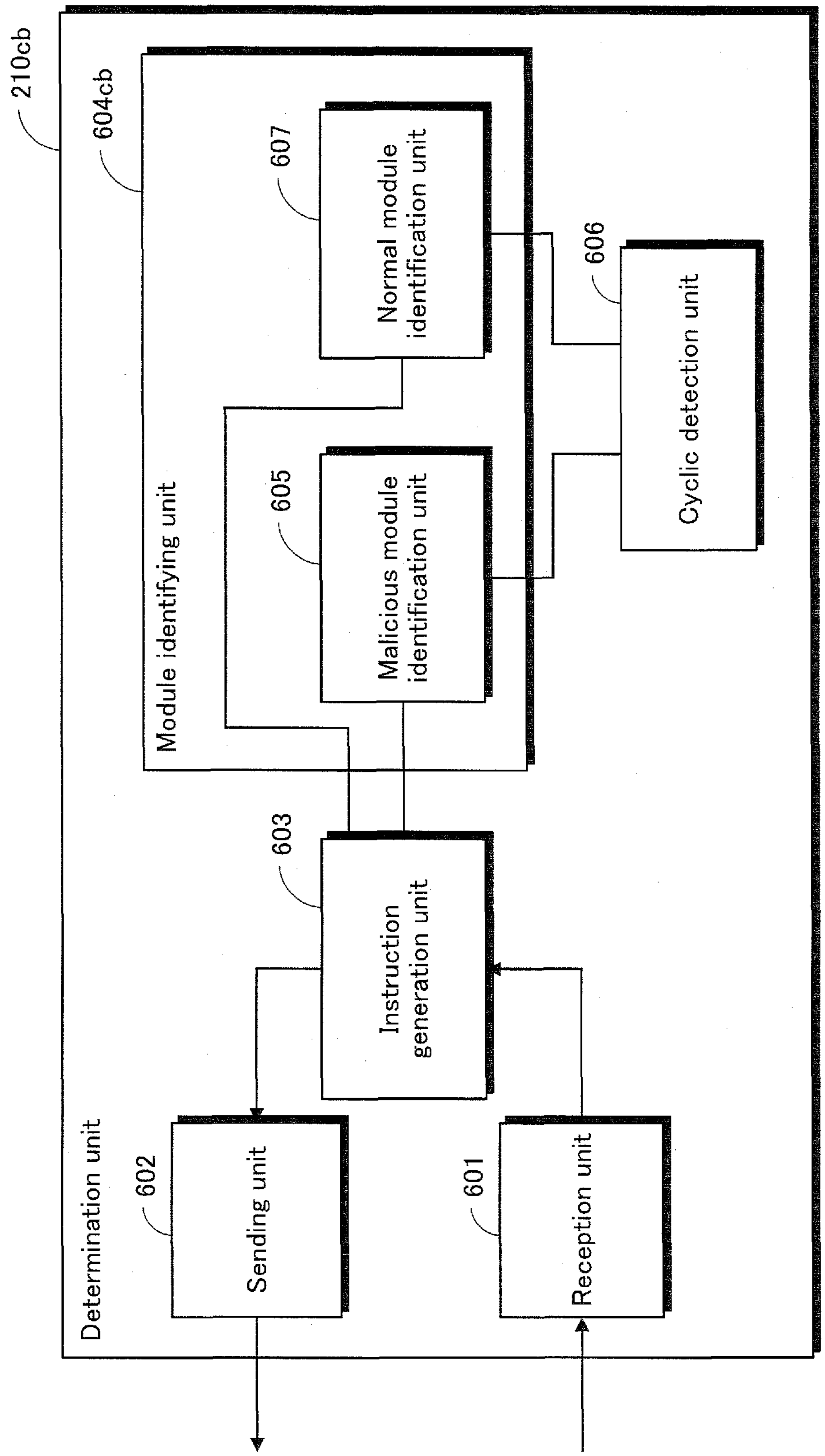
FIG. 45 is a configuration diagram showing a structure of a determination unit 210*cb* in a software updating system 10*cb*.

The determination unit 210*cb* has a similar structure to the determination unit 210*b* shown in FIG. 27. Instead of the module identifying unit 604*b* in the determination unit 210*b*, the determination unit 210*cb* has a module identifying unit 604*cb* as shown in FIG. 45. The module identifying unit 604*cb* has a malicious module identification unit 605 and a normal module identification unit 607, as shown in FIG. 45. The malicious module identification unit 605 is the same as the malicious module identification unit 605 shown in FIG. 27. The following describes the normal module identification unit 607.

(3) Normal Module Identification Unit 607

As shown below, the normal module identification unit 607 identifies a normal update module that has not been tampered with by referring to mutual monitoring results between update modules in the device 100.

Figure 46:
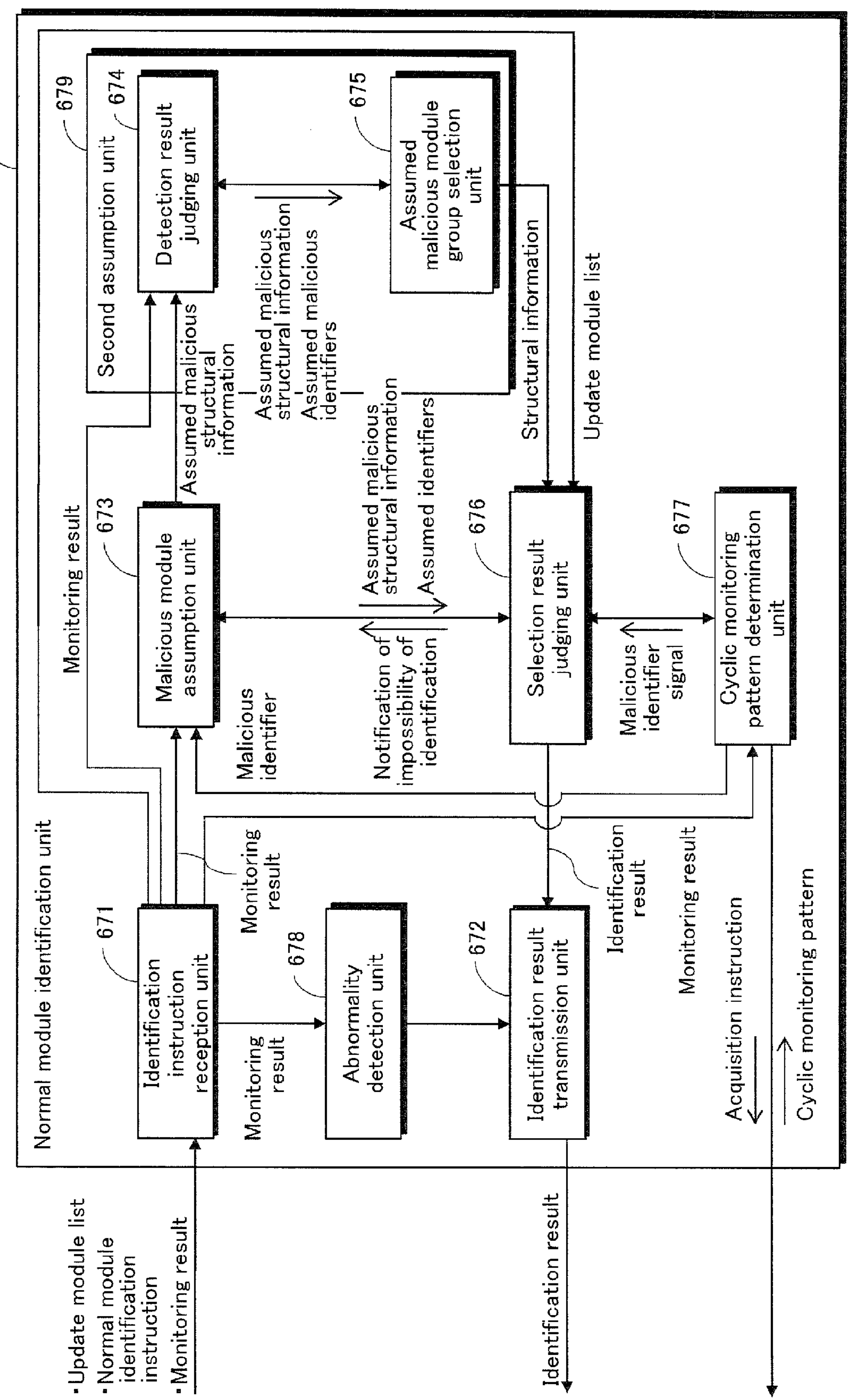
FIG. 46 is a configuration diagram showing a structure of a normal module identification unit 607 in the software updating system 10*cb*.

As shown in FIG. 46, the normal module identification unit 607 includes an identification instruction reception unit 671, an identification result transmission unit 672, a malicious module assumption unit (also called a first assumption unit) 673, a detection result judging unit 674, an assumed malicious module group selection unit 675, a selection result judging unit 676, a cyclic monitoring pattern determination unit 677, and an abnormality detection unit 678. The detection result judging unit 674 and the assumed malicious module group selection unit 675 form a second assumption unit 679.

The second assumption unit 679 starts with an update module assumed by the malicious module assumption unit 673 to have been tampered with and, for each unprocessed update module, consecutively performs the procedure of assuming, by referring to the received monitoring results, that an update module determined to be normal by an update module assumed to have been tampered with has also been tampered with.

(a) Identification Instruction Reception Unit 671

The identification instruction reception unit 671 receives, from the instruction generation unit 603, a normal module identification instruction, which instructs to identify a normal update module. Upon receiving the normal module identification instruction, the identification instruction reception unit 671 outputs the instruction to the abnormality detection unit 678.

The identification instruction reception unit 671 also receives an update module list from the instruction generation unit 603. The update module list includes identifiers for all of the update modules in the update module group 130. Next, the identification instruction reception unit 671 transmits the received update module list to the malicious module assumption unit 673 and the selection result judging unit 676.

The identification instruction reception unit 671 also receives, from the device 100, monitoring results for the update module group 130 in the device 100 via the network 5, the transmission unit 240, the reception unit 601, and the instruction generation unit 603. The identification instruction reception unit 671 transmits the received monitoring results for the update module group 130 to the abnormality detection unit 678, the malicious module assumption unit 673, the cyclic monitoring pattern determination unit 677, and the detection result judging unit 674.

(b) Abnormality Detection Unit 678

As shown below, the abnormality detection unit 678 detects a normal update module that has not been tampered with by referring to the received monitoring results. Briefly, this detection is as follows. The abnormality detection unit 678 detects, by referring to the previously received monitoring results and the currently received monitoring results, a normal update module that has not been tampered with when all of the update modules were determined to be normal in the previously received monitoring results, whereas not all of the update modules are determined to be normal in the currently received monitoring results. The time between the previous monitoring and the current monitoring is set to be less than a predetermined threshold.

The following provides further details on the abnormality detection unit 678.

The abnormality detection unit 678 receives a normal module identification instruction from the identification instruction reception unit 671.

Upon receiving the normal module identification instruction, the abnormality detection unit 678 receives monitoring results (the latest monitoring results) for the update module group 130 in the device 100 from the identification instruction reception unit 671. The abnormality detection unit 678 also receives the previous monitoring results for the update module group 130 in the device 100 from the identification instruction reception unit 671.

The previous monitoring refers to the monitoring performed one monitoring session before the latest monitoring. The device 100 repeatedly performs monitoring on a regular or irregular basis at frequent intervals (for example, 10-20 times a month, five to six times a week, two to three times a day, once an hour, etc.). The time between the previous monitoring and the current monitoring is less than a predetermined threshold. Examples of the predetermined threshold are five days, three days, one day, 12 hours, six hours, three hours, one hour, etc.

The update server **200*cb*** cumulatively stores the monitoring results for each monitoring session.

As described above, the device 100 repeatedly performs monitoring on a regular or irregular basis at frequent intervals. It is therefore assumed that all of the update modules will not be tampered with between a first monitoring point in time and a second monitoring point in time that follows next.

In other words, at the first monitoring point in time, if all of the update modules are modules that have not been tampered with, then at the second monitoring point in time that follows next, it can be assumed that at least one monitoring module has not been tampered with.

The abnormality detection unit 678 determines whether all of the latest monitoring results are normal by referring to the received latest monitoring results. When all of the latest monitoring results are normal, the abnormality detection unit 678 transmits, via the identification result transmission unit 672, a normal result to the instruction generation unit 603 indicating that all of the latest monitoring results are normal. The module identifying unit **604*cb*** then terminates processing. In this case, since all of the update modules are normal, it is not necessary to identify a normal update module.

When determining that not all of the latest monitoring results are normal, the abnormality detection unit 678 then determines whether all of the previous monitoring results are normal by referring to the received previous monitoring results. When not all of the previous monitoring results are normal, the abnormality detection unit 678 transmits, via the identification result transmission unit 672, a result indicating that not all of the previous monitoring results are normal to the instruction generation unit 603. The module identifying unit **604*cb*** then terminates processing. In this case, since there is a chance that all of the update modules are not normal, a normal update module is not identified.

When all of the previous monitoring results are normal, the abnormality detection unit 678 causes the other units in the normal module identification unit 607 to identify a normal module. The abnormality detection unit 678 also transmits, to the cyclic monitoring pattern determination unit 677, a malicious module identification instruction to identify a malicious update module.

(c) Cyclic Monitoring Pattern Determination Unit 677

The cyclic monitoring pattern determination unit 677 receives a malicious module identification instruction from the abnormality detection unit 678 and receives monitoring results for the update module group 130 from the identification instruction reception unit 671. Upon receiving the malicious module identification instruction, the cyclic monitoring pattern determination unit 677 transmits a cyclic monitoring pattern acquisition instruction to the cyclic detection unit 606. The cyclic detection unit 606 transmits one or more cyclic monitoring patterns, if such patterns exist, to the cyclic monitoring pattern determination unit 677. Next, the cyclic monitoring pattern determination unit 677 receives the cyclic monitoring patterns from the cyclic detection unit 606.

Next, the cyclic monitoring pattern determination unit 677 verifies whether the monitoring results for a plurality of update modules indicated by the received cyclic monitoring patterns are contradictory by referring to the received monitoring results. When the monitoring results are contradictory, the cyclic monitoring pattern determination unit 677 determines that all of the update modules included in the received cyclic monitoring patterns are malicious update modules and transmits a malicious identifier for each of the update modules identified as malicious to the malicious module assumption unit 673.

The following is a brief description of a cyclic monitoring pattern.

The cyclic monitoring pattern specifies the update modules that are targets of monitoring by other update modules. The cyclic monitoring pattern indicates that a second update module, which is the target of monitoring by a first update module, monitors the first update module either directly or via one or more other update modules.

In other words, when a plurality of monitoring results by a plurality of update modules in the cyclic monitoring pattern for another update module do not match, the cyclic monitoring pattern determination unit 677 identifies the update modules in the cyclic monitoring pattern as malicious update modules.

Note that a malicious update module may be identified as follows. The malicious module identification unit may assume that one update module is normal and determine whether there is an inconsistency between a plurality of monitoring results by referring to the received monitoring results. When there is an inconsistency, the update module that was assumed to be normal may then be identified as a malicious update module.

(d) Malicious Module Assumption Unit 673

As shown below, the malicious module assumption unit 673 assumes that one update module selected from among a plurality of update modules has been tampered with.

The malicious module assumption unit 673 receives the update module list from the identification instruction reception unit 671 and receives the monitoring results for the update module group 130 in the device 100. The malicious module assumption unit 673 also receives, from the cyclic monitoring pattern determination unit 677, malicious identifiers for all of the update modules identified as malicious.

Next, the malicious module assumption unit 673 selects one update module identifier from among the update module identifiers included in the update module list other than the received malicious identifiers and assumes that the update module indicated by the selected identifier is a malicious update module. The selected identifier is referred to as an assumed identifier. The malicious module assumption unit 673 creates an empty assumed malicious update module group and then includes the assumed identifier in the assumed malicious update module group. At this point, the assumed malicious update module group includes only the assumed identifier identifying the selected update module. Note that the assumed malicious update module group may also be referred to as an assumed malicious group. The malicious module assumption unit 673 thus generates the assumed malicious group to include the assumed identifier.

Next, the malicious module assumption unit 673 transmits the assumed identifier of the selected update module to the selection result judging unit 676 and transmits structural information on the assumed malicious update module group to the detection result judging unit 674. The structural information on the assumed malicious update module group is formed of all of the identifiers included in the assumed malicious update module group.

The malicious module assumption unit 673 also receives, from the selection result judging unit 676, a notification of the impossibility of identification, indicating that a normal update module cannot be identified. When receiving the notification of the impossibility of identification, the malicious module assumption unit 673 selects the identifier of an update module from among the identifiers of update modules included in the update module list other than the selected update module and other than the update modules indicated by the received malicious identifiers. The malicious module assumption unit 673 then assumes that the selected update module is malicious and includes only the assumed identifier identifying the selected update module in the assumed malicious update module group, transferring the structural information on the assumed malicious update module group to the detection result judging unit 674.

(e) Second Assumption Unit 679

As described above, the second assumption unit 679 includes the detection result judging unit 674 and the assumed malicious module group selection unit 675.

As described below, the second assumption unit 679 starts with an update module assumed by the malicious module assumption unit 673 to have been tampered with and, for each unprocessed update module, consecutively performs the procedure of assuming, by referring to the received monitoring results, that an update module determined to be normal by an update module assumed to have been tampered with has also been tampered with.

Briefly, operations are as follows. The second assumption unit 679 determines whether an update module determined to be normal by an update module identified by an identifier included in the assumed malicious group exists by referring to the monitoring results. When such an update module exists, the second assumption unit 679 adds the identifier identifying the update module to the assumed malicious group. The second assumption unit 679 repeatedly performs this determination and addition for each unprocessed update module.

(i) Detection Result Judging Unit 674

The detection result judging unit 674 receives the monitoring results for the update module group 130 in the device 100 from the identification instruction reception unit 671. The detection result judging unit 674 also receives the assumed malicious structural information from the malicious module assumption unit 673.

The detection result judging unit 674 judges the detection results for the update modules in the assumed malicious update module group by referring to the monitoring results for the update module group 130 in the device 100, received from the identification instruction reception unit 671, and the structural information on the assumed malicious update module group received from the malicious module assumption unit 673.

The judgment method used by the detection result judging unit 674 is now described with reference to FIG. 47.

Figure 47:
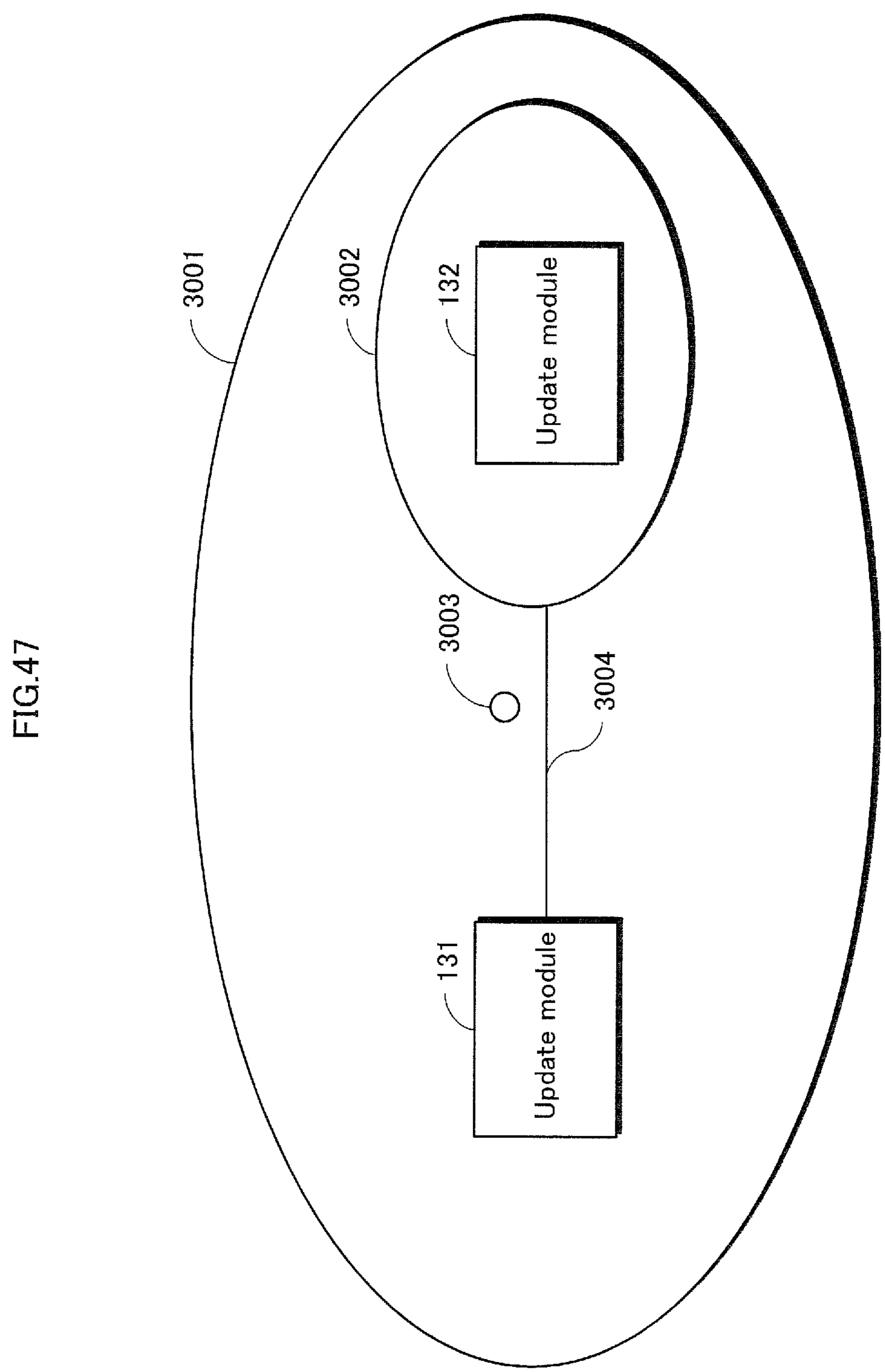
FIG. 47 is an example of a monitoring pattern and monitoring results to illustrate the determination method used in a verification results determination unit 674 in the software updating system 10*cb*.

As shown in FIG. 47, the update module 131 monitors the update module 132 (3004), and the monitoring result by the update module 131 for the update module 132 is normal (3003). In this example, the update module 132 is an update module included in the assumed malicious update module group 3002.

At this point, the detection result judging unit 674 searches, by referring to the received monitoring results, for an update module that determines that the update module 132 included in the assumed malicious update module group 3002 is normal. In the example shown in FIG. 47, the update module 131 determines that the update module 132 is normal (3003). Therefore, the detection result judging unit 674 assumes that the update module 131, which determines the update module 132 to be normal, is a malicious update module.

As described below, the update module 131 is added to the assumed malicious update module group as an assumed malicious update module. As a result, the update modules 132 and 131 are included in a new assumed malicious update module group 3001.

The detection result judging unit 674 transmits, as the results of monitoring of update modules in the assumed malicious update module group, one or more identifiers identifying update modules determined to be normal (hereinafter referred to as "assumed malicious identifiers") and the received structural information on the assumed malicious update module group to the assumed malicious module group selection unit 675. When, as the result of monitoring of update modules in the assumed malicious update module group, no update module is determined to be normal, the assumed malicious module group selection unit 675 is notified accordingly. Similar operations are performed when receiving the structural information on the assumed malicious update module group from the assumed malicious module group selection unit 675.

(ii) Assumed Malicious Module Group Selection Unit 675

The assumed malicious module group selection unit 675 receives from the detection result judging unit 674, as the result of monitoring of update modules in the assumed malicious update module group, identifiers for update modules determined to be normal (assumed malicious identifiers) and the structural information on the assumed malicious update module group. Next, the assumed malicious module group selection unit 675 adds the received update module identifiers (assumed malicious identifiers) to the assumed malicious update module group.

In the case of the example in FIG. 47, the update module 131 is added to the assumed malicious update module group as an assumed malicious update module. As a result, the update modules 132 and 131 are included in the new assumed malicious update module group 3001.

Next, the assumed malicious module group selection unit 675 transmits the new structural information on the assumed malicious update module group with the identifiers added thereto to the detection result judging unit 674. When receiving notification from the detection result judging unit 674 that no update modules exist, the assumed malicious module group selection unit 675 transmits the structural information on the assumed malicious update module group to the selection result judging unit 676.

(f) Selection Result Judging Unit 676

The selection result judging unit 676 receives the update module list from the identification instruction reception unit 671. The selection result judging unit 676 also receives the structural information on the assumed malicious update module group and the assumed identifier from the assumed malicious module group selection unit 675. Furthermore, the selection result judging unit 676 receives malicious identifiers identifying malicious update modules from the cyclic monitoring pattern determination unit 677.

Next, the selection result judging unit 676 determines whether all of the update modules other than the malicious update modules identified by the cyclic monitoring pattern determination unit 677 are included in the assumed malicious update module group by referring to the structural information on the assumed malicious update module group and to the malicious identifiers identifying malicious update modules.

When no malicious update modules exist, the selection result judging unit 676 determines whether all of the update modules are included in the assumed malicious update module group. Furthermore, even when no malicious update modules are detected, the selection result judging unit 676 determines whether all of the update modules are included in the assumed malicious update module group. In other words, the selection result judging unit 676 judges whether all of the update modules have been assumed to have been tampered with. This is equivalent to saying that the selection result judging unit 676 judges whether the identifiers identifying all of the update modules are included in the assumed malicious group.

Specifically, the selection result judging unit 676 removes malicious identifiers from the identifiers included in the update module list and then removes identifiers included in the structural information on the assumed malicious update module group, judging whether, as a result, the update module list becomes an empty set, or whether the update module list still includes any identifiers.

When no malicious update module exists, the selection result judging unit 676 removes identifiers included in the assumed malicious structural information from the identifiers included in the update module list, judging whether, as a result, the update module list becomes an empty set, or whether the update module list still includes any identifiers. Furthermore, even when no malicious update module is detected, the selection result judging unit 676 removes identifiers included in the assumed malicious structural information from the identifiers included in the update module list, judging whether, as a result, the update module list becomes an empty set, or whether the update module list still includes any identifiers.

When all of the update modules other than the malicious update modules identified by the cyclic monitoring pattern determination unit 677 are included in the assumed malicious update module group, the selection result judging unit 676 identifies the update module assumed to be malicious by the malicious module assumption unit 673 as a normal update module, treats the received assumed identifier as an identifier of a normal module, and transmits this normal module identifier to the identification result transmission unit 672 as the result of identification.

When not all of the update modules are included in the assumed malicious update module group, the selection result judging unit 676 transmits an instruction (a notification of the impossibility of identification of a normal update module) to the malicious module assumption unit 673 to assume that an update module other than the previously assumed update module is malicious.

(g) Identification Result Transmission Unit 672

The identification result transmission unit 672 receives the identification result of a normal update module from the selection result judging unit 676 and transmits the received identification result to the instruction generation unit 603.

The identification result transmission unit 672 also transmits a normal result indicating that all of the latest monitoring results are normal to the instruction generation unit 603. The identification result transmission unit 672 also transmits a result indicating that not all of the latest monitoring results are normal (i.e., when at least one result indicates a malicious module), or that not all of the previous monitoring results are normal (i.e., when at least one result indicates a malicious module) to the instruction generation unit 603.

(4) Operations for Normal Module Identification

Operations for normal update module identification in the software updating system 10*cb* are now described with reference to FIGS. 48, 49, and 50-52.

Figure 48:
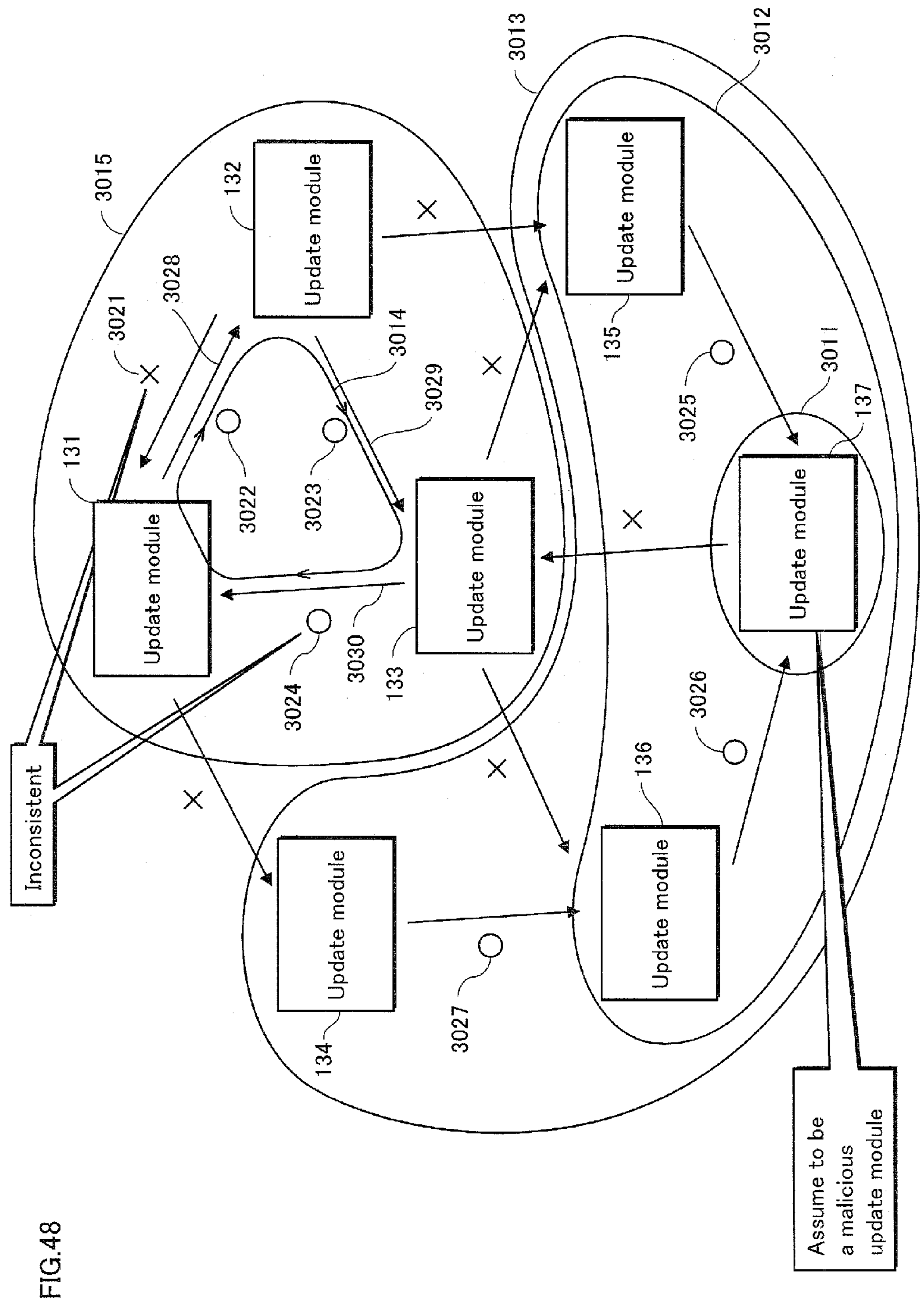
FIG. 48 shows an example of tampering detection monitoring results for each update module in the software updating system 10*cb*.
Figure 49:
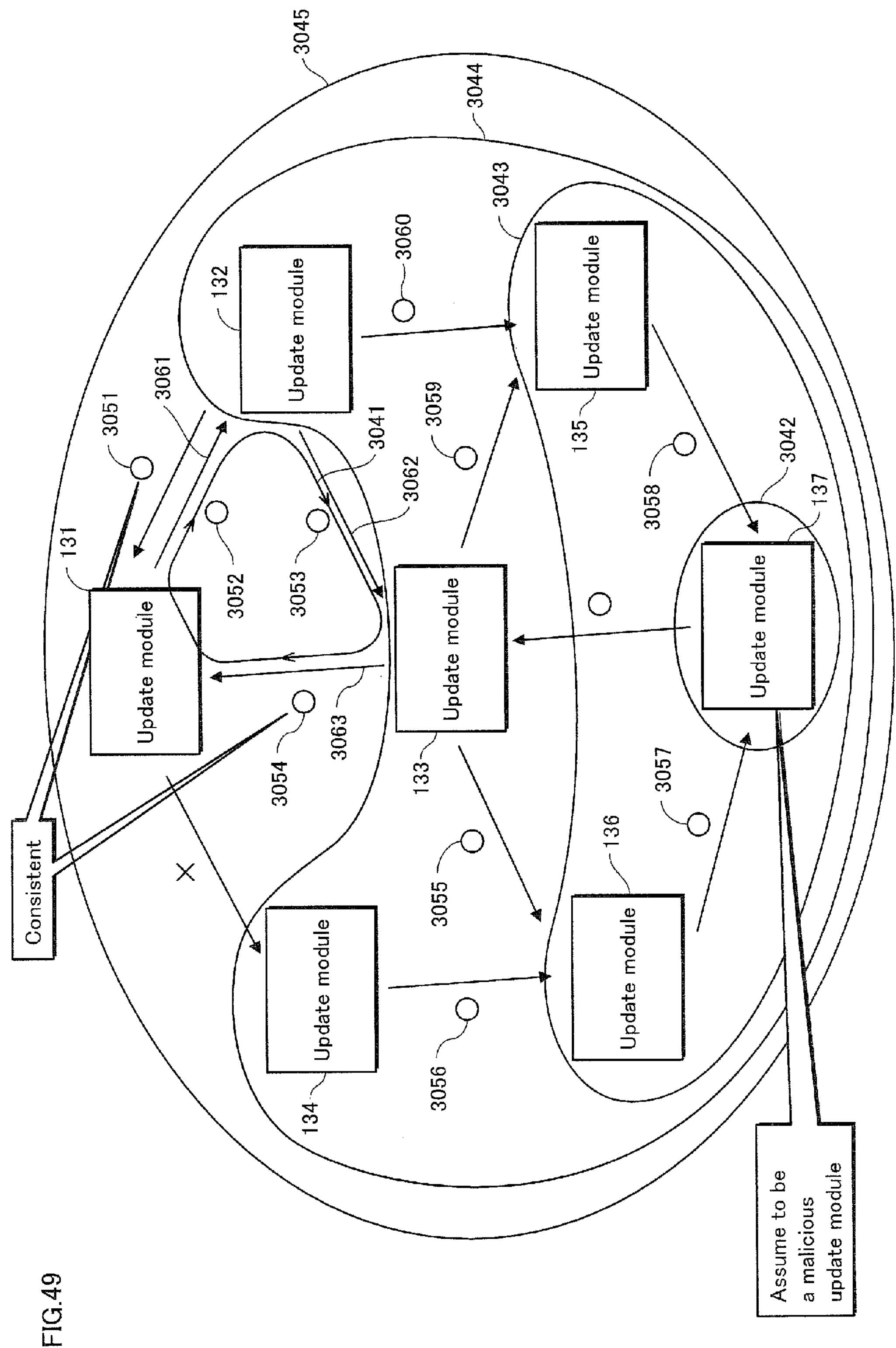
FIG. 49 shows another example of tampering detection monitoring results for each update module in the software updating system 10*cb*.
Figure 50:
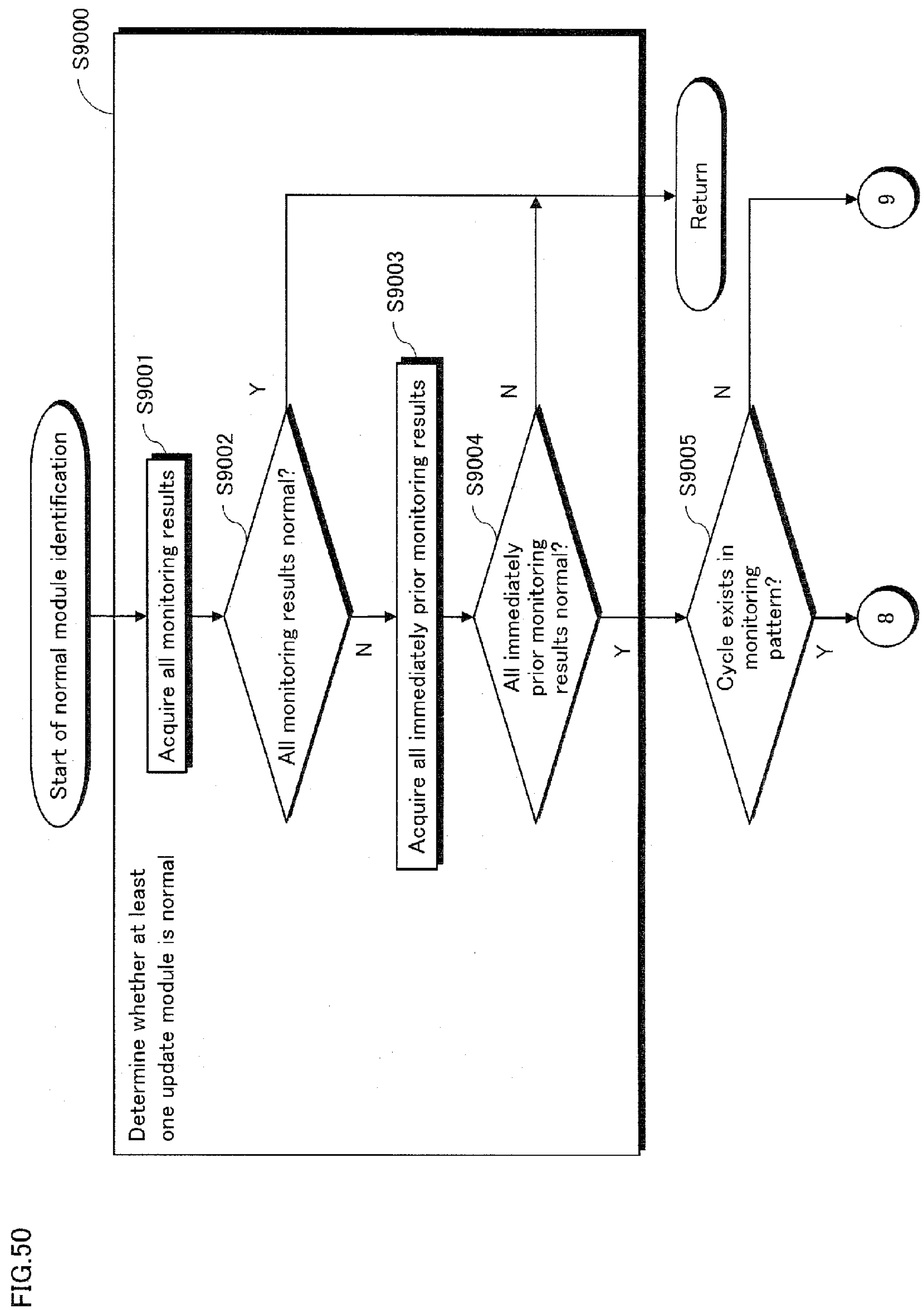
FIG. 50 is a flowchart showing operations to identify a normal update module in the software updating system 10*cb*, and is continued in FIG. 51.
Figure 51:
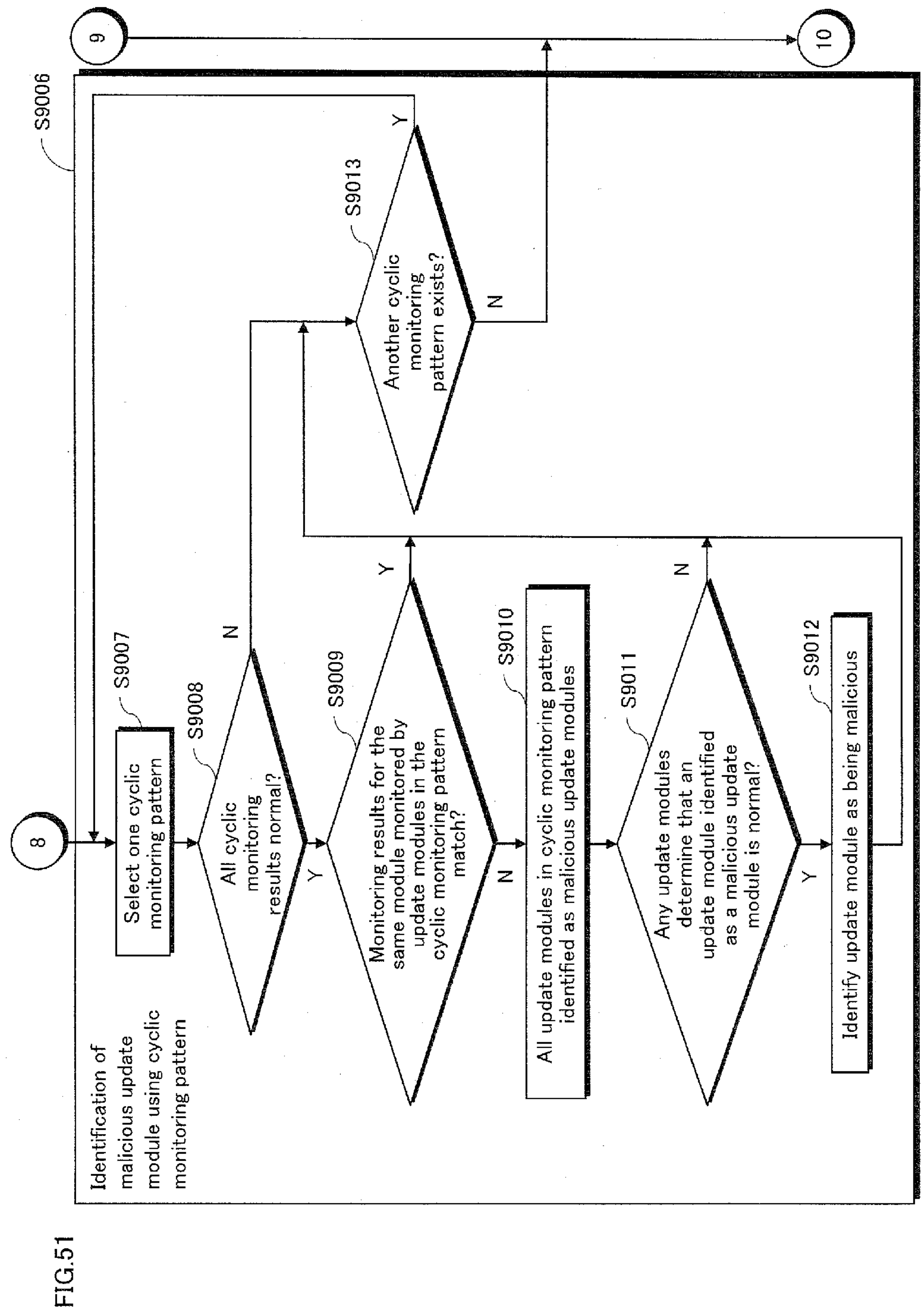
FIG. 51 is a flowchart showing operations to identify a normal update module in the software updating system 10*cb*, and is continued in FIG. 52.
Figure 52:
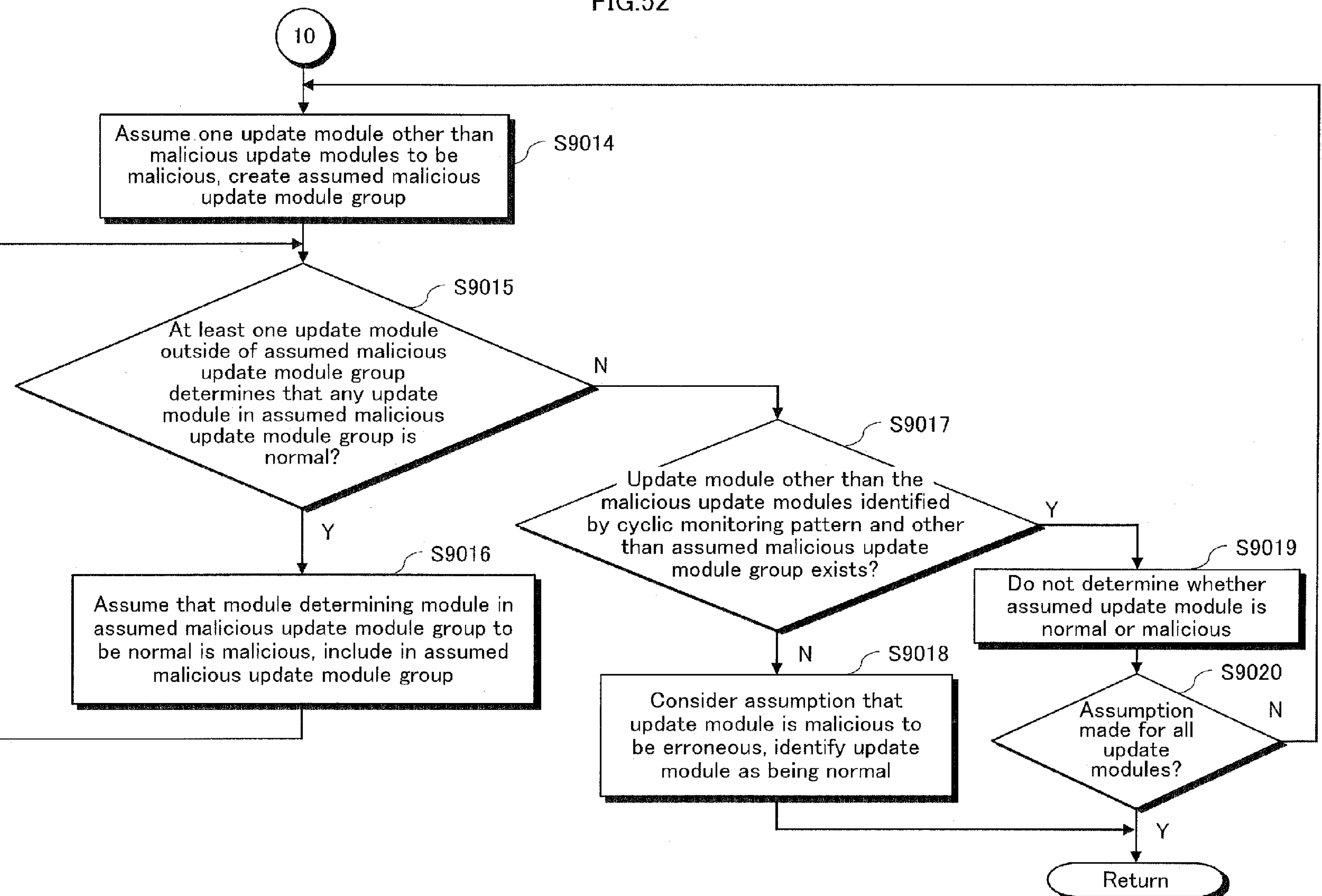
FIG. 52 is a flowchart showing operations to identify a normal update module in the software updating system 10*cb*, and is continued from FIG. 51.

FIGS. 48 and 49 each show an example of monitoring results for tampering detection on update modules, and FIGS. 50-52 are flowcharts showing operations for normal module identification.

Below, operations for normal module identification are described with reference to the flowcharts in FIGS. 50-52.

The abnormality detection unit 678 determines whether at least one update module is normal. In other words, the existence of a normal update module that has not been tampered with is detected (S9000). Details on step S9000 are as follows (S9001-S9004).

The abnormality detection unit 678 receives all of the latest monitoring results (S9001) and determines whether all of the latest monitoring results are normal (S9002). If all of the monitoring results are normal (S9002: Y), all of the update modules are identified as normal, and the module identifying unit 604*cb* terminates normal module identification. If not all of the monitoring results are determined to be normal (S9002: N), then the immediately prior monitoring results, i.e. for the previous monitoring session, are acquired by being received (S9003). It is then determined whether all of the previous monitoring results are normal (S9004). When not all of the previous monitoring results are determined to be normal (S9004: N), the module identifying unit 604*cb* terminates normal module identification. When all of the previous monitoring results are normal (S9004: Y), at least one update module in the update module group 130 is judged to be normal. This is because when all of the update modules in the previous mutual monitoring were normal, it is judged that not all of the update modules would have been tampered with to become malicious update modules in the short interval between mutual monitoring sessions.

By thus confirming that at least one update module in the update module group 130 is normal, a normal module can be identified logically as described below.

Next, when all of the monitoring results in the previous mutual monitoring session were normal (S9004: Y), the cyclic monitoring pattern determination unit 677 determines whether a cyclic monitoring pattern exists (S9005). This determination is made by confirming whether a cyclic monitoring pattern is stored in the cyclic monitoring pattern storage unit 666 within the cyclic detection unit 606. When no cyclic monitoring pattern exists (S9005: N), processing proceeds to step S9014.

When a cyclic monitoring pattern exists (S9005: Y), the cyclic monitoring pattern determination unit 677 identifies malicious update modules using the cyclic monitoring pattern (S9006). Details on step S9006 are as follows (S9007-S9013). Note that identification of malicious update modules using the cyclic monitoring pattern need not be performed. In other words, malicious update modules may be identified by another method. Alternatively, malicious update modules may not be identified at all.

The cyclic monitoring pattern determination unit 677 selects one cyclic monitoring pattern recorded in the cyclic monitoring pattern storage unit 666 within the cyclic detection unit 606 (S9007) and determines whether all of the monitoring results in the selected cyclic monitoring pattern are normal (S9008). When all of the monitoring results in the cyclic monitoring pattern are normal (S9008: Y), it is verified whether a plurality of monitoring results for the same module that is monitored by a plurality of update modules in the cyclic monitoring pattern match (S9009). When the monitoring results do not match (S9009: N), all of the update modules in the cyclic monitoring pattern are identified as malicious update modules (S9010). Furthermore, it is verified whether any update modules determine that an update module identified as a malicious update module in step S9010 is normal (S9011). When such an update module exists (S9011: Y), the update module is identified as a malicious update module (S9012). In this way, it is possible to reduce the number of update modules that are not verified as being a malicious update module or not. As a result, a normal update module that updates the protection control module is more effectively identified. Next, control proceeds to step S9013.

When not all of the monitoring results in the cyclic monitoring pattern are normal (S9008: N), and a plurality of monitoring results for the same module that is monitored by a plurality of update modules in the cyclic monitoring pattern match (S9009: Y), or when no update module determines that an update module identified as a malicious update module is normal (S9011: N), the cyclic monitoring pattern determination unit 677 furthermore determines whether another cyclic monitoring pattern is stored in the cyclic monitoring pattern storage unit 666 within the cyclic detection unit 606 (S9013). When another cyclic monitoring pattern is stored therein (S9013: Y), control proceeds to step S9007. When no other cyclic monitoring pattern is stored therein (S9013: N), the cyclic monitoring pattern determination unit 677 terminates processing for identification of malicious update modules using a cyclic monitoring pattern.

Next, the malicious module assumption unit 673 selects an update module other than the update modules identified as malicious update modules in step S9010 or step S9012, assumes that the selected update module is a malicious update module, and creates the assumed malicious update module group to include only the identifier of this update module assumed to be malicious (S9014).

The detection result judging unit 674 determines whether at least one update module outside of the assumed malicious update module group determines that any update module identified by the identifiers included in the assumed malicious update module group is normal (S9015). When even one update module outside of the assumed malicious update module group determines that a module in the assumed malicious update module group is normal (S9015: Y), the assumed malicious module group selection unit 675 includes the identifier of this update module in the assumed malicious update module group (S9016). Next, control proceeds to step S9015. When not even one update module outside of the assumed malicious update module group determines that a module in the assumed malicious update module group is normal (S9015: N), it is determined whether an update module other than the malicious update modules identified in steps S9010 and S9012 and other than the update modules in the assumed malicious update module group exists (S9017). When no update module exists (S9017: N), the update module assumed to be malicious in step S9014 is identified as a regular update module (S9018). When a regular update module is thus identified, all of the above assumptions that an update module is malicious are subsequently revoked, and the identifiers included in the assumed malicious update module group are removed.

When an update module exists (S9017: Y), the update module assumed to be malicious in step S9014 is not identified as a regular update module (S9019). In step S9014, when not all of the update modules other than the update modules identified as malicious update modules in steps S9010 and S9012 have been selected (S9020: N), control proceeds to step S9014. When all of the update modules have been assumed to be malicious (S9020: Y), normal module identification terminates.

In step S9019, not identifying an update module assumed to be malicious as a normal update module, as described above, prevents erroneous determination of a malicious update module as a normal update module. This prevents the protection control module from being updated to a malicious protection control module by a malicious update module.

During the above normal module identification, one update module among a plurality of update modules is first assumed to be a malicious update module. Since a normal update module among update modules is efficiently identified using a logical verification method, the protection control module can be securely updated using the identified normal update module.

Note that in the above description, the update modules may be monitoring modules.

(5) Example of Normal Module Identification (a) First Example of Normal Module Identification Next, an example of normal module identification is described with reference to FIG. 48.

As shown in FIG. 48, the update module group 130 of the device 100 includes update modules 131-137.

The update module 131 monitors the update modules 132 and 134, and the monitoring results respectively indicate normal (3022) and malicious. The update module 132 monitors the update modules 131, 133, and 135, and the monitoring results respectively indicate malicious (3021), normal (3023), and malicious. The update module 133 monitors the update modules 131, 135, and 136, and the monitoring results respectively indicate normal (3024), malicious, and malicious. The update module 134 monitors the update module 136, and the monitoring result indicates normal (3027). The update module 135 monitors the update module 137, and the monitoring result indicates normal (3025). The update module 136 monitors the update module 137, and the monitoring result indicates normal (3026). The update module 137 monitors the update module 133, and the monitoring result indicates malicious.

Furthermore, the update module 131 monitors the update module 132 (3028), the update module 132 monitors the update module 133 (3029), and the update module 133 monitors the update module 131 (3030). Accordingly, a cyclic monitoring pattern 3014 exists.

The cyclic monitoring pattern establishes which update modules are the target of monitoring by other update modules. The cyclic monitoring pattern indicates that a second update module, which is the target of monitoring by a first update module, monitors the first update module either directly or via one or more other update modules.

First, the cyclic monitoring pattern determination unit 677 determines whether a cyclic monitoring pattern exists (S9005) and identifies all of the update modules 131, 132, and 133 in the cyclic monitoring pattern as malicious update modules (S9010). As shown in FIG. 48, the cyclic monitoring pattern 3014 exists, and the monitoring results of the cyclic monitoring pattern 3014 are all normal (3022, 3023, 3024). The monitoring result (3021) by the update module 132 for the update module 131 and the monitoring result (3024) by the update module 133 for the update module 131 differ.

Next, the malicious module assumption unit 673 selects the update module 137 and assumes that the update module 137 is a malicious update module, including the identifier of the update module 137 in the assumed malicious update module group 3011 (S9014). Subsequently, as shown in FIG. 48, the update modules 135 and 136, which are update modules other than the update modules 131-133 determined to be malicious, determine that the update module 137 is normal (S9015). Since the update module 137 is within the assumed malicious update module group 3011, the update modules 135 and 136 are included in the assumed malicious update module group (S9016). As a result, a new assumed malicious update module group 3012 is generated. As also shown in FIG. 48, the update module 134, which is an update module other than the update modules 131-133 determined to be malicious, determines (3027) that the update module 136 (included in the assumed malicious update module group 3012) is normal (S9015). Since the update module 136 is within the assumed malicious update module group 3012, the update module 134 is included in the assumed malicious update module group (S9016). As a result, a new assumed malicious update module group 3013 is generated.

Next, the selection result judging unit 676 determines whether an update module other than the malicious update modules 131-133 identified in step S9010 and the assumed malicious update module group (update modules 134-137) exists (S9017). As shown in FIG. 48, since all of the update modules are malicious update modules or are assumed malicious update modules (S9017: N), the selection result judging unit 676 identifies the update module 137 as a normal update module (S9018).

Since the normal update module 137 among the update modules is thus efficiently identified using a logical verification method, the protection control module can be securely updated using the identified normal update module 137.

(b) Second Example of Normal Module Identification

Next, an example of normal module identification is described with reference to FIG. 49.

As shown in FIG. 49, the update module group 130 of the device 100 includes update modules 131-137.

The update module 131 monitors the update modules 132 and 134, and the monitoring results respectively indicate normal (3052) and malicious. The update module 132 monitors the update modules 131, 133, and 135, and the monitoring results respectively indicate normal (3051), normal (3053), and normal (3060). The update module 133 monitors the update modules 131, 135, and 136, and the monitoring results respectively indicate normal (3054), normal (3059), and normal (3055). The update module 134 monitors the update module 136, and the monitoring result indicates normal (3056). The update module 135 monitors the update module 137, and the monitoring result indicates normal (3058). The update module 136 monitors the update module 137, and the monitoring result indicates normal (3057). The update module 137 monitors the update module 133, and the monitoring result indicates normal.

Furthermore, the update module 131 monitors the update module 132 (3061), the update module 132 monitors the update module 133 (3062), and the update module 133 monitors the update module 131 (3063). Accordingly, a cyclic monitoring pattern 3041 exists.

First, the cyclic monitoring pattern determination unit 677 determines whether a cyclic monitoring pattern exists (S9005), and since monitoring results for the same monitored module match (S9009: Y), control proceeds to step S9014. As shown in FIG. 49, the cyclic monitoring pattern 3041 exists, and the monitoring results in the cyclic monitoring pattern 3041 are all normal (3052, 3053, 3054). The monitoring result (3051) by the update module 132 for the update module 131 and the monitoring result (3054) by the update module 133 for the update module 131 match. Furthermore, no other monitoring results are contradictory.

Next, the malicious module assumption unit 673 selects the update module 137 and assumes that the update module 137 is a malicious update module, including the identifier of the update module 137 in the assumed malicious update module group 3042 (S9014).

Subsequently, as shown in FIG. 49, the update modules 135 and 136, which have not been determined to be malicious, determine (3058, 3057) that the update module 137 is normal (S9015). Since the update module 137 is within the assumed malicious update module group 3042, the update modules 135 and 136 are included in the assumed malicious update module group (S9016). As a result, a new assumed malicious update module group 3043 is generated. As also shown in FIG. 49, the update module 134, which has not been determined to be malicious, determines (3056) that the update module 136 (included in the assumed malicious update module group 3043) is normal, and the update module 132, which has not been determined to be malicious, determines (3060) that the update module 135 (included in the assumed malicious update module group 3043) is normal (S9015). Since the update modules 136 and 135 are within the assumed malicious update module group 3043, the update modules 134 and 132 are included in the assumed malicious update module group (S9016). As a result, a new assumed malicious update module group 3044 is generated. Furthermore, the update module 131, which has not been determined to be malicious, determines (3052) that the update module 132 (included in the assumed malicious update module group 3044) is normal (S9015). Since the update module 132 is within the assumed malicious update module group 3044, the update module 131 is included in the assumed malicious update module group (S9016). As a result, a new assumed malicious update module group 3045 is generated.

In this way, all of the update modules 131-137 are included in the assumed malicious update module group 3045. Accordingly, since no update module other than the assumed malicious update module group exists (S9017: N), the selection result judging unit 676 identifies the update module 137 as a normal update module (S9018).

Since the normal update module 137 among the plurality of update modules is thus efficiently identified using a logical verification method, the protection control module can be securely updated using the identified normal update module 137.

4. Embodiment 4

The following describes another Embodiment.

4.1 Regarding Embodiment 3

In the software updating system 10*cb* in Embodiment 3, a normal update module that has not been tampered with is selected as the update module to perform updating.

However, if an update module that blocks identification of a normal module exists when applying the method to identify a normal module in the software updating system 10*cb*, it may not be possible to identify a normal update module.

Figure 57:
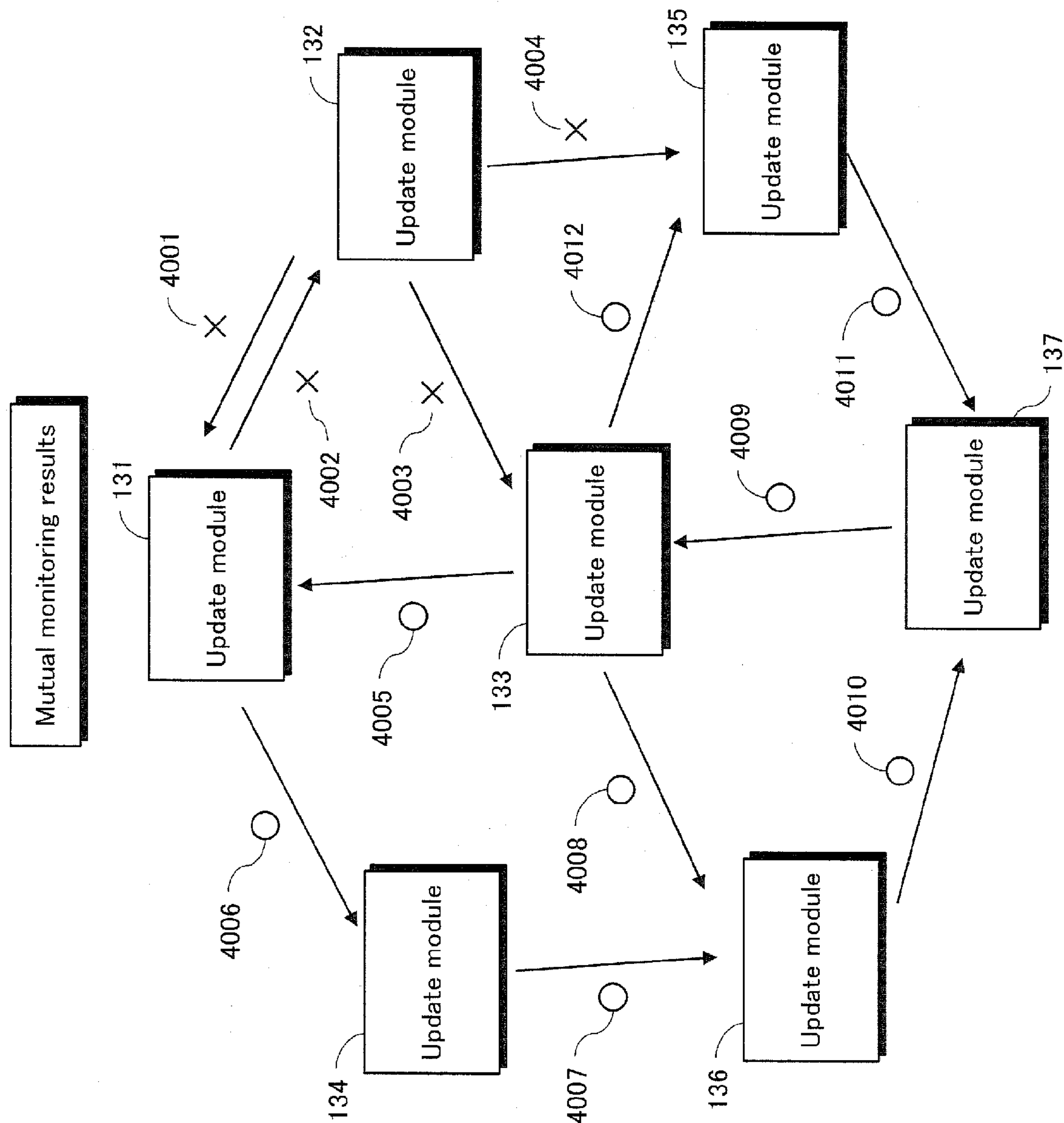
FIG. 57 shows an example of monitoring results.

An example of an update module that blocks identification of a normal module is an update module whose monitoring results are all malicious. FIG. 57 illustrates this example.

FIG. 57 shows monitoring results by the update modules 131-137 included in the update module group 130.

In FIG. 57, the update module 132 monitors the update modules 131, 133, and 135, and the monitoring results by the update module 132 for the update modules 131, 133, and 135 are all malicious (4001, 4003, 4004).

Furthermore, the update module 131 monitors the update module 134, and the monitoring result indicates normal (4006). The update module 133 monitors the update modules 131, 135, and 136, and the monitoring results all indicate normal (4005, 4012, and 4008). The update module 134 monitors the update module 136, and the monitoring result indicates normal (4007). The update module 135 monitors the update module 137, and the monitoring result indicates normal (4011). The update module 136 monitors the update module 137, and the monitoring result indicates normal (4010). The update module 137 monitors the update module 133, and the monitoring result indicates normal (4009).

In this case, the method described in the above Embodiments fails to identify any of the update modules as a malicious update module, since no contradiction occurs in the monitoring results for the update modules.

Furthermore, in this case, no update module is determined to be a malicious update module even when adopting the procedure from steps S9001 to S9013 in FIG. 50 to the normal module identification described in the software updating system 10*cb* of Embodiment 3.

Next, applying the procedure in step S9014, one update module is selected, and applying the procedures from step S9015 to step S9016, an update module assumed to be malicious is added to the assumed malicious update module group. In this case, the monitoring results shown in FIG. 57 indicate that the update module 132 is not included in the assumed malicious update module group. This is because the monitoring results by the update module 132 for the update modules 131, 133, and 135 are all malicious (4001, 4003, 4004). As a result, the update modules 131-137 shown in FIG. 57 cannot be divided only into an assumed malicious update module group and a malicious update module group. The normal module identification described for the software updating system 10*cb* in Embodiment 3, therefore, cannot be applied, and no update module can be identified as a normal update module.

As described, the update module 132 is neither determined to be a malicious update module, nor classified as belonging to the assumed malicious update module group when using the normal module identification method of the software updating system 10*cb*. Accordingly, the normal module identification method in the software updating system 10*cb* cannot be applied to identify a normal module.

In order to identify a normal update module, it might suffice to change the monitoring pattern, receive new monitoring results, and once again perform the normal module identification process. Even if the monitoring pattern is changed and monitoring is performed again, however, if the update module 132 determines that all of the update modules it monitors are malicious, it will similarly not be possible to identify a normal update module.

An update module that always issues malicious monitoring results for all of the update modules it monitors, even when the monitoring pattern is updated and monitoring is performed again, is an update module that has been tampered with and that blocks identification of a normal module (hereinafter referred to as a "blocking module").

4.2 Tampering Monitoring System 10*da*

In order to solve the above problem, a tampering monitoring system 10*da* selected one or more monitoring modules (hereinafter referred to as "candidate blocking modules") that determine all of the monitoring modules monitored thereby to be malicious, identifies any true blocking modules from among the selected candidate blocking modules, and excludes the identified blocking modules. By thus excluding the blocking modules that have been tampered with and that operate maliciously, a normal monitoring module is efficiently identified from among the remaining plurality of monitoring modules. The identified normal monitoring module is then effectively used.

Figure 78:
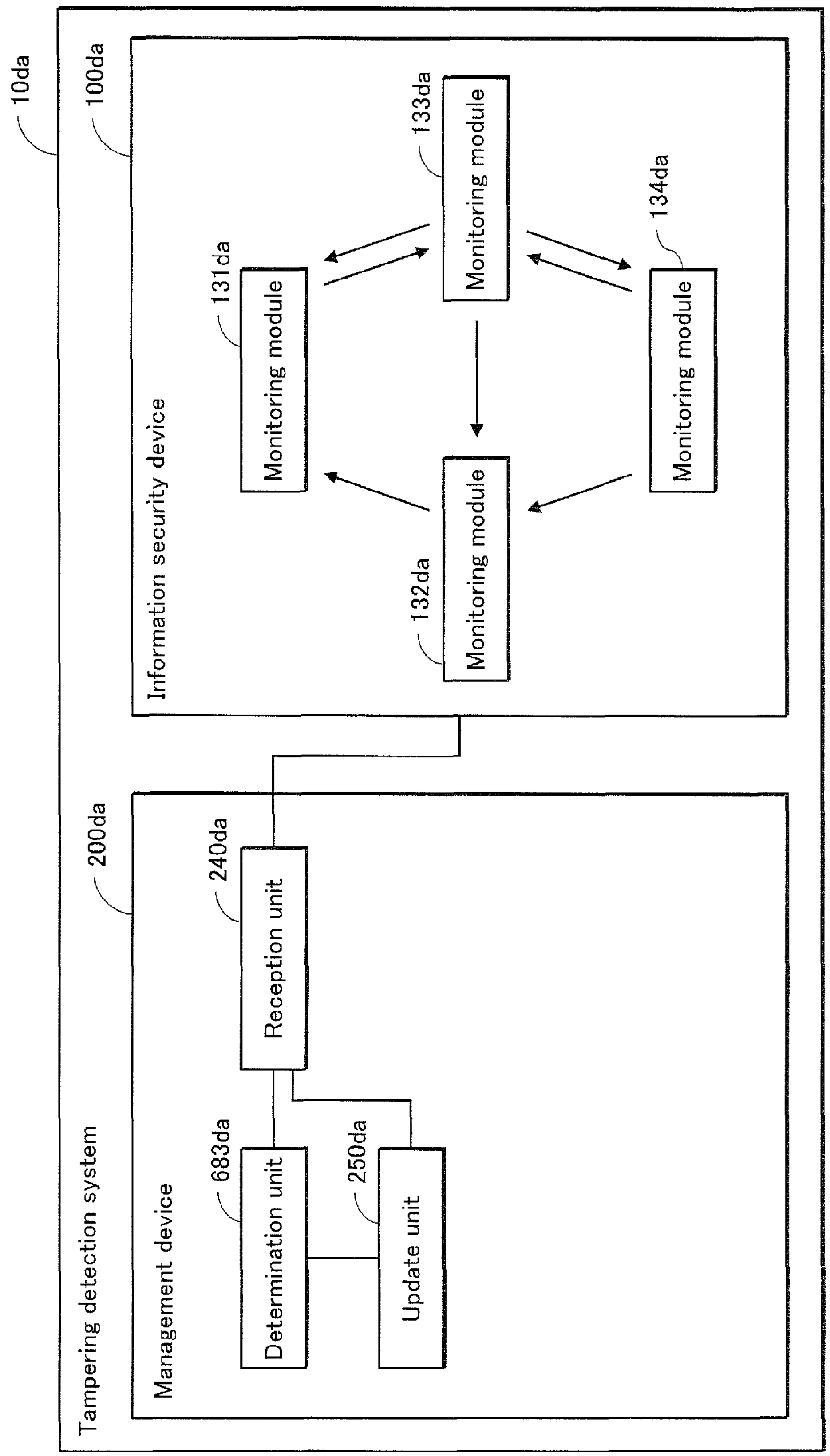
FIG. 78 is a block diagram showing a structure of a tampering monitoring system 10*da* according to Embodiment 4 of the present invention.

With reference to the configuration diagram in FIG. 78, the following describes the tampering monitoring system 10*da* as another Embodiment.

As shown in FIG. 78, the tampering monitoring system 10*da* includes an information security device 100*da* and a management device 200*da*.

The information security device 100*da* includes a plurality of monitoring modules 131*da*, 132*da*, 133*da*, and 134*da* that monitor for tampering.

The management device 200*da* includes a reception unit 240*da*, a determination unit 683*da*, and an update unit 250*da*. The reception unit 240*da* receives, from the information security device 100*da*, a plurality of monitoring results generated by the monitoring modules each monitoring one or more of the other monitoring modules. The determination unit 683*da* refers to the received monitoring results to select, from among the monitoring modules, a candidate blocking module that determines one or more candidate blocking modules that determine all other monitoring modules monitored thereby to be malicious. The update unit 250*da* generates, when a plurality of the candidate blocking modules are selected, a new monitoring pattern in which the candidate blocking modules monitor each other, to transmit the new monitoring pattern to the information security device 100*da*, and to cause the information security device 100*da* to adopt the new monitoring pattern. The reception unit 240*da* further receives, from the information security device 100*da*, new monitoring results generated in accordance with the new monitoring pattern. The determination unit 683*da* furthermore identifies each candidate blocking module as a blocking module after excluding, from the candidate blocking modules, two candidate blocking modules that determine each other to be normal and determine all other candidate blocking modules to be malicious.

Since a blocking module is thus identified, the identified blocking module may be deactivated.

The determination unit 683*da* may identify, by referring to newly received monitoring results, a first candidate blocking module as a malicious update module that has been tampered with when the first candidate blocking module determines that a second candidate blocking module is normal, whereas the second candidate blocking module determines that the first candidate blocking module is malicious.

4.3 Software Updating System 10*db*

The following describes the software updating system 10*db* as another Embodiment.

In order to solve the problem in Embodiment 3, the software updating system 10*db* selects one or more monitoring modules (hereinafter referred to as "candidate blocking modules") that determine all of the monitoring modules monitored thereby to be malicious, identifies any true blocking modules from among the selected candidate blocking modules, and excludes the identified blocking modules. By thus excluding blocking modules that have been tampered with and operate maliciously, a normal update module can efficiently be identified from among the remaining plurality of update modules, and the protection control module can be securely updated using the identified normal update module.

Note that the software updating system 10*db* is described as having seven update modules, as in Embodiments 2 and 3. However, the number of update modules may be eight or greater, or six or fewer.

(1) Structure of Software Updating System 10*db*

Figure 53:
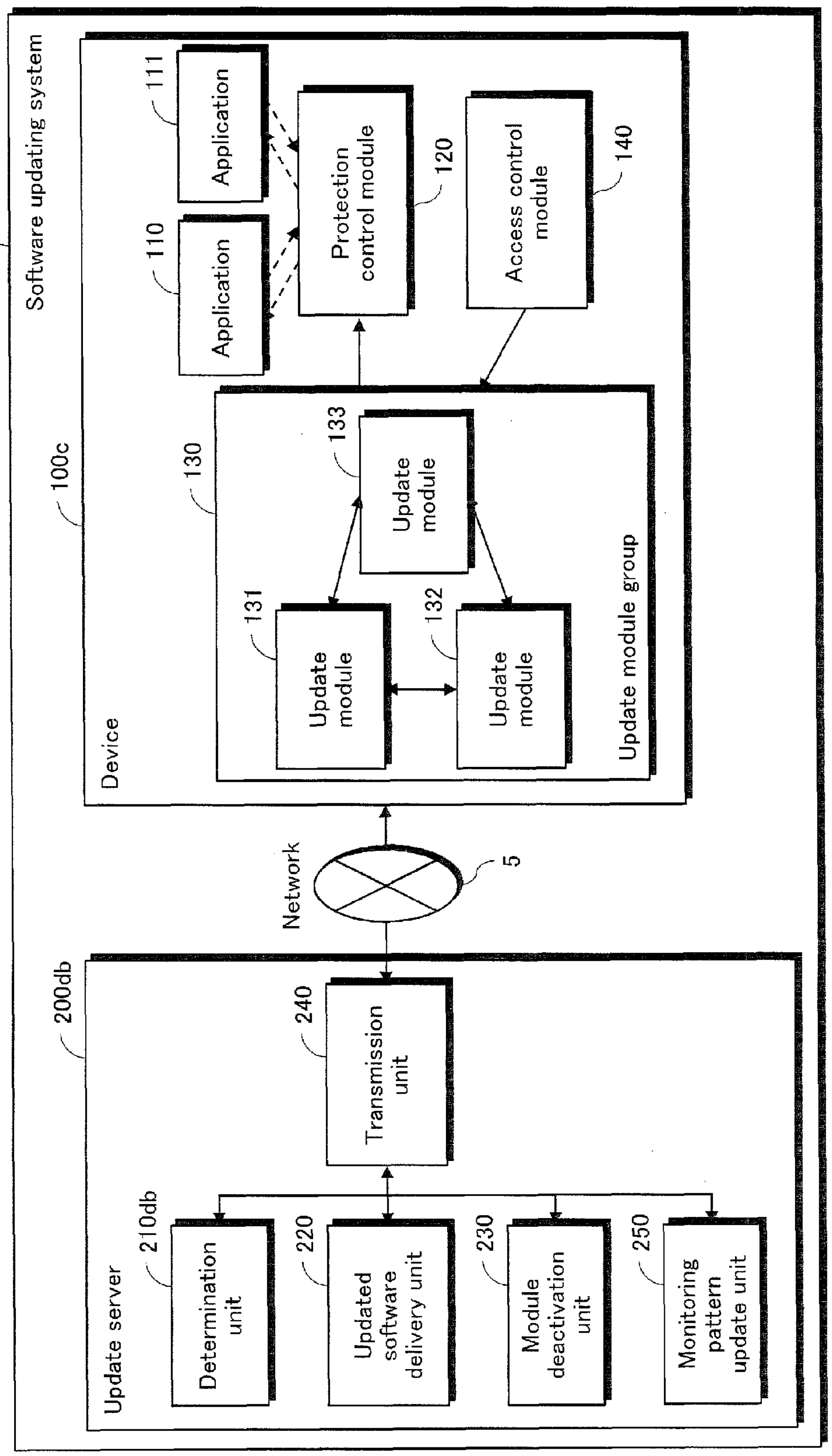
FIG. 53 is a configuration diagram showing a structure of a software updating system 10*db*.

As shown in FIG. 53, the software updating system 10*db* includes an update server 200*db* and a device 100*db*. The device 100*db* has the same structure as the device 100 in Embodiment 1. The update server 200*db* has a similar structure to the update server 200 in Embodiment 1 and includes a determination unit 210*db*, an updated software delivery unit 220, a module deactivation unit 230, a transmission unit 240, and a monitoring pattern update unit 250.

The updated software delivery unit 220, the module deactivation unit 230, and the transmission unit 240 are the same as the respective units in the update server 200. The determination unit 210*db* has a similar structure to the determination unit 210*cb* of the update server 200*cb* in the software updating system 10*cb*.

The following description centers on the determination unit 210*db* and the monitoring pattern update unit 250.

(2) Structure of Monitoring Pattern Update Unit 250

When the monitoring pattern of the update module group 130 in the device 100*db* is to be updated, the monitoring pattern update unit 250 generates, in response to a monitoring pattern update instruction from the determination unit 210*db*, new monitoring patterns to update the monitoring pattern in each update module in the update module group 130 and transmits the generated monitoring patterns to the update modules.

Figure 54:
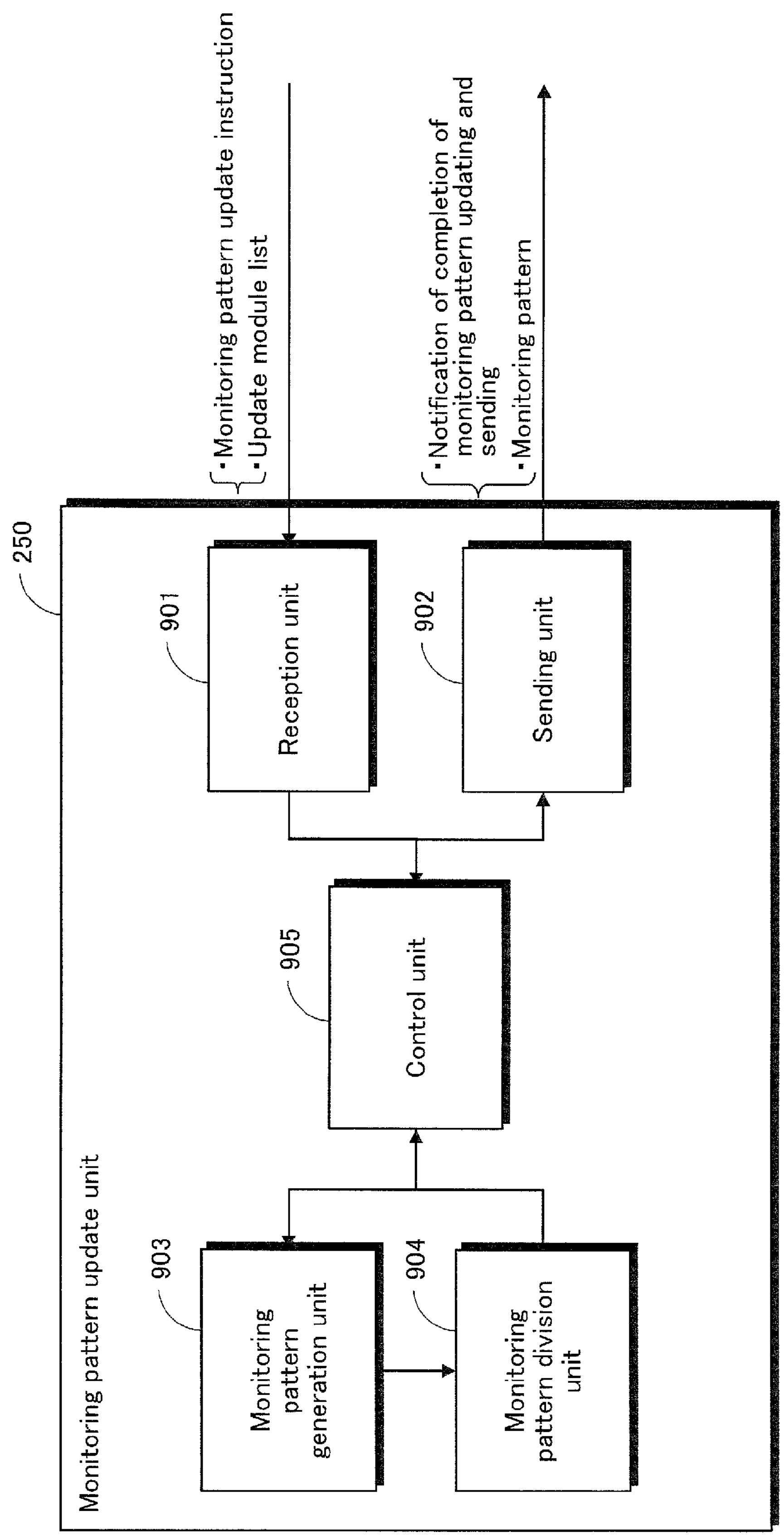
FIG. 54 is a configuration diagram showing a structure of a monitoring pattern update unit 250 in the software updating system 10*db*.

As shown in FIG. 54, the monitoring pattern update unit 250 includes a reception unit 901, a sending unit 902, a monitoring pattern generation unit 903, a monitoring pattern division unit 904, and a control unit 905.

(a) Reception Unit 901

The reception unit 901 receives, from the determination unit 210*db*, a generation instruction indicating generation of a monitoring pattern and an update module list at the time of the instruction. The update module list includes identifiers for all of the update modules in the update module group 130 of the device 100*db*. When any candidate blocking modules exist, the reception unit 901 receives the identifiers corresponding to the candidate blocking modules.

The reception unit 901 transmits the received monitoring pattern generation instruction to the control unit 905. The reception unit 901 also transmits the received update module list to the monitoring pattern generation unit 903 via the control unit 905. In the case of having received any identifiers corresponding to candidate blocking modules, the reception unit 901 also transmits the received identifiers to the monitoring pattern generation unit 903 via the control unit 905.

(b) Monitoring Pattern Generation Unit 903

The monitoring pattern generation unit 903 receives the update module list from the reception unit 901 via the control unit 905. When any candidate blocking modules exist, the reception unit 901 receives the identifiers corresponding to the candidate blocking modules.

Upon receiving the update module list, the monitoring pattern generation unit 903 refers to the received update module list to determine which update module will monitor which update module, thereby generating an overall monitoring pattern for the update module group 130 in the device 100*db*.

In particular, the monitoring pattern generation unit 903 generates the overall monitoring pattern by referring to the received identifiers of the candidate blocking modules so that each of the candidate blocking modules monitors all other candidate blocking modules, i.e. generates a mutual monitoring pattern between candidate blocking modules.

A specific example of a mutual monitoring pattern between candidate blocking modules is described below.

Note that the monitoring pattern generation unit 903 may select an overall monitoring pattern in which, for example, all of the update modules monitor all of the other update modules.

The monitoring pattern generation unit 903 transmits the generated overall monitoring pattern to the monitoring pattern division unit 904.

(c) Monitoring Pattern Division Unit 904

The monitoring pattern division unit 904 receives the overall monitoring pattern from the monitoring pattern generation unit 903.

Upon receiving the overall monitoring pattern, the monitoring pattern division unit 904 divides the received monitoring pattern into a monitoring pattern for each update module. Next, the monitoring pattern division unit 904 transmits the update module monitoring patterns thus produced by division to the update modules in the device 100*db* via the control unit 905, the sending unit 902, the transmission unit 240, and the network 5.

(d) Sending Unit 902

The sending unit 902 sends the new update module monitoring patterns to the device 100*db* via the sending unit 902, the transmission unit 240, and the network 5. The sending unit 902 also notifies the determination unit 210*db* of completion of generation of the new monitoring patterns and sending.

(d) Control Unit 905

The control unit 905 receives the monitoring pattern generation instruction from the reception unit 901.

Upon receiving the monitoring pattern generation instruction, the control unit 905 causes the monitoring pattern generation unit 903 and the monitoring pattern division unit 904 to update the monitoring patterns in the device 100*db* by generating an overall monitoring pattern for the update module group 130 in the device 100*db*, generating a new monitoring pattern for each update module, and transmitting the new update module monitoring patterns to the device 100*db*.

(3) Structure of Determination Unit 210*db*

Figure 55:
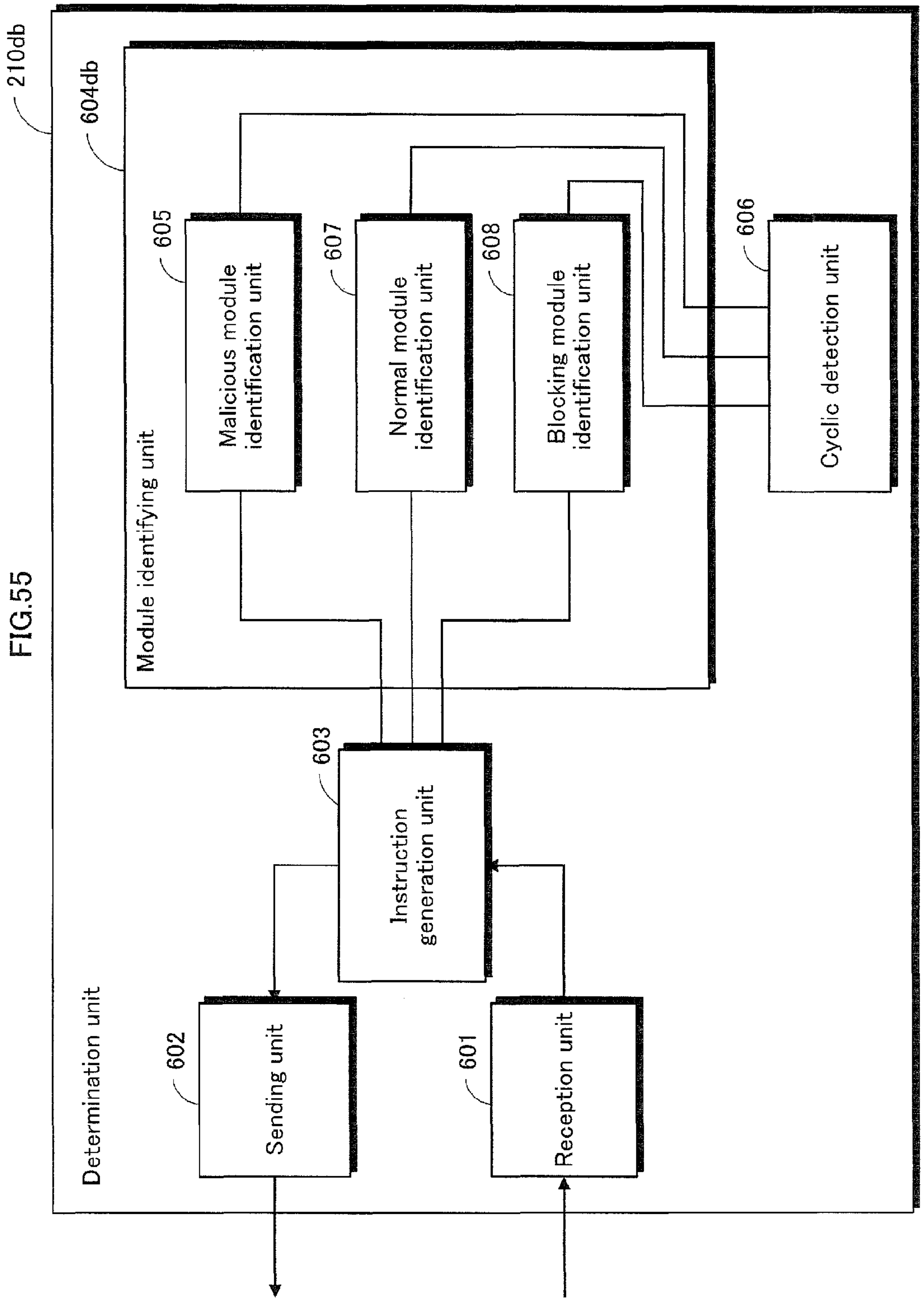
FIG. 55 is a configuration diagram showing a structure of a determination unit 210*cb* in the software updating system 10*db*.

As shown in FIG. 55, the determination unit 210*db* includes a reception unit 601, a sending unit 602, an instruction generation unit 603, a module identifying unit 604*db*, and a cyclic detection unit 606. The module identifying unit 604*db* includes a malicious module identification unit 605, a normal module identification unit 607, and a blocking module identification unit 608.

The reception unit 601, the sending unit 602, the instruction generation unit 603, and the cyclic detection unit 606 are the same as the respective units included in the determination unit 210*cb* of the update server 200*cb* in the software updating system 10*cb*.

The instruction generation unit 603 transmits, via the sending unit 602, an instruction to generate a monitoring pattern to the monitoring pattern update unit 250.

The malicious module identification unit 605 and the normal module identification unit 607 are the same as the respective units included in the module identifying unit 604*cb* in the determination unit 210*cb* of the update server 200*cb* in the software updating system 10*cb*.

The following describes the blocking module identification unit 608.

(4) Structure of Blocking Module Identification Unit 608

The blocking module identification unit 608 determines whether there are any update modules that have been tampered with and that might operate maliciously.

As shown in FIG. 56, the blocking module identification unit 608 includes an identification instruction reception unit 681, an identification result transmission unit 682, a detection result determination unit 683, a monitoring pattern update instruction generation unit 684, and a detection result reception unit 685.

(a) Identification Instruction Reception Unit 681

The identification instruction reception unit 681 receives, from the instruction generation unit 603, a blocking identification instruction indicating to identify an update module that blocks identification of a normal module and monitoring results by update modules in the device 100*db*. The identification instruction reception unit 681 transmits the received monitoring results to the detection result determination unit 683.

(b) Detection Result Reception Unit 685

The detection result reception unit 685 receives, from the instruction generation unit 603, the monitoring results after updating of the monitoring patterns for the update module group 130 in the device 100*db* and transmits the received monitoring results after updating to the detection result determination unit 683.

(c) Detection Result Determination Unit 683

The detection result determination unit 683 receives the monitoring results from the identification instruction reception unit 681 and determines, by referring to the received monitoring results, whether there is a possibility that any update modules that block identification of a normal module exist. In other words, the detection result determination unit 683 determines whether any candidate blocking modules exist. A candidate blocking module is an update module that determines every update module monitored thereby to be malicious. Details on the determination of whether a candidate blocking module exists are provided below.

When determining that no candidate blocking module exists, the detection result determination unit 683 notifies the identification result transmission unit 682 that no candidate blocking module exists.

When determining that one or more candidate blocking modules exist, then in order to determine whether each candidate blocking module is a true blocking module, the detection result determination unit 683 transmits the identifier of each candidate blocking module to the monitoring pattern update instruction generation unit 684 and requests updating of the monitoring patterns. This is in order to determine whether the candidate blocking module has been tampered with and blocks identification of a normal module, or whether the candidate blocking module is a normal update module correctly monitoring a malicious update module. Details are described below.

After the monitoring patterns of the update module group 130 in the device 100*db* have been updated, the detection result determination unit 683 receives, from the detection result reception unit 685, monitoring results after updating of the monitoring patterns and determines whether each update module identified as possibly being malicious is in fact a malicious update module. The detection result determination unit 683 transmits the determination results to the identification result transmission unit 682 and issues a request to update the monitoring patterns of the update module group 130 to the monitoring pattern update instruction generation unit 684.

(d) Monitoring Pattern Update Instruction Generation Unit 684

The monitoring pattern update instruction generation unit 684 receives, from the detection result determination unit 683, the identifier of each update module identified as possibly being malicious and receives a request to update the monitoring patterns. The monitoring pattern update instruction generation unit 684 then transmits, to the instruction generation unit 603, an instruction to update the monitoring patterns so that each update module identified by the received identifiers monitors all other identified update modules. When only receiving a request to update the monitoring pattern, the monitoring pattern update instruction generation unit 684 transmits an instruction to update the monitoring patterns to the instruction generation unit 603.

(e) Identification Result Transmission Unit 682

The identification result transmission unit 682 receives the identification result of update modules that block identification of a normal module from the detection result determination unit 683 and transmits the identification result to the instruction generation unit 603.

(4) Operations of Software Updating System 10*db*

The following describes operations of the software updating system 10*db* with reference to the operational diagram in FIG. 58. In particular, the flow of processing from blocking module identification through normal module identification is described.

In order to identify a normal update module, a plurality of update modules in the update module group 130 monitor each other, and the device 100*db* transmits the monitoring results to the update server 200*db*. The update server 200*db* receives the monitoring results and determines whether any update modules (referred to, as above, as "candidate blocking modules") that generate a monitoring result of "malicious" for all of the update modules monitored thereby exist (S10001). When any candidate blocking modules exist, the update server 200*db* selects all of the candidate blocking modules from the update module group 130 (S10002). Next, in order to determine whether the selected candidate blocking modules are actually blocking modules, the update server 200*db* generates a new monitoring pattern in which each candidate blocking module monitors all other candidate blocking modules. The update server 200*db* then transmits the new monitoring patterns to the update modules in the device 100*db* and causes the device 100*db* to adopt the new monitoring patterns (S10003).

The update modules in the device 100*db* monitor one another in accordance with the new monitoring patterns. In particular, the candidate blocking modules each monitor all other candidate blocking modules. The update server 200*db* receives, from the device 100*db*, monitoring results generated in accordance with the new monitoring patterns and determines, by referring to the received monitoring results, whether each candidate blocking module is a blocking module. A blocking module always determines a monitored update module to be malicious, whereas a normal update module determines a normal update module to be normal. Therefore, when a plurality of normal update modules exist among a candidate blocking module group, the monitoring results between normal candidate blocking modules are normal. On the other hand, monitoring results by candidate blocking modules for candidate blocking modules other than the normal candidate blocking modules are all malicious. Accordingly, when determining if a candidate blocking module is a blocking module, two candidate blocking modules are determined not to be blocking modules when (i) the two candidate blocking modules generate a monitoring result of "normal" for each other, and (ii) the two candidate blocking modules that determine each other to be normal determine, via monitoring, all other candidate blocking modules to be malicious. Any candidate blocking module not satisfying these two conditions is identified as a blocking module, since such a candidate blocking module always determines all other candidate blocking modules to be malicious (S10004).

When candidate blocking modules satisfy the above conditions, the update server 200*db* selects any candidate blocking module not satisfying the conditions and identifies the selected candidate blocking module as a blocking module (S10005). The update server 200 then transmits an instruction to the device 100*db* so that the module deactivation unit 230 deactivates the identified blocking module (S10006).

When no candidate blocking module satisfies the above conditions, all of the candidate blocking module are blocking modules, and therefore the module deactivation unit 230 in the update server 200*db* transmits an instruction to the device 100*db* to deactivate the identified blocking modules (S10006).

Next, the update server 200*db* updates the monitoring patterns of all of the update modules (S10007), and the update modules perform mutual monitoring (S10001). The update server 200*db* receives the monitoring results for the update module group 130, and when no candidate blocking module exists, performs processing for normal module identification (S10008) and identifies a normal module (S10009).

As described above, by deactivating and excluding a blocking module that blocks identification of a normal module, the efficiency of identification of a normal update module is improved.

In the above description, the processing from step S10001 through step S10006 is the blocking module identification process.

Figure 59:
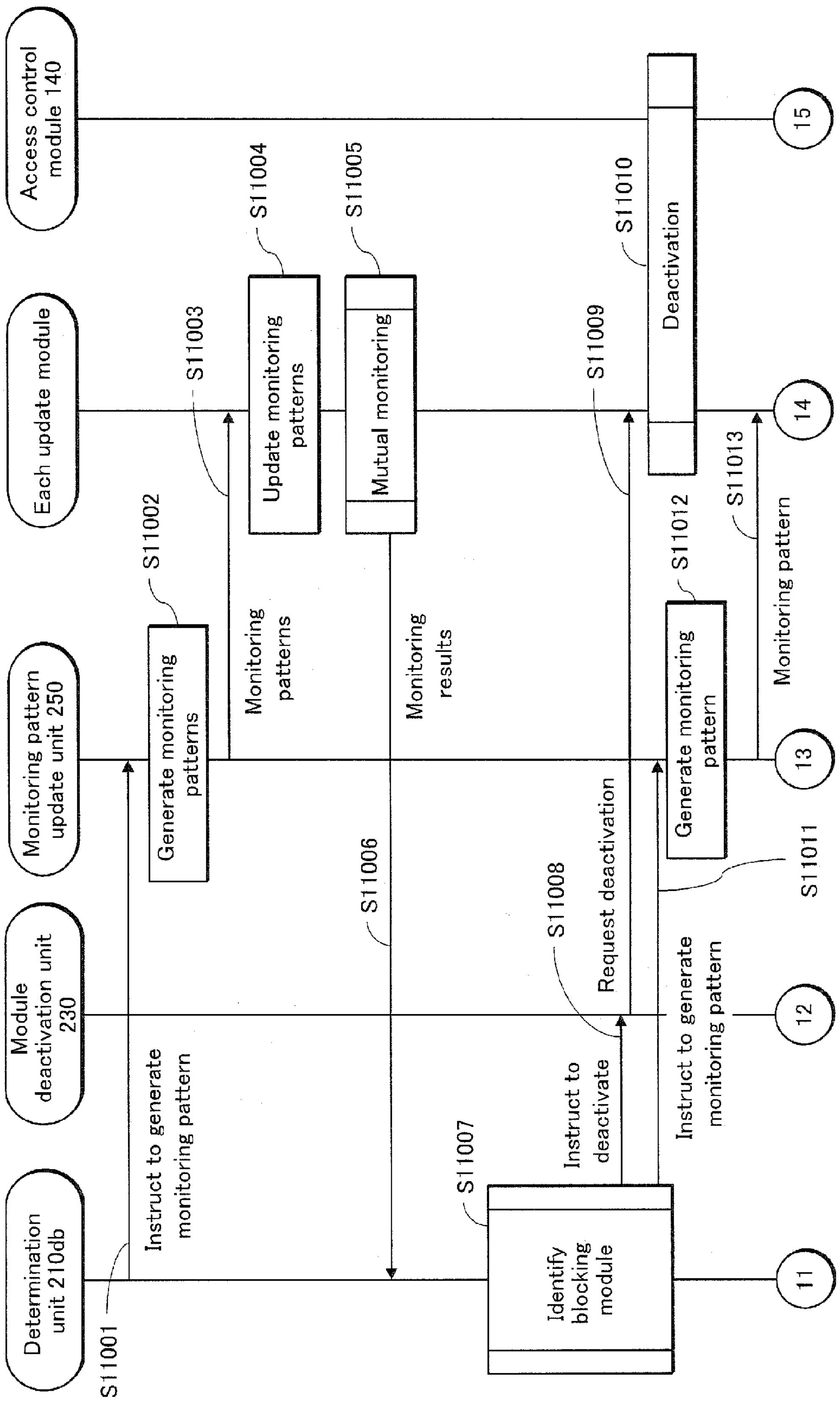
FIG. 59 is a sequence diagram showing operations for blocking module identification and normal module identification in the software updating system 10*db*, and is continued in FIG. 60.
Figure 60:
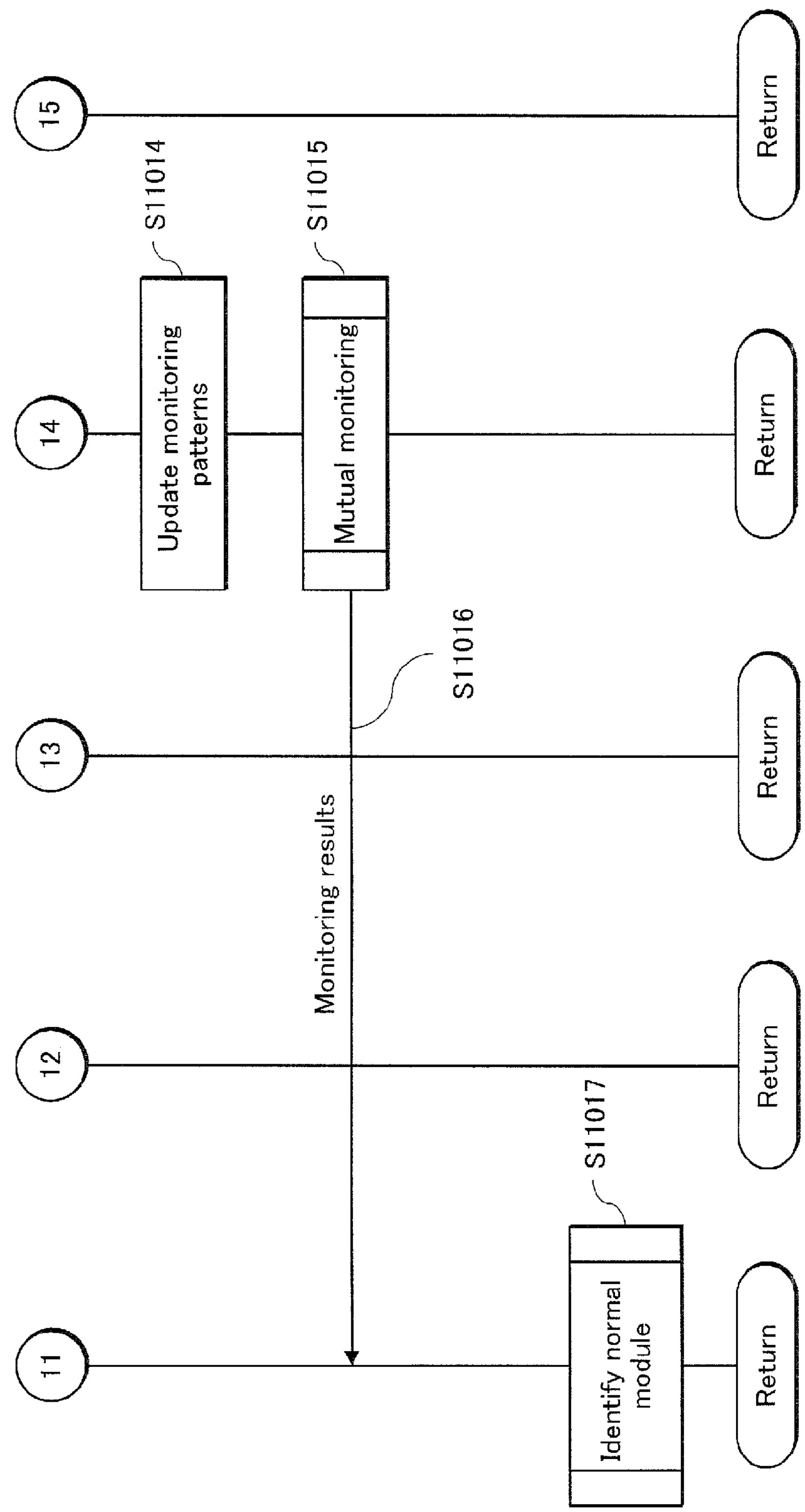
FIG. 60 is a sequence diagram showing operations for blocking module identification and normal module identification in the software updating system 10*db*, and is continued from FIG. 59.

(5) Sequence for Blocking Module Identification and Normal Module Identification The following describes the sequence for blocking module identification and normal module identification with reference to the sequence diagrams in FIGS. 59 and 60.

The instruction generation unit 603 in the determination unit 210*db* transmits a monitoring pattern generation instruction to the monitoring pattern update unit 250. The monitoring pattern update unit 250 receives the monitoring pattern generation instruction (S11001). The monitoring pattern generation unit 903 in the monitoring pattern update unit 250 generates a new overall monitoring pattern, and the monitoring pattern division unit 904 divides the new overall monitoring pattern into monitoring patterns for each of the update modules (S11002). The monitoring pattern update unit 250 transmits the update module monitoring patterns to the update modules in the device 100*db* via the transmission unit 240 and the network 5. The update modules in the update module group 130 of the device 100*db* receive the monitoring patterns (S11003).

The update modules in the update module group 130 update old monitoring patterns by overwriting the old monitoring patterns with the received, new monitoring patterns (S11004). After updating to the new monitoring patterns, the update modules in the update module group 130 perform monitoring in accordance with the new monitoring patterns to perform tampering detection in accordance with the monitoring patterns as per mutual monitoring in Embodiment 1 (S11005). Note that the determination of whether an update module that has been tampered with exists as in Embodiment 1 (S5004 in FIG. 19) is not performed. Next, the device 100*db* transmits the monitoring results to the determination unit 210*db* via the network 5 and the transmission unit 240, and the determination unit 210*db* receives the monitoring results (S11006).

The determination unit 210*db* performs blocking module identification (S11007). Details on blocking module identification are provided below. When a blocking module is identified during blocking module identification, the determination unit 210*db* transmits the identifier of the identified blocking module to the module deactivation unit 230 along with a deactivation instruction (S11008). The module deactivation unit 230 transmits the identifier of the identified blocking module along with a deactivation request to an update module in the update module group 130 (S11009). In coordination with the access control module 140, the update module that receives the deactivation request deactivates the blocking module by referring to the received identifier that identifies the blocking module (S11010). Note that deactivation is the same as in Embodiment 1, and therefore details thereof are omitted. During blocking module identification, the determination unit 210*db* transmits a monitoring pattern generation instruction. The monitoring pattern update unit 250 receives the monitoring pattern generation instruction (S11011).

Based on the received monitoring pattern generation instruction, the monitoring pattern generation unit 903 in the monitoring pattern update unit 250 generates a new overall monitoring pattern, and the monitoring pattern division unit 904 divides the new overall monitoring pattern into monitoring patterns for each of the update modules (S11012). The monitoring pattern update unit 250 transmits the update module monitoring patterns to the update modules in the device 100*db* via the transmission unit 240 and the network 5. The update modules in the update module group 130 of the device 100*db* receive the update module monitoring patterns (S11013).

Each of the update modules in the update module group 130 of the device 100*db* updates the monitoring pattern therein to the new monitoring pattern (S11014). After updating to the new monitoring patterns, the update modules perform mutual monitoring (S11015). The device 100*db* transmits the monitoring results, and the determination unit 210*db* receives the monitoring results (S11016).

The determination unit 210*db* performs normal module identification (S11017). Note that normal module identification is the same as in Embodiment 3, and therefore details thereof are omitted.

(6) Example of Mutual Monitoring Pattern

An example of a mutual monitoring pattern is described with reference to the mutual monitoring pattern shown in FIG. 65.

Figure 65:
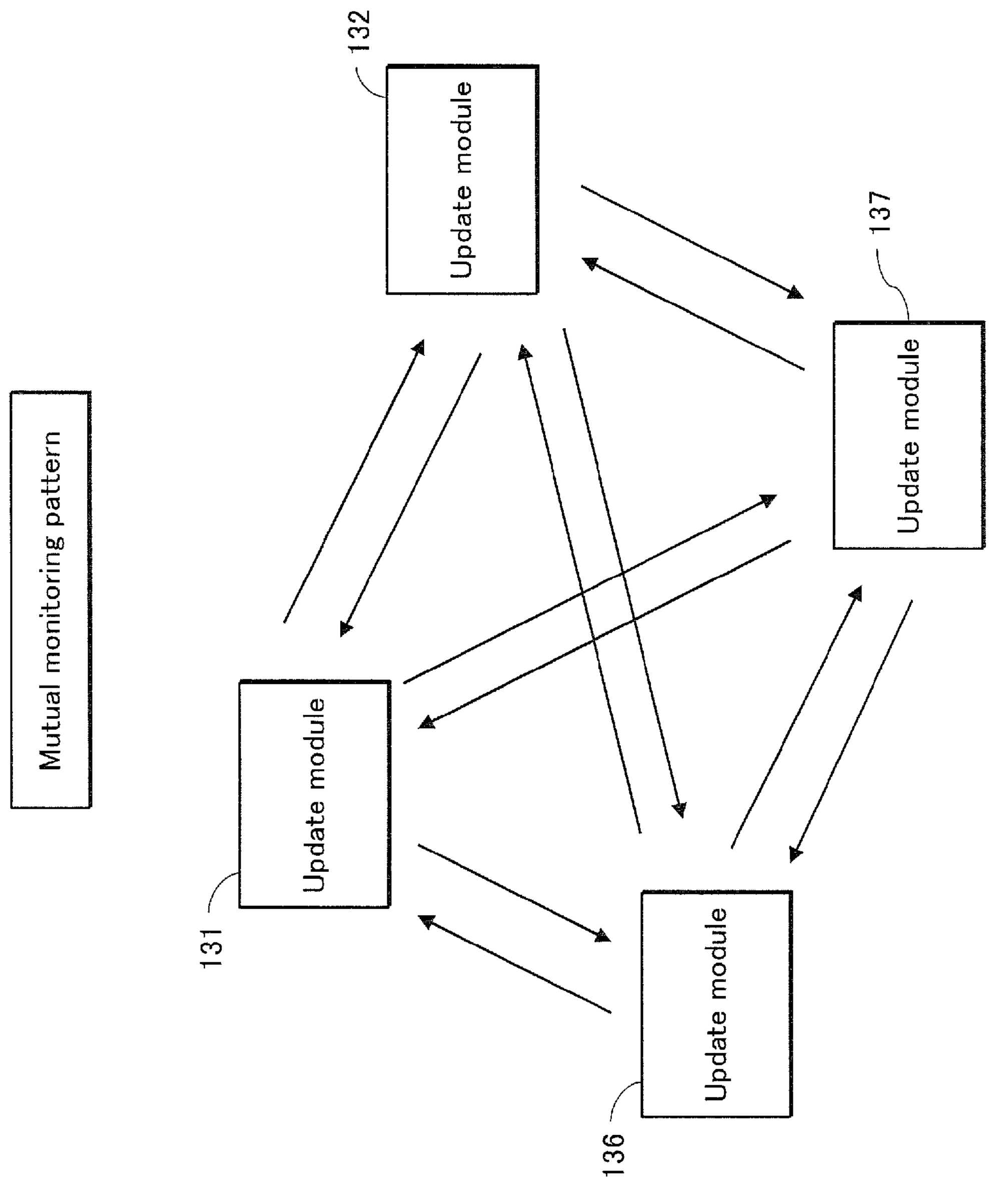
FIG. 65 shows an example of a monitoring pattern in the software updating system 10*db*.

FIG. 65 shows an example in which four candidate blocking modules monitor each other. As shown in this figure, the update modules 131, 132, 136, and 137 have all been selected as candidate blocking modules.

Furthermore, since the update modules 131, 132, 136, and 137 have been selected as candidate blocking modules, the monitoring pattern update unit 250 generates update module monitoring patterns whereby the update modules 131 and 132 monitor each other, the update modules 132 and 137 monitor each other, the update modules 137 and 136 monitor each other, the update modules 136 and 131 monitor each other, and the update modules 137 and 131 monitor each other. The monitoring pattern update unit 250 transmits the update module monitoring patterns to the update modules 131, 132, 136, and 137, and the update modules 131, 132, 136, and 137 change their respective old monitoring patterns to the received new monitoring patterns, monitoring each other thereafter in accordance with the new monitoring patterns.

(7) Example of Mutual Monitoring Results for Mutual Monitoring Patterns

Examples of mutual monitoring results when using the example mutual monitoring patterns shown in FIG. 65 are described with reference to FIGS. 66-69.

Note that as described in FIG. 65, the update modules 131, 132, 136, and 137, which are candidate blocking modules, monitor each other.

(a) Example 1 of Mutual Monitoring Results

Figure 66:
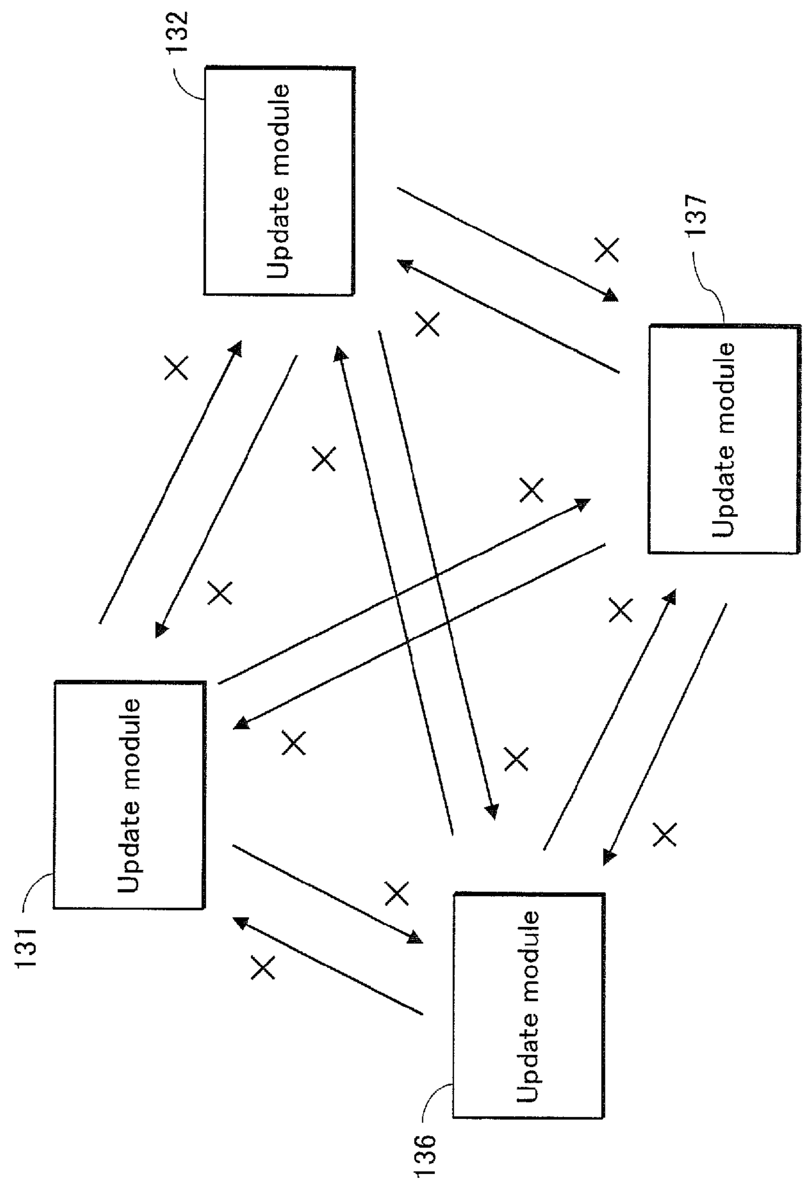
FIG. 66 shows an example of mutual monitoring results in the software updating system 10*db*.

FIG. 66 shows example 1 of mutual monitoring results when using the mutual monitoring pattern shown in FIG. 65.

In example 1 shown in FIG. 66, all of the monitoring results are malicious. In other words, the update modules 131, 132, 136, and 137 all determine all of the other update modules to be malicious.

(b) Example 2 of Mutual Monitoring Results

Figure 67:
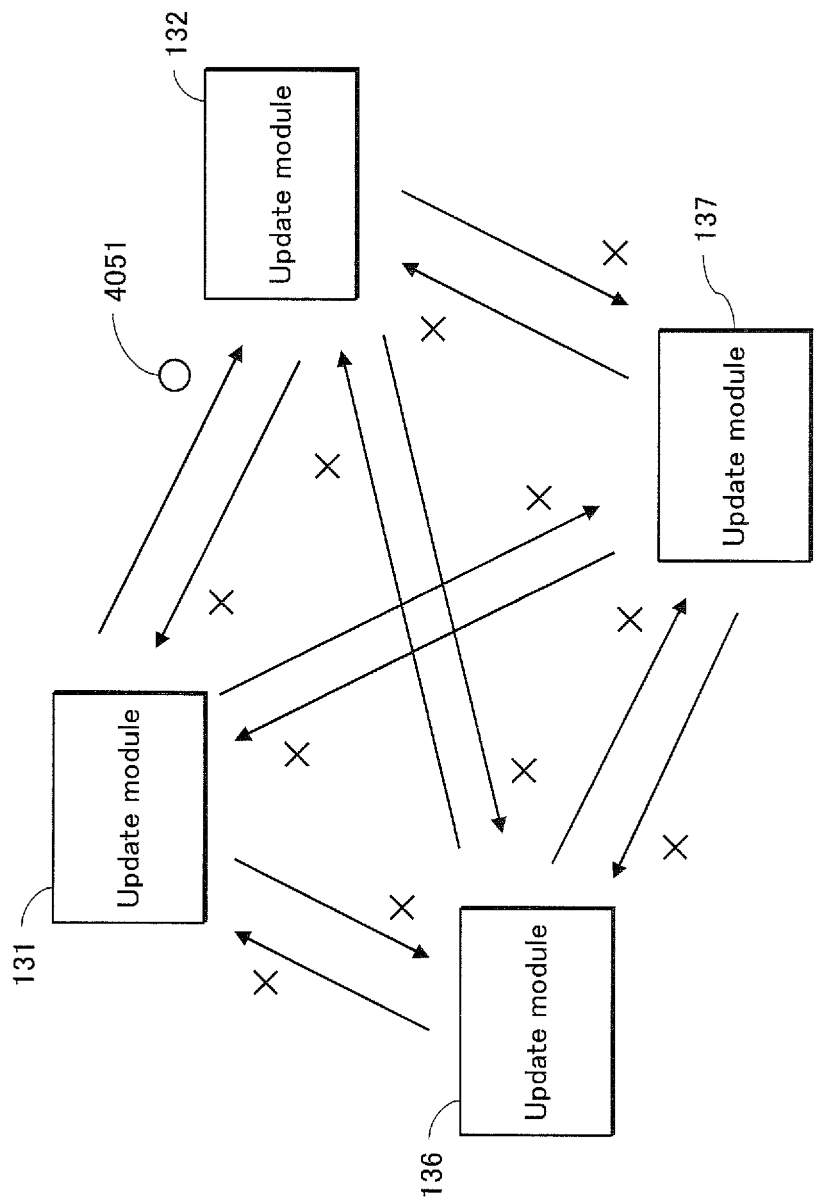
FIG. 67 shows another example of mutual monitoring results in the software updating system 10*db*.

FIG. 67 shows example 2 of mutual monitoring results when using the mutual monitoring pattern shown in FIG. 65.

In example 2 shown in FIG. 67, all of the monitoring results are malicious, except for the monitoring result (4051) by the update module 131 for the update module 132.

In other words, the update module 131 determines the update module 132 to be normal (4051), whereas the update module 132 determines the update module 131 to be malicious. The following modules also determine each other to be malicious: update modules 131 and 137, update modules 132 and 137, update modules 132 and 136, update modules 131 and 136, and update modules 136 and 137.

(c) Example 3 of Mutual Monitoring Results

Figure 68:
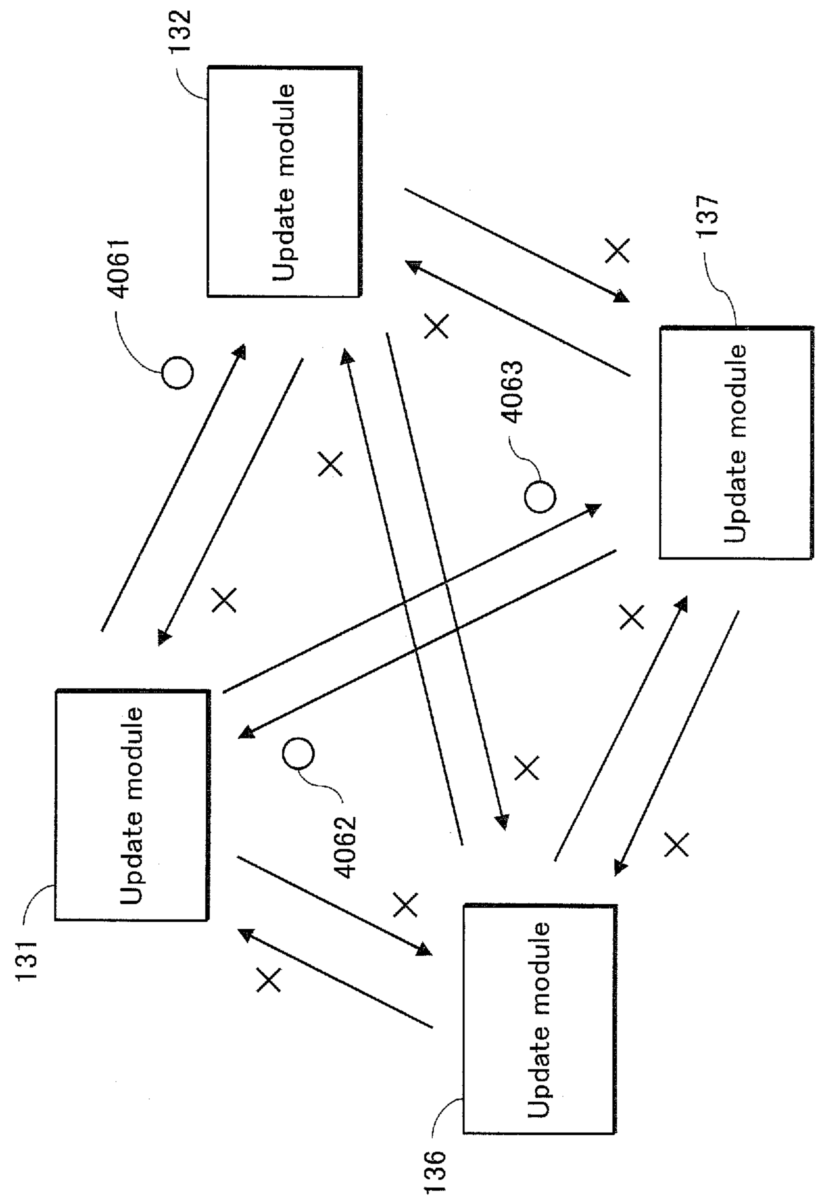
FIG. 68 shows yet another example of mutual monitoring results in the software updating system 10*db*.

FIG. 68 shows example 3 of mutual monitoring results when using the mutual monitoring pattern shown in FIG. 65.

In example 3 shown in FIG. 68, all of the monitoring results are malicious, except for the monitoring result (4061) by the update module 131 for the update module 132, the monitoring result (4063) by the update module 131 for the update module 137, and the monitoring result (4062) by the update module 137 for the update module 131.

In other words, the update module 131 determines the update module 132 to be normal (4061), whereas the update module 132 determines the update module 131 to be malicious. The update module 131 determines the update module 137 to be normal (4063), and the update module 137 determines the update module 131 to be normal (4062). Furthermore, the following modules determine each other to be malicious: update modules 132 and 137, update modules 132 and 136, update modules 132 and 136, update modules 131 and 136, and update modules 136 and 137.

(d) Example 4 of Mutual Monitoring Results

Figure 69:
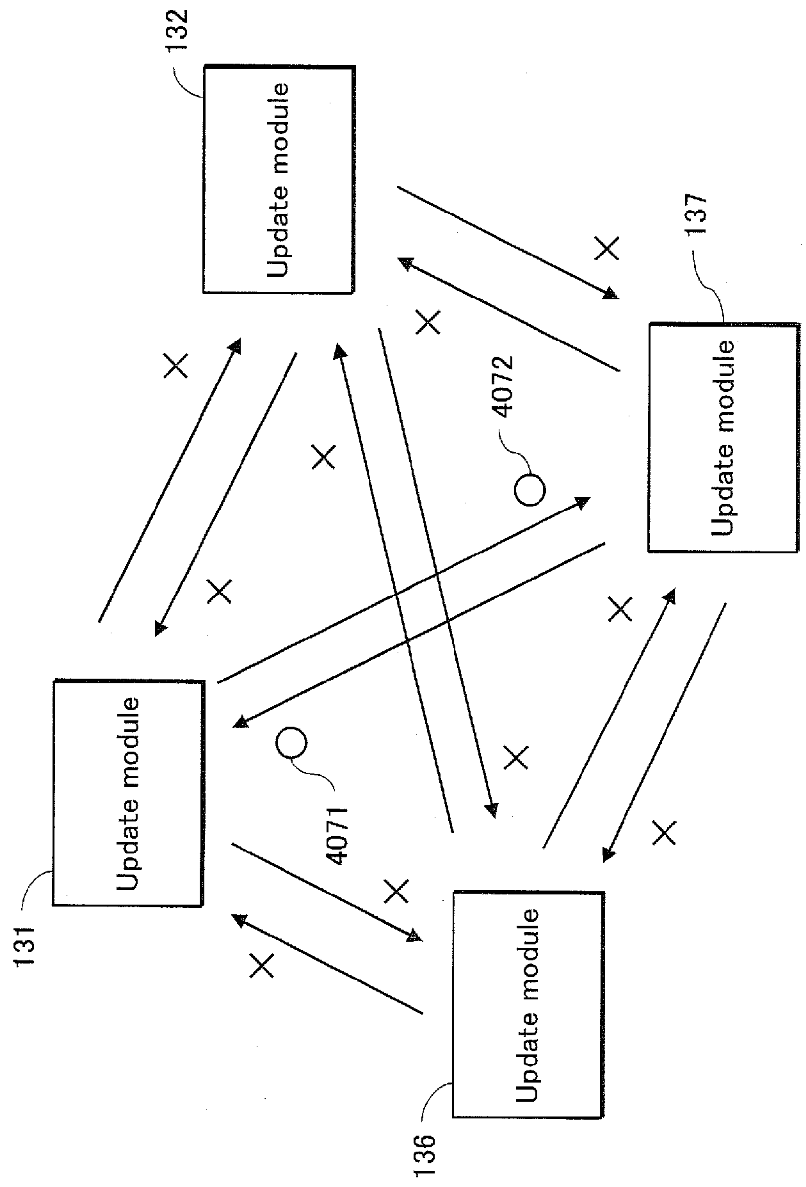
FIG. 69 shows yet another example of mutual monitoring results in the software updating system 10*db*.

FIG. 69 shows example 4 of mutual monitoring results when using the mutual monitoring pattern shown in FIG. 65.

In example 4 shown in FIG. 69, all of the monitoring results are malicious, except for the monitoring result (4072) by the update module 131 for the update module 137 and the monitoring result (4071) by the update module 137 for the update module 131.

In other words, the update module 131 determines the update module 137 to be normal (4072), and the update module 137 determines the update module 131 to be normal (4071). The following modules determine each other to be malicious: update modules 131 and 132, update modules 132 and 137, update modules 132 and 136, update modules 131 and 136, and update modules 136 and 137.

(8) Details on Operations for Blocking Module Identification

Figure 61:
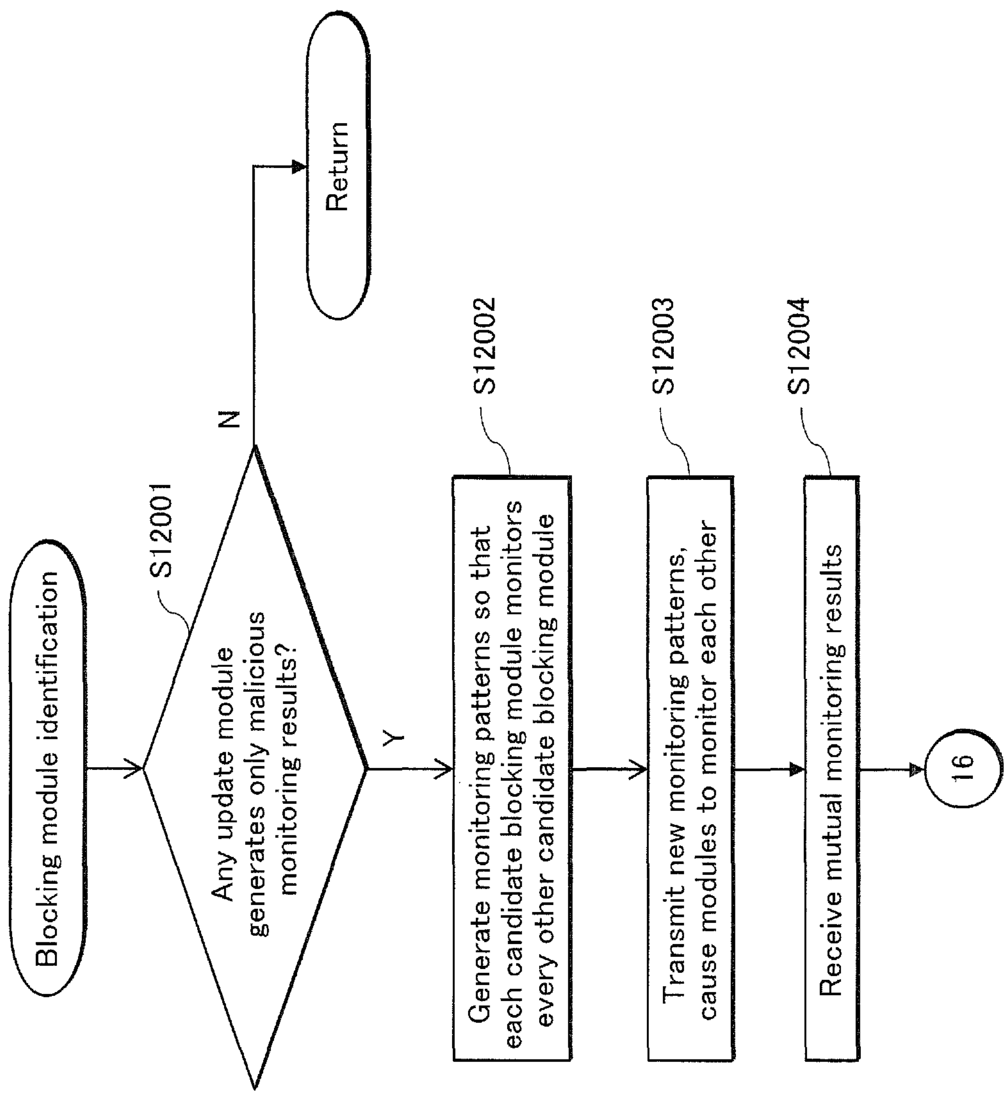
FIG. 61 is a flowchart showing blocking module identification in the software updating system 10*db*, and is continued in FIG. 62.
Figure 62:
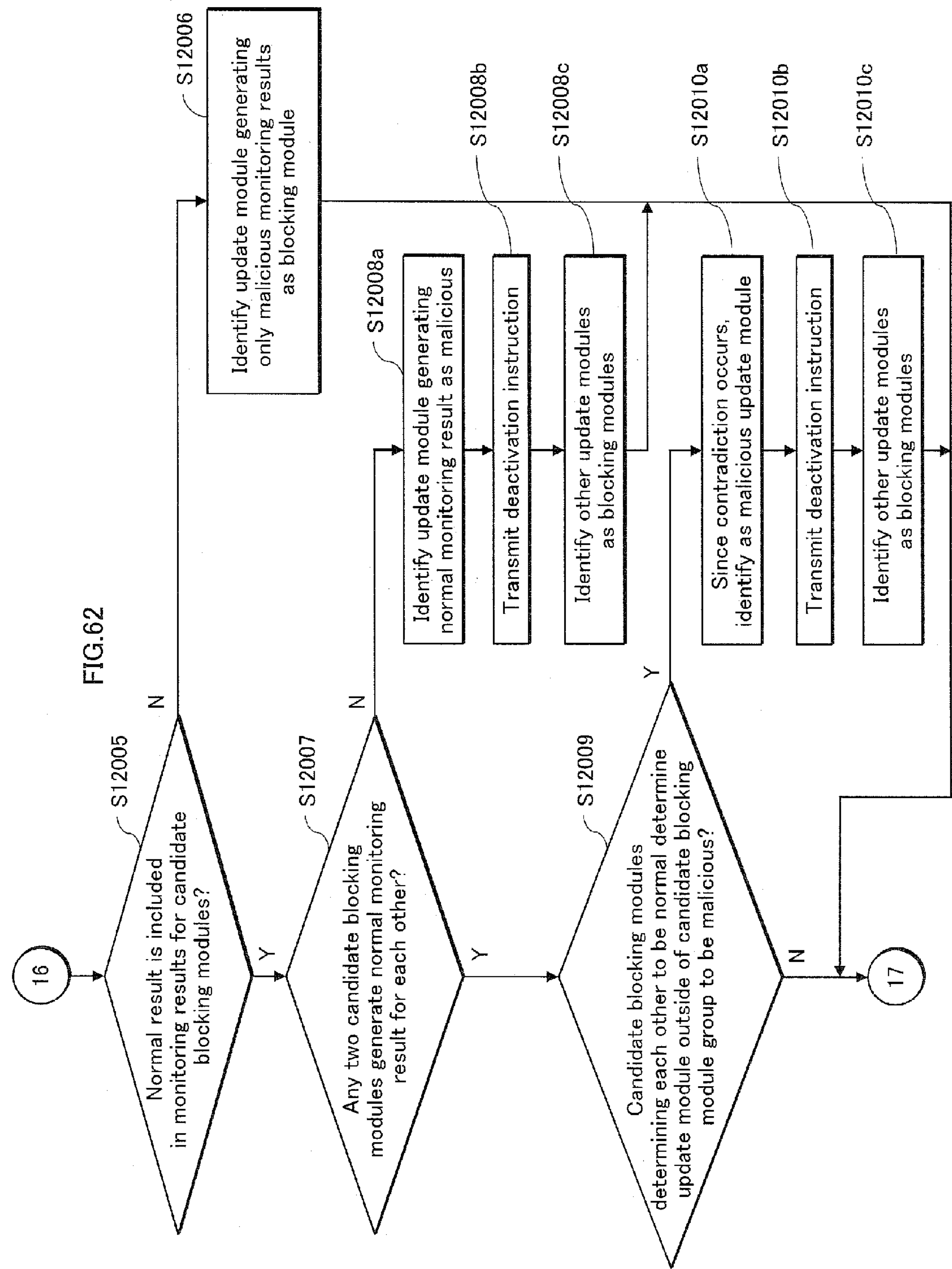
FIG. 62 is a flowchart showing blocking module identification in the software updating system 10*db*, and is continued in FIG. 63.
Figure 63:
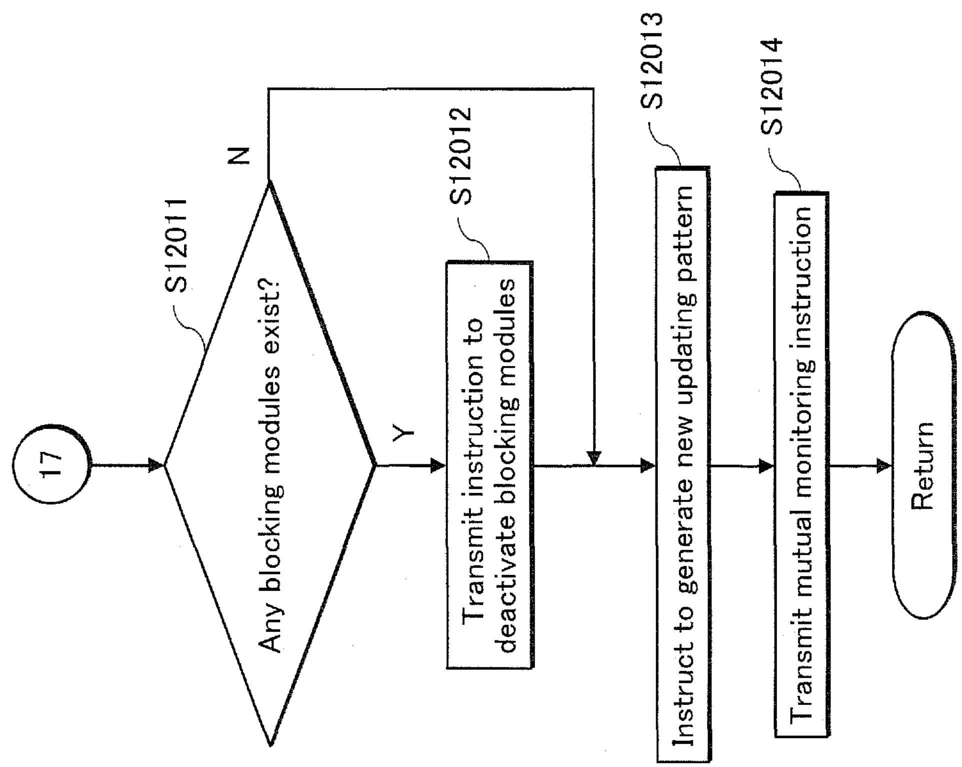
FIG. 63 is a flowchart showing blocking module identification in the software updating system 10*db*, and is continued from FIG. 62.

Next, operations for blocking module identification are described with reference to the flowcharts in FIGS. 61-63.

The determination unit 210*db* performs blocking module identification based on monitoring results by the update modules in the update module group 130, as described below.

The detection result determination unit 683 determines whether any update module generates malicious monitoring results for all of the update modules monitored thereby. In other words, the detection result determination unit 683 determines whether any candidate blocking modules exist (S12001).

When no candidate blocking module exists (S12001: N), the detection result determination unit 683 terminates blocking module identification.

When any candidate blocking modules exist (S12001: Y), the detection result determination unit 683 transmits the identifiers identifying the candidate blocking modules to the monitoring pattern update unit 250. The monitoring pattern update unit 250 generates, by referring to the received identifiers of all the candidate blocking modules, update module monitoring patterns so that all of the candidate blocking modules monitor each other (S12002).

By way of example, if the update modules 131, 132, 136, and 137 in the update module group 130 determine that all of the update modules monitored thereby are malicious, the update modules 131, 132, 136, and 137 are all candidate blocking modules. The monitoring pattern update unit 250 therefore generates monitoring patterns for the update modules 131, 132, 136, and 137 to monitor each other. The monitoring patterns in this case are shown in FIG. 65.

Next, so that the update modules in the device 100*db* perform mutual monitoring, the monitoring pattern update unit 250 transmits the generated monitoring patterns to the device 100*db* and causes the update modules therein to perform mutual monitoring. The device 100*db* receives the monitoring patterns. The update modules in the update module group 130 change their respective old monitoring patterns to the received new monitoring patterns and then perform mutual monitoring (S12003). The device 100*db* transmits the monitoring results to the update server 200*db*. The detection result determination unit 683 of the blocking module identification unit 608, in the determination unit 210*db* of the update server 200*db*, receives the mutual monitoring results (S12004).

Next, the detection result determination unit 683 determines whether at least one normal result is included in the monitoring results between candidate blocking modules (S12005).

When all of the mutual monitoring results between candidate blocking modules are malicious, with no normal result at all in the mutual monitoring results (S12005: N), the detection result determination unit 683 identifies every candidate blocking module as a blocking module (S12006). In the example shown in FIG. 66, each of the mutual monitoring results for the update modules 131, 132, 136, and 137, which are candidate blocking modules, is malicious (an "X" in FIG. 66). Since no normal mutual monitoring result ("○") exists, the detection result determination unit 683 identifies the update modules 131, 132, 136, and 137 as blocking modules. Next, control proceeds to step S12011.

When at least one normal monitoring result for a candidate blocking module exists (S12005: Y), the detection result determination unit 683 further determines whether any two candidate blocking modules determine each other to be normal (S12007).

In the examples in FIGS. 67, 68, and 69, at least one monitoring result for the candidate blocking modules is normal. In the example shown in FIG. 67, no two candidate blocking modules determine each other to be normal. In the example shown in FIG. 68, the update modules 131 and 137 are candidate blocking modules that determine each other to be normal. In the example shown in FIG. 69 as well, the update modules 131 and 137 are candidate blocking modules that determine each other to be normal.

Accordingly, in the example shown in FIG. 67, the condition in step S12007 is not satisfied. On the other hand, in the examples shown in FIGS. 68 and 69, the condition in step S12007 is satisfied.

When it is determined that no two candidate blocking modules determine each other to be normal (S12007: N), then when a candidate blocking module that generates a normal monitoring result exists, the detection results are contradictory, as in the update module 131 in the example in FIG. 67 (4051 "○"). In this case, the detection result by the update module 131 for the update module 132 is normal, but the detection result by the update module 132 for the update module 131 is malicious. Therefore, the detection result determination unit 683 determines that the update module 131 is a malicious update module. In the case described here, among two candidate blocking modules that perform mutual monitoring, a first candidate blocking module determines a second candidate blocking module to be normal, whereas the second candidate blocking module determines the first candidate blocking module to be malicious. In this case, the candidate blocking module that determines another candidate blocking module to be normal is identified as a malicious update module (S12008*a*).

Next, the determination unit 210*db* transmits a deactivation instruction to deactivate the update module identified as a malicious update module (S12008*b*).

In the case of the example shown in FIG. 67, since the update modules 132, 136, and 137 all generate malicious monitoring results ("X") for the other candidate blocking modules, the detection result determination unit 683 then identifies the update modules 132, 136, and 137 as blocking modules. In other words, the detection result determination unit 683 identifies any candidate blocking module that generates malicious monitoring results for all candidate blocking modules monitored thereby as a blocking module (S12008*c*).

Next, control proceeds to step S12011.

When two candidate blocking modules determine each other to be normal (S12007: Y), the detection result determination unit 683 then determines whether the two candidate blocking modules that determine each other to be normal ("○") both determine all other candidate blocking modules to be malicious ("X") (S12009). When the two candidate blocking modules that determine each other to be normal ("○") both determine all other update modules in the group of update modules that generate all malicious monitoring results to be malicious ("X") (S12009: Y), as in the example shown in FIG. 68, in which the update module 131 and the update module 137 determine each other to be normal ("○"), then in this example, a contradiction occurs in the monitoring results for the update module 131 based on the mutual monitoring results by the update modules 131 and 132 (since the update module 132 determines the update module 131 to be malicious, whereas the update module 137 determines the update module 131 to be normal). A contradiction also occurs in the monitoring results for the update module 137. Accordingly, the update modules 131 and 137 are identified as malicious update modules (S12010*a*).

Next, the determination unit 210*db* transmits a deactivation instruction to deactivate the update modules 131 and 137 identified as malicious update modules (S12010*b*).

Next, the detection result determination unit 683 identifies the update modules 132 and 136 as blocking modules, since the update modules 132 and 136 generate malicious monitoring results ("X") for every monitored update module (S12010*c*).

Next, the detection result determination unit 683 determines whether any update modules other than the group of candidate blocking modules that determine each other to be normal ("○") exist. In other words, the detection result determination unit 683 determines whether any blocking modules exist (S12011).

In the example shown in FIG. 69, the update modules 131 and 137 determine each other to be normal ("○"), and apart from these update modules, the update modules 132 and 136 exist. In this case, since the update modules 132 and 136 generate only malicious monitoring results ("X"), the detection result determination unit 683 determines the update modules 132 and 136 to be blocking modules. When any blocking modules exist (S12011: Y), the determination unit 210*db* transmits a deactivation instruction for the blocking module (S12012). When no blocking module exists (S12011: N), and after transmission of the deactivation instruction (S12012), the determination unit 210*db* instructs the monitoring pattern update unit 250 to generate new monitoring patterns for the entire update module group 130. The monitoring pattern update unit 250 generates the new monitoring patterns for the entire update module group 130 and transmits the new monitoring patterns to the device 100*db* (S12013). The determination unit 210*db* transmits an instruction to perform mutual monitoring in accordance with the new monitoring patterns to the update module group 130 in the device 100*db* (S12014).

As described above, even if the monitoring patterns are changed during blocking module identification, update modules that block identification of a normal module (i.e. blocking modules) can actively be excluded by deactivating update modules that determine all of the update modules monitored thereby to be malicious ("X"). After blocking modules are excluded, a normal update module can be identified, and the protection control module can be updated by the identified update module. This approach is even more effective for saving the protection control module and improving system security.

Furthermore, actively excluding update modules that block identification of a normal update module reduces the probability of not being able to identify a normal update module. In this way, insofar as possible, a normal update module is identified and used to update the protection control module.

Note that in the above description, the update modules may be monitoring modules.

5. Other Modifications

While the present invention has been described based on the above Embodiments, the present invention is of course not limited to these Embodiments. The present invention also includes cases such as the following.

(1) In the above embodiments, the protection control module 120 is updated, but the present invention is not limited in this way.

Modules other than the protection control module 120, such as update modules, application programs, etc. may be updated. The following describes updating of an update module, using updating of the update module 133 as an example.

During updating of an update module, as when updating the protection control module, the updated software delivery unit 220 doubly encrypts an updated update module in order to update the update module 133 using a plurality of keys and transmits the updated update module to an update module in the update module group 130 (other than the update module 133). An update module included in the update module group 130 (other than the update module 133) updates the update module 133 with the updated update module.

At this point, the updated software delivery unit 220 controls the timing of transmission of the plurality of keys for decrypting the doubly encrypted updated update module to the update module included in the update module group 130, so that an attacker cannot acquire the unencrypted updated update module.

(2) In the above Embodiments, the update modules each include the reception unit 301, the sending unit 302, the control unit 303, the update unit 304, the verification unit 305, the MAC value generation unit 306, the MAC value table updating unit 307, and the share storage unit 308. However, the update modules are not limited in this way.

Each update module may include only constituent elements necessary for monitoring (the control unit 303 and the verification unit 305). Each update module may also include only constituent elements necessary for updating (the control unit 303 and the update unit 304). Each update module may also include only constituent elements necessary for deactivation (the control unit 303 and the update unit 304).

Furthermore, each update module may be a combination of the above structures.

In this case, the plurality of update modules included in the update module group 130 should be structured as a whole to include the constituent elements necessary for monitoring and updating.

(3) In the above Embodiments, the verification unit 305 in each update module performs a tampering check on other update modules and on the protection control module 120, but the target of the tampering check is not limited to these modules.

The target of the tampering check may be a portion of the update modules, such as data corresponding to a specific capability, function, key, etc. Furthermore, the tampering check need not be performed at once for the entire target, but may be performed for a portion of the target. In this case, a tampering check may be performed on portions obtained by dividing the target of the tampering check into portions of a predetermined size, or obtained by dividing by capability or function. Furthermore, each tampering check may be performed on one of a plurality of portions of the target of the tampering check selected in order. Alternatively, the portion on which the tampering check is performed may be selected at random each time. Another module, or an apparatus external to the device 100, may indicate the portion on which to perform the tampering check, and the tampering check may then be performed on the indicated portion.

(4) In the above Embodiments, the update modules and the protection control module 120 may operate in a region protected from attacks, such as a tamper-resistant region.

In the case that an update module having only the constituent elements necessary for monitoring operates in a region protected from attack, when another update module or the determination unit 210 receives, from the update module located in the protected region, notification of detection of an attack on another update module or the protection control module 120, the other update module or the determination unit 210 may receive the notification unconditionally and perform updating or deactivation. The other update module or the determination unit 210 may also treat the notification as being more important than notification from other modules when determining whether to perform updating or deactivation.

The protection control module may operate in protected mode, i.e. may operate in a tamper-resistant region. The update modules may operate in normal mode, i.e. may operate in a region that is not tamper resistant.

(5) In the above Embodiments, the module deactivation unit 230 is located in the update server, and the access control module 140 is located in the device, but the present invention is not limited in this way.

The module deactivation unit 230 and the access control module 140 may both be located within the device or may be located in the update server. The module deactivation unit 230 and the access control module 140 may also be located within the update modules.

The module deactivation unit 230 and the access control module 140 need not be separate modules, but may be one module within the device or the update server.

When the module deactivation unit 230 and the access control module 140 are one module, the access information may be transmitted directly to the update module that performs deactivation, without transmitting the access information acquisition key and the encrypted access information.

Furthermore, when located in the device, the module deactivation unit 230 or the access control module 140 may be located in a region protected from attack by, for example, tamper resistance.

(6) In the above Embodiments, the update server includes a determination unit, updated software delivery unit, module deactivation unit, transmission unit, monitoring pattern update unit, etc., but the update server is not limited in this way. The determination unit, updated software delivery unit, module deactivation unit, transmission unit, monitoring pattern update unit, etc. may be structured as one module. The above components may be combined with each other.

(7) In the above Embodiments, the software updating system initializes the device at the time of manufacturing, but initialization is not limited in this way. Initialization may be performed at some point after shipping, such as after selling. Furthermore, initialization may be performed not only once, but two or more times.

(8) In the above Embodiments, during initialization, the verification certificate and the authentication key certificate are generated by referring to the signature private key stored by the updated software delivery unit 220, but these certificates are not limited in this way. The certificates may be generated using separate keys, or may be issued by a certificate issuing device other than the updated software delivery unit 220.

(9) In the above Embodiments, during initialization and next round preparation, shares generated from the encryption/decryption key are transmitted to the update modules 13*x*, which store the shares. The present invention, however, is not limited in this way.

Instead of update modules, application programs may store shares, or both update modules 13*x* and application programs may store shares.

(10) In the above Embodiments, when performing tampering detection on the protection control module 120, the update modules 13*x* use the MAC value calculated using the verification key, but tampering detection is not limited in this way.

Verification may use the tampering detection certificate of the protection control module 120. Furthermore, instead of tampering verification using a hash value such as a MAC value or a certificate, tampering detection may be performed by checking a log.

(11) In the above Embodiments, when an update module detects tampering in the protection control module 120, the update module notifies the determination unit 210 and other update modules, but the present invention is not limited in this way.

The update module may notify at least one module from among the determination unit 210 and the other update modules. When tampering is detected in the protection control module 120, the update modules, the device 100, or the protection control module 120 may be stopped. Furthermore, a protected control module that has been tampered with may be deleted.

When an update module does not detect tampering in the protection control module 120, the update module provides no notification to the determination unit 210, but the present invention is not limited in this way. The update module may provide notification that tampering was not detected as a result of tampering detection.

(12) In the above Embodiments, each update module does not transmit the results of tampering detection on the protection control module to other update modules during detection, but alternatively the update modules may share detection results.

When an update module does not share detection results, the update module may be determined to be a malicious update module and be deactivated.

(13) In the above Embodiments, during analysis and determination, it is determined whether to update the protection control module 120 based on tampering information, but the present invention is not limited in this way.

It may be determined whether to update based on the number of update modules that notify of tampering. For example, it may be determined to perform updating when the number of update modules notifying of tampering is equal to or greater than a predetermined number, and not to perform updating otherwise. The predetermined number is the number of all of the update modules included in the update module group.

Furthermore, during analysis and determination, it is determined whether to update the protection control module 120 and whether to deactivate the protection control module 120, but analysis and determination are not limited in this way. It may also be determined whether to stop the device 100.

(14) In the above Embodiments, during mutual authentication, each update module performs authentication on the updated software delivery unit 220, and subsequently, the updated software delivery unit 220 performs authentication on each update module, but mutual authentication is not limited in this way.

The updated software delivery unit 220 may perform authentication on each update module, and subsequently, each update module may perform authentication on the updated software delivery unit 220. Alternatively, the update modules and the updated software delivery unit 220 may perform authentication on each other on an individual basis.

(15) In the above Embodiments, during mutual authentication, the updated software delivery unit 220 performs authentication on each of the update modules using challenge data having a different value for each update module, but mutual authentication is not limited in this way. The same value may be used for challenge data for all of the update modules, or the update modules may be divided into a plurality of groups, with challenge data having a different value for each group.

(16) In the above Embodiments, during mutual authentication, each update module performs authentication on the updated software delivery unit 220 individually, but mutual authentication is not limited in this way.

Each update module may notify other update modules of the result of signature verification, thereby sharing the verification results between update modules, and an update module may determine whether the updated software delivery unit 220 is authentic based on the verification results of the update module itself and verification results received from other update modules.

The method of determination may, for example, be to determine that the updated software delivery unit 220 is authentic when verification is successful for a predetermined number (such as a majority) of the update modules, and to determine that the updated software delivery unit 220 is not authentic otherwise.

(17) In the above Embodiments, the update server 200 performs mutual authentication using the signature private key and the signature public key, but the present invention is not limited in this way. Other than the signature private key and the signature public key, the pair of authentication keys used during mutual authentication may be used.

In this case, between the pair of authentication keys for the update server, the authentication public key may be stored in advance by one update module or may be transmitted from the update server to an update module at the time of mutual authentication.

(18) In the above Embodiments, during mutual authentication, it is determined whether to perform recovery based on whether the number of update modules verified as being authentic is at least the number necessary for recovery, but the present invention is not limited in this way.

It may be determined whether to perform recovery based on whether the number of malicious update modules is less than a predetermined allowable number.

Furthermore, during mutual authentication, when the number is determined not to be the required minimum for recovery, the device is stopped in the above Embodiments, but alternatively, the update modules may be deactivated.

(19) In the above Embodiments, during mutual authentication, when the updated software delivery unit 220 performs authentication on each update module, each update module transmits response data along with the authentication public key and the authentication key certificate to the updated software delivery unit 220, but mutual authentication is not limited in this way.

Each update module may transmit the response data, the authentication public key, and the authentication key certificate at separate times.

Furthermore, the update modules may send the authentication public key and the authentication key certificate only when requested by the updated software delivery unit 220 to do so. In this case, the updated software delivery unit 220 may receive the authentication public key and the authentication key certificate from all of the update modules, from the predetermined number of update modules necessary for recovery, or from fewer than the predetermined allowable number of malicious update modules.

(20) In each of the above Embodiments, during recovery, monitoring is performed twice during each decryption (monitoring 3-1, 3-2, 5-1, 5-2), but the present invention is not limited in this way. Monitoring may be performed any number of times in accordance with the duration of decryption, and other than during decryption, monitoring may be performed when receiving a key or the updated protection control module, when performing detection, during mutual authentication, etc.

Although monitoring has been described as being performed regularly at predetermined intervals, monitoring is not limited in this way. Updating may be divided into a plurality of blocks, and monitoring may be performed at the end of processing for each block, at random intervals, or at intervals specified by the update server.

Each update module may acquire synchronization information indicating the timing of monitoring from an external server and perform monitoring in accordance with the acquired synchronization information. In this way, the update modules perform monitoring at the same time as other update modules, thus improving the accuracy of detection of a malicious update module.

Furthermore, the frequency of detection may vary between normal processing and recovery. The frequency of detection may also vary during recovery.

(21) In Embodiments 2 and 3, the number of update modules in the cyclic monitoring pattern is three, but as explained above, the number is not limited in this way. Four or more update modules may perform detection in a unidirectional cycle.

(22) In Embodiments 2 and 3, when all of the detection results in the unidirectional cycle are normal, the update modules in the cyclic monitoring pattern are treated as a group, but the present invention is not limited in this way. When a pair of update modules monitor each other and the detection results are normal, the pair of update modules may also be treated as a group. In this case, when the detection results by a pair of update modules that monitor each other for another update module do not match, the pair of update modules are both identified as malicious update modules.

Figure 70:
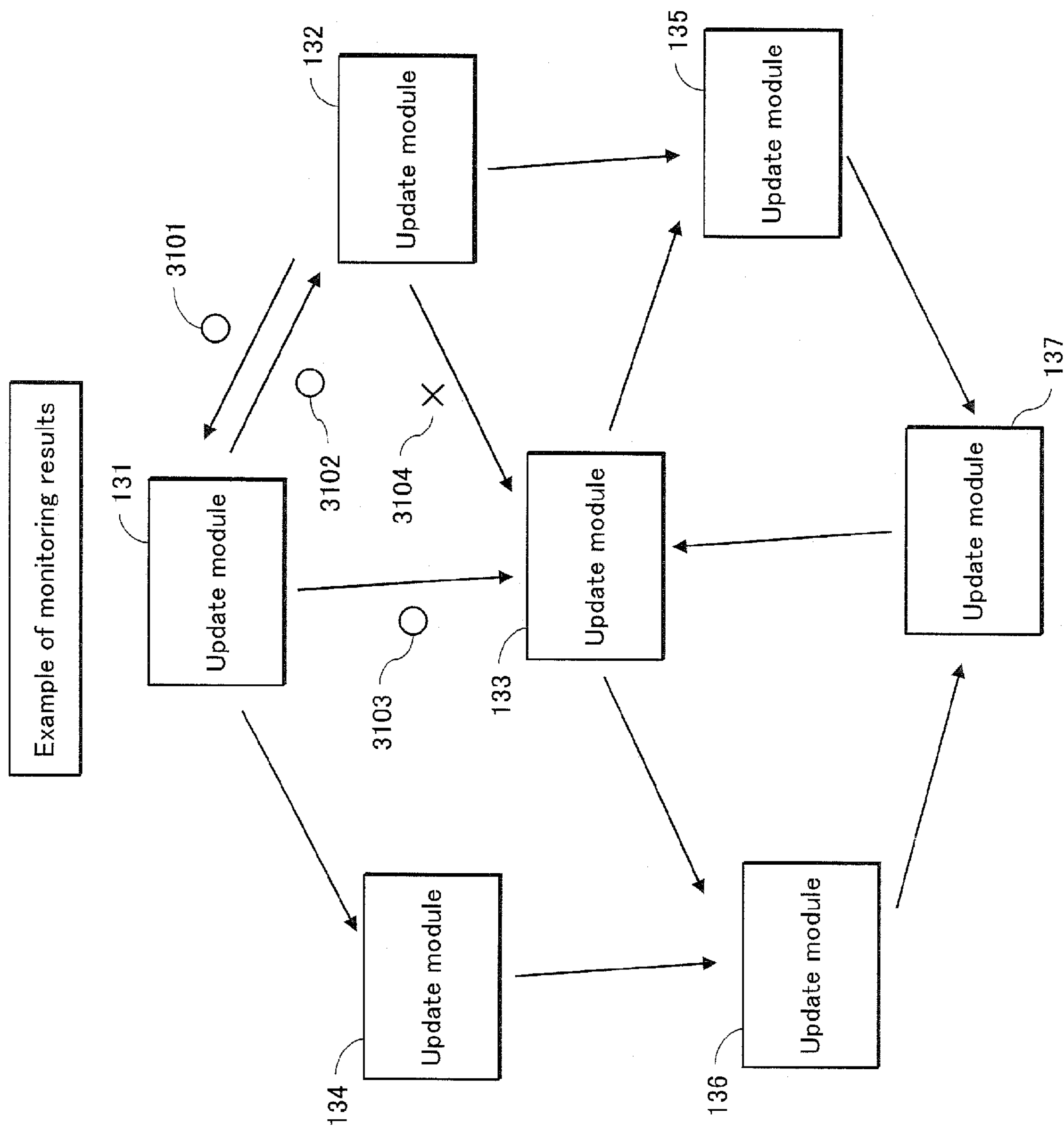
FIG. 70 shows an example of monitoring results in a modification (22).

This case is described with reference to the example of monitoring results in FIG. 70. The update module 131 and the update module 132 are a pair of update modules that monitor each other, and the detection results are both normal (3101, 3102). In this case, the detection result (3103) by the update module 131 for the update module 133 and the detection result (3104) by the update module 132 for the update module 133 do not match. Therefore, the update module 131 and the update module 132 are both identified as malicious update modules.

(23) In Embodiments 2 and 3, the cyclic monitoring pattern is selected based on the cycle size, but selection is not limited in this way.

Cyclic monitoring patterns may be selected in the order in which the largest number of update modules monitor the same update module. For example, suppose that a first, second, and third cyclic monitoring pattern exist. In the first cyclic monitoring pattern, twenty update modules monitor a first update module. In the second cyclic monitoring pattern, ten update modules monitor a second update module. In the third cyclic monitoring pattern, five update modules monitor a third update module. In this case, the cyclic monitoring patterns are chosen in the order of the first, second, and third cyclic monitoring patterns.

Since as the number of update modules monitoring the same update module increases, verification of whether a contradiction occurs is increasingly performed, thus making it easier to quickly discover any contradiction. As a result, malicious update modules are identified more quickly and are effectively and rapidly excluded.

(24) In Embodiments 2 and 3, when a plurality of cyclic monitoring patterns having the same cycle size exist, a cyclic monitoring pattern is chosen from among the plurality of cyclic monitoring patterns based on the number of update modules within the cyclic monitoring pattern that monitor update modules outside of the cyclic monitoring pattern, but the present invention is not limited in this way.

The cyclic monitoring pattern in which the largest number of update modules monitor the same update module may be selected. Since as the number of update modules monitoring the same update module increases, verification of whether a contradiction occurs is increasingly performed, thus making it easier to quickly discover any contradiction. As a result, malicious update modules are identified more quickly and are effectively and rapidly excluded.

(25) In Embodiment 2, a malicious update module is identified by monitoring results for one mutual monitoring session, but the present invention is not limited in this way. A malicious update module may be identified based on monitoring results for a plurality of mutual monitoring sessions.

This case is described in detail with reference to the examples of monitoring results in FIGS. 71 and 72.

Figure 71:
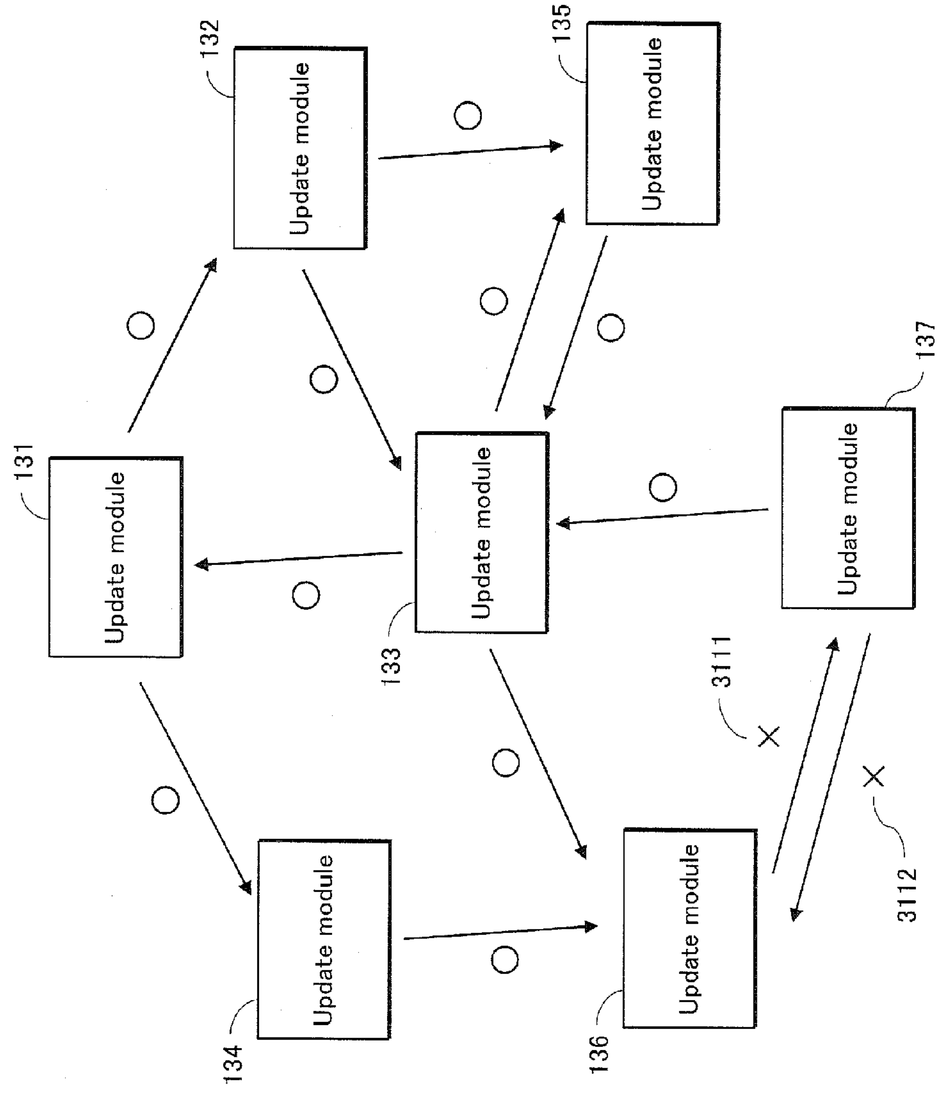
FIG. 71 shows an example of monitoring results in a modification (25).
Figure 72:
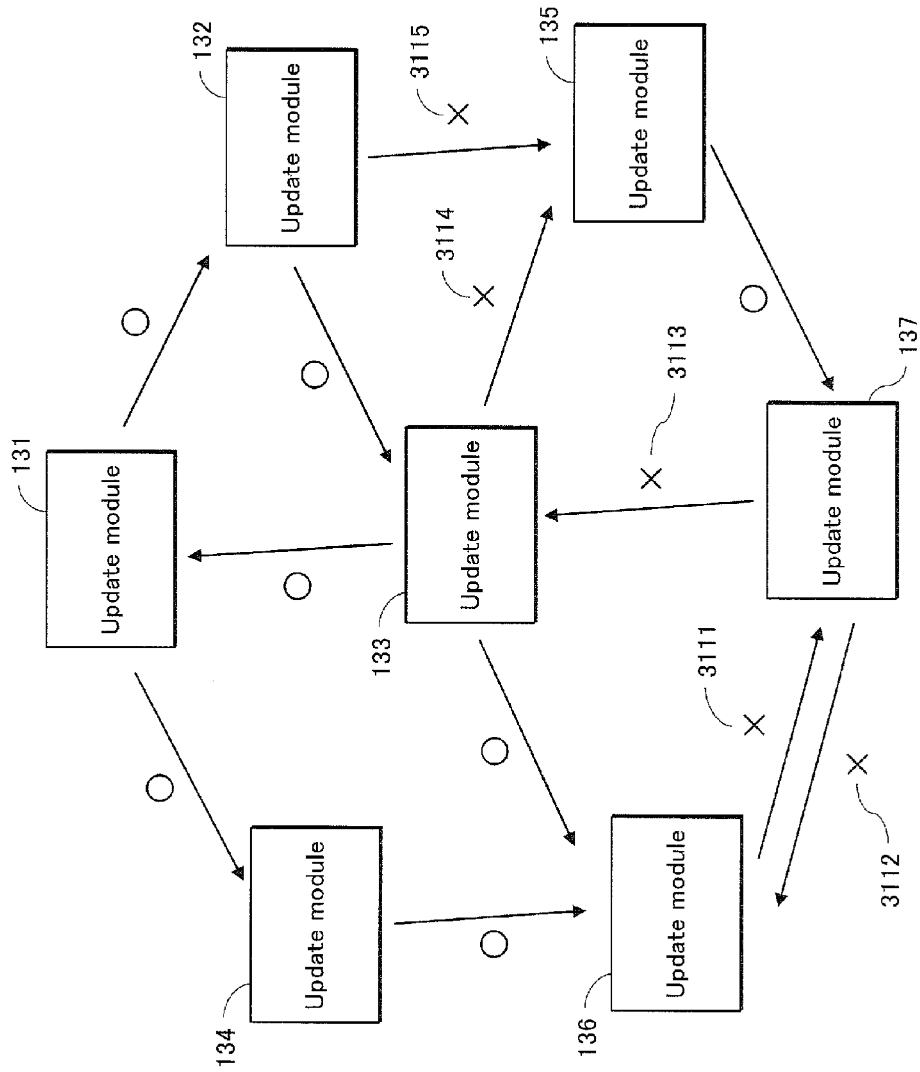
FIG. 72 shows an example of monitoring results in the modification (25).

An update server **200*bb* receives the monitoring results shown in FIG. 71 during a certain mutual monitoring session and receives the monitoring results shown in FIG. 72** during the next mutual monitoring session.

In the example shown in FIG. 71, the monitoring result by the update module 137 for the update module 136 is malicious (3112), and the monitoring result by the update module 136 for the update module 137 is also malicious (3111). All other monitoring results are normal.

In the example shown in FIG. 72, the monitoring result by the update module 132 for the update module 135 is malicious (3115), and the monitoring result by the update module 133 for the update module 135 is also malicious (3114). The monitoring result by the update module 137 for the update module 133 is malicious as well (3113). Furthermore, the monitoring result by the update module 137 for the update module 136 is malicious (3112), and the monitoring result by the update module 136 for the update module 137 is also malicious (3111). All other monitoring results are normal. In the example of monitoring results shown in FIG. 71, when malicious module identification is performed, the update module 137 is identified as a malicious update module. Unless the malicious update module is removed from the device 100 by deactivation, the malicious update module remains. Accordingly, during the next mutual monitoring session, any update module determining the update module identified as a malicious update module to be normal is also a malicious update module. The update module 135 in FIG. 72 is therefore identified as a malicious update module. This is because the update module 135 determines the update module 137, which has been identified as malicious, to be normal.

(26) In Embodiment 2, a malicious update module is identified by monitoring results for one mutual monitoring session, but the present invention is not limited in this way.

A malicious update module may be identified based on monitoring results for a plurality of mutual monitoring sessions. This case is described in detail with reference to the examples of monitoring results in FIGS. 73 and 74.

Figure 73:
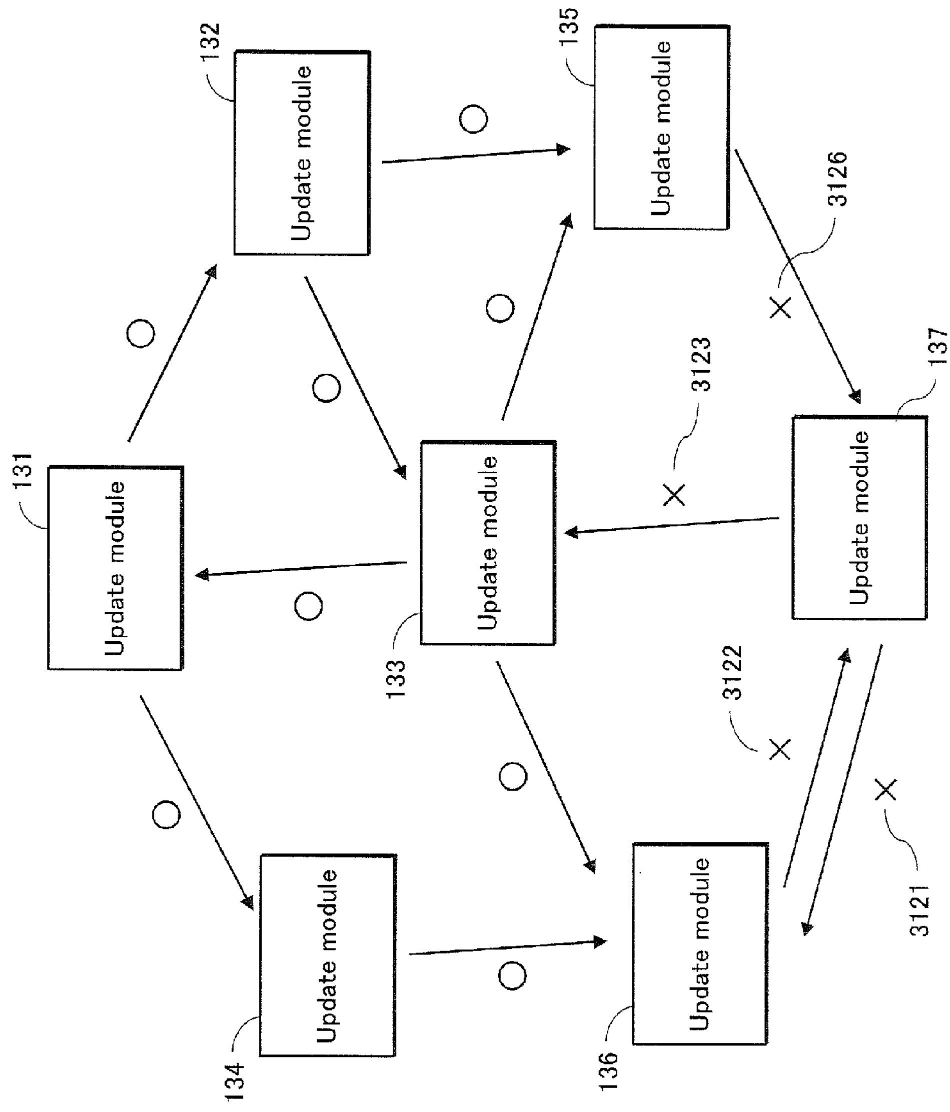
FIG. 73 shows an example of monitoring results in a modification (26).
Figure 74:
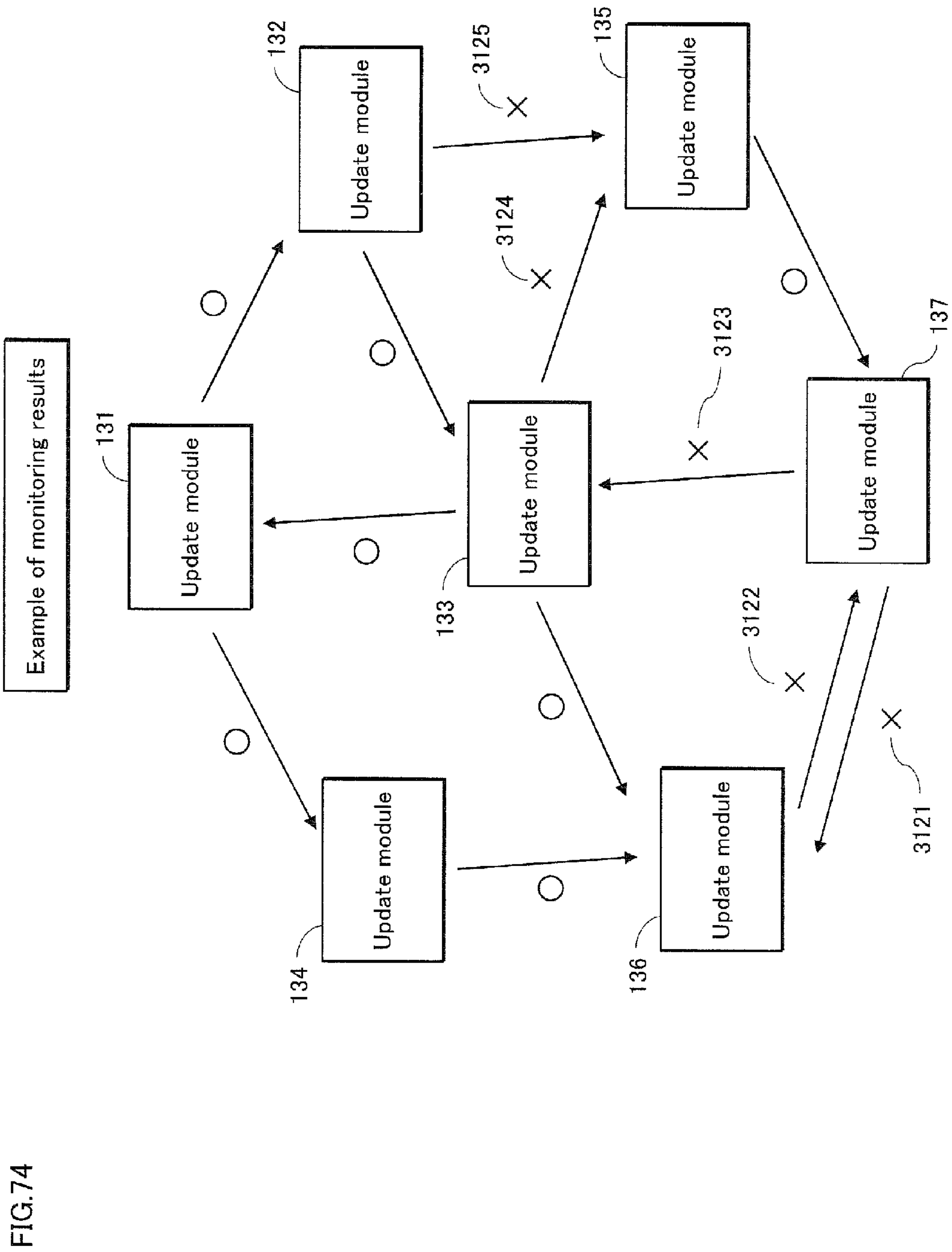
FIG. 74 shows an example of monitoring results in the modification (26).

The update server **200*bb* receives the monitoring results shown in FIG. 73 during a certain mutual monitoring session and receives the monitoring results shown in FIG. 74** during the next mutual monitoring session.

In the example shown in FIG. 73, the monitoring result by the update module 137 for the update module 136 is malicious (3121), and the monitoring result by the update module 136 for the update module 137 is also malicious (3122). Furthermore, the monitoring result by the update module 135 for the update module 137 is malicious (3126), and the monitoring result by the update module 137 for the update module 133 is also malicious (3123). All other monitoring results are normal.

In the example shown in FIG. 74, the monitoring result by the update module 137 for the update module 136 is malicious (3121), and the monitoring result by the update module 136 for the update module 137 is also malicious (3122). Furthermore, the monitoring result by the update module 133 for the update module 135 is malicious (3124), the monitoring result by the update module 132 for the update module 135 is malicious (3125), and the monitoring result by the update module 137 for the update module 133 is malicious (3123). All other monitoring results are normal.

In the example shown in FIG. 73, the update module 135 determines that the update module 137 is a malicious update module (3126). Subsequently, in the example shown in FIG. 74, the update module 135 determines that the update module 137 is a normal update module (3127). Therefore, the determination results by the update module 135 for the update module 137 do not match between the example shown in FIG. 73 and the example shown in FIG. 74. Accordingly, the update module 135 is identified as a malicious update module.

(27) In Embodiment 2, the normal module assumption unit 653 randomly selects an update module in the update module group 130, but the present invention is not limited in this way.

The normal module assumption unit 653 may select an update module determining many other update modules to be normal. Since other update modules are thus determined to be normal, the number of update modules included in the assumed normal update module group increases, thereby increasing the number of verifications of whether a contradiction occurs. This makes it easier to rapidly discover a contradiction. As a result, malicious update modules are identified more quickly and are effectively and rapidly excluded.

(28) In Embodiment 2, after completion of malicious module identification in step S8006 shown in FIG. 33, another update module is assumed to be normal, and malicious module identification is repeated. During malicious module identification at this point, the normal module assumption unit 653 randomly selects an update module in the update module group 130, but the present invention is not limited in this way.

An update module other than the update modules in the assumed normal update module group in step S8003 of the previous malicious module identification may be selected. Since it is known that no contradiction occurs among update modules in the assumed normal update module group in the previous malicious module identification, no malicious update module can be identified by selecting, in step S8001, an update module in the assumed normal update module group. Avoiding selection of an update module that cannot be used to identify a malicious update module increases processing efficiency.

(29) In Embodiment 3, during normal module identification, it is determined whether a cyclic monitoring pattern exists and whether a contradiction occurs in the cyclic monitoring pattern, but the present invention is not limited in this way. Instead of only determining whether a contradiction occurs in the cyclic monitoring pattern, malicious module identification may also be performed when determining whether a contradiction occurs in the cyclic monitoring pattern. A malicious update module may be identified by performing malicious module identification.

(30) In Embodiment 3, the malicious module assumption unit 673 randomly selects an update module in the update module group 130, but the present invention is not limited in this way. The malicious module assumption unit 673 may select an update module determined by many other update modules to be normal. Since the update module is determined to be normal by many update modules, the number of update modules in the assumed malicious update module group increases. This reduces the number of update modules selected in step S9014, thereby increasing efficiency.

(31) In Embodiment 3, when not all update modules are selected in step S9020, one other update module is selected in step S9014 at random, but the present invention is not limited in this way. An update module other than the update modules in the assumed malicious update module group in step S9016 of the previous normal module identification may be selected. Since it is known that no contradiction occurs among update modules in the assumed malicious update module group in the previous normal module identification, no normal update module can be identified by selecting, in step S9014, an update module in the assumed malicious update module group. Avoiding selection of an update module that cannot be used to identify a normal update module increases processing efficiency.

(32) In Embodiment 3, it is determined between steps S9005 and S9013 whether a cyclic monitoring pattern exists, and after identifying any malicious update modules, between steps S9014 and S9016 an update module is selected to form the assumed malicious update module group, but the present invention is not limited in this way. After step S9004 on, the processing between steps S9014 and S9016 may be performed, and thereafter, after performing the processing between steps S9005 and S9013, the determination in step S9017 may be made. In this case, when a normal update module is not identified, processing returns to step S9014, and an update module other than update modules identified as malicious update modules between steps S9005 and S9013 is selected.

(33) In Embodiments 2 and 3, during mutual authentication, monitoring results are received from each module, but when an update module does not transmit monitoring results, the update module may be identified as a malicious update module. Furthermore, any update module determining an update module not transmitting monitoring results to be normal may be identified as a malicious update module. Malicious update modules are thus identified before performing malicious module identification. As a result, malicious update modules are effectively and rapidly excluded.

(34) In Embodiment 4, in step S11017, the normal module identification of Embodiment 3 is performed, but the present invention is not limited in this way. The normal module identification described in Modification (29) may be performed.

(35) In Embodiment 4, when an update module generating only malicious monitoring results for all of the update modules monitored thereby (i.e. a candidate blocking module) exists, the monitoring pattern is updated in step S12002. After updating the monitoring pattern, it is determined whether a blocking module exists based on the monitoring results, but the present invention is not limited in this way. When a plurality of update modules (i.e. a candidate blocking modules) generate only malicious monitoring results for all of the update modules monitored thereby, then if two candidate blocking modules determine each other to be malicious, an instruction to deactivate the two candidate blocking modules may be transmitted.

Furthermore, in Embodiment 4, when only one update module generating only malicious monitoring results for all of the update modules monitored thereby (i.e. a candidate blocking module) exists, an instruction to deactivate the candidate blocking module may be transmitted. After excluding this candidate blocking module, normal module identification may be performed.

The present invention may be a management device for managing an information security device that includes a plurality of monitoring modules that monitor for tampering. The management device comprises: a reception unit configured to receive, from the information security device, a plurality of monitoring results generated by the monitoring modules each monitoring another monitoring module; a determination unit configured to determine, by referring to the monitoring results, that one or more of the monitoring modules are candidate blocking modules that determine all other monitoring modules monitored thereby to be malicious; a deactivation unit configured to control the information security device, when only one candidate blocking module is determined, to deactivate the candidate blocking module; and an update unit configured to generate, when only one candidate blocking module is determined, a new monitoring pattern excluding the candidate blocking module, to transmit the new monitoring pattern to the information security device, and to cause the information security device to adopt the new monitoring pattern. The reception unit further receives, from the information security device, new monitoring results generated in accordance with the new monitoring pattern, and the determination unit determines that a monitoring module is a normal monitoring module by referring to the new monitoring results.

(36) In step S12007 of Embodiment 4, it is determined whether there exists a candidate blocking module group in which update modules that are candidate blocking modules determine each other to be normal ("○"). When candidate blocking modules determine each other to be normal, and when the candidate blocking modules that determine each other to be normal determine each other to be malicious in the monitoring results of step S12001, the candidate blocking modules may be identified as malicious update modules, and an instruction to deactivate the candidate blocking modules may be transmitted.

This is because, when comparing monitoring results for one update module by another update module, in step S12001 the monitored update module is determined to be malicious, whereas in step S12007 the monitored update module is determined to be normal. The monitoring results between steps are therefore contradictory, and the determining update module can thus be identified as a malicious update module.

(37) In Embodiment 4, an update module that blocks identification of a normal module is identified, but the present invention is not limited in this way. An update module that blocks identification of a malicious module may be identified.

Figure 64:
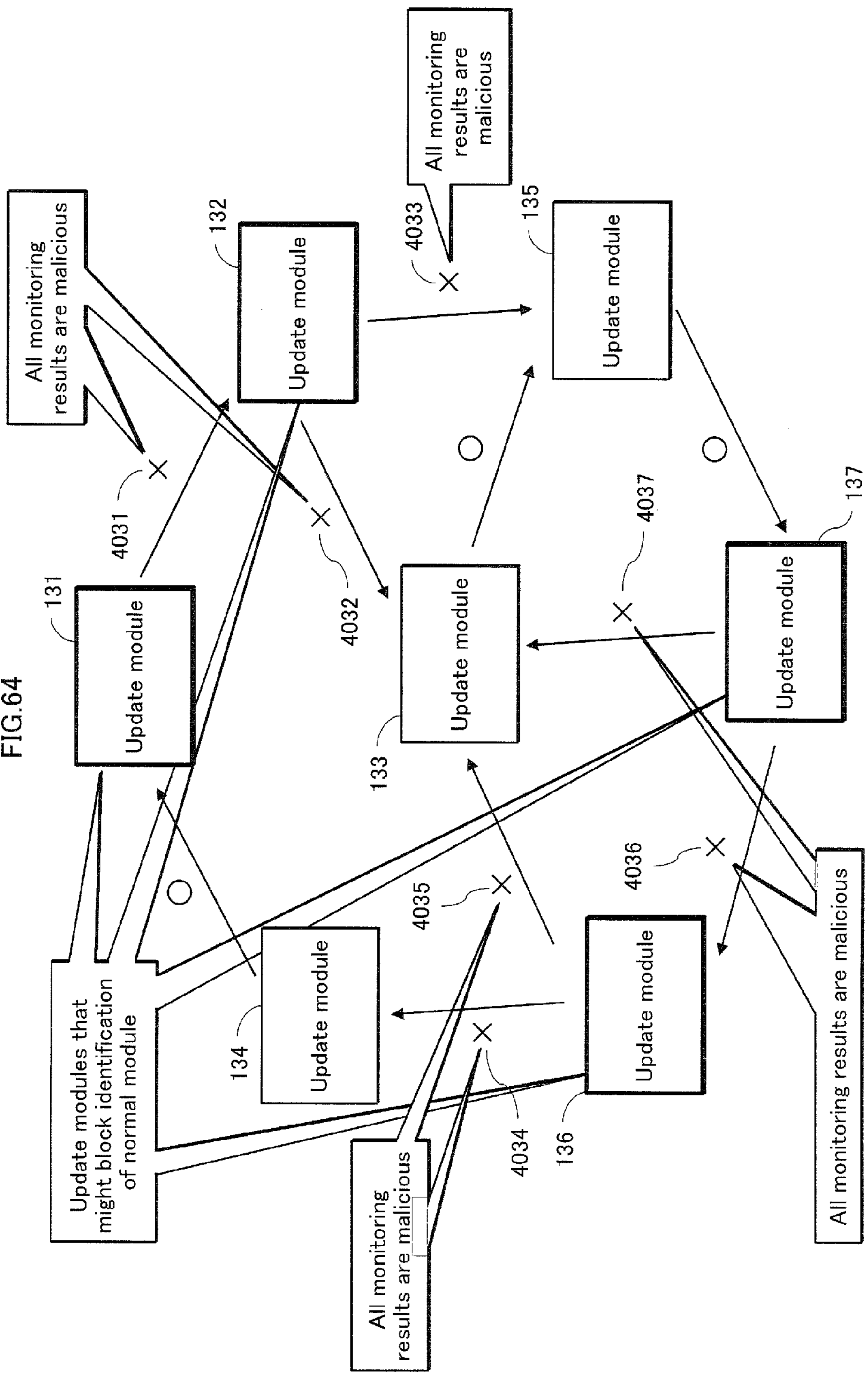
FIG. 64 shows an example of monitoring results in a modification of the software updating system 10*db*.

In this case, in step S10008 of the operational diagram shown in FIG. 58, malicious module identification is performed instead of normal module identification. In the case of the example shown in FIG. 64, when performing malicious module identification, update modules 131, 132, 136, and 137 are not identified as malicious update modules. In other words, the update modules 131, 132, 136, and 137 block themselves from detection as malicious modules. In this case, by performing blocking module identification, malicious modules that cannot be identified during malicious module identification are identified as blocking modules and excluded in advance, after which malicious module identification is performed. Malicious update modules are thus effectively and rapidly excluded.

(38) In Embodiment 4, in step S12002, a monitoring pattern is generated in which each update module that determines all of the update modules monitored thereby to be malicious, i.e. each candidate blocking module, monitors all the other candidate blocking modules, but the present invention is not limited in this way. A monitoring pattern in which each update module monitors all of the update modules in the update module group 130 may be generated. In this case, after updating the monitoring pattern, when a candidate blocking module determines all the update modules to be malicious, the candidate blocking module is identified as a blocking module.

(39) Each of the above modules may specifically be an individual computer program, a computer program embedded in the operating system, a driver program called by the operating system, or an application program.

(40) Application Example (1) of the Systems

Figure 75:
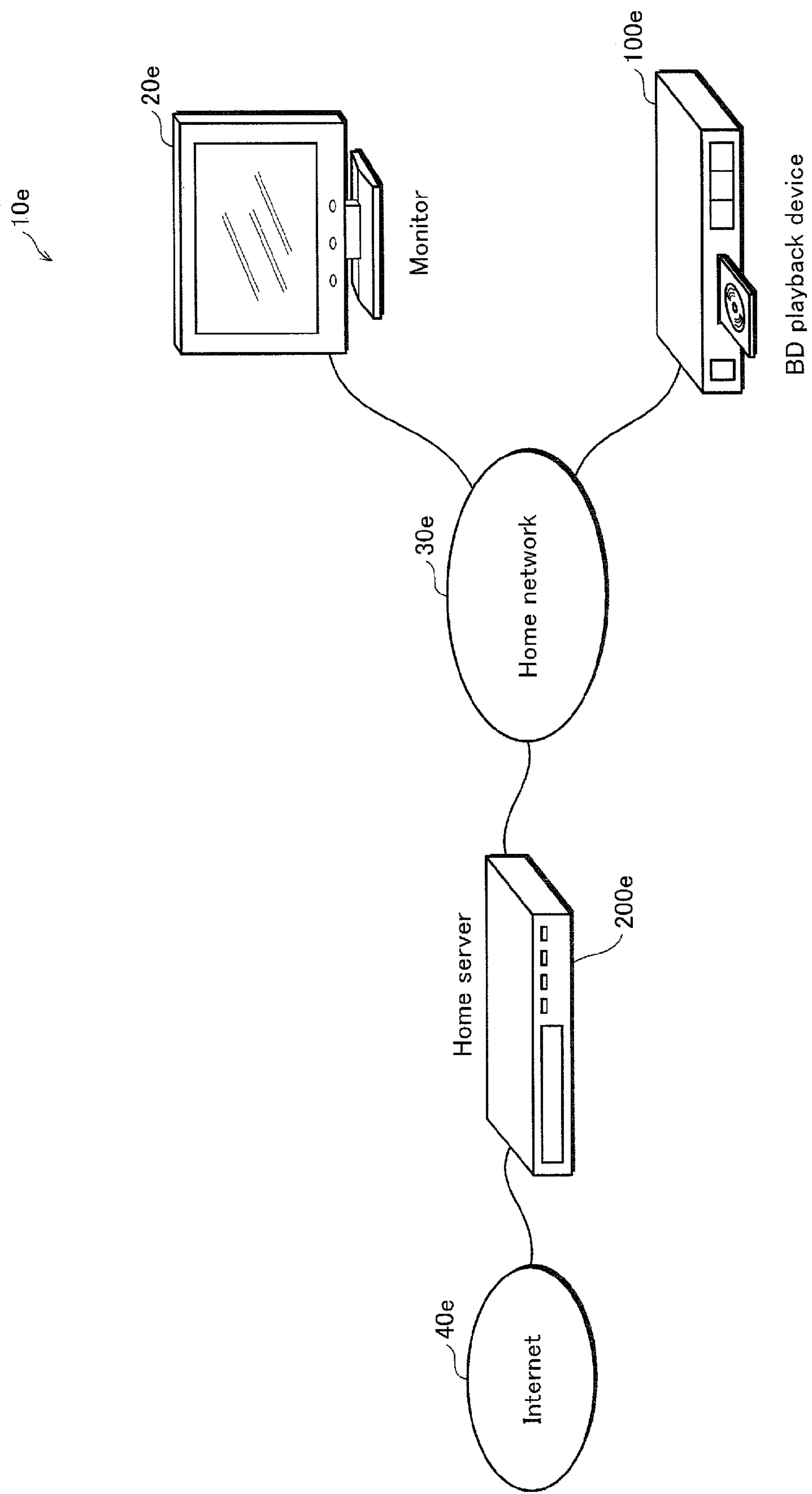
FIG. 75 is a configuration diagram showing a structure of a content reproduction system 10*e*.

As shown in FIG. 75, the systems in the above Embodiments may be a content reproduction system 10*e*.

As shown in FIG. 75, the content reproduction system 10*e* includes a BD playback device 100*e*, a monitor 20*e*, and a home server device 200*e*. The BD playback device 100*e*, the monitor 20*e*, and the home server device 200*e* are connected to each other via a home network 30*e*.

The home server device 200*e* acquires, via the Internet 40*e*, content from a content server device (not shown in the figures) connected to the Internet 40*e*. An example of the content is compressed video data and audio data that are further encrypted. The home server device 200*e* transmits the acquired content to the BD playback device 100*e* via the home network 30*e*.

The BD playback device 100*e* receives the content from the home server device 200*e* and records the received content on a BD (Blu-ray Disc). The BD playback device 100*e* expands the video data and audio data that is encrypted and compressed in the content recorded on the BD to generate a video signal and an audio signal. The BD playback device 100*e* then outputs the generated video signal and audio signal to the monitor 20*e* via the home network 30*e*. The monitor 20*e* receives the video signal and the audio signal and then displays video and outputs audio using the received signals.

The BD playback device 100*e* corresponds to the device in the software updating systems or to the information security device in the tampering monitoring systems of the above Embodiments and has a similar structure to the corresponding device or information security device. An example of application programs in the BD playback device 100*e* is a computer program for decrypting encrypted data. Another example is a computer program for expanding compressed video data and audio data.

The home server device 200*e* corresponds to the update server in the software updating systems or to the management device in the tampering monitoring systems and has a similar structure to the update server or to the management device.

(41) Application Example (2) of the Systems

Figure 76:
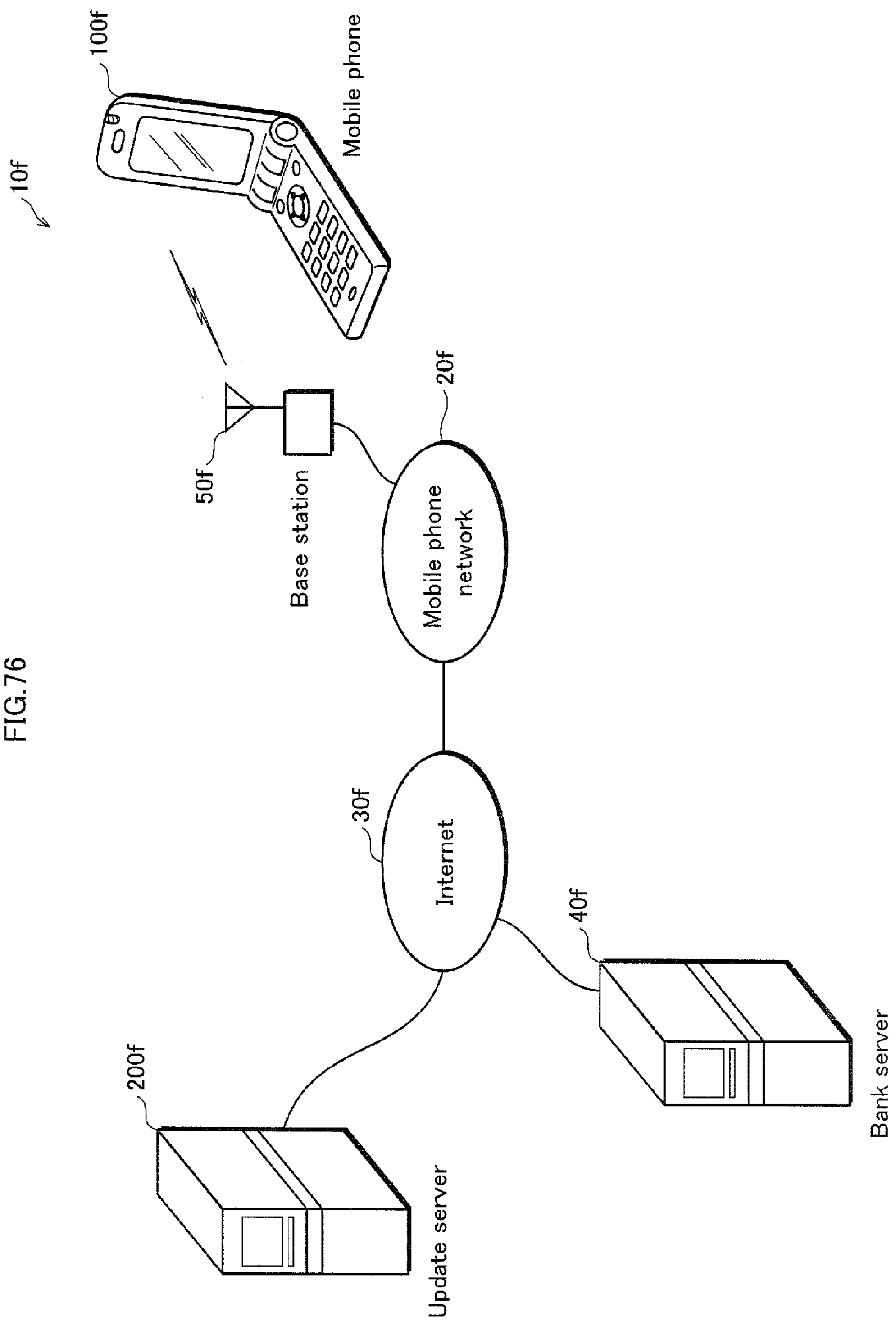
FIG. 76 is a configuration diagram showing a structure of a mobile banking system 10*f*.

As shown in FIG. 76, the systems in the above Embodiments may be mobile banking system 10*f*.

As shown in FIG. 76, the mobile banking system 10*f* includes a mobile phone 100*f*, a radio base station 50*f*, a bank server device 40*f*, and an update server device 200*f*. The mobile phone 100*f* is connected to the update server device 200*f* and the bank server device 40*f* via the radio base station 50*f*, a mobile phone network 20*f*, and the Internet 30*f*.

The bank server device 40*f* stores an account file corresponding to accounts of bank users. The account file includes transaction data. The transaction data includes a transaction type, amount, date, identifier for the other party, etc.

For example, the mobile phone 100*f* may issue a request, upon user operation, to the bank server device 40*f* via the radio base station 50*f*, the mobile phone network 20*f*, and the Internet 30*f* for a transfer from the user's account to another party's account. In accordance with the transfer request, the bank server device 40*f* performs a transfer from the user's account to the other party's account.

While transmitting data back and forth, the mobile phone 100*f* and the bank server device 40*f* perform mutual device authentication using a digital signature. Data is also requested to be encrypted. In accordance with the transfer request, the bank server device 40*f* performs a transfer from the user's account to the other party's account.

While transmitting data back and forth, the mobile phone 100*f* and the bank server device 40*f* perform mutual device authentication on each other using a digital signature. While transmitting data back and forth, the mobile phone 100*f* and the bank server device 40*f* encrypt data and decrypt encrypted data.

The mobile phone 100*f* corresponds to the device in the software updating systems or to the information security device in the tampering monitoring systems of the Embodiments and has a similar structure to the corresponding device or information security device. An example of the applications in the mobile phone 100*f* is a computer program for encrypting data or a computer program for decrypting encrypted data. Another example is a computer program for performing device authentication using a digital signature between devices in communication.

The update server device 200*f* corresponds to the update server in the software updating systems or to the management device in the tampering monitoring systems of the Embodiments.

(42) The update servers 200, 200*a*, and 200*b* described in Embodiments 1 and 2 may include a monitoring pattern generation unit that generates a monitoring pattern for when the update modules in the devices 100, 100*a*, and 100*b* perform mutual monitoring. The update servers 200, 200*a*, and 200*b* transmit the generated monitoring pattern to the respective devices 100, 100*a*, and 100*b*, and the devices 100, 100*a*, and 100*b* receive the monitoring pattern. The devices 100, 100*a*, and 100*b* perform mutual monitoring in accordance with the received monitoring pattern.

In particular, the update servers 200*a* and 200*b* in Embodiment 2 may generate a monitoring pattern that includes a cyclic monitoring pattern. By performing mutual monitoring using the monitoring pattern that includes a cyclic monitoring pattern, the devices 100*a* and 100*b* improve processing efficiency of malicious module identification performed later by the update servers 200*a* and 200*b*.

(43) Each of the above devices is, specifically, a computer system composed of a microprocessor, ROM, RAM, hard disk unit, display unit, keyboard, mouse, etc. Computer programs are stored on the RAM or the hard disk unit. By operating in accordance with the computer programs, the microprocessor achieves the functions of each device. In order to achieve predetermined functions, the computer programs are composed of a combination of multiple command codes that indicate instructions for the computer.

(44) Part or all of the components comprising each of the above-described devices may be assembled as one system Large Scale Integration (LSI). A system LSI is an ultra-multifunctional LSI produced by integrating multiple components on one chip and, more specifically, is a computer system including a microprocessor, ROM, RAM, and the like. Computer programs are stored in the RAM. The microprocessor operates according to the computer programs, and thereby the system LSI accomplishes its functions.

Individual components comprising each of the above-described devices may respectively be made into discrete chips, or part or all of the components may be made into one chip.

Although referred to here as a system LSI, depending on the degree of integration, the terms IC, LSI, super LSI, or ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(45) Part or all of the components comprising each of the above devices may be assembled as an IC card detachable from each device, or as a single module. The IC card/module is a computer system that includes a microprocessor, ROM, RAM, etc. The IC card/module may include therein the above-mentioned ultra-multifunctional LSI. The microprocessor operates according to computer programs, and the IC card/module thereby accomplishes its functions. The IC card/module may be tamper resistant.

(46) The present invention may be the above-described method. The present invention may be computer programs that achieve the method by a computer or may be a digital signal comprising the computer programs.

The present invention may also be a computer-readable recording medium, such as a flexible disk, hard disk, CD-ROM, MO, DVD, DVD-ROM, DVD-RAM, BD (Blu-ray Disc), or semiconductor memory, on which the above-mentioned computer program or digital signal is recorded. The present invention may also be the digital signal recorded on such a recording medium.

The present invention may also be the computer programs or digital signal to be transmitted via networks, of which telecommunications networks, wire/wireless communications networks, and the Internet are representative, or via data broadcasting.

The present invention may also be a computer system comprising a microprocessor and memory, the memory storing the computer programs, and the microprocessor operating in accordance with the computer programs.

Also, another independent computer system may implement the computer programs or digital signal after the computer programs or digital signal are transferred via being recorded on the recording medium, via one of the above-mentioned networks, etc.

(47) The above Embodiments and Modifications may be combined with one another.

(48) A software updating system that is an aspect of the present invention includes a software update device storing a predetermined application and a management device connected to the software update device. The software update device includes: a protection control module that verifies whether the predetermined application has been tampered with, and an update module group including a plurality of update modules that (i) receive, from the management device, an updated protection control module for updating the protection control module and (ii) update the protection control module. Each of the update modules included in the update module group verifies whether other update modules operate maliciously. The management device receives verification results from the update modules, identifies, based on the received verification results, an update module having a possibility of operating maliciously, and transmits an instruction to the software update device to deactivate the identified update module.

With this structure, the update module group includes update modules that update the protection control module and verify each other to detect malicious operations. Since the update module groups self-verifies to detect tampering with an update module, tampering with the update modules or obstruction of normal operation by the update modules is prevented. As a result, the protection control module is prevented from being updated to a malicious protection control module by an update module operating maliciously, thereby preventing the predetermined application from being attacked by such a malicious protection control module.

Since the management device identifies, based on verification results from the update modules, an update module that has a possibility of operating maliciously and transmits an instruction to deactivate the identified update module, then even if an update module that has been tampered with falsely notifies the management device that another update module, which has not actually been tampered with, has been tampered with, the management device appropriately identifies whether each update module is an update module that has a possibility of operating maliciously by considering the verification results from other update modules.

Furthermore, since the management device transmits, to the update software device, an instruction to deactivate the update module identified as possibly operating maliciously, the update module thus appropriately identified is deactivated. Therefore, even if an update module that has been tampered with falsely notifies the management device that another update module, which has not actually been tampered with, has been tampered with, the update module that has not been tampered with is prevented from being deactivated, and the update module that has been tampered with is prevented from remaining in the update module group without being deactivated.

A software updating system that is an aspect of the present invention includes a software update device storing a predetermined application and a management device connected to the software update device. The software update device includes: a protection control module that verifies whether the predetermined application has been tampered with, and a plurality of update modules that update the protection control module. The update modules each perform a first verification to verify whether the protection control module operates maliciously and a second verification to verify whether other update modules operate maliciously. The update modules each transmit results of the first verification and results of the second verification to the management device. The management device includes: a transmission unit that receives the first verification results and the second verification results from each of the update modules, and a control unit that, when determining based on the first verification results that the protection control module has a possibility of operating maliciously, identifies, based on the second verification results, one of the update modules for updating the protection control module and causes the identified update module to update the protection control module. The control unit determines combinations of the update modules for performing the second verification and transmits combination information indicating the combinations to the software update device. The combinations include a predetermined relationship whereby a number of the update modules perform verification in order in a unidirectional cycle. First, the second verification results are confirmed on a regular basis. When the previous second verification results indicate that no update module has the possibility of operating maliciously, and the current second verification results indicate that an update module now has a possibility of operating maliciously, the control unit determines that among the update modules, at least one normal update module exists. Next, when based on the second verification results the control unit determines that (i) the update modules included in the predetermined relationship generate results, by performing verification in a unidirectional cycle, indicating that all of the update modules included in the predetermined relationship are normal and (ii) there is a contradiction between any of the results by the update modules included in the predetermined relationship, then the control unit determines that all of the update modules included in the predetermined relationship have a possibility of operating maliciously and removes the update modules from the update modules that update the protection control module. The control unit then assumes that a first update module among the remaining update modules has a possibility of operating maliciously and includes the first update module in a malicious update module group. When a second update module that verifies any update module in the malicious update module group exists, the control unit determines whether the second update module determines any update module in the malicious update module group to be normal. When the second update module determines any update module in the malicious update module group to be normal, the control unit determines the second update module to also have a possibility of operating maliciously and includes the second update module in the malicious update module group. When an update module that is outside of the malicious update module group and for which the determination has not been made no longer exists, the control unit considers the assumption to be erroneous, determines the first update module to be a normal update module, and identifies the first update module as the update module for updating the protection control module.

With this structure, it is first confirmed that one of the update modules is normal. Next, the first update module is assumed to have a possibility of operating maliciously, and based on this assumption, if a second update module that determines the first update module to be normal exists, the second update module is determined to have a possibility of operating maliciously. When an update module for which the determination has not been made no longer exists, the control unit considers the assumption to be erroneous, determines the first update module to be a normal update module, and identifies the first update module as the update module for updating the protection control module. Since a logical verification method is thus used to effectively identify a truly normal update module among the plurality of update modules, an update module that does not have the possibility of operating maliciously is appropriately selected to securely update the protection control module.

In the software updating system, when three update modules, namely a first update module, a second update module, and a third update module, are included in the predetermined relationship, the first, second, and third update modules may verify each other in a unidirectional cycle, in which the first update module verifies the second update module, the second update module verifies the third update module, and the third update module verifies the first update module.

In this way, when three update modules, namely the first update module, the second update module, and the third update module, are included in the predetermined relationship, the first, second, and third update modules can verify each other in a unidirectional cycle, in which the first update module verifies the second update module, the second update module verifies the third update module, and the third update module verifies the first update module.

In the software updating system, the control unit confirms the second verification results on a regular basis. When the previous second verification results indicate that no update module has the possibility of operating maliciously, the control unit may alternatively not determine whether at least one normal update module exists among the update modules and not identify the update module for updating the protection control module.

With this structure, the control unit confirms the second verification results on a regular basis, and when the previous second verification results indicate that no update module has the possibility of operating maliciously, the control unit does not determine whether at least one normal update module exists among the update modules. In this case, the control unit does not identify the update module for updating the protection control module. In other words, when the assumption that the first update module has a possibility of operating maliciously cannot be made, the control unit does not identify the update module for updating the protection control module. This prevents an update module that has a possibility of operating maliciously from erroneously being determined to be a normal update module. As a result, the protection control module is prevented from being updated to a malicious protection control module by an update module operating maliciously, thereby preventing the predetermined application from being attacked by such a malicious protection control module.

In the software updating system, when an update module that is outside of the malicious update module group and for which the determination has not been made exists, and the update module for which the determination has not been made determines that any update module in the malicious update module group has a possibility of operating maliciously, the control unit may not identify the update module for updating the protection control module.

In this way, when an update module that is outside of the malicious update module group and for which the determination has not been made exists, and the update module for which the determination has not been made determines that any update module in the malicious update module group has a possibility of operating maliciously, the control unit does not identify the update module for updating the protection control module. In other words, when the assumption that the first update module has a possibility of operating maliciously cannot be considered erroneous, the control unit does not identify the update module for updating the protection control module. This prevents an update module that has a possibility of operating maliciously from erroneously being determined to be a normal update module. As a result, the protection control module is prevented from being updated to a malicious protection control module by an update module operating maliciously, thereby preventing the predetermined application from being attacked by such a malicious protection control module.

In the software updating system, when an update module that is outside of the malicious update module group and for which the determination has not been made exists, and the update module for which the determination has not been made does not determine whether any update module in the malicious update module group is normal, the control unit may not identify the update module for updating the protection control module.

In this way, when an update module that is outside of the malicious update module group and for which the determination has not been made exists, and the update module for which the determination has not been made does not determine whether any update module in the malicious update module group is normal, the control unit does not identify the update module for updating the protection control module. In other words, when the assumption that the first update module has a possibility of operating maliciously cannot be considered erroneous, the control unit does not identify the update module for updating the protection control module. This prevents an update module that has a possibility of operating maliciously from erroneously being determined to be a normal update module. As a result, the protection control module is prevented from being updated to a malicious protection control module by an update module operating maliciously, thereby preventing the predetermined application from being attacked by such a malicious protection control module.

In the software updating system, when the control unit determines that all of the update modules included in the predetermined relationship have a possibility of operating maliciously, the control unit may include all of the update modules in the predetermined relationship in a second malicious update module group. When a predetermined update module not included in the second malicious update module group determines any update module in the second malicious update module group to be normal, the control unit may determine that the predetermined update module has a possibility of operating maliciously and include the predetermined update module in the second malicious update module group. When an update module outside of the second malicious update module group that determines an update module in the second malicious update module group to be normal no longer exists, the control unit may remove all of the update modules in the second malicious update module group from the update modules that update the protection control module.

With this structure, when the control unit determines that all of the update modules included in the predetermined relationship have a possibility of operating maliciously, the control unit includes all of the update modules in the predetermined relationship in a second malicious update module group, and when a predetermined update module not included in the second malicious update module group determines any update module in the second malicious update module group to be normal, the control unit determines that the predetermined update module has a possibility of operating maliciously and includes the predetermined update module in the second malicious update module group. When an update module outside of the second malicious update module group that determines an update module in the second malicious update module group to be normal no longer exists, the control unit removes all of the update modules in the second malicious update module group from the update modules that update the protection control module. This structure makes it possible to determine whether a predetermined update module not included in the predetermined relationship has a possibility of operating maliciously. It is thus possible to reduce the number of update modules for which it is not determined whether the update module has a possibility of operating maliciously. As a result, a normal update module that updates the protection control module is more effectively identified.

A software update device that is an aspect of the present invention includes: a protection control module that verifies whether a predetermined application has been tampered with, and a plurality of update modules that update the protection control module. The update modules each perform a first verification to verify whether the protection control module operates maliciously and are each connected to a software update device that performs a second verification to verify whether other update modules operate maliciously. The update modules each include: a transmission unit that receives the first verification results and the second verification results from the software update device, and a control unit that, when determining based on the first verification results that the protection control module has a possibility of operating maliciously, identifies, based on the second verification results, one of the update modules for updating the protection control module and causes the identified update module to update the protection control module. The control unit determines combinations of the update modules for performing the second verification and transmits combination information indicating the combinations to the software update device. The combinations include a predetermined relationship whereby a number of the update modules perform verification in order in a unidirectional cycle. First, the second verification results are confirmed on a regular basis. When the previous second verification results indicate that no update module has the possibility of operating maliciously, and the current second verification results indicate that an update module now has a possibility of operating maliciously, the control unit determines that among the update modules, at least one normal update module exists. Next, when based on the second verification results the control unit determines that (i) the update modules included in the predetermined relationship generate results, by performing verification in a unidirectional cycle, indicating that all of the update modules included in the predetermined relationship are normal and (ii) there is a contradiction between any of the results by the update modules included in the predetermined relationship, then the control unit determines that all of the update modules included in the predetermined relationship have a possibility of operating maliciously and removes the update modules from the update modules that update the protection control module. The control unit then assumes that a first update module among the remaining update modules has a possibility of operating maliciously and includes the first update module in a malicious update module group. When a second update module that verifies any update module in the malicious update module group exists, the control unit determines whether the second update module determines any update module in the malicious update module group to be normal. When the second update module determines any update module in the malicious update module group to be normal, the control unit determines the second update module to also have a possibility of operating maliciously and includes the second update module in the malicious update module group. When an update module outside of the malicious update module group for which the determination has not been made no longer exists, the control unit considers the assumption to be erroneous, determines the first update module to be a normal update module, and identifies the first update module as the update module for updating the protection control module.

A software update method that is an aspect of the present invention is used in a software updating system comprising a software update device and a management device, the software update method being for the management device to identify an update module among a plurality of update modules that has a possibility of operating maliciously. The software update device includes: a storage unit storing a predetermined application, a protection control module that verifies whether the predetermined application has been tampered with, and a plurality of update modules that update the protection control module; and a control unit that causes the update modules each to perform a first verification to verify whether the protection control module operates maliciously and a second verification to verify whether other update modules operate maliciously and transmits results of the first verification and results of the second verification to the management device. The management device includes: a transmission unit that receives the first verification results and the second verification results from the update modules, and a control unit that, when determining based on the first verification results that the protection control module has a possibility of operating maliciously, identifies, based on the second verification results, one of the update modules for updating the protection control module and causes the identified update module to update the protection control module. The control unit determines combinations of the update modules for performing the second verification and transmits combination information indicating the combinations to the software update device. The combinations include a predetermined relationship whereby a number of the update modules perform verification in order in a unidirectional cycle. First, the second verification results are confirmed on a regular basis. When the previous second verification results indicate that no update module has the possibility of operating maliciously, and the current second verification results indicate that an update module now has a possibility of operating maliciously, the control unit determines that among the update modules, at least one normal update module exists.

Next, when based on the second verification results the control unit determines that (i) the update modules included in the predetermined relationship generate results, by performing verification in a unidirectional cycle, indicating that all of the update modules included in the predetermined relationship are normal (ii) there is a contradiction between any of the results by the update modules included in the predetermined relationship, then the control unit determines that all of the update modules included in the predetermined relationship have a possibility of operating maliciously and removes the update modules from the update modules that update the protection control module. The control unit then assumes that a first update module among the remaining update modules has a possibility of operating maliciously and includes the first update module in a malicious update module group. When a second update module that verifies any update module in the malicious update module group exists, the control unit determines whether the second update module determines any update module in the malicious update module group to be normal. When the second update module determines any update module in the malicious update module group to be normal, the control unit determines the second update module to also have a possibility of operating maliciously and includes the second update module in the malicious update module group. When an update module outside of the malicious update module group for which the determination has not been made no longer exists, the control unit considers the assumption to be erroneous, determines the first update module to be a normal update module, and identifies the first update module as the update module for updating the protection control module.

A software updating system that is an aspect of the present invention includes a software update device storing a predetermined application and a management device connected to the software update device. The software update device includes a protection control module that verifies whether the predetermined application has been tampered with and an update module group including a plurality of update modules that (i) receive, from the management device, an updated protection control module for updating the protection control module and (ii) update the protection control module. Each of the update modules included in the update module group verifies whether other update modules operate maliciously. The management device receives verification results from the update modules, identifies, based on the received verification results, an update module having a possibility of operating maliciously, and transmits an instruction to the software update device to deactivate the identified update module.

With this structure, the update module group includes update modules that update the protection control module and verify each other to detect malicious operations. Since the update module groups self-verifies to detect tampering with an update module, tampering with the update modules or obstruction of normal operation by the update modules is prevented. As a result, the protection control module is prevented from being updated to a malicious protection control module by an update module operating maliciously, thereby preventing the predetermined application from being attacked by such a malicious protection control module.

Since the management device identifies, based on verification results from the update modules, an update module that has a possibility of operating maliciously and transmits an instruction to deactivate the identified update module, then even if an update module that has been tampered with falsely notifies the management device that another update module, which has not actually been tampered with, has been tampered with, the management device appropriately identifies whether each update module is an update module that has a possibility of operating maliciously by considering the verification results from other update modules.

Furthermore, since the management device transmits, to the update software device, an instruction to deactivate the update module identified as possibly operating maliciously, the update module thus appropriately identified is deactivated. Therefore, even if an update module that has been tampered with falsely notifies the management device that another update module, which has not actually been tampered with, has been tampered with, the update module that has not been tampered with is prevented from being deactivated, and the update module that has been tampered with is prevented from remaining in the update module group without being deactivated.

A software updating system that is an aspect of the present invention includes a software update device storing a predetermined application and a management device connected to the software update device. The software update device includes: a protection control module that verifies whether the predetermined application has been tampered with, and a plurality of update modules that update the protection control module. The update modules each perform a first verification to verify whether the protection control module operates maliciously and transmit results of the first verification to the management device. The management device includes: a transmission unit that receives the first verification results from each of the update modules, and a control unit that, when determining based on the first verification results that the protection control module has a possibility of operating maliciously, identifies one of the update modules for updating the protection control module and causes the identified update module to update the protection control module. The management device generates, and transmits to the software update device, a first monitoring pattern. The first monitoring pattern indicates, for a first group including all of the update modules, the update modules monitored by each update module to determine whether the update modules have a possibility of operating maliciously. Based on the first monitoring pattern, the software update device performs a second verification of whether the update modules operate maliciously and transmits the results of the second verification to the management device. Then, based on the second verification results, the management device includes, in a second group of update modules that have a possibility of being tampered with, any update module that determines that every update module it monitors has a possibility of operating maliciously. The management device then extracts the second group from the first group. Next, the management device generates a second monitoring pattern in which every update module in the second group monitors every other update module in the second group and transmits the generated second monitoring pattern to the software update device. Based on the second monitoring pattern, the software update device performs a third verification of whether the update modules included in the second monitoring pattern operate maliciously and transmits the results of the third verification to the management device. Then, based on the third verification results, the management device identifies, within the second group, a third group of update modules that determine each other not to have a possibility of operating maliciously, returns to the first group update modules in the third group, which determine update modules other than the update modules in the third group to have a possibility of operating maliciously, and eliminates any update modules in the second group not included in the third group.

In this way, the update modules that are not returned to the first group are eliminated, thereby actively excluding, from among the update modules, update modules not returned to the first group that have a high possibility of operating maliciously. This approach is even more effective for saving the protection control module and improving system security.

In the software updating system, based on the third verification results, the management device identifies, within the second group, a third group of update modules that determine each other not to have a possibility of operating maliciously and returns to the first group update modules in the third group, which determine update modules other than the update modules in the third group to have a possibility of operating maliciously. Next, the management device identifies, as a fourth group, the first group to which the third group has been returned and generates a third monitoring pattern indicating the update modules monitored by each update module in the fourth group to determine whether the update modules have a possibility of operating maliciously. The management device than transmits the generated third monitoring pattern to the software update device. Based on the third monitoring pattern, the software update device performs a fourth verification in which the update modules included in the third monitoring pattern verify each other to detect an update module operating maliciously and transmits the results of the fourth verification to the management device. Based on the fourth verification results, the management device identifies one of the update modules for identifying the protection control module and causes the identified update module to update the protection control module. The third monitoring pattern includes a predetermined relationship whereby a number of the update modules among the update modules included in the fourth group perform verification in order in a unidirectional cycle. First, the fourth verification results are confirmed on a regular basis. When the previous fourth verification results indicate that no update module has the possibility of operating maliciously, and the current fourth verification results indicate that an update module now has a possibility of operating maliciously, the control unit determines that among the update modules, at least one normal update module exists. Next, when based on the fourth verification results the control unit determines that (i) the update modules included in the predetermined relationship generate results, by performing verification in a unidirectional cycle, indicating that all of the update modules included in the predetermined relationship are normal and (ii) there is a contradiction between any of the results by the update modules included in the predetermined relationship, then the control unit determines that all of the update modules included in the predetermined relationship have a possibility of operating maliciously and removes the update modules from the update modules that update the protection control module. The control unit then assumes that a first update module among the remaining update modules has a possibility of operating maliciously and includes the first update module in a malicious update module group. When a second update module that verifies any update module in the malicious update module group exists, the control unit determines whether the second update module determines any update module in the malicious update module group to be normal. When the second update module determines any update module in the malicious update module group to be normal, the control unit determines the second update module to also have a possibility of operating maliciously and includes the second update module in the malicious update module group. When an update module outside of the malicious update module group for which the determination has not been made no longer exists, the control unit considers the assumption to be erroneous, determines the first update module to be a normal update module, and identifies the first update module as the update module for updating the protection control module.

With this structure, it is first confirmed that one of the update modules is normal. Next, the first update module is assumed to have a possibility of operating maliciously, and based on this assumption, if a second update module that determines the first update module to be normal exists, the second update module is determined to have a possibility of operating maliciously. When an update module for which the determination has not been made no longer exists, the control unit considers the assumption to be erroneous, determines the first update module to be a normal update module, and identifies the first update module as the update module for updating the protection control module. Since a logical verification method is thus used to effectively identify a truly normal update module among the plurality of update modules, an update module that does not have the possibility of operating maliciously is appropriately selected to securely update the protection control module.

When making the above determinations, if among the update modules, a category of update module that determines all other update modules monitored thereby to have a possibility of operating maliciously exists, it may not be possible to identify an update module that does not have a possibility of operating maliciously.

To address this problem, in the present aspect, this category of update module determining all update modules monitored thereby to have a possibility of operating maliciously is extracted from among the update modules and gathered in to a separate group. The update modules in this category then verify each other to detect an update module having a possibility of operating maliciously. As a result, any group of update modules in this category that determine each other not to have a possibility of operating maliciously and that determine every other update module not in the group to have a possibility of operating maliciously is determined not to have been tampered with and is returned to the original group of update modules. The above determinations are then performed after update modules have thus been returned. This structure reduces the possibility that the above determinations cannot be performed, so that insofar as possible, an update module that does not have a possibility of operating maliciously is identified, and the protection control module is saved.

The present invention is widely applicable to a tampering monitoring system and management device that can identify, to a high degree of accuracy, a normal monitoring module that has not been tampered with among a plurality of monitoring modules, even when a portion of the monitoring modules have been tampered with.

REFERENCE SIGNS LIST

10_ca_, 10_da_ tampering monitoring system
10_cb_, 10_db_ software updating system
10_e_ content playback system
10_f_ mobile banking system
40_f_ bank server device
100, 100 db device
100_ca_, 100_da_ information security device
100_e_BD playback device
100_f_ mobile phone
200, 200_bb_, 200_cb_, 200_db_ update server
200_ca_, 200_da_ management device
200_e_ home server device

200*f* update server device

The invention claimed is:

1. A management device for managing an information security device that includes a plurality of monitoring modules that monitor for tampering, the management device comprising:

a non-transitory memory device that stores a program; and a processing device that executes the program to cause the management to device to operate as:

a reception unit that receives, from the information security device, a plurality of monitoring results generated by the monitoring modules each monitoring another monitoring module;

a detection unit that detects whether any normal monitoring module that has not been tampered with exists by referring to the monitoring results;

a first hypothesis unit that selects, when the detection unit detects existence of a monitoring module that has not been tampered with, a monitoring module among the plurality of monitoring modules and hypothesizes that the selected monitoring module has been tampered with;

a second hypothesis unit that successively applies a procedure to monitoring modules other than the selected monitoring module by referring to the monitoring results, starting from the selected monitoring module, the procedure being to hypothesize that any monitoring module determining that a monitoring module hypothesized to have been tampered with is normal has also been tampered with; and a determination unit that determines whether, as a result of the procedure by the second hypothesis unit, all of the monitoring modules are hypothesized to have been tampered with, and when determining that all of the monitoring modules are hypothesized to have been tampered with, determines the selected monitoring module to be a normal monitoring module that has not been tampered with, thereby reversing the hypothesis by the first hypothesis unit as being incorrect, wherein the detection unit detects, by referring to previously received monitoring results and currently received monitoring results, existence of the normal monitoring module when all monitoring modules are determined to be normal in the previously received monitoring results and not all modules are determined to be normal in the currently received monitoring results, and wherein a time between generation of the previously received monitoring results and generation of the currently received monitoring results is less than a predetermined threshold.

2. The management device of claim 1, wherein the first hypothesis unit is further configured to generate an hypothesized malicious group including an identifier of the selected monitoring module, the second hypothesis unit applies the procedure to the monitoring modules other than the selected monitoring module by repeatedly (i) determining, by referring to the monitoring results, whether another monitoring module determines that a monitoring module whose identifier is included in the hypothesized malicious group is normal and (ii) adding, when determining positively, an identifier of the other monitoring module to the hypothesized malicious group, and the determination unit determines whether identifiers corresponding to all monitoring modules are included in the hypothesized malicious group and, when determining positively, determines the selected monitoring module to be the normal monitoring module.

3. The management device of claim 1, wherein the management device further comprises a malicious module identification unit configured to identify at least one malicious module that has been tampered with among the monitoring modules, the first hypothesis unit excludes the malicious monitoring module when selecting the monitoring module, the second hypothesis unit applies the procedure to the monitoring modules other than the selected monitoring module after excluding the malicious monitoring module, and the determination unit determines whether all of the monitoring modules, excluding the malicious monitoring module, are hypothesized to have been tampered with, and when determining positively, determines the selected monitoring module to be the normal monitoring module.

4. The management device of claim 3, wherein the malicious module identification unit identifies the malicious monitoring module by assuming that one monitoring module is normal, determining whether two of the monitoring results are inconsistent by referring to the received monitoring results, and when determining positively, identifying the one monitoring module as the malicious monitoring module.

5. The management device of claim 3, wherein the other monitoring module monitored by each monitoring module is specified by a cyclic monitoring pattern, the cyclic monitoring pattern indicating that a first monitoring module monitors a second monitoring module and that the second monitoring module monitors the first monitoring module directly or via one or more other monitoring modules, and each monitoring module monitors at least another one of the monitoring modules that is specified by the cyclic monitoring pattern, and the malicious module identification unit identifies, as the at least one malicious monitoring module, each of a plurality of monitoring modules in the cyclic monitoring pattern when a plurality of monitoring results by a plurality of monitoring modules in the cyclic monitoring pattern for another monitoring module do not match.

6. The management device of claim 1, wherein at least one monitoring module in the information security device is an update module provided with a function to update another module, and the management device further comprises a control unit configured to control the monitoring module selected as the normal monitoring module to update another module when the monitoring module is the update module.

7. The management device of claim 6, wherein the information security device further includes an application program and a protection control module configured to protect the application program, and the other module is one of the monitoring module, the application program, and the protection control module.

8. The management device of claim 1 for managing an information security device that includes a plurality of monitoring modules that monitor for tampering, the management device comprising:

a reception unit configured to receive, from the information security device, a plurality of monitoring results generated by the monitoring modules each monitoring one or more other monitoring modules;

a determination unit configured to determine, by referring to the monitoring results, that one or more of the monitoring modules are candidate blocking modules that determine all other monitoring modules monitored thereby to be malicious; and an update unit configured to generate, when a plurality of monitoring modules are determined to be candidate blocking modules, a new monitoring pattern in which the candidate blocking modules monitor each other, to transmit the new monitoring pattern to the information security device, and to cause the information security device to adopt the new monitoring pattern, wherein the reception unit further receives, from the information security device, new monitoring results generated in accordance with the new monitoring pattern, and the determination unit determines, by referring to the new monitoring results, that each candidate blocking module is a blocking module after excluding, from the candidate blocking modules, two candidate blocking modules that determine each other to be normal and determine all other candidate blocking modules to be malicious.

9. The management device of claim 8, wherein the determination unit identifies, by referring to the new monitoring results, a first candidate blocking module as a malicious monitoring module that has been tampered with when the first candidate blocking module determines that a second candidate blocking module is normal and the second candidate blocking module determines that the first candidate blocking module is malicious.

10. The management device of claim 8, wherein the update unit generates the new monitoring pattern so that each monitoring module monitors all other monitoring modules.

11. The management device of claim 8, further comprising:

a deactivation unit configured to cause the information security device to deactivate each blocking module.

12. The management device of claim 11, wherein the update unit generates the new monitoring pattern so that monitoring modules excluding each deactivated blocking module monitor each other, transmits the new monitoring pattern to the information security device, and causes the information security device to adopt the new monitoring pattern, the reception unit further receives, from the information security device, a plurality of monitoring results generated by the monitoring modules monitoring each other, excluding each deactivated blocking module, and the monitoring device further comprises a normal module identification unit configured to identify a normal monitoring module.

13. The management device of claim 1 for managing an information security device that includes a plurality of monitoring modules that monitor for tampering, the management device comprising:

a reception unit configured to receive, from the information security device, a plurality of monitoring results generated by the monitoring modules each monitoring one or more other monitoring modules;

a determination unit configured to determine, by referring to the monitoring results, that one or more of the monitoring modules are candidate blocking modules that determine all other monitoring modules monitored thereby to be malicious;

a deactivation unit configured to control the information security device, when only one candidate blocking module is determined, to deactivate the candidate blocking module; and an update unit configured to generate, when only one candidate blocking module is determined, a new monitoring pattern excluding the candidate blocking module, to transmit the new monitoring pattern to the information security device, and to cause the information security device to adopt the new monitoring pattern, wherein the reception unit further receives, from the information security device, new monitoring results generated in accordance with the new monitoring pattern, and the determination unit determines that a monitoring module is a normal monitoring module by referring to the new monitoring results.

14. A tampering management system comprising an information security device and a management device, the information security device including a plurality of monitoring modules that monitor for tampering, and the management device managing the information security device, wherein the management device comprises:

a non-transitory management device that stores a program; and a processing device that executes the program to cause the management device to operate as:

a reception unit that receives, from the information security device, a plurality of monitoring results generated by the monitoring modules each monitoring another monitoring module;

a detection unit that detects whether any normal monitoring module that has not been tampered with exists by referring to the monitoring results;

a first hypothesis unit that selects, when the detection unit detects existence of a monitoring module that has not been tampered with, a monitoring module among the plurality of monitoring modules and hypothesizes that the selected monitoring module has been tampered with;

a second hypothesis unit that successively applies a procedure to monitoring modules other than the selected monitoring module by referring to the monitoring results, starting from the selected monitoring module, the procedure being to hypothesize that any monitoring module determining that a monitoring module hypothesized to have been tampered with is normal has also been tampered with; and a determination unit that determines whether, as a result of the procedure by the second hypothesis unit, all of the monitoring modules are hypothesized to have been tampered with, and when determining that all of the monitoring modules are hypothesized to have been tampered with, determines the selected monitoring module to be a normal monitoring module that has not been tampered with, thereby reversing the hypothesis by the first hypothesis unit as being incorrect, wherein the detection unit detects, by referring to previously received monitoring results and currently received monitoring results, existence of the normal monitoring module when all monitoring modules are determined to be normal in the previously received monitoring results and not all modules are determined to be normal in the currently received monitoring results, and wherein a time between generation of the previously received monitoring results and generation of the currently received monitoring results is less than a predetermined threshold.

15. The tampering management system of claim 14, wherein at least one monitoring module in the information security device is an update module provided with a function to update another module, and the management device further comprises a control unit configured to control the monitoring module selected as the normal monitoring module to update another module when the monitoring module is the update module.

16. The tampering management system of claim 14 comprising an information security device including a plurality of monitoring modules that monitor for tampering and the information security device, wherein the management device comprises:

a reception unit configured to receive, from the information security device, a plurality of monitoring results generated by the monitoring modules each monitoring one or more other monitoring modules;

a determination unit configured to determine, by referring to the monitoring results, that one or more of the monitoring modules are candidate blocking modules that determine all other monitoring modules monitored thereby to be malicious; and an update unit configured to generate, when a plurality of monitoring modules are determined to be candidate blocking modules, a new monitoring pattern in which the candidate blocking modules monitor each other, to transmit the new monitoring pattern to the information security device, and to cause the information security device to adopt the new monitoring pattern, wherein the reception unit further receives, from the information security device, new monitoring results generated in accordance with the new monitoring pattern, and the determination unit determines, by referring to the new monitoring results, that each candidate blocking module is a blocking module after excluding, from the candidate blocking modules, two candidate blocking modules that determine each other to be normal and determine all other candidate blocking modules to be malicious.

17. The tampering management system of claim 16, wherein at least one monitoring module in the information security device is an update module provided with a function to update another module, and the management device further comprises a control unit configured to control the monitoring module selected as the normal monitoring module to update another module when the monitoring module is the update module.

18. An integrated circuit for managing an information security device that includes a plurality of monitoring modules that monitor for tampering, the integrated circuit comprising:

a non-transitory security device that stores a program; and a processing device that executes the program to cause the management device to operate as:

a detection unit that detects whether any normal monitoring module that has not been tampered with exists by referring to a plurality of monitoring results received from the information security device and generated by the monitoring modules each monitoring another monitoring module;

a first hypothesis unit that selects, when the detection unit detects existence of a monitoring module that has not been tampered with, a monitoring module among the plurality of monitoring modules and hypothesizes that the selected monitoring module has been tampered with;

a second hypothesis unit that successively applies a procedure to monitoring modules other than the selected monitoring module by referring to the monitoring results, starting from the selected monitoring module, the procedure being to hypothesize that any monitoring module determining that a monitoring module hypothesized to have been tampered with is normal has also been tampered with; and a determination unit that determines whether, as a result of the procedure by the second hypothesis unit, all of the monitoring modules are hypothesized to have been tampered with, and when determining that all of the monitoring modules are hypothesized to have been tampered with, determines the selected monitoring module to be a normal monitoring module that has not been tampered with, thereby reversing the hypothesis by the first hypothesis unit as being incorrect, wherein the detection unit detects, by referring to previously received monitoring results and currently received monitoring results, existence of the normal monitoring module when all monitoring modules are determined to be normal in the previously received monitoring results and not all modules are determined to be normal in the currently received monitoring results, and wherein a time between generation of the previously received monitoring results and generation of the currently received monitoring results is less than a predetermined threshold.

19. The integrated circuit of claim 18 for managing an information security device that includes a plurality of monitoring modules that monitor for tampering, the integrated circuit comprising:

a determination unit configured to select from the monitoring modules, by referring to monitoring results, one or more candidate blocking modules that determine all other monitoring modules monitored thereby to be malicious, the monitoring results being received from the information security device and generated by the monitoring modules each monitoring one or more other monitoring modules; and an update unit configured to generate, when a plurality of monitoring modules are determined to be candidate blocking modules, a new monitoring pattern in which the candidate blocking modules monitor each other, to transmit the new monitoring pattern to the information security device, and to cause the information security device to adopt the new monitoring pattern, wherein the reception unit further receives, from the information security device, new monitoring results generated in accordance with the new monitoring pattern, and the determination unit determines, by referring to the new monitoring results, that each candidate blocking module is a blocking module after excluding, from the candidate blocking modules, two candidate blocking modules that determine each other to be normal and determine all other candidate blocking modules to be malicious.

20. A management method performed by a management device for managing an information security device that includes a plurality of monitoring modules that monitor for tampering, the management device including a non-transitory security device that stores a program and a processing device that executes the program to cause the management device to perform the management method comprising the steps of:

receiving, from the information security device, a plurality of monitoring results generated by the monitoring modules each monitoring another monitoring module;

detecting whether any normal monitoring module that has not been tampered with exists by referring to the monitoring results;

selecting, when existence of a monitoring module that has not been tampered with is detected, a monitoring module among the plurality of monitoring modules and performing a first hypothesizing step that the selected monitoring module has been tampered with;

successively applying a procedure to monitoring modules other than the selected monitoring module by referring to the monitoring results, starting from the selected monitoring module, the procedure being to perform a second hypothesizing step that any monitoring module determining that a monitoring module hypothesized to have been tampered with is normal has also been tampered with; and determining whether, as a result of the procedure by the second hypothesizing step, all of the monitoring modules are hypothesized to have been tampered with, and when determining positively, determining the selected monitoring module to be a normal monitoring module that has not been tampered with, thereby reversing the hypothesis by the first hypothesis unit as being incorrect, wherein the detection unit detects, by referring to previously received monitoring results and currently received monitoring results, existence of the normal monitoring module when all monitoring modules are determined to be normal in the previously received monitoring results and not all modules are determined to be normal in the currently received monitoring results, and wherein a time between generation of the previously received monitoring results and generation of the currently received monitoring results is less than a predetermined threshold.

21. The management method of claim 20 for managing an information security device that includes a plurality of monitoring modules that monitor for tampering, the management method comprising the steps of:

selecting from the monitoring modules, by referring to monitoring results, one or more candidate blocking modules that determine all other monitoring modules monitored thereby to be malicious, the monitoring results being received from the information security device and generated by the monitoring modules each monitoring one or more other monitoring modules; and generating, when a plurality of monitoring modules are determined to be candidate blocking modules, a new monitoring pattern in which the candidate blocking modules monitor each other, transmitting the new monitoring pattern to the information security device, and causing the information security device to adopt the new monitoring pattern, wherein in the receiving step, new monitoring results generated in accordance with the new monitoring pattern are further received from the information security device, and in the determination step it is determined, by referring to the new monitoring results, that each candidate blocking module is a blocking module after excluding, from the candidate blocking modules, two candidate blocking modules that determine each other to be normal and determine all other candidate blocking modules to be malicious.

22. A non-transitory computer-readable recording medium having recorded thereon a computer program for managing an information security device that includes a plurality of monitoring modules that monitor for tampering, the computer program causing a computer to perform the steps of:

receiving, from the information security device, a plurality of monitoring results generated by the monitoring modules each monitoring another monitoring module;

detecting whether any normal monitoring module that has not been tampered with exists by referring to the monitoring results;

selecting, when existence of a monitoring module that has not been tampered with is detected, a monitoring module among the plurality of monitoring modules and performing a first hypothesizing step that the selected monitoring module has been tampered with;

successively applying a procedure to monitoring modules other than the selected monitoring module by referring to the monitoring results, starting from the selected monitoring module, the procedure being to perform a second hypothesizing step that any monitoring module determining that a monitoring module hypothesized to have been tampered with is normal has also been tampered with; and determining whether, as a result of the procedure by the second hypothesizing step, all of the monitoring modules are hypothesized to have been tampered with, and when determining positively, determining the selected monitoring module to be a normal monitoring module that has not been tampered with, thereby reversing the hypothesis by the first hypothesis unit as being incorrect, wherein the detection unit detects, by referring to previously received monitoring results and currently received monitoring results, existence of the normal monitoring module when all monitoring modules are determined to be normal in the previously received monitoring results and not all modules are determined to be normal in the currently received monitoring results, and wherein a time between generation of the previously received monitoring results and generation of the currently received monitoring results is less than a predetermined threshold.

23. The computer-readable recording medium of claim 22 having recorded thereon a computer program for managing an information security device that includes a plurality of monitoring modules that monitor for tampering, the computer program causing a computer to perform the steps of:

selecting from the monitoring modules, by referring to monitoring results, one or more candidate blocking modules that determine all other monitoring modules monitored thereby to be malicious, the monitoring results being received from the information security device and generated by the monitoring modules each monitoring one or more other monitoring modules; and generating, when a plurality of monitoring modules are determined to be candidate blocking modules, a new monitoring pattern in which the candidate blocking modules monitor each other, transmitting the new monitoring pattern to the information security device, and causing the information security device to adopt the new monitoring pattern, wherein in the receiving step, new monitoring results generated in accordance with the new monitoring pattern are further received from the information security device, and in the determination step it is determined, by referring to the new monitoring results, that each candidate blocking module is a blocking module after excluding, from the candidate blocking modules, two candidate blocking modules that determine each other to be normal and determine all other candidate blocking modules to be malicious.

* * * * *